United States Patent
Waite

(10) Patent No.: US 9,342,497 B1
(45) Date of Patent: May 17, 2016

(54) HIERARCHICAL USER INTERFACE

(71) Applicant: David Waite, Belmont, MA (US)

(72) Inventor: David Waite, Belmont, MA (US)

(*) Notice: Subject to any disclaimer, the term of this patent is extended or adjusted under 35 U.S.C. 154(b) by 116 days.

(21) Appl. No.: 14/202,210

(22) Filed: Mar. 10, 2014

Related U.S. Application Data

(60) Provisional application No. 61/777,577, filed on Mar. 12, 2013.

(51) Int. Cl.
  *G06F 17/24* (2006.01)
  *G06F 3/0485* (2013.01)
  *G06F 17/22* (2006.01)

(52) U.S. Cl.
  CPC ............ *G06F 17/246* (2013.01); *G06F 3/0485* (2013.01); *G06F 17/2247* (2013.01)

(58) Field of Classification Search
  CPC ... G06F 17/246; G06F 3/0485; G06F 3/0486; G06F 3/0487
  USPC .......................... 715/255, 853, 854, 503, 212
  See application file for complete search history.

(56) References Cited

U.S. PATENT DOCUMENTS

| | | | |
|---|---|---|---|
| 6,651,216 B1 | 11/2003 | Sullivan et al. | |
| 7,096,422 B2 * | 8/2006 | Rothschiller et al. | ......... 715/212 |
| 2004/0030719 A1 * | 2/2004 | Wei | ................... G06F 17/30905 |
| 2012/0084708 A1 * | 4/2012 | Upadhyaya et al. | .......... 715/781 |
| 2013/0080930 A1 * | 3/2013 | Johansson | ..................... 715/760 |

OTHER PUBLICATIONS

Workbook Manager for Microsoft Excel, Mar. 8, 2013, Add-in Express Ltd., p. 1-13.*
Excel 2013 VBA and Macros—Understanding VB Editor, Feb. 4, 2013, Que, p. 7-8.*
Merge copies of a shared workbook, Nov. 4, 2012, Microsoft, p. 1.*
Resolve Invalid Links in a Microsoft Excel List Tree, Apr. 28, 2011, Microsoft, p. 1.*
How to display or hide sheet tabs in Microsoft Excel, Jun. 16, 2012, ExtendOffice.com, p. 2.*
Microsoft Corporation, EXCEL 2010 Screen capture, 2010, p. 1.*
Smartsheet.com, Using Folders, Nov. 30, 2012, Smartsheet.com, p. 1.*
Vertical Tabs Navigation Add-In for Microsoft Excel, retrieved Jan. 9, 2014 from the Internet URL: http://excelnavi.com.
MyInfo 6 free form personal organizer, retrieved with a date of Nov. 26, 2012 from http://www.archive.org, from the Internet URL: http://www.milenix.com/myinfo, downloaded on Mar. 7, 2014.

* cited by examiner

*Primary Examiner* — Scott Baderman
*Assistant Examiner* — Seung Jung
(74) *Attorney, Agent, or Firm* — Hamilton, Brook, Smith & Reynolds, P.C.

(57) ABSTRACT

In an embodiment, a hierarchical user interface replaces a native one-dimensional horizontal navigation system with a multi-dimensional hierarchical tree structure for organizing and navigating spreadsheet workbooks. The interface allows users to visualize the full structure and content of workbooks, quickly navigate to and select sheets, and organize workbooks in a more logical manner than sequential tabs allow.

21 Claims, 119 Drawing Sheets illustrates one embodiment of the HUI user interface

Figure 1A - illustrates the EXCEL user interface
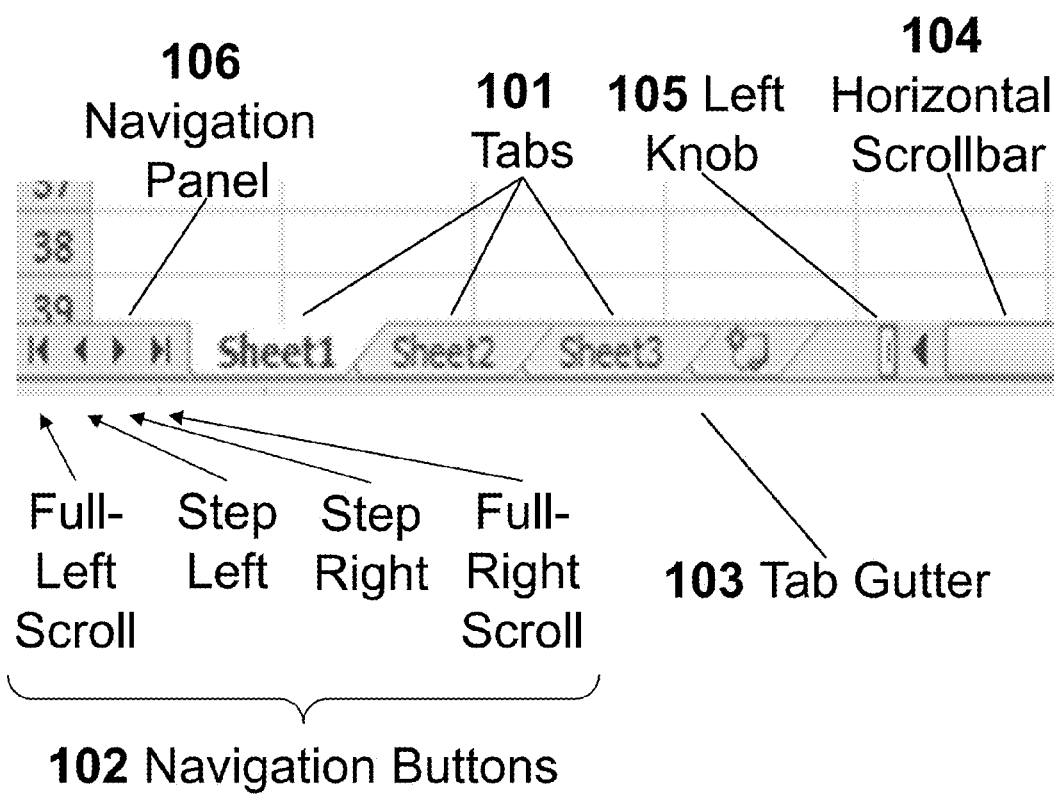

Figure 1B - illustrates the EXCEL user interface
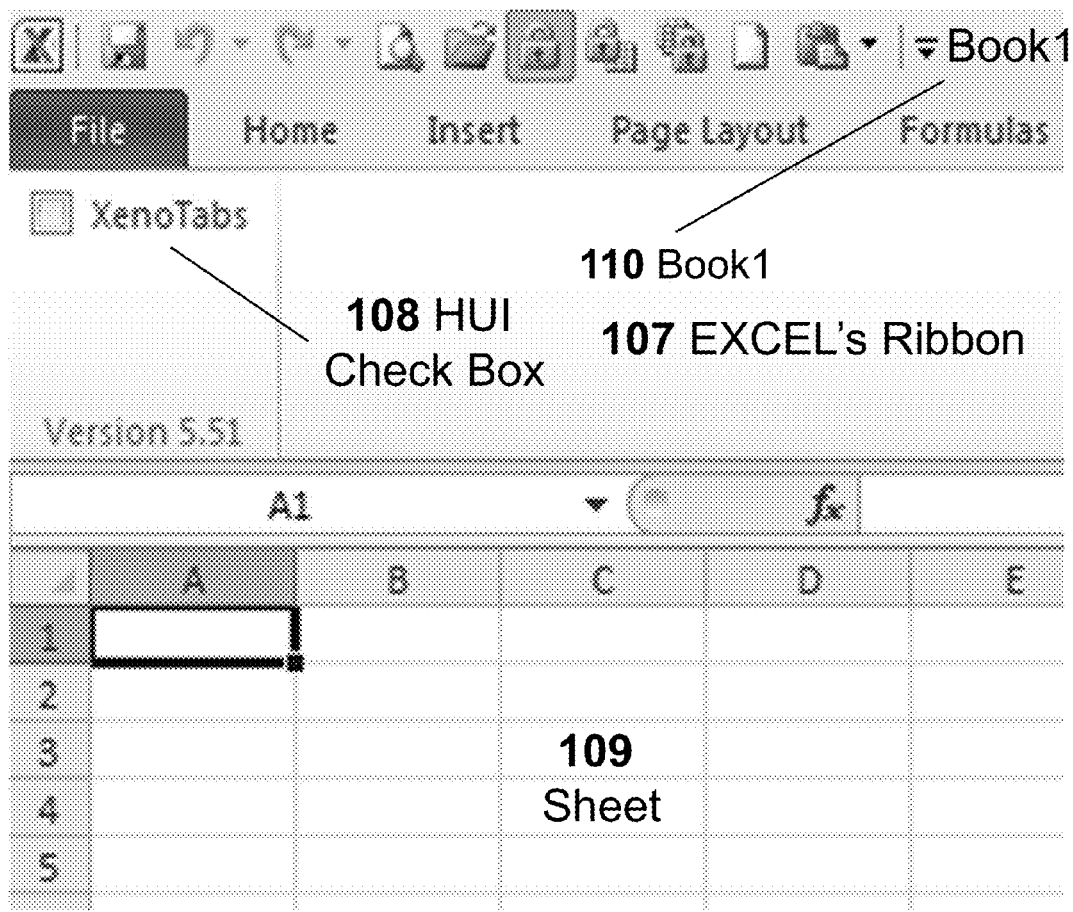

Figure 2A - illustrates one embodiment of the HUI user interface
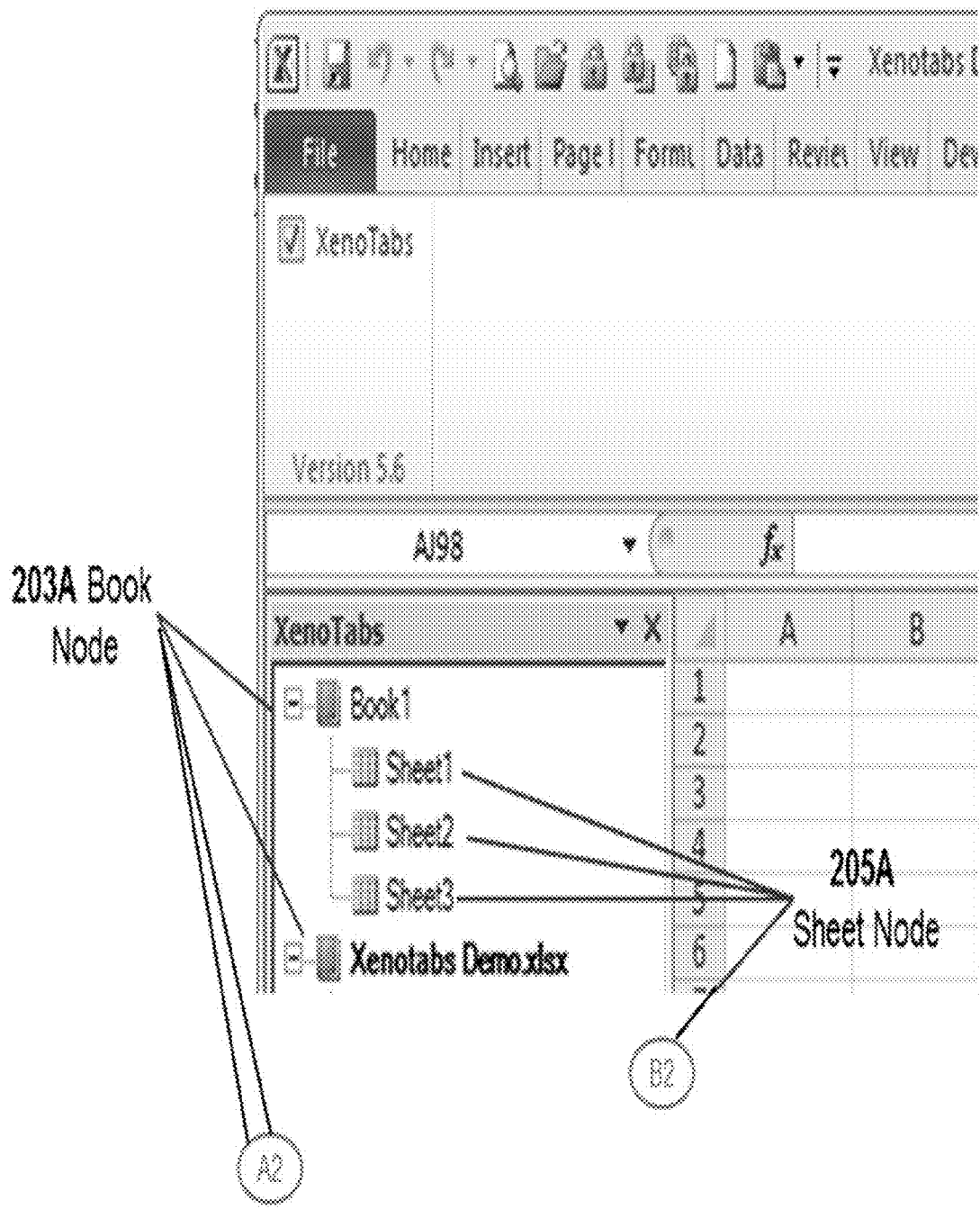

Figure 2B - illustrates one embodiment of the HUI user interface
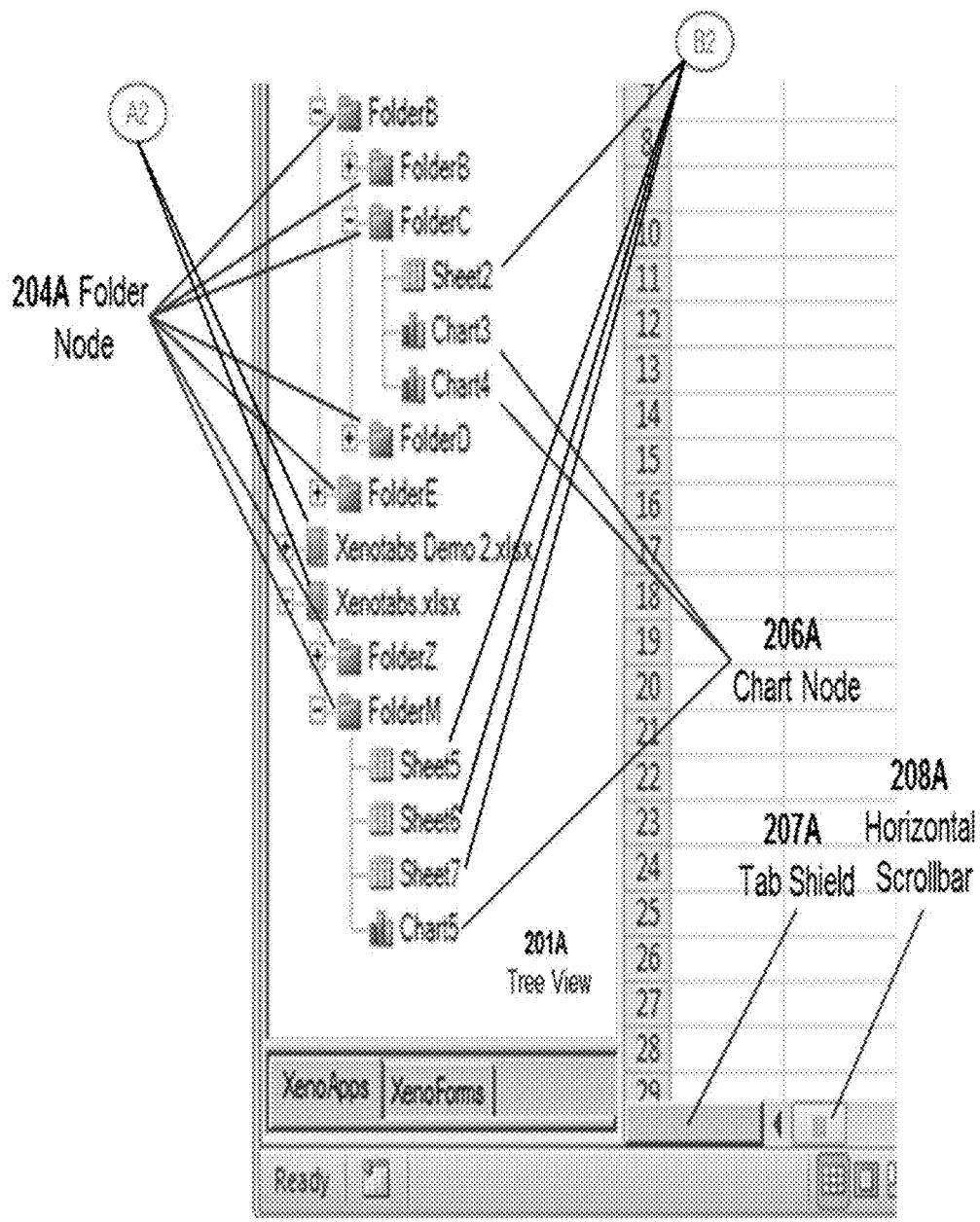

Figure 2C - illustrates one embodiment of the HUI user interface
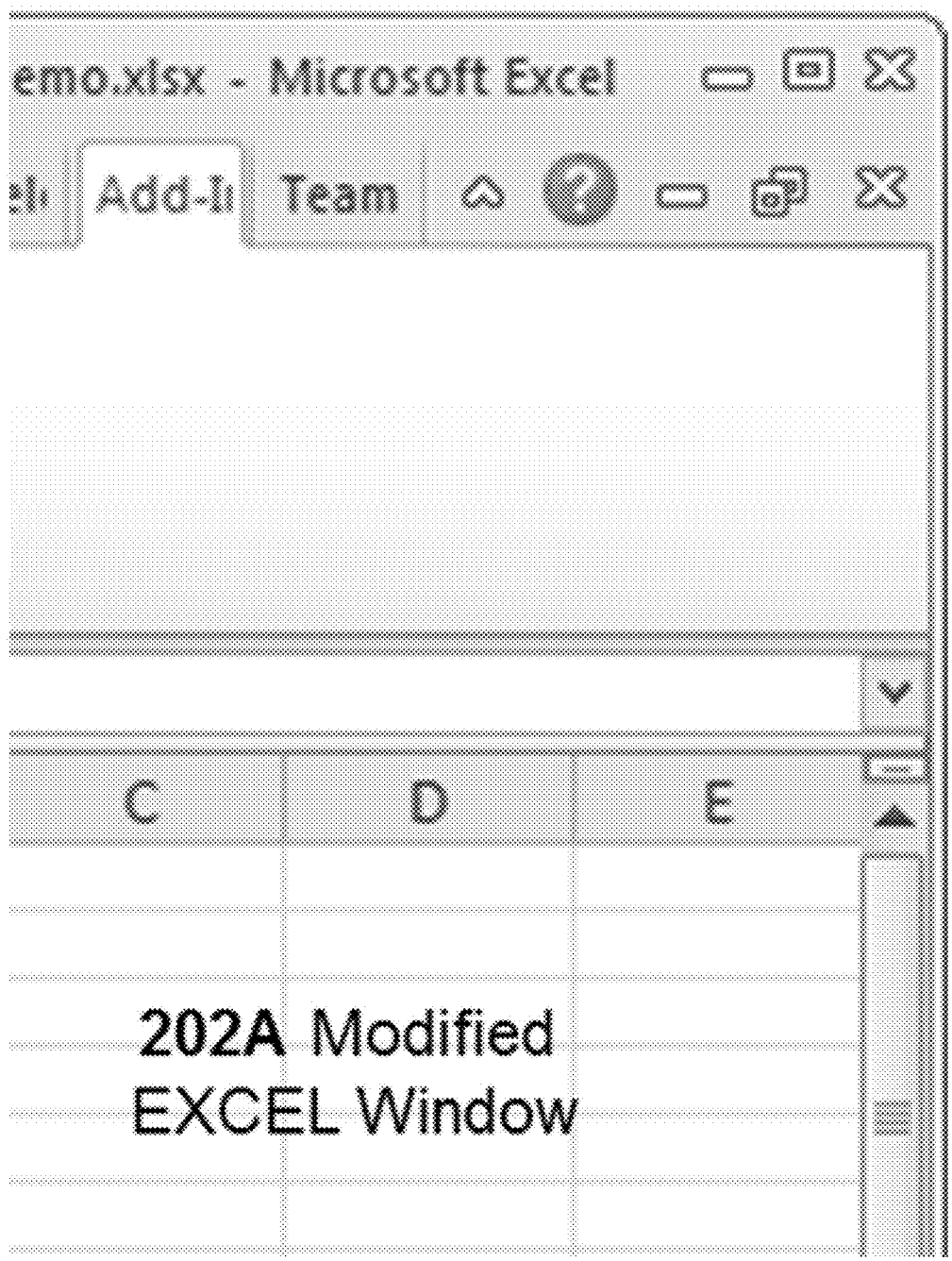

Figure 2D - illustrates the HUI user interface floating over an EXCEL sheet
201B Floating HUI Tree View
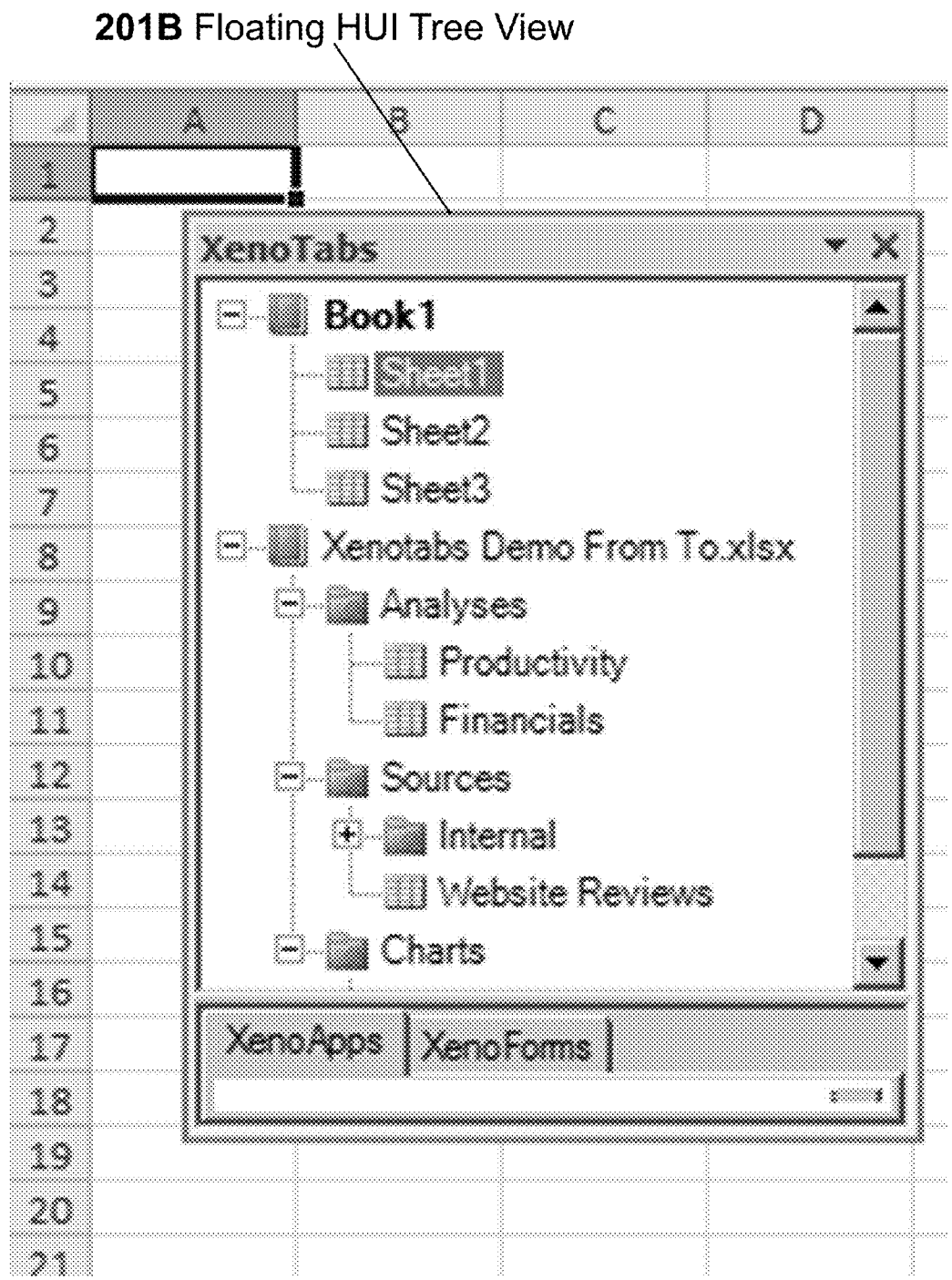

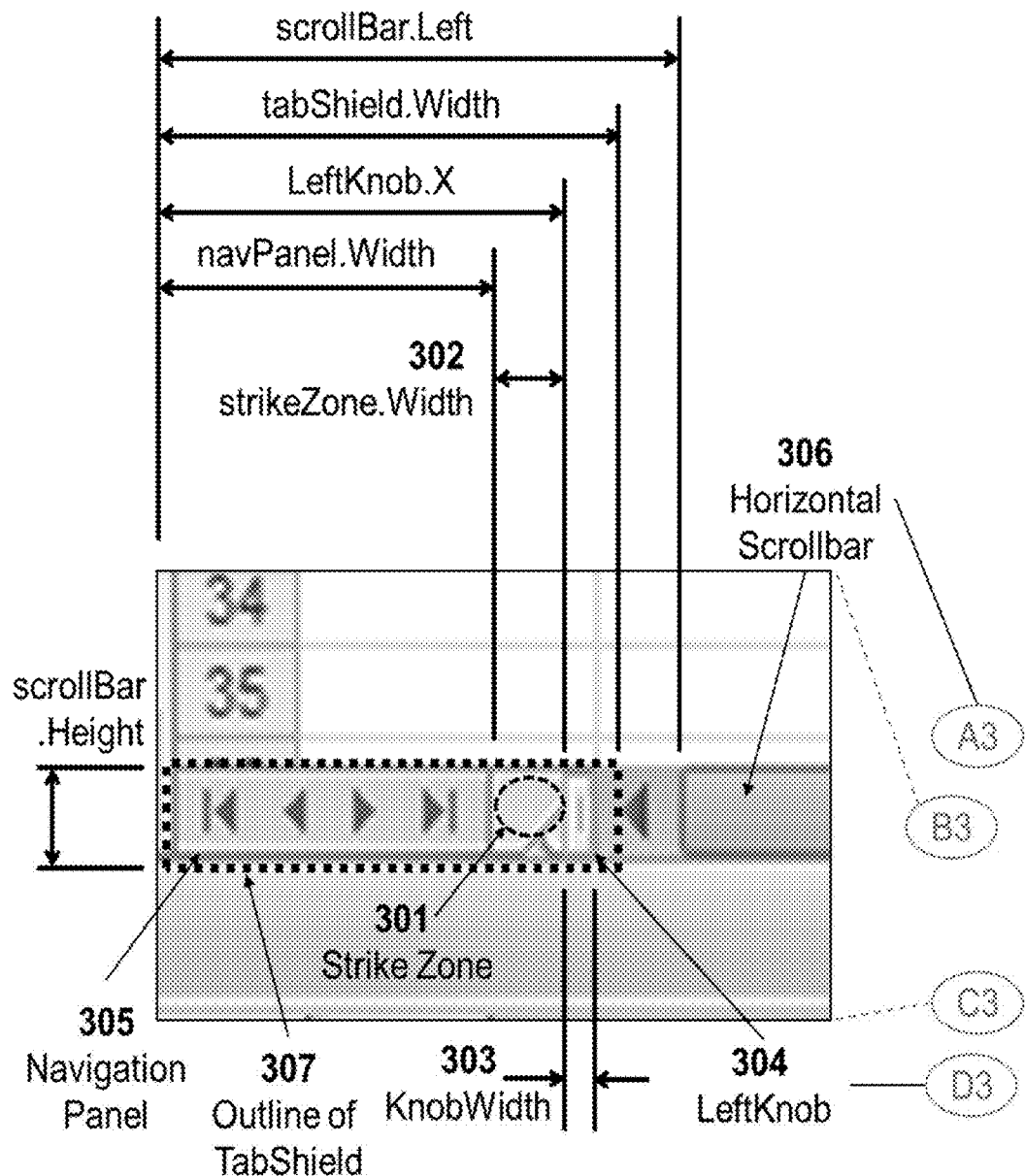
Figure 3A - shows the geometry behind the HUI user interface

Figure 3B - shows the geometry behind the HUI user interface
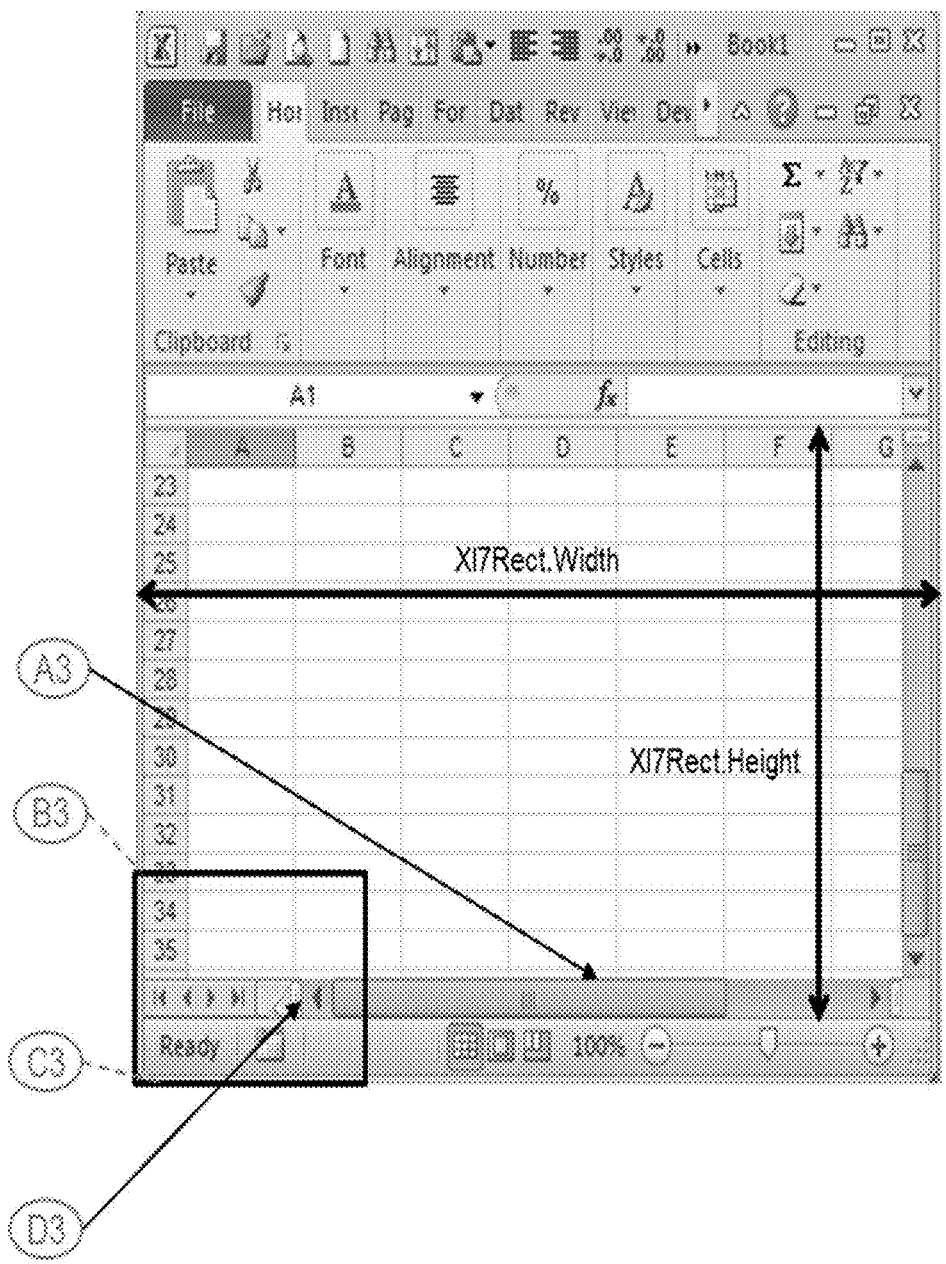

Figure 4 - represents the relevant dimensional relationships for the HUI interface

| | X | Y | Width | Height |
|---|---|---|---|---|
| Strike Zone 401 | Fixed | Fixed | 2*knobWidth | Fixed |
| Left Knob 402 | LeftKnob.X = navPanel.Width + 2*knobWidth | Xl7Rect.Height – scrollBar.Height | knobWidth | scrollBar.Height |
| Horiz-ontal Scroll-bar 403 | navPanel Width + knobWidth[1] | Xl7Rect.Height – scrollBar.Height | Xl7Rect.Width – LeftKnob.X Dim - knobWidth * 2 – scrollBar.Height | scrollBar.Height |
| Tab-Shield 404 | 0 | Xl7Rect.Height – scrollBar.Height | LeftKnob.X + knobWidth | scrollBar.Height |

Figure 5 - illustrates the HUI's architecture
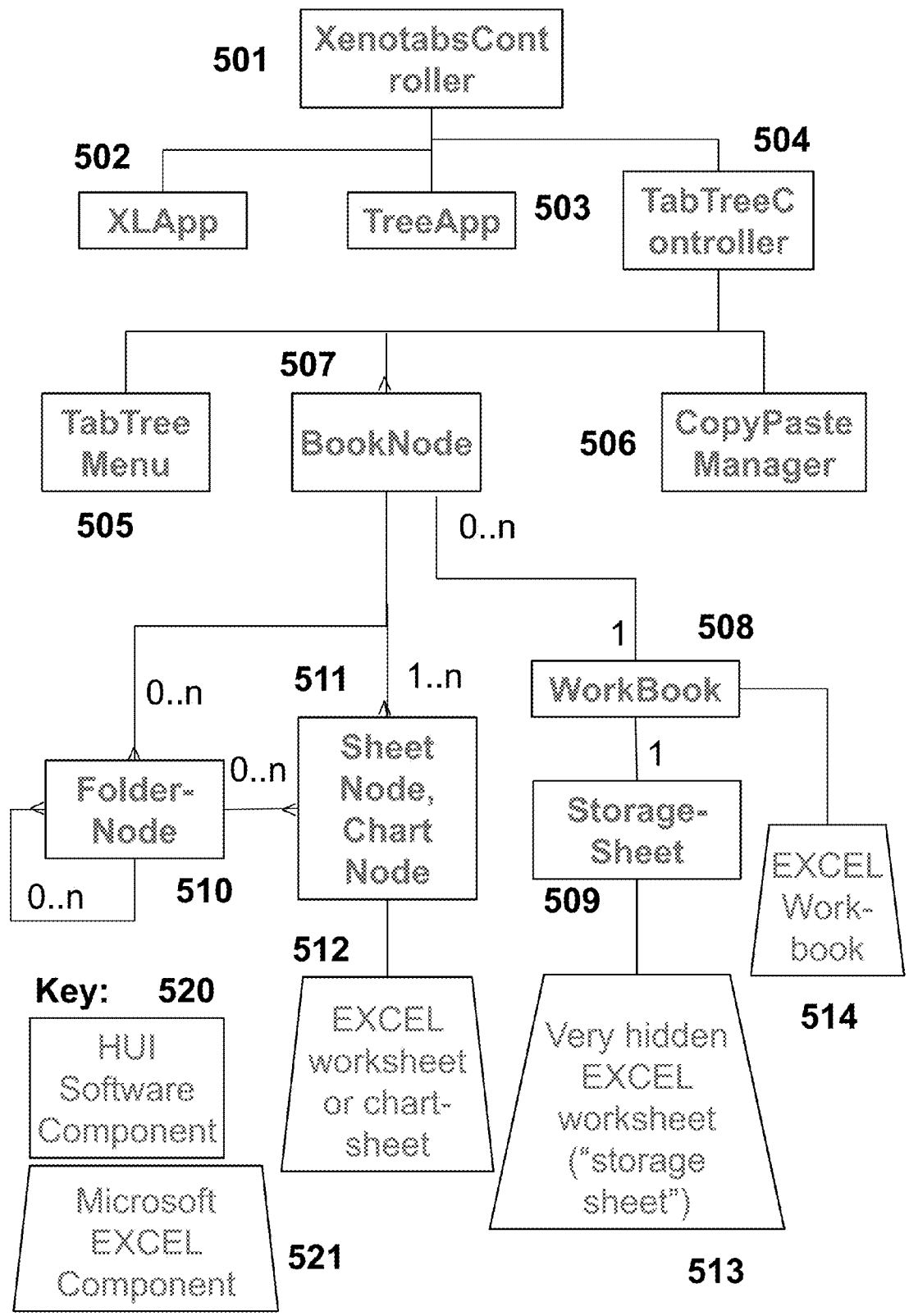

Figure 6A - shows the storage sheet and its parameter table

601

| ChildID |
|---|
| 0a4a8031aa8148578599175d7e5bb19f |
| cc6b38b100094d0989f1a970965c0b77 |
| cade19f21fa24c6f9989bceceddb7238 |
| a427b1d79c9a46daafaceece086878aa |
| dff807fcba134014b0d495d17fd49055 |
| 730d7358bc3e433e8fbf39ea229b5e73 |
| ec7f4596dd3d479e848dd0cc3c54babf |

(A6)

| ParentID |
|---|
| -1 |
| 0a4a8031aa8148578599175d7e5bb19f |
| cc6b38b100094d0989f1a970965c0b77 |
| cc6b38b100094d0989f1a970965c0b77 |
| cc6b38b100094d0989f1a970965c0b77 |
| dff807fcba134014b0d495d17fd49055 |
| cc6b38b100094d0989f1a970965c0b77 |

(B6)

Figure 6B - shows the storage sheet and its parameter table

601

| ChildName | ParentName | NodeType | IsExpanded | IsVisible |
|---|---|---|---|---|
| Book1.xlsx | ?root? | 0 | FALSE | FALSE |
| FolderA | Book1.xlsx | 1 | FALSE | FALSE |
| Sheet1 | FolderA | 2 | FALSE | FALSE |
| Chart1 | FolderA | 3 | FALSE | FALSE |
| FolderB | FolderA | 1 | FALSE | FALSE |

C6　D6　E6　F6　G6

Figure 6C - shows the storage sheet and its parameter table

A6 → 602    B6 → 603    C6 → 604    D6 → 605

| Hierarchical relationship table in StorageSheet (one row per node) ||||
|---|---|---|---|
| ChildID | ParentID | ChildName | ParentName |
| Unique ID for the current node | Unique ID of the parent's node | Child's text name | Parent's text name |

E6 → 606    F6 → 607    G6 → 608

| Hierarchical relationship table in StorageSheet (one row per node) |||
|---|---|---|
| NodeType | IsExpanded | IsHidden |
| Integer indicating the node type (Book, Folder, Sheet, Chart) | Boolean indicating of the node is expanded or collapsed | Boolean indicating whether the node is Hidden |

Figure 7A - shows the HUI's lifecycle operations
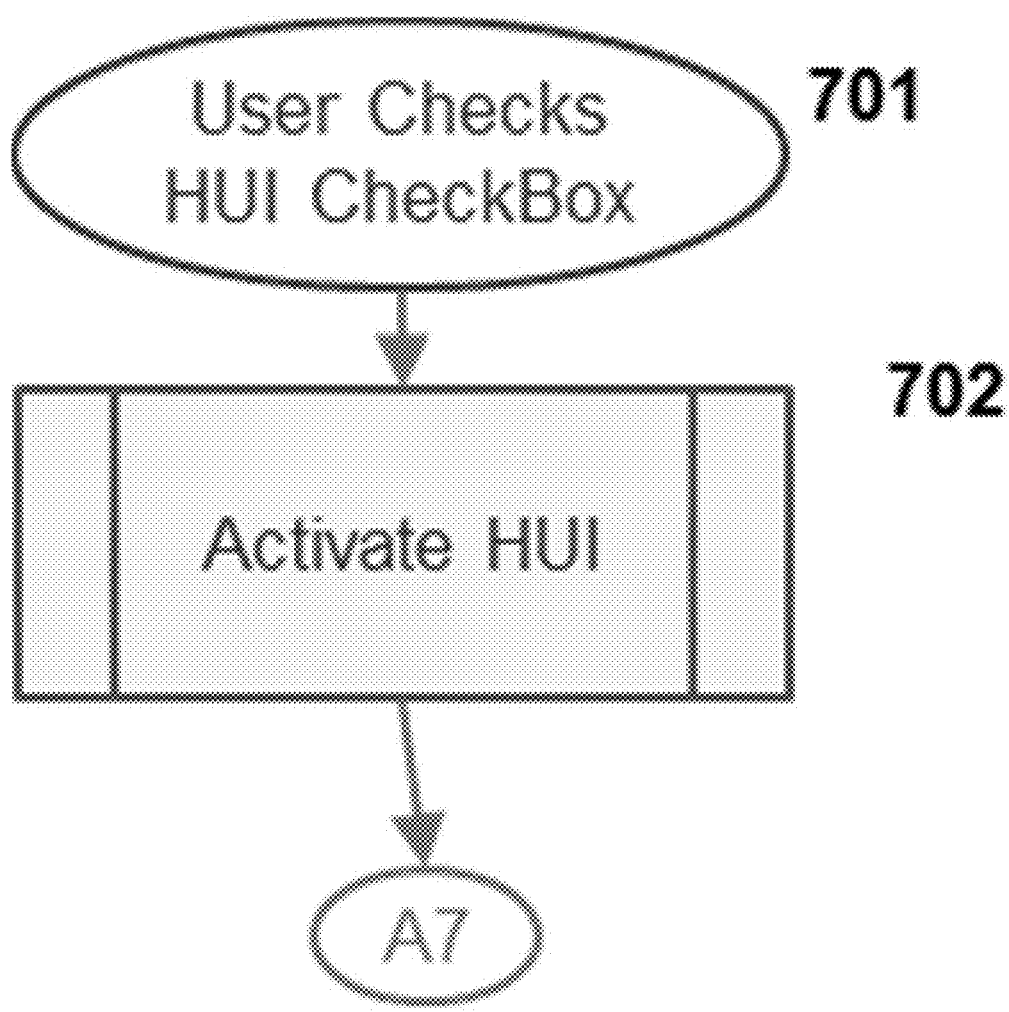

Figure 7B - shows the HUI's lifecycle operations
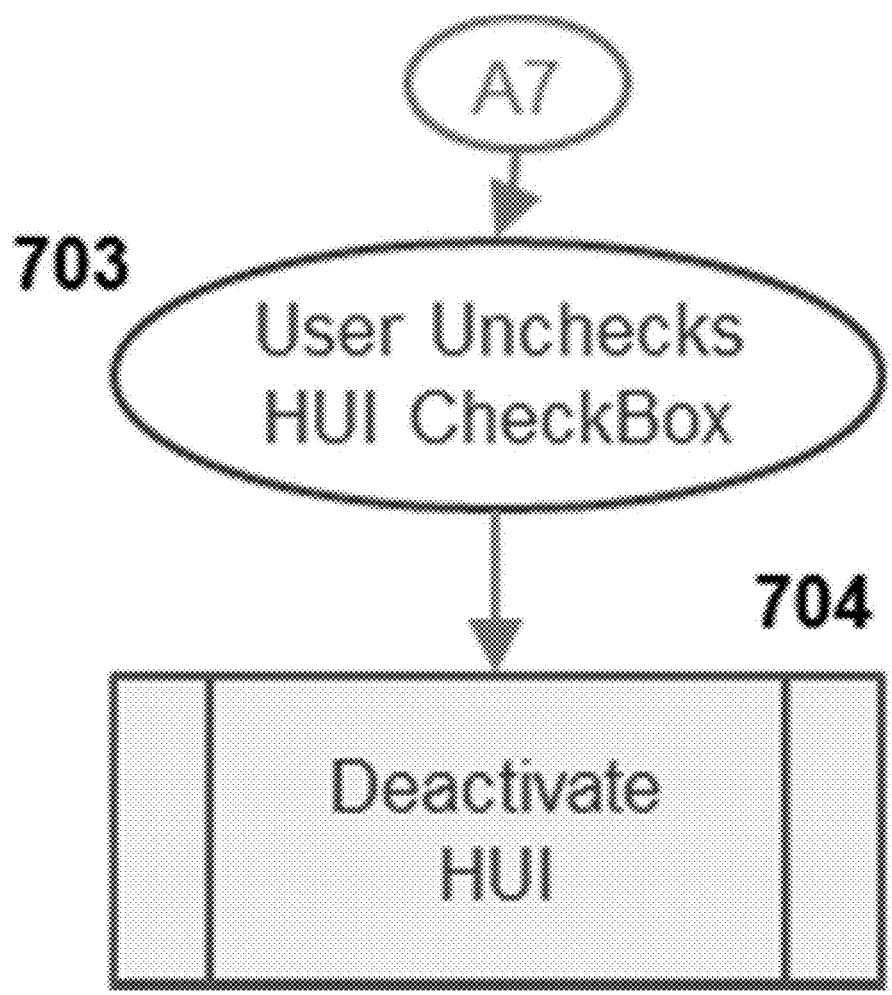

Figure 7C - shows the HUI's lifecycle operations
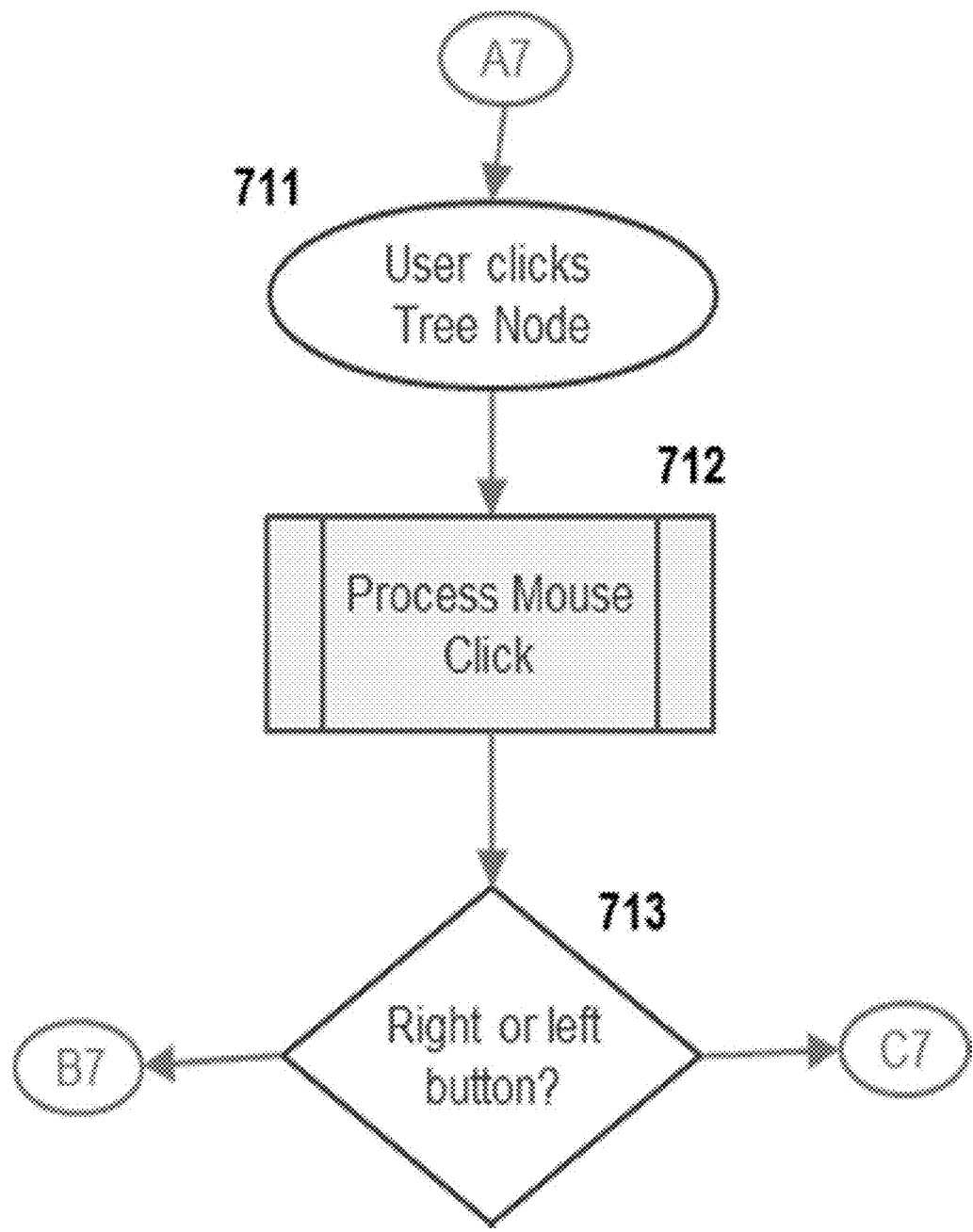

Figure 7D - shows the HUI's lifecycle operations
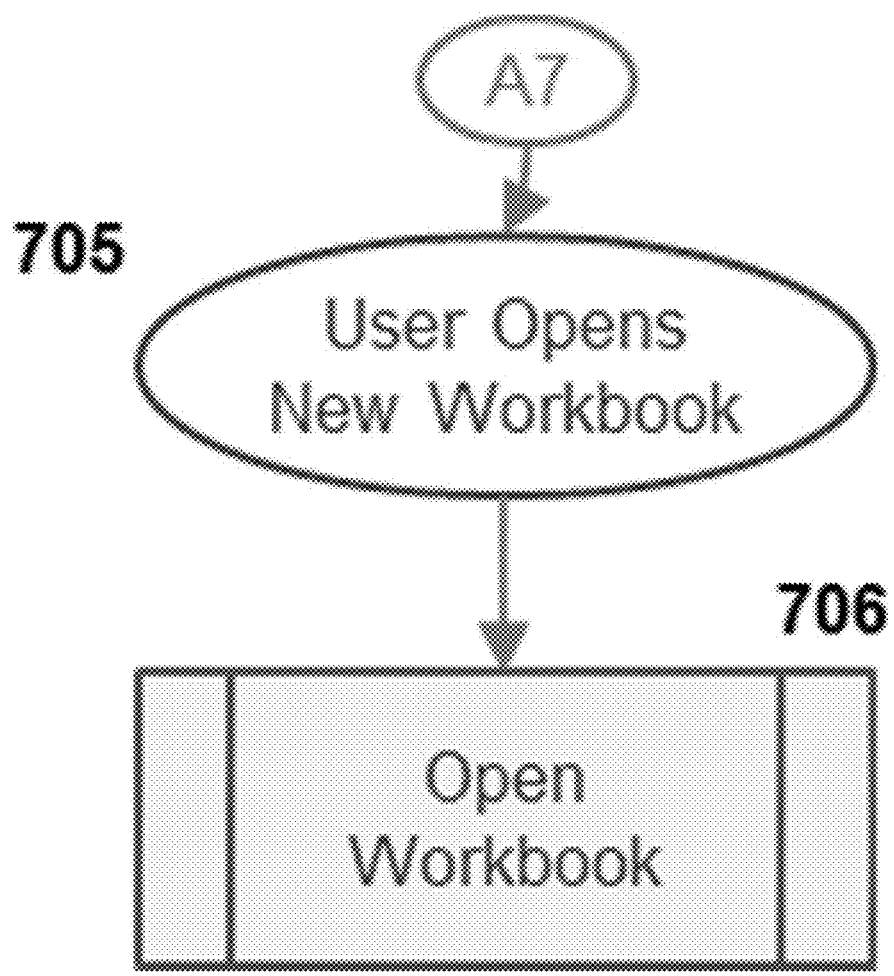

Figure 7E - shows the HUI's lifecycle operations
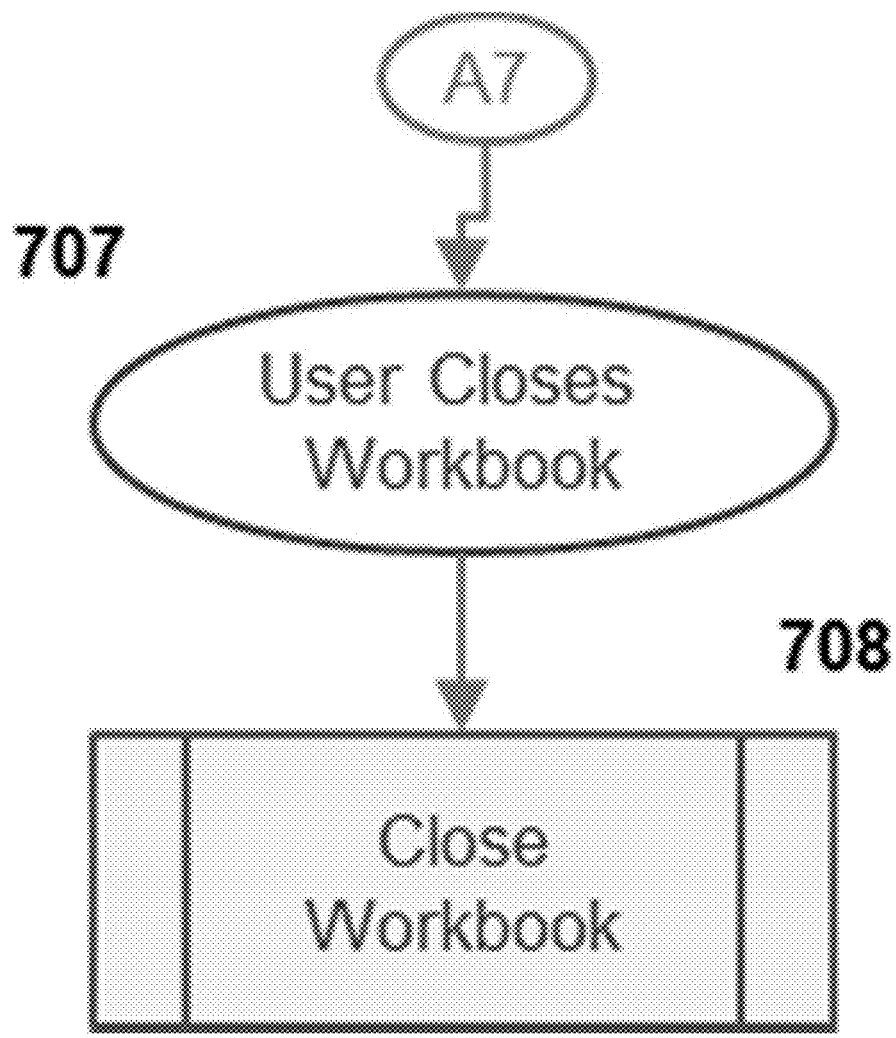

Figure 7F - shows the HUI's lifecycle operations
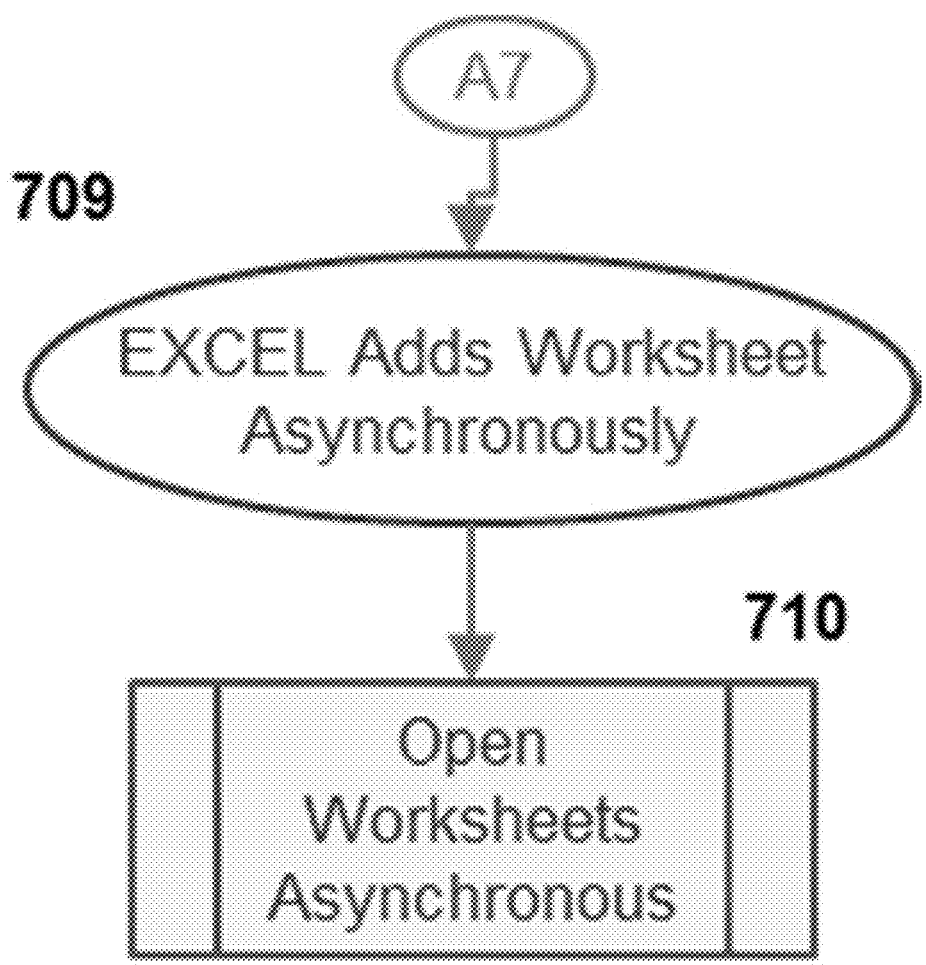

Figure 7G - shows the HUI's lifecycle operations
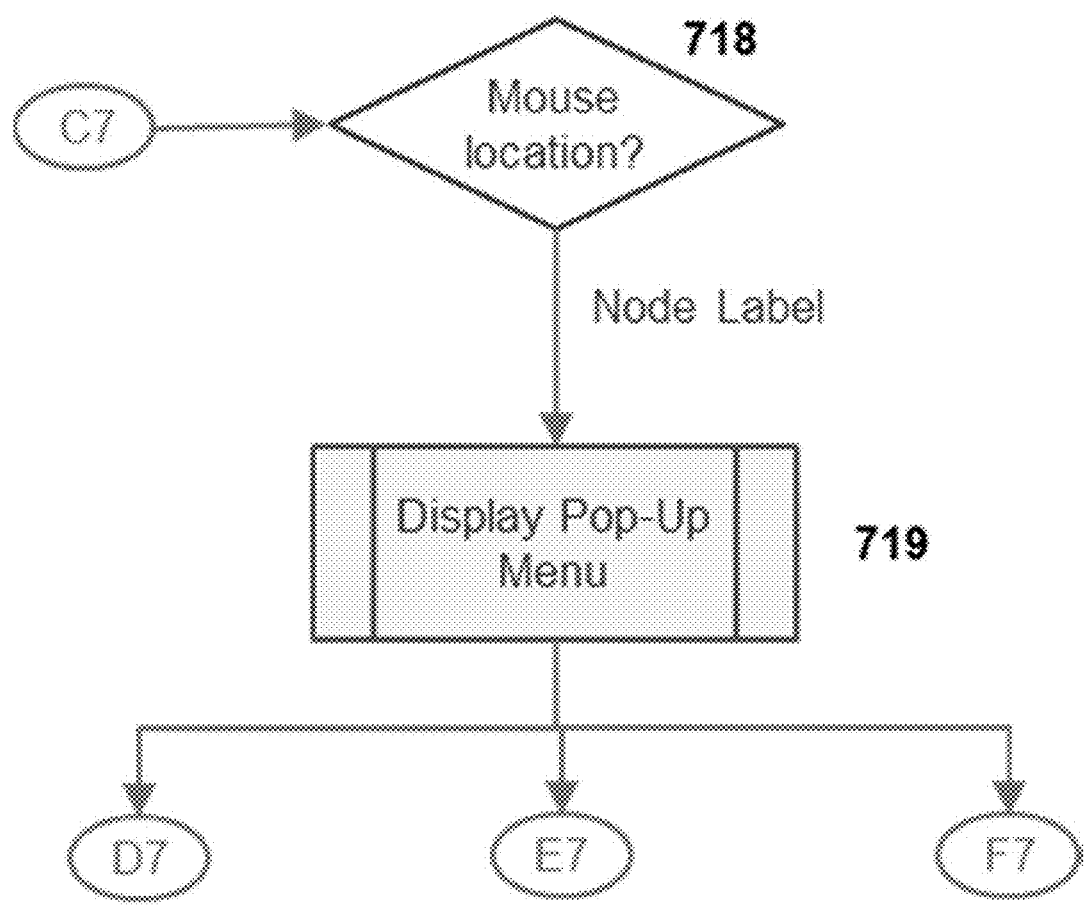

Figure 7H - shows the HUI's lifecycle operations
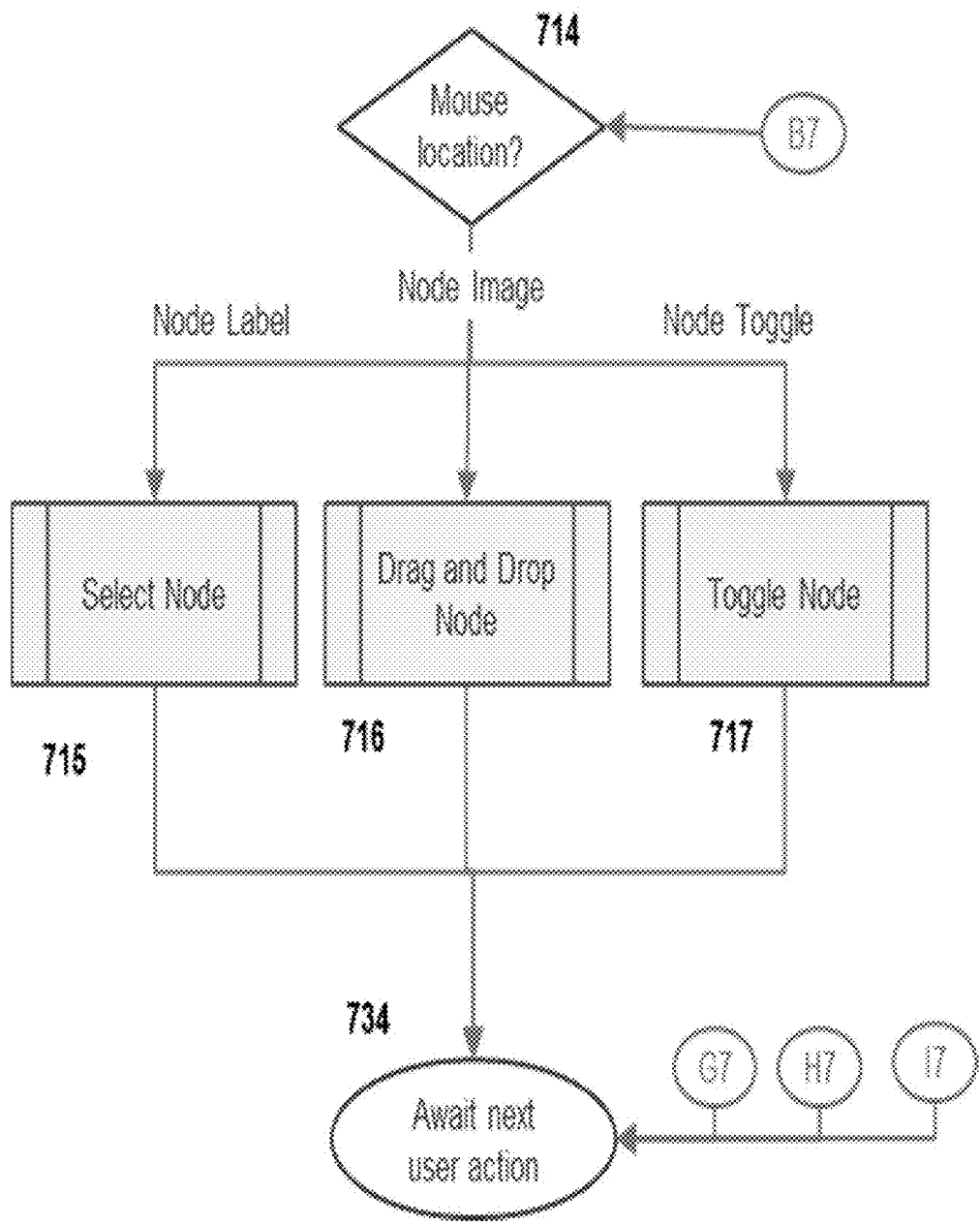

Figure 7I - shows the HUI's lifecycle operations
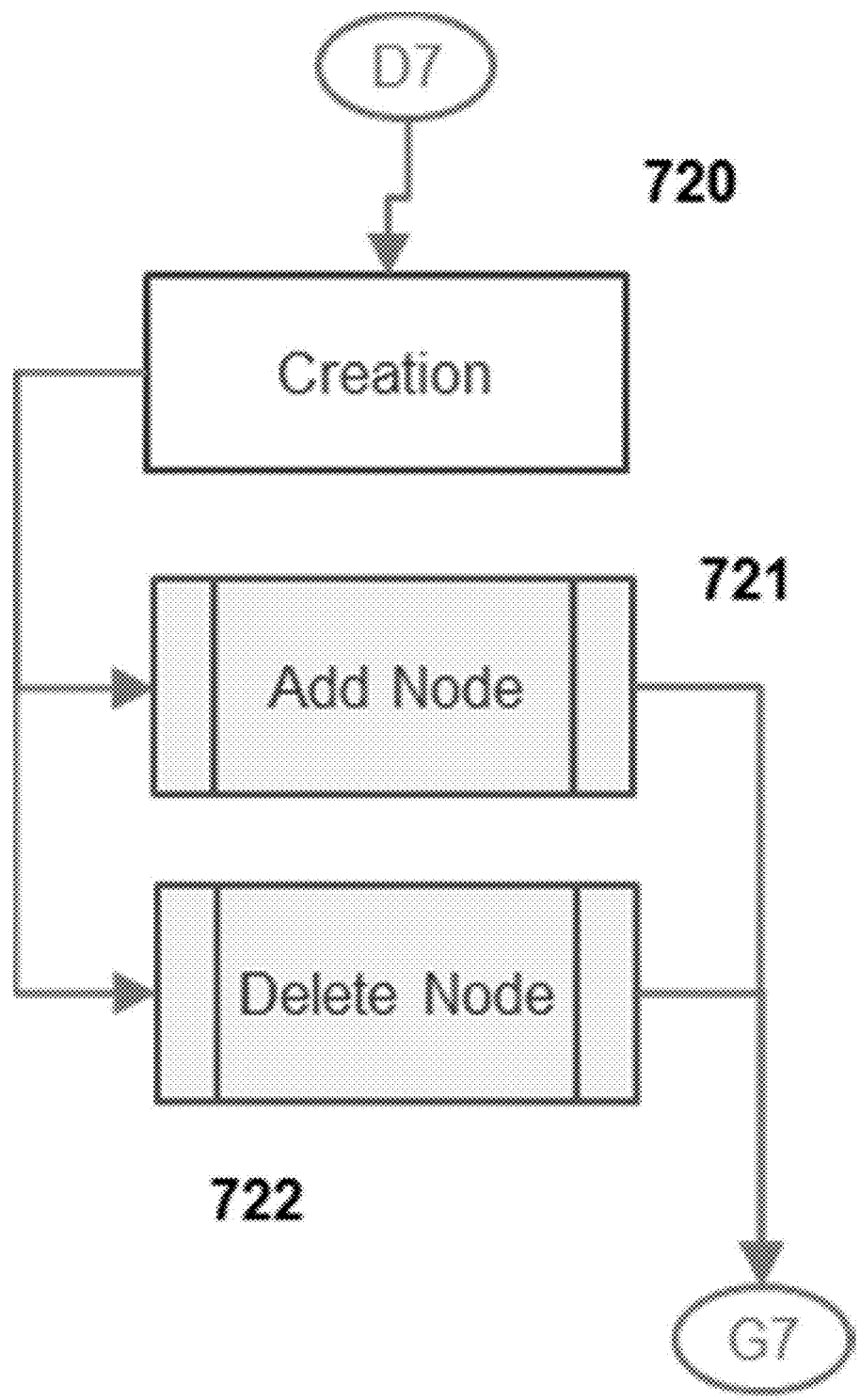

Figure 7J - shows the HUI's lifecycle operations
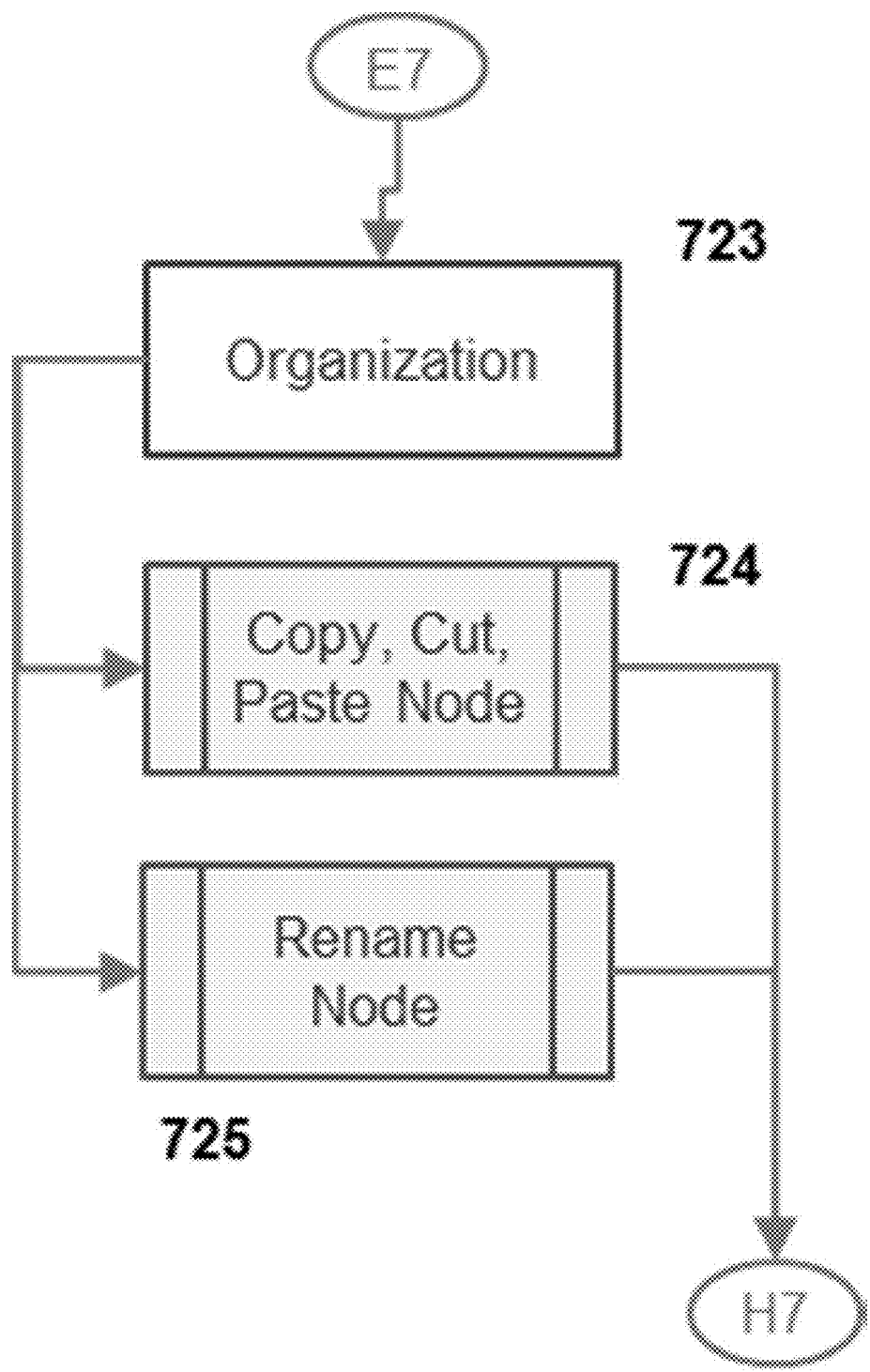

Figure 7K - shows the HUI's lifecycle operations
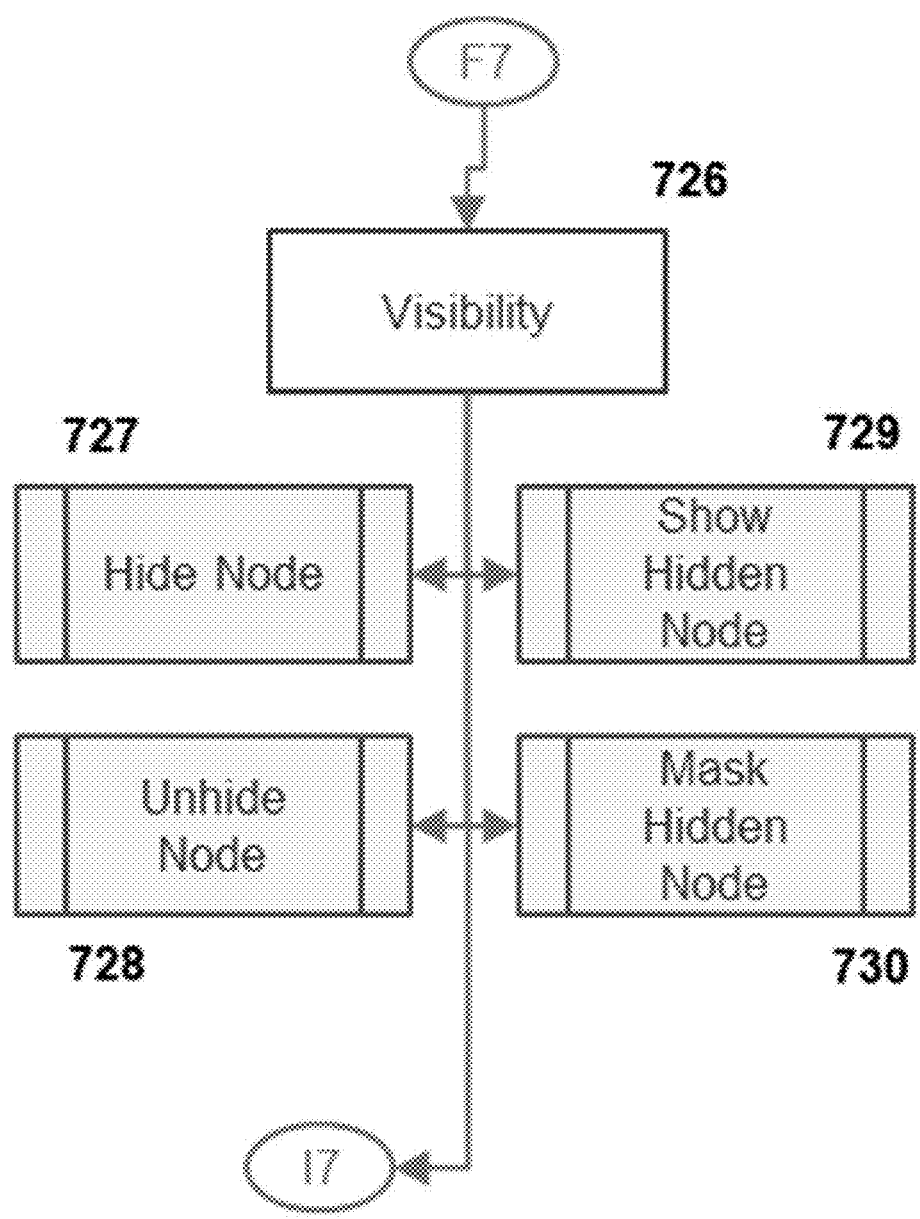

Figure 7L - shows the HUI's lifecycle operations
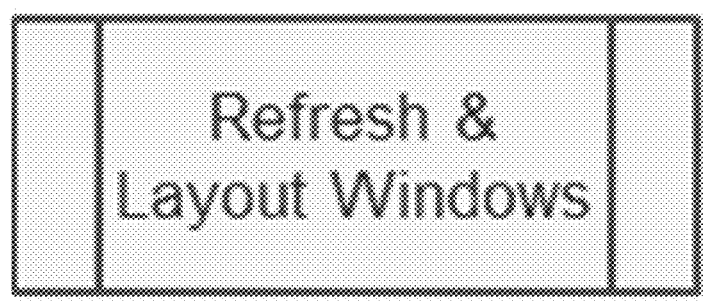
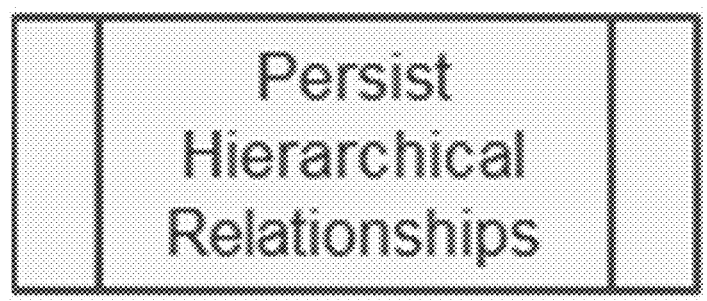

Figure 8A - shows how the HUI is activated
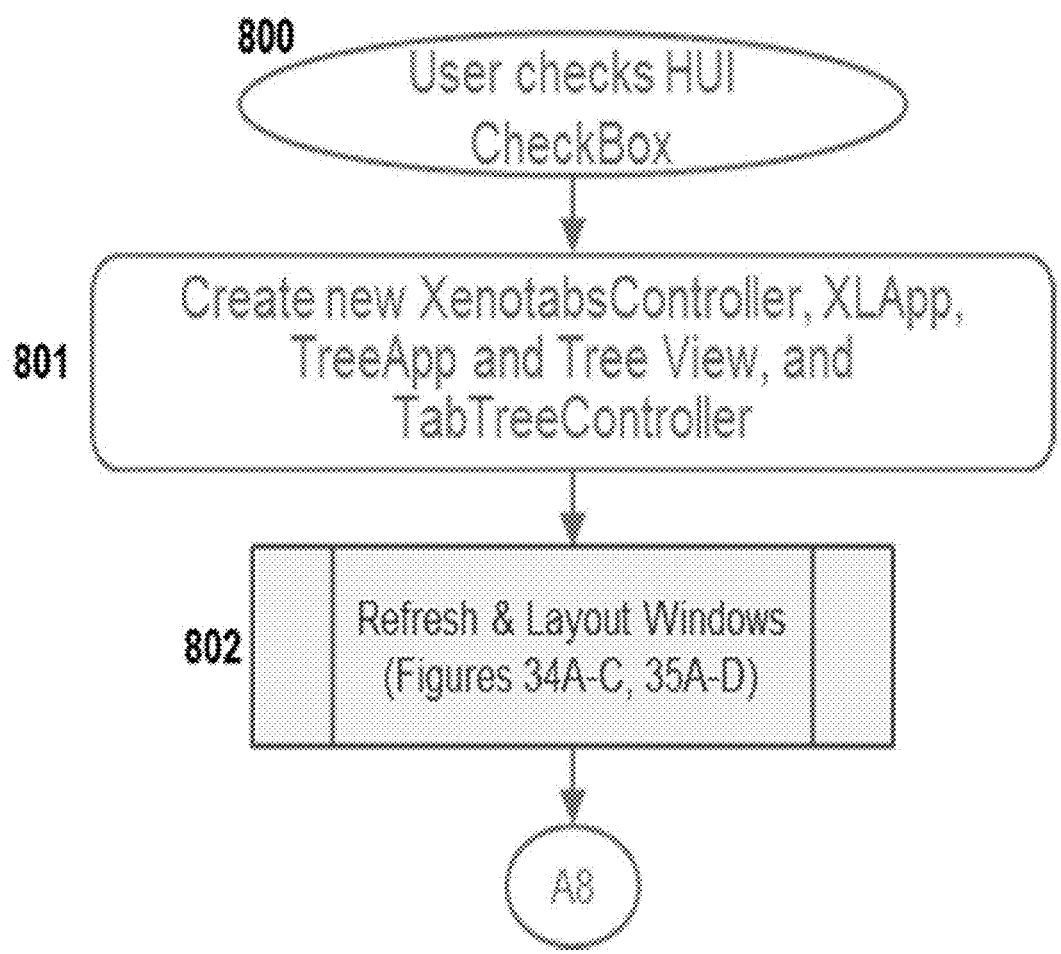

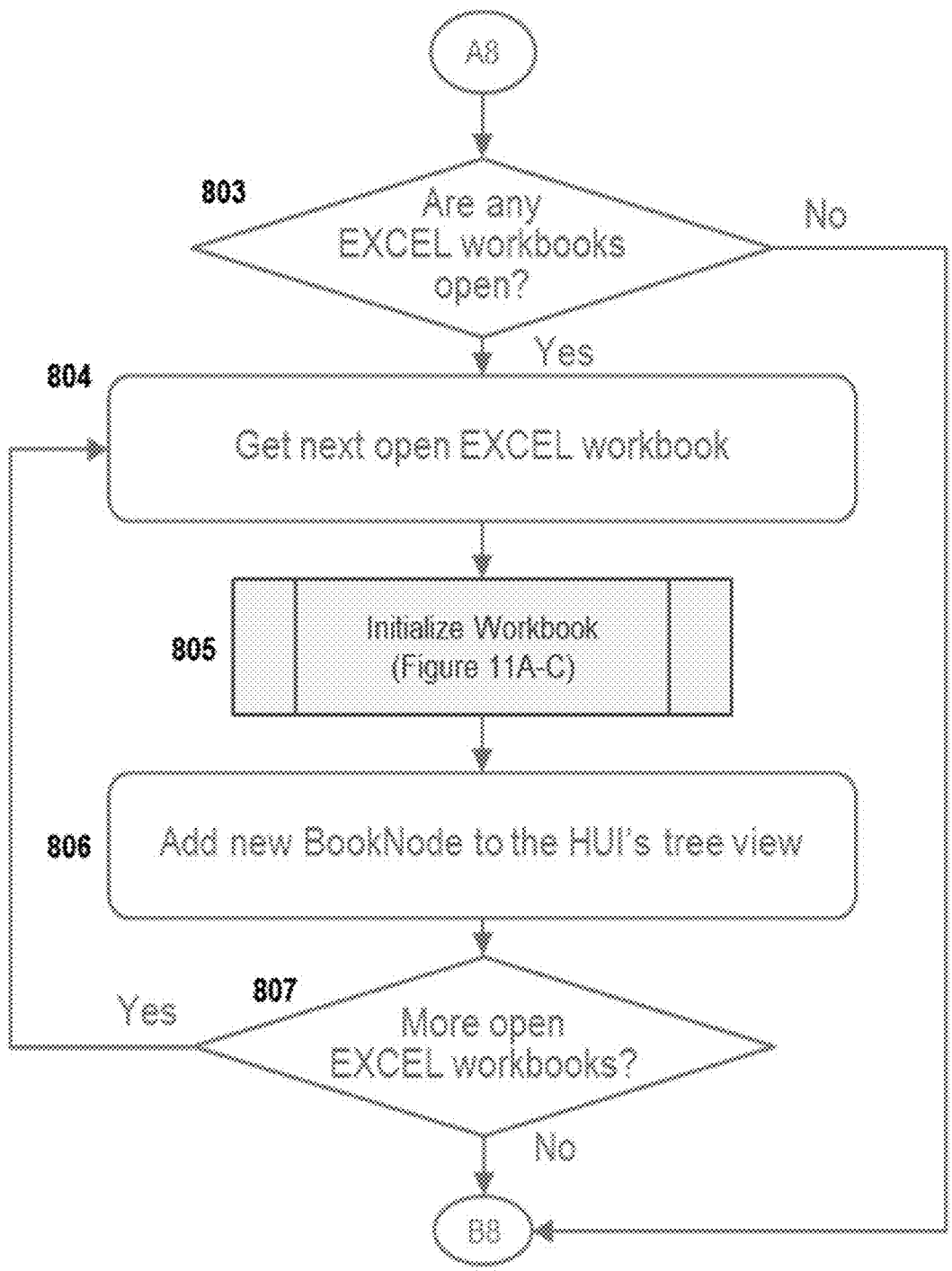
Figure 8B - shows how the HUI is activated

Figure 8C - shows how the HUI is activated
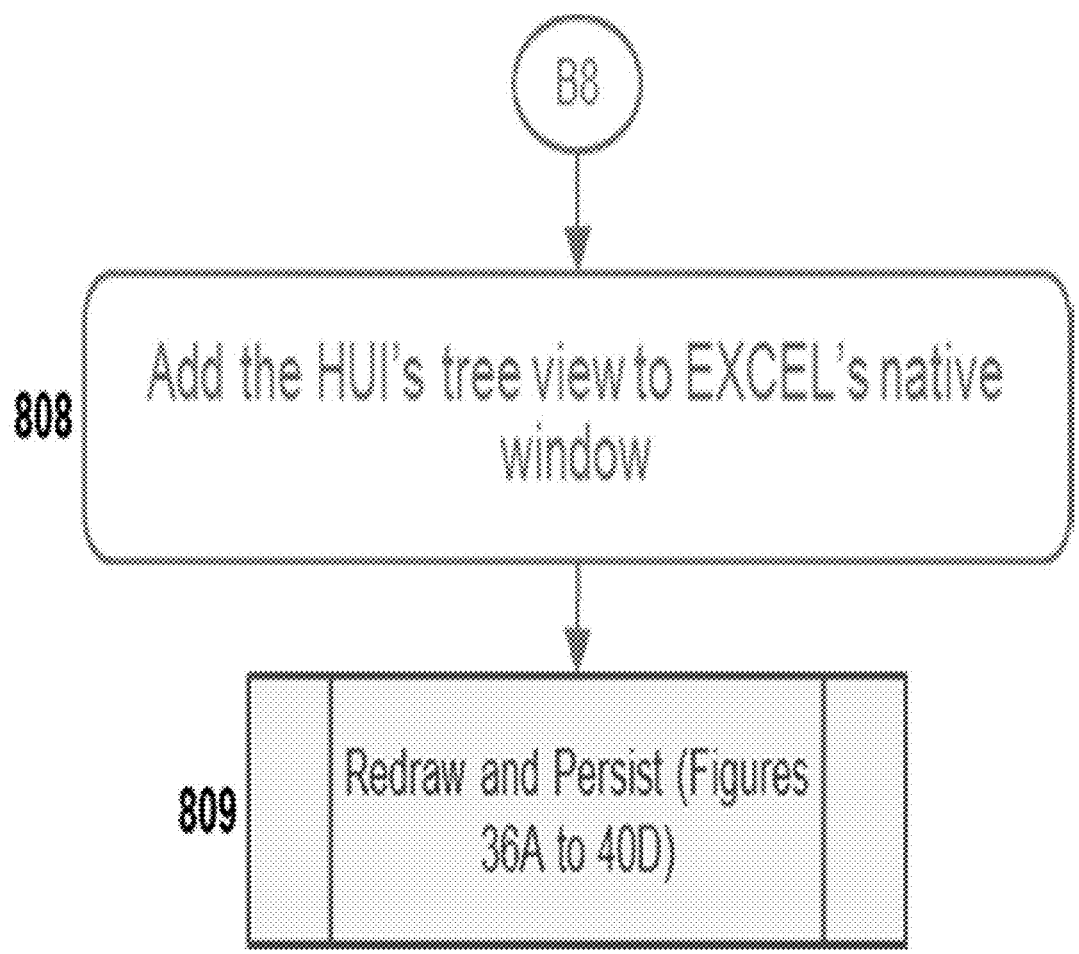

Figure 9A - shows how the HUI is deactivated
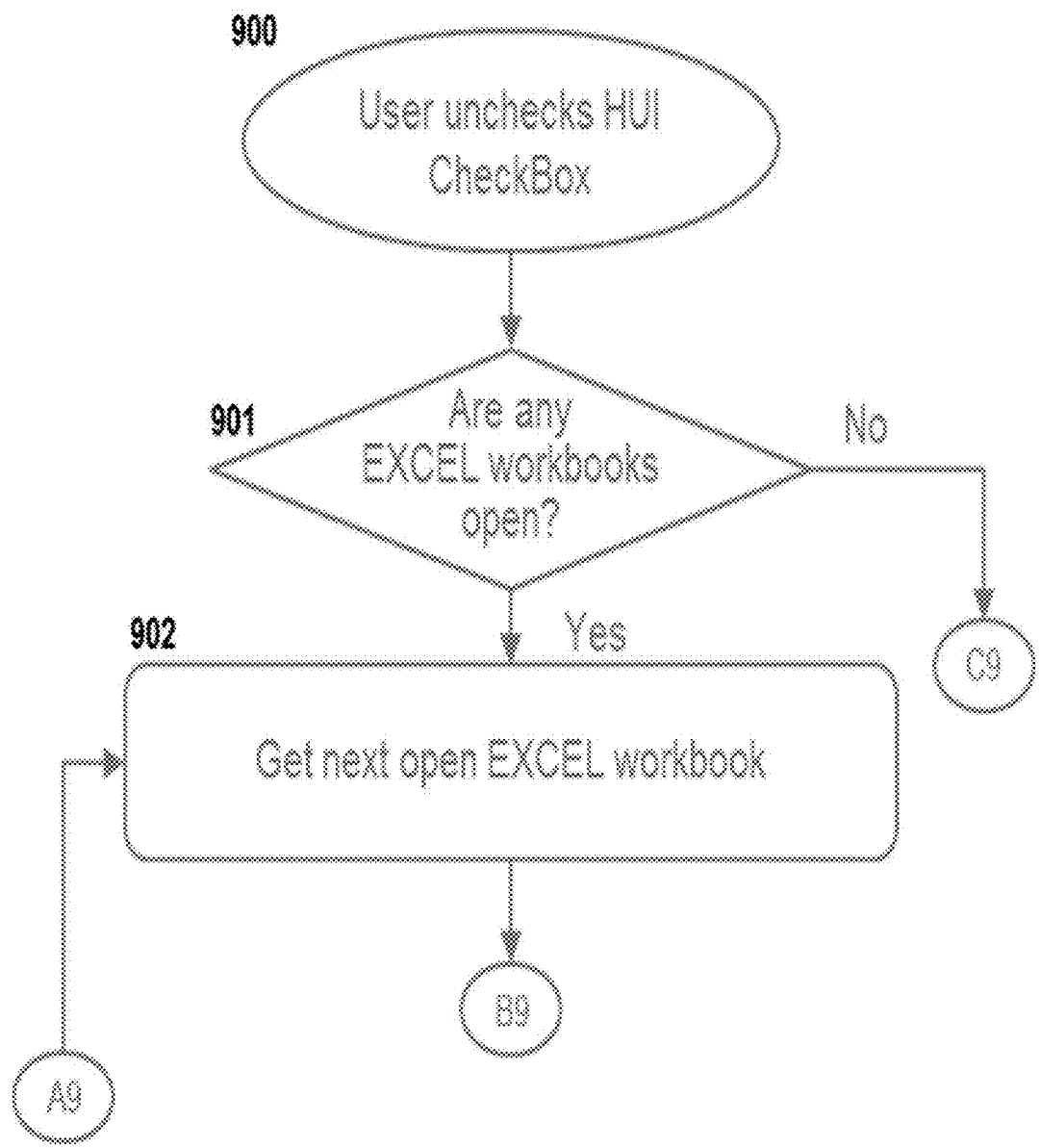

Figure 9B - shows how the HUI is deactivated
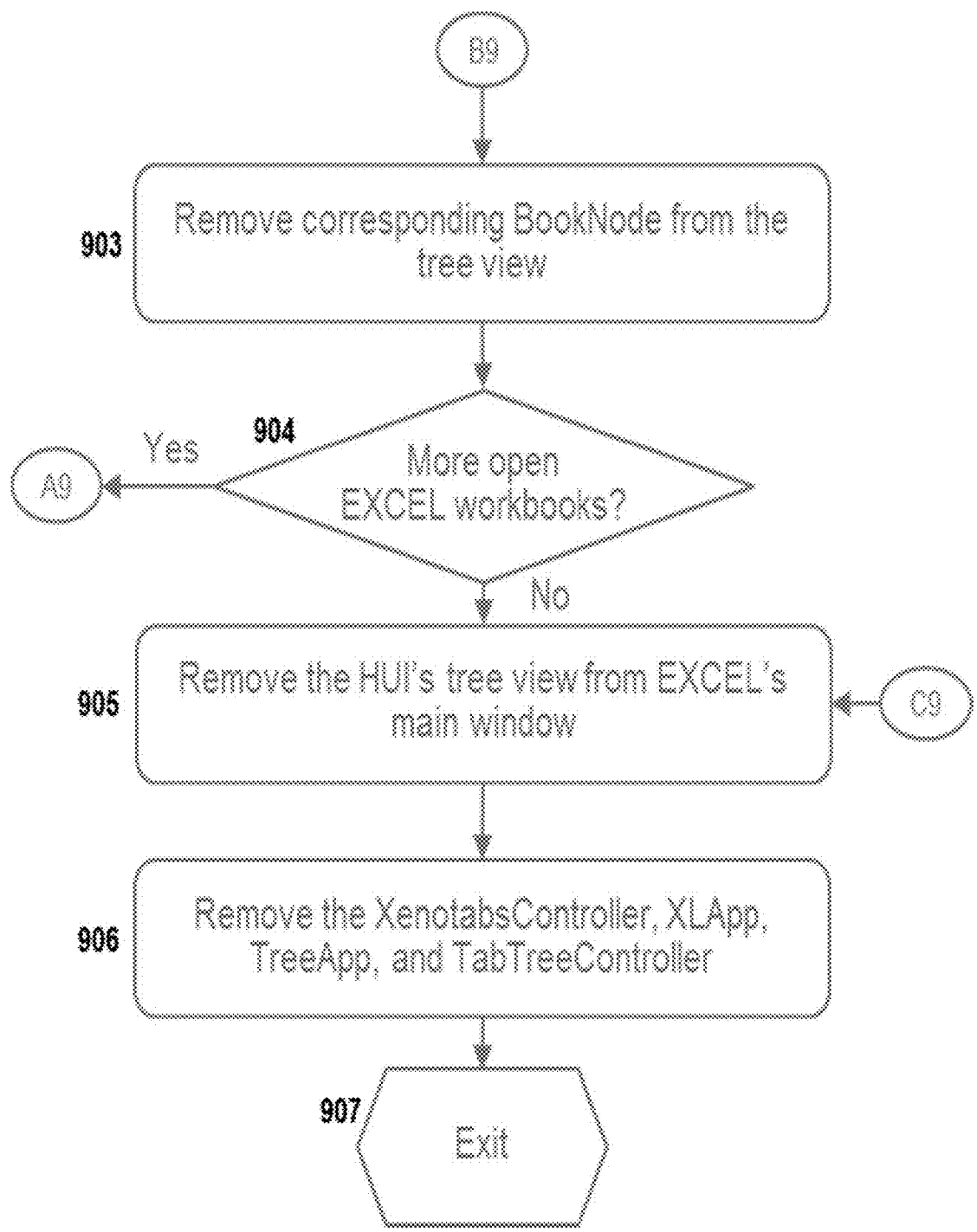

Figure 10A - illustrates the steps associated with opening workbooks
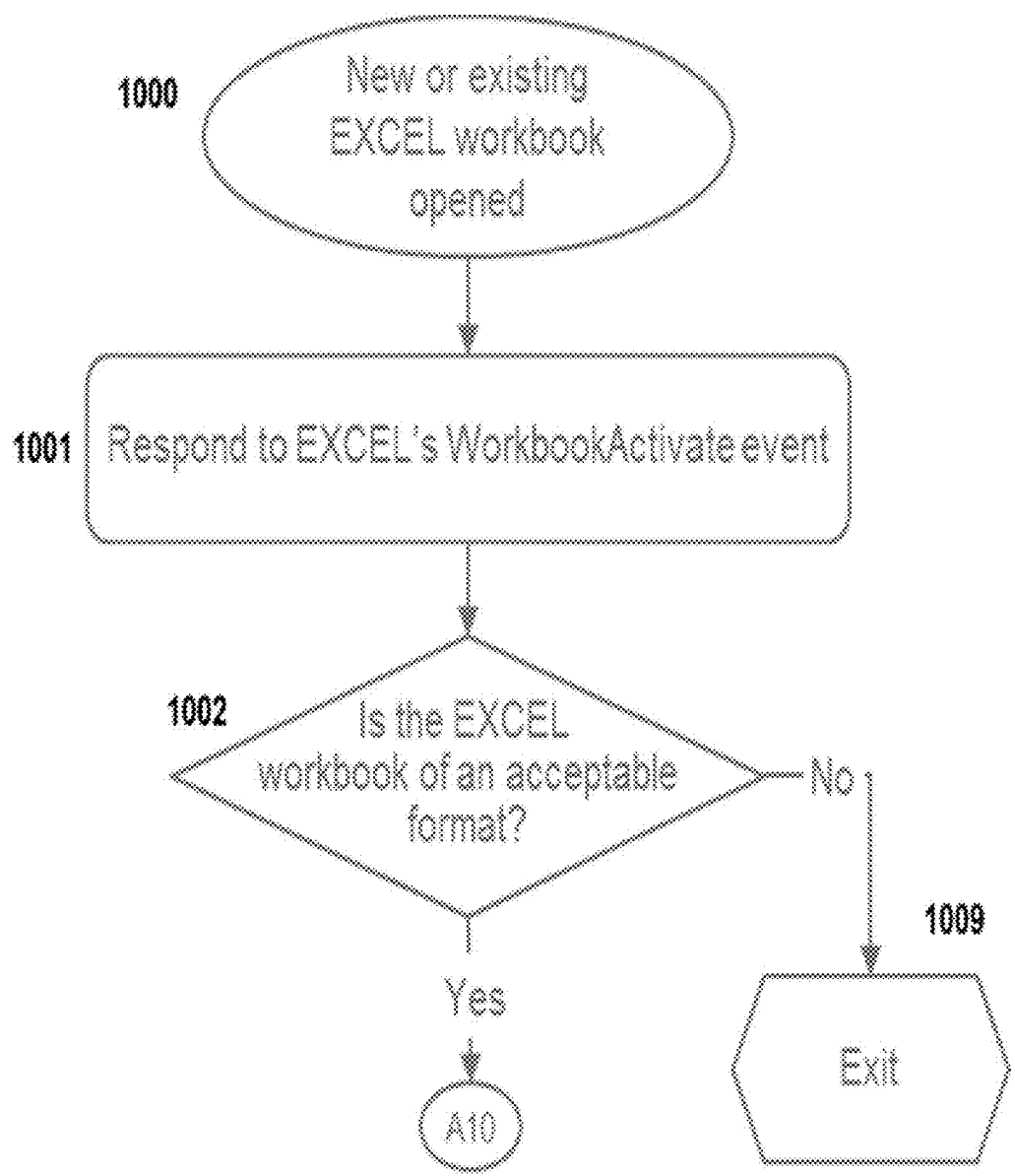

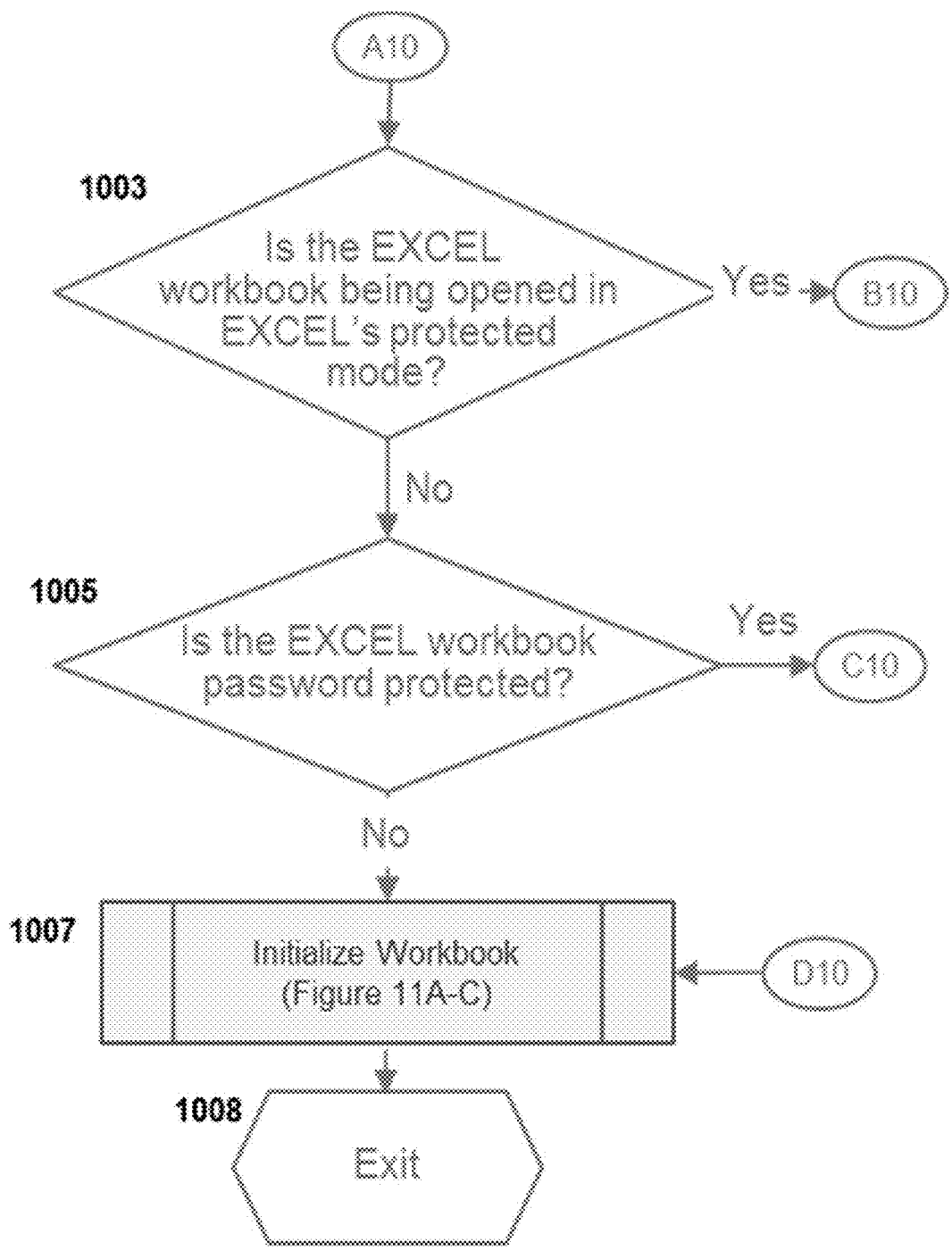
Figure 10B - illustrates the steps associated with opening workbooks

Figure 10C - illustrates the steps associated with opening workbooks
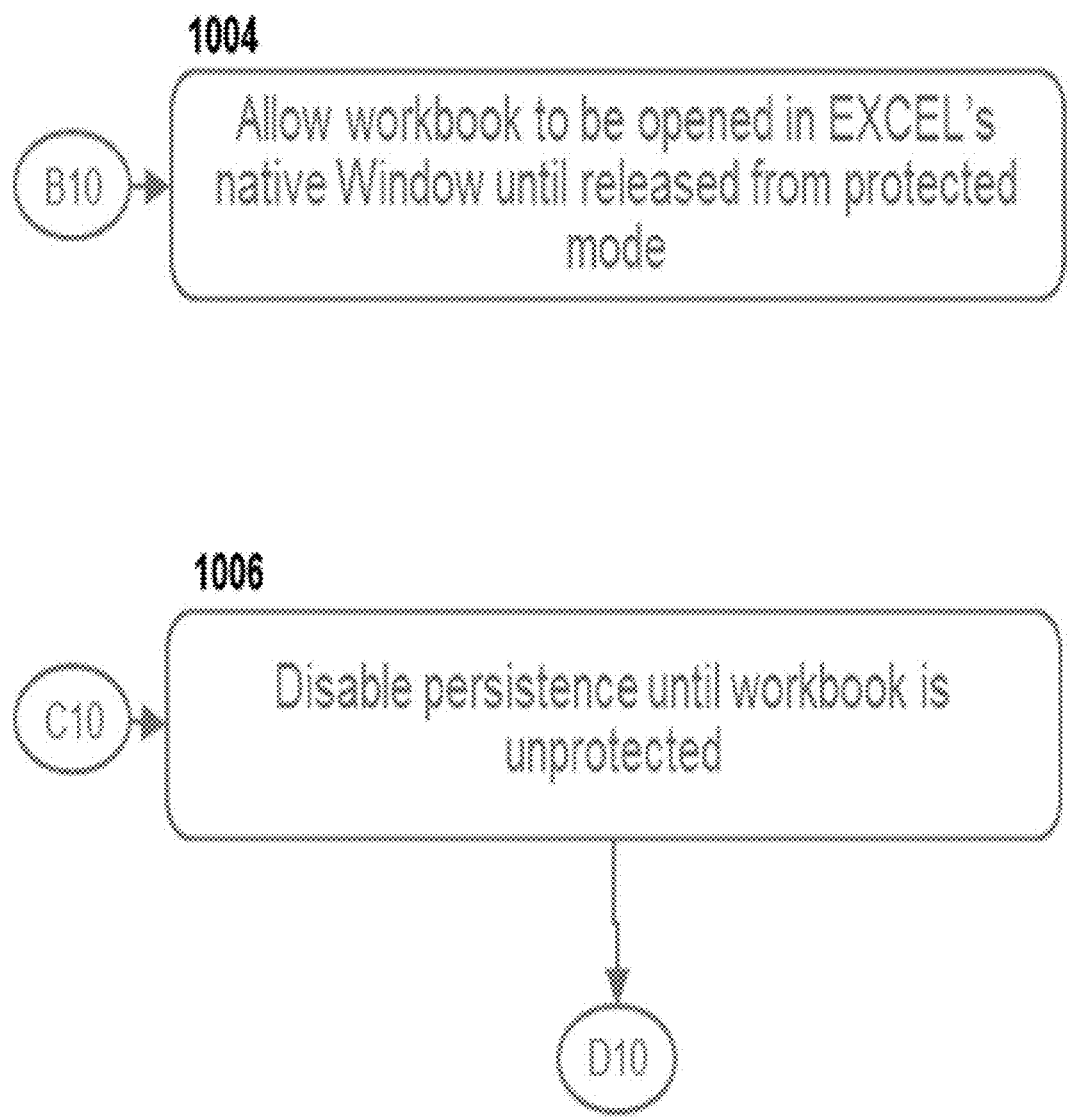

Figure 11A - illustrates how a BookNode is created for each open EXCEL workbook
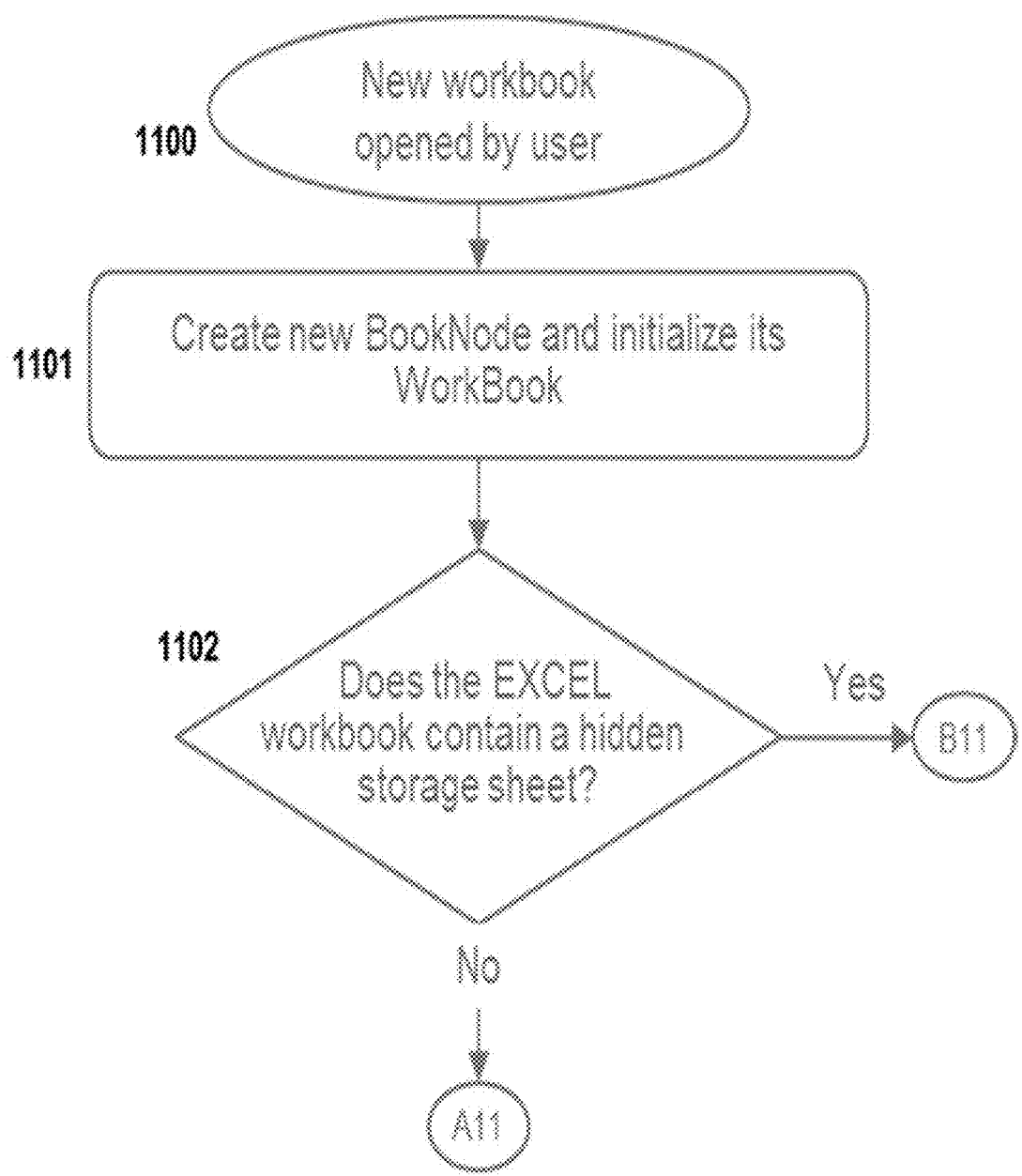

Figure 11B - illustrates how a BookNode is created for each open EXCEL workbook
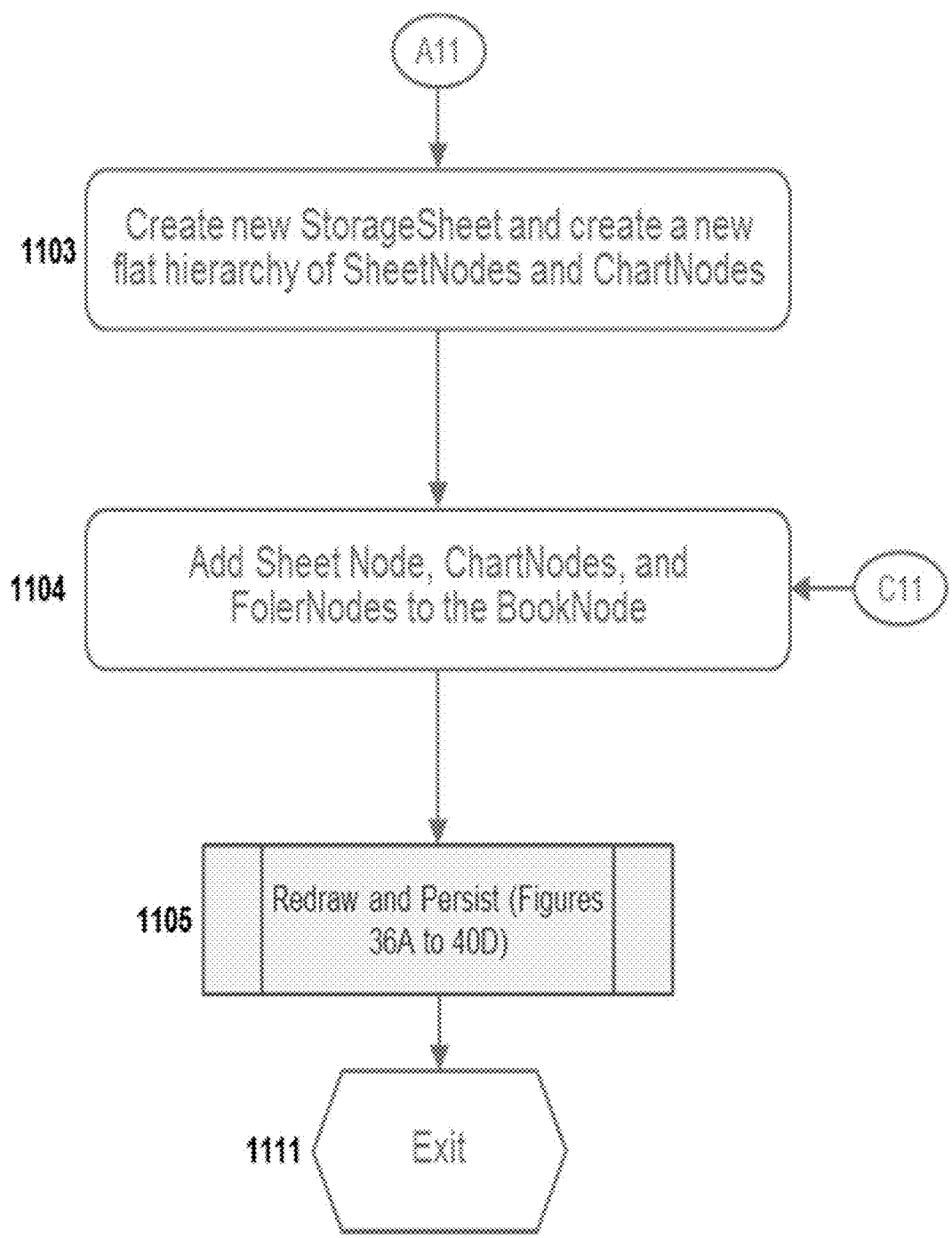

Figure 11C - illustrates how a BookNode is created for each open EXCEL workbook
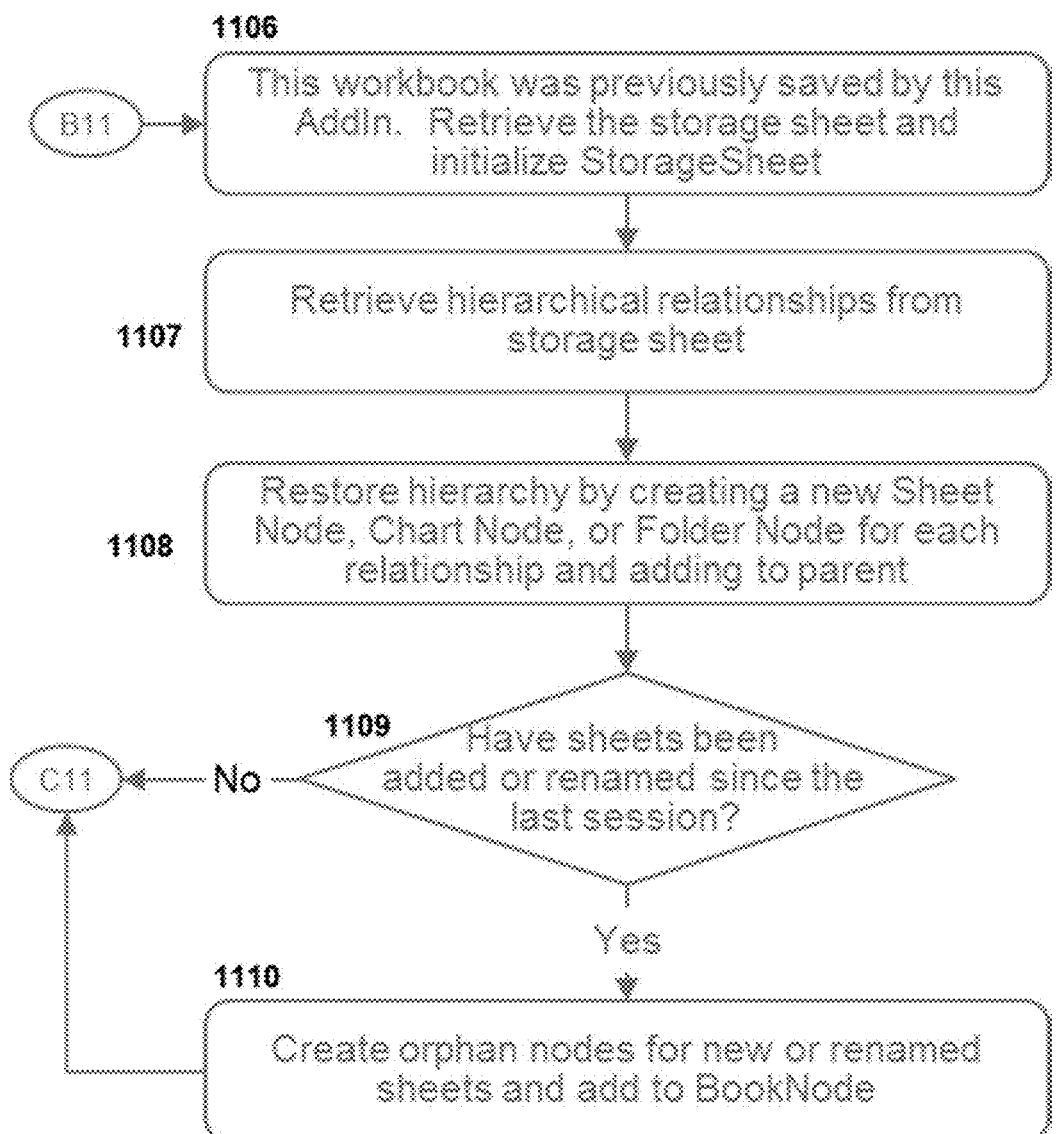

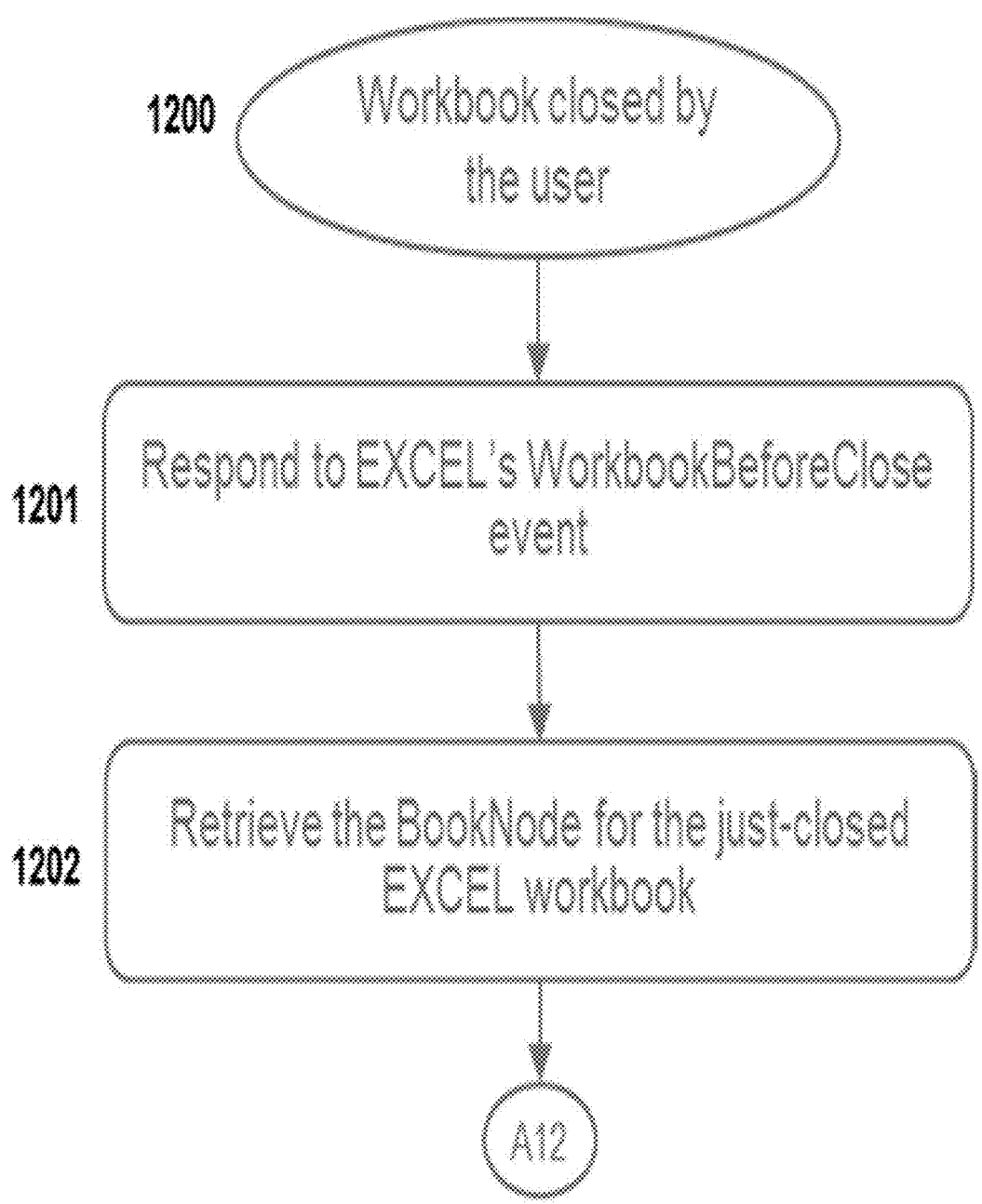
Figure 12A - illustrates the steps associated with closing workbooks

Figure 12B - illustrates the steps associated with closing workbooks
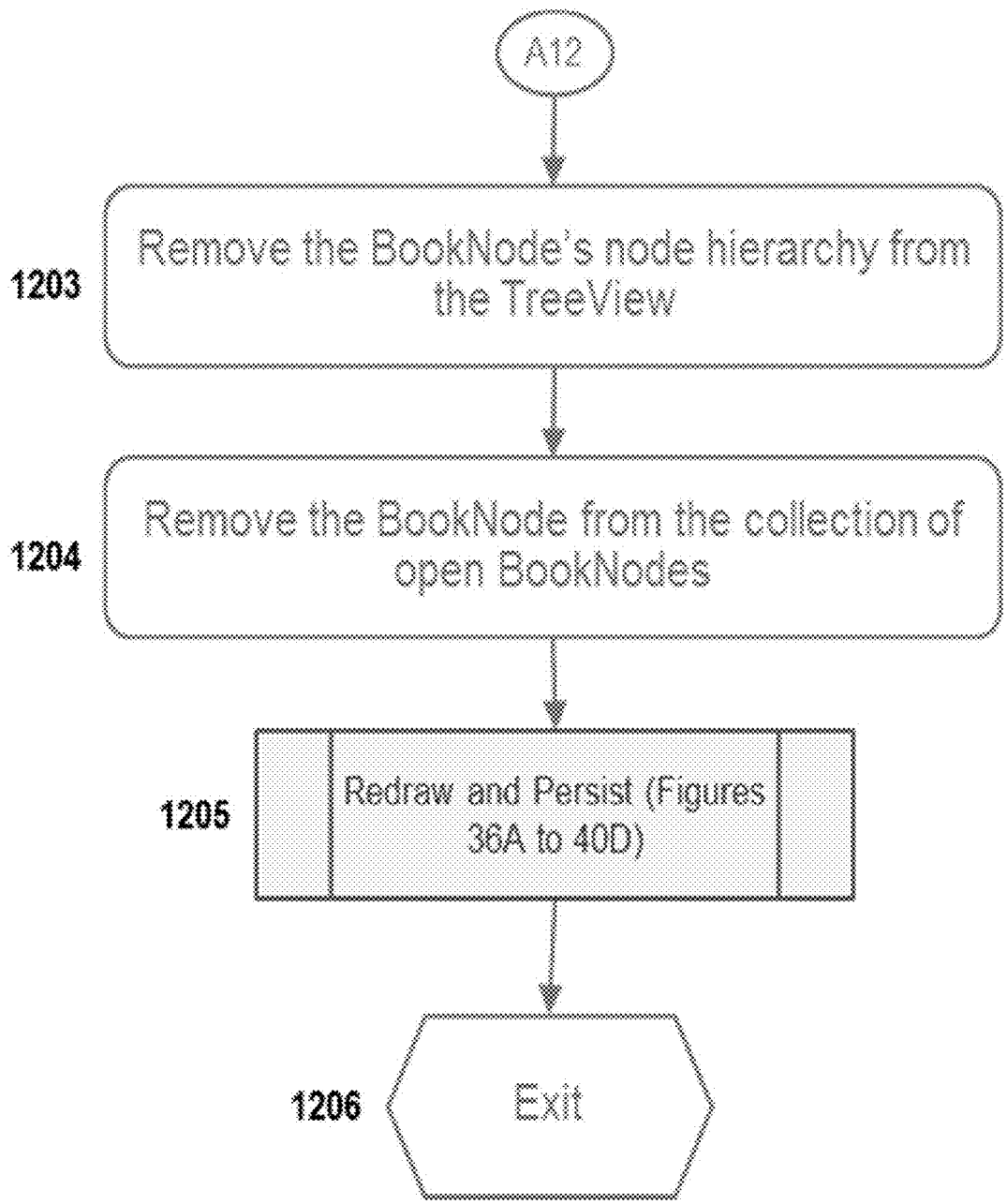

Figure 13A - illustrates the steps associated with adding sheets asynchronously
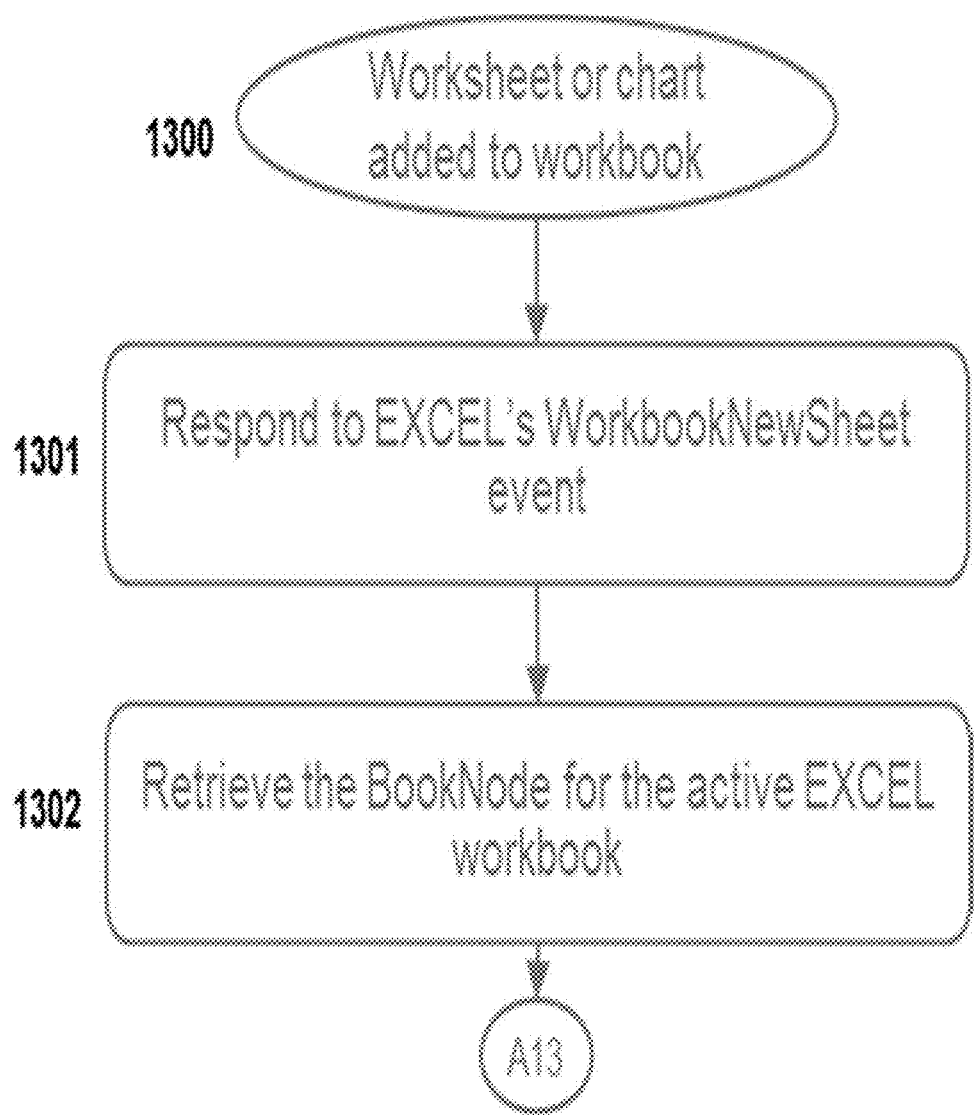

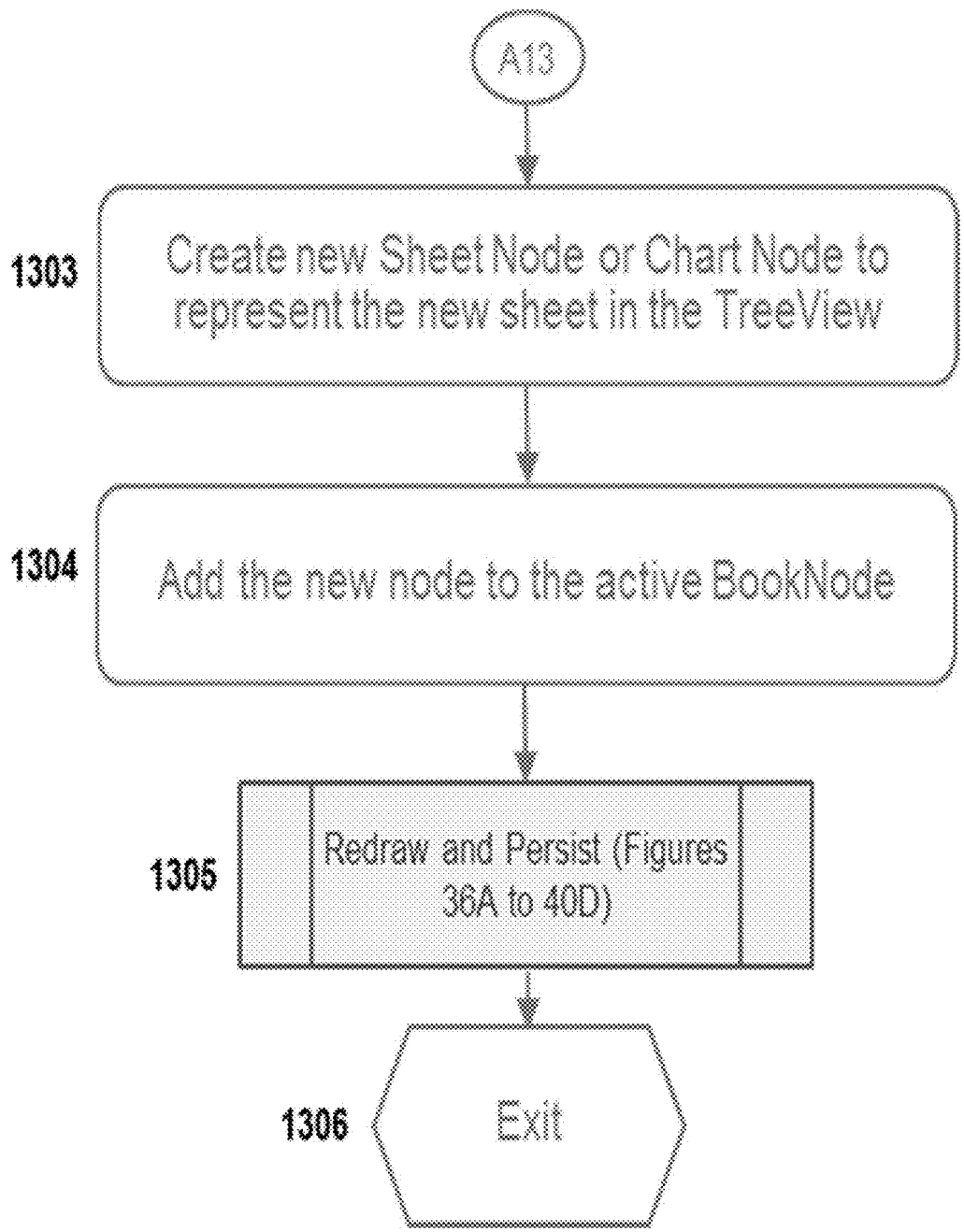
Figure 13B - illustrates the steps associated with adding sheets asynchronously

Figure 14 - illustrates the elements of a tree node
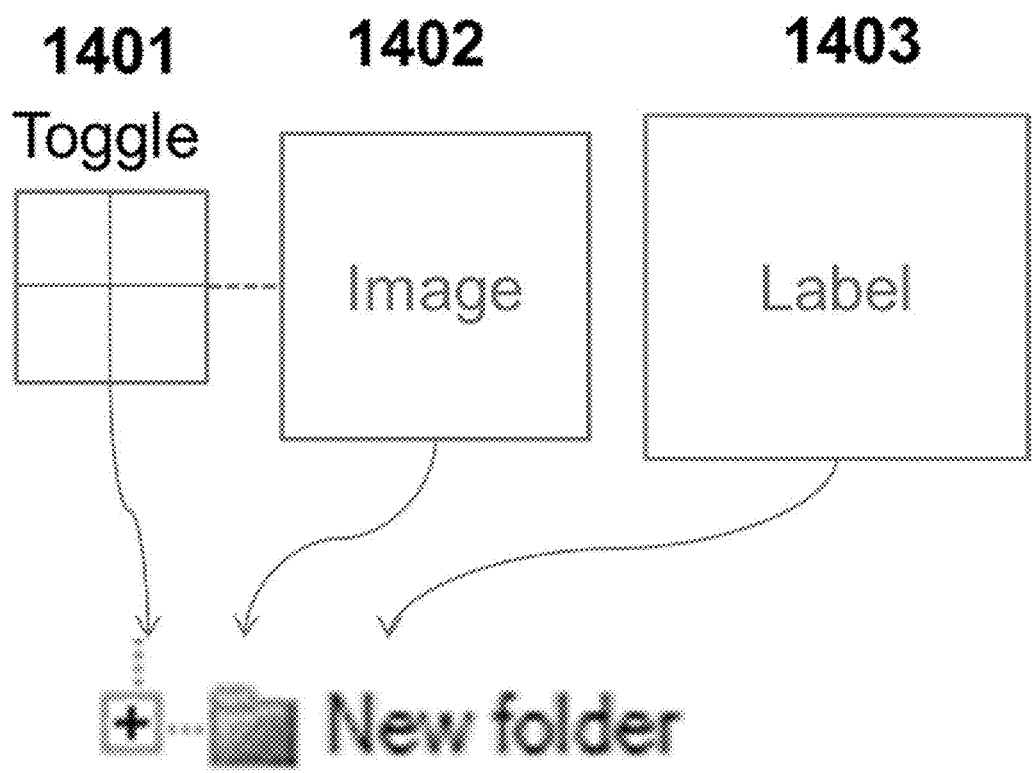

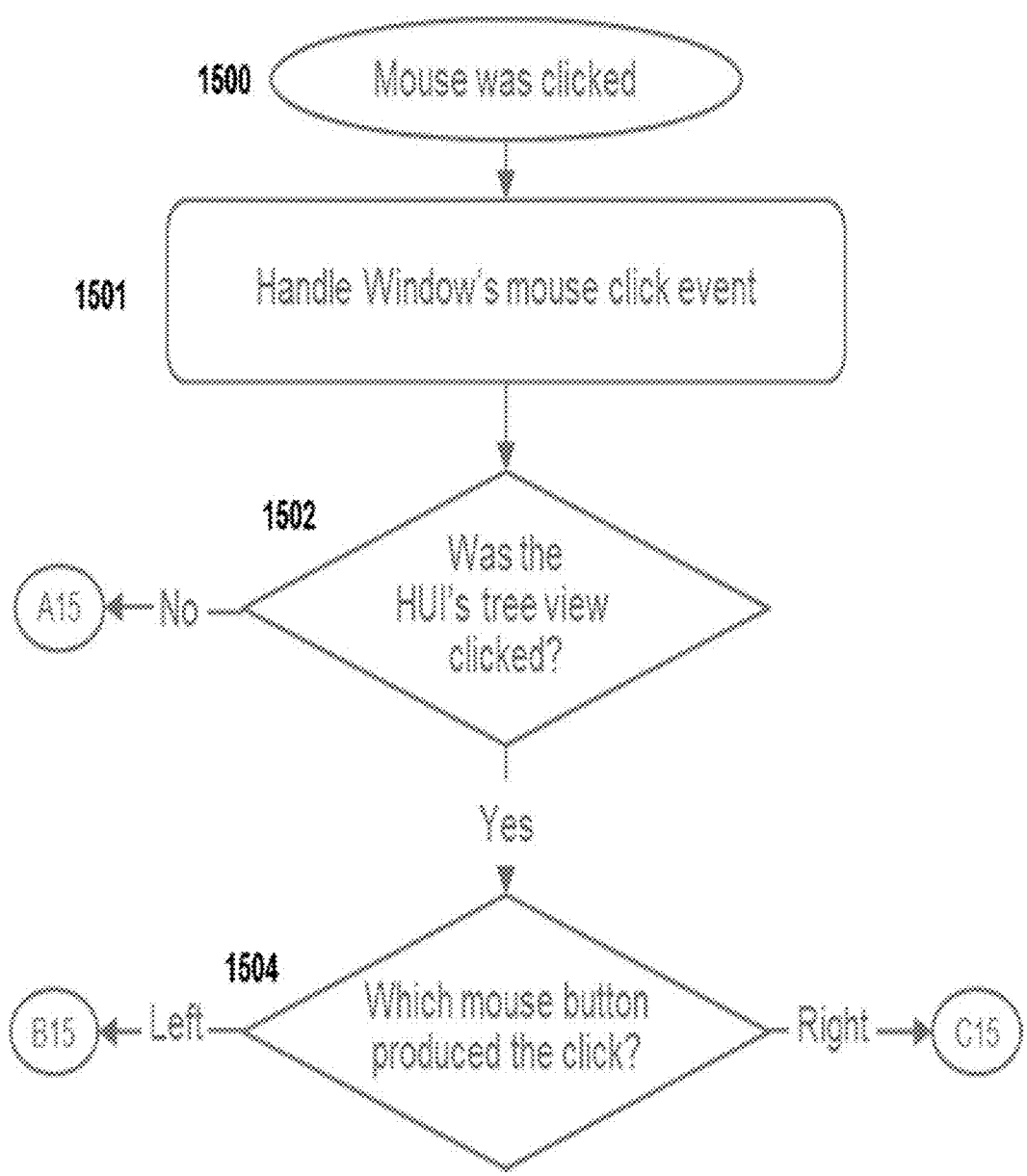
Figure 15A - shows how the HUI processes mouse clicks

Figure 15B - shows how the HUI processes mouse clicks
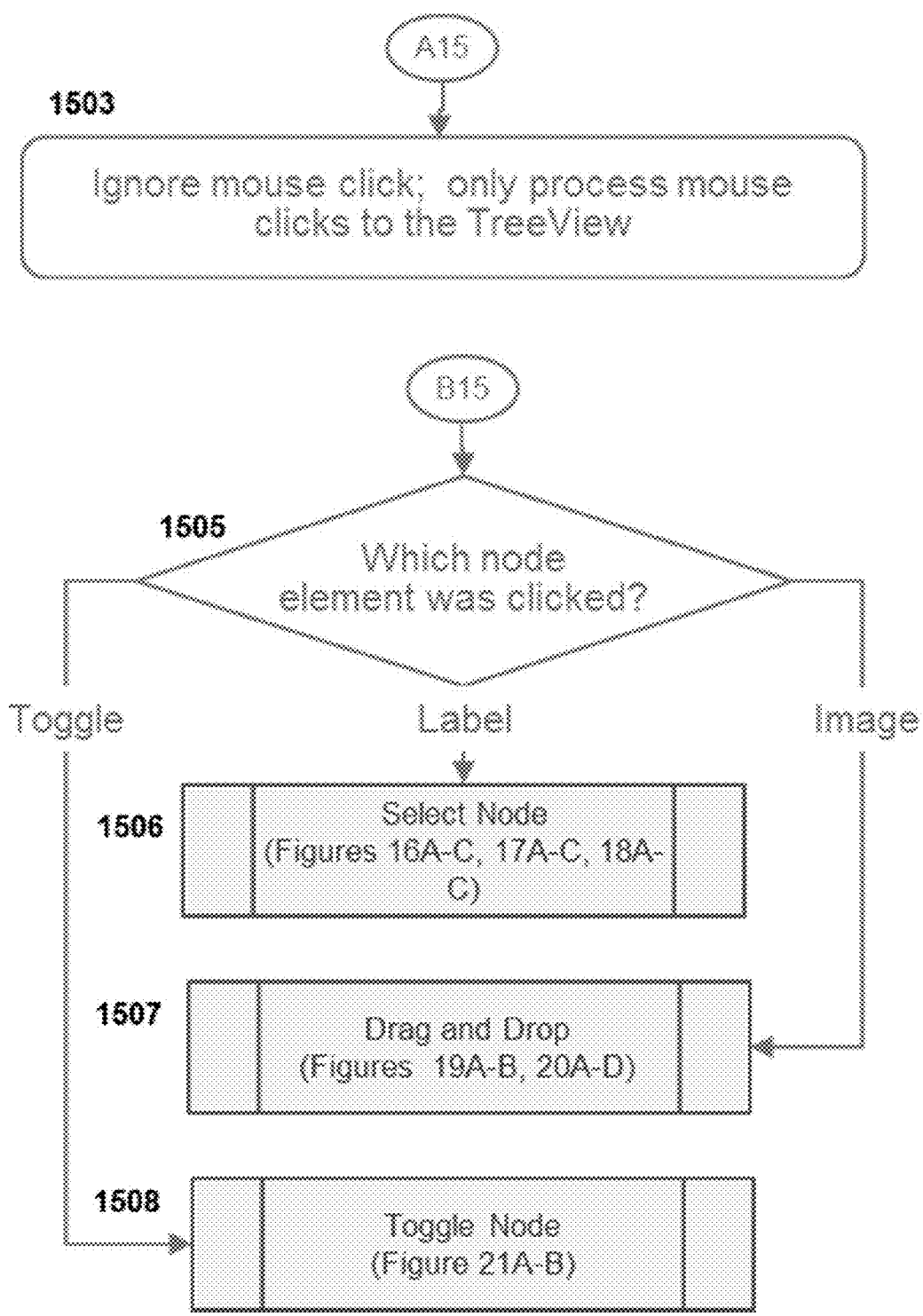

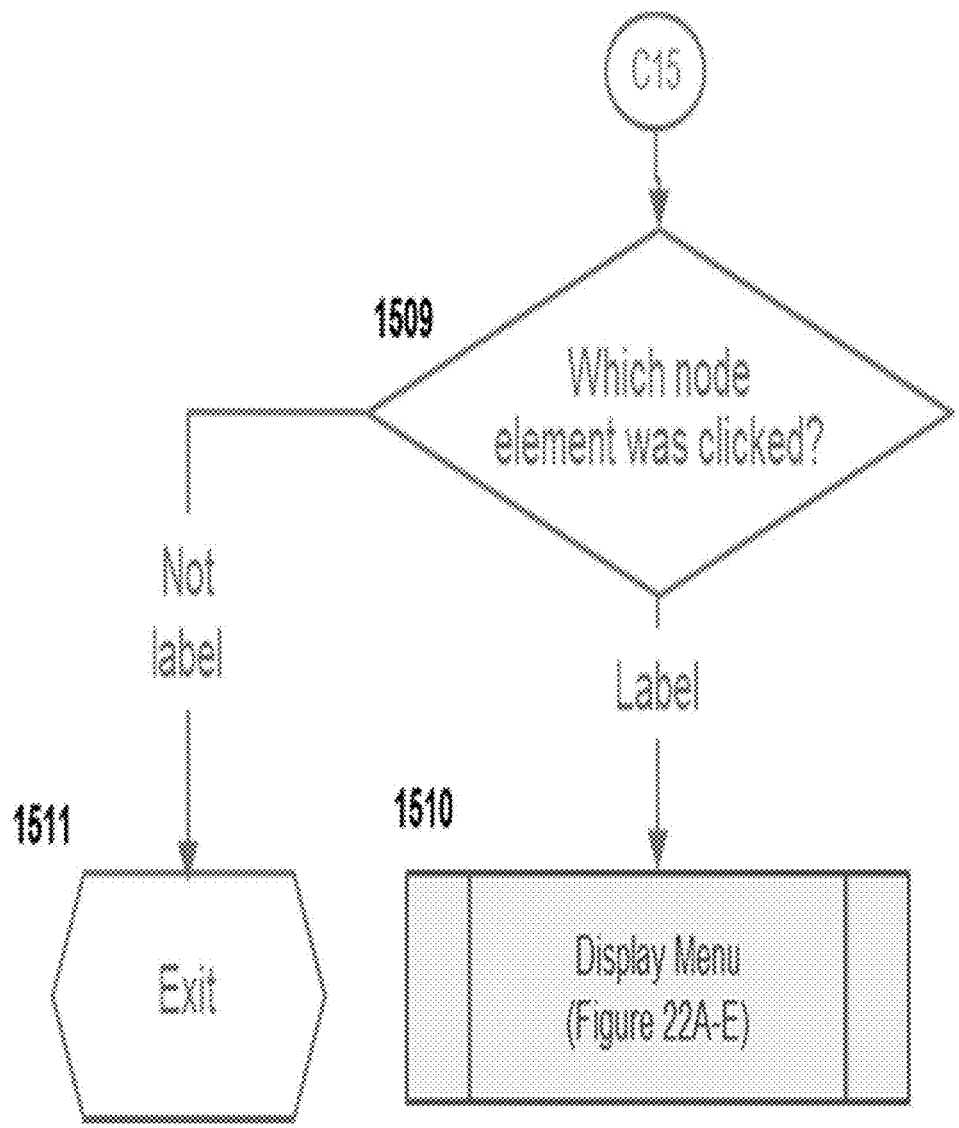
Figure 15C - shows how the HUI processes mouse clicks

Figure 16A - shows how the HUI selects an EXCEL worksheet
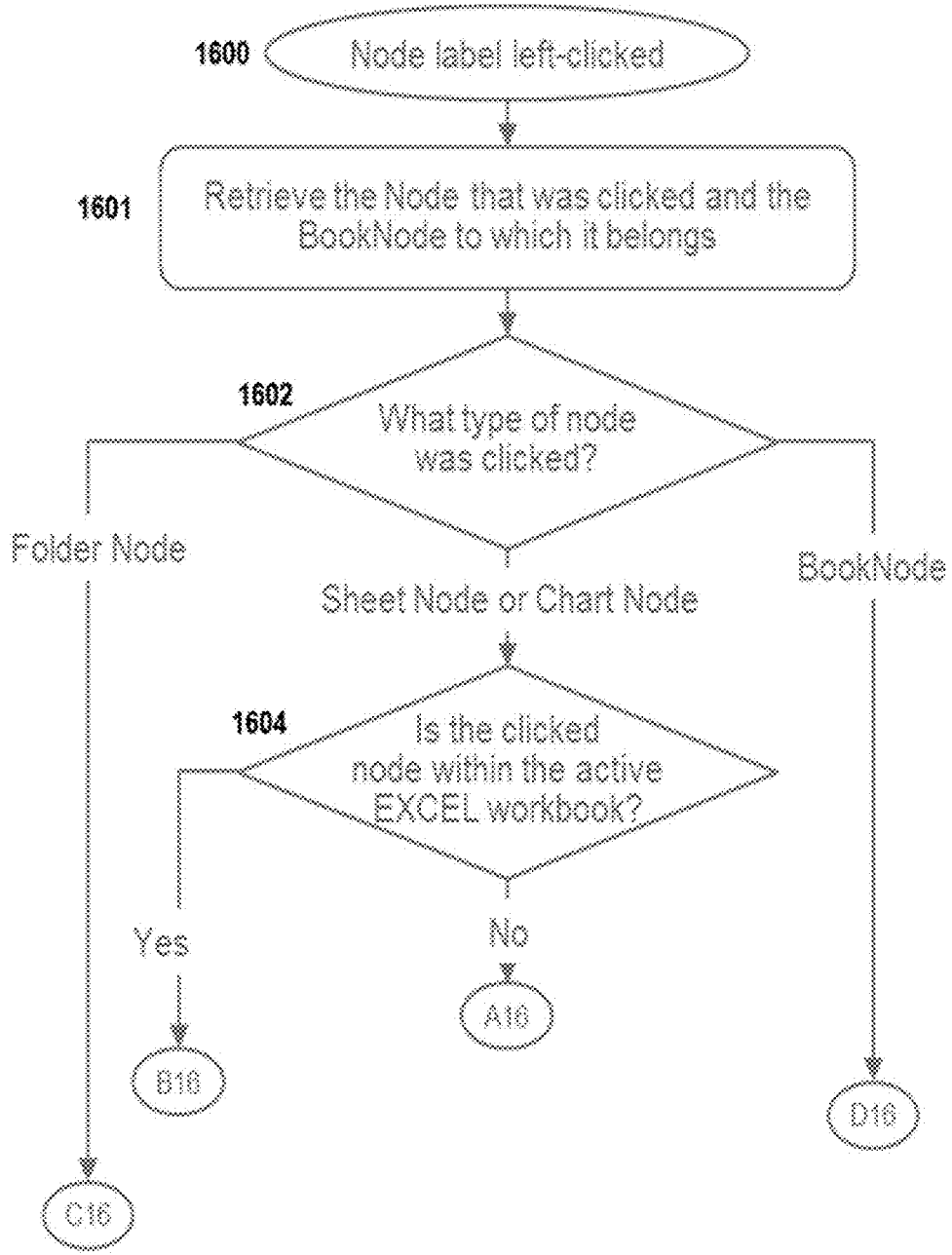

Figure 16B - shows how the HUI selects an EXCEL worksheet
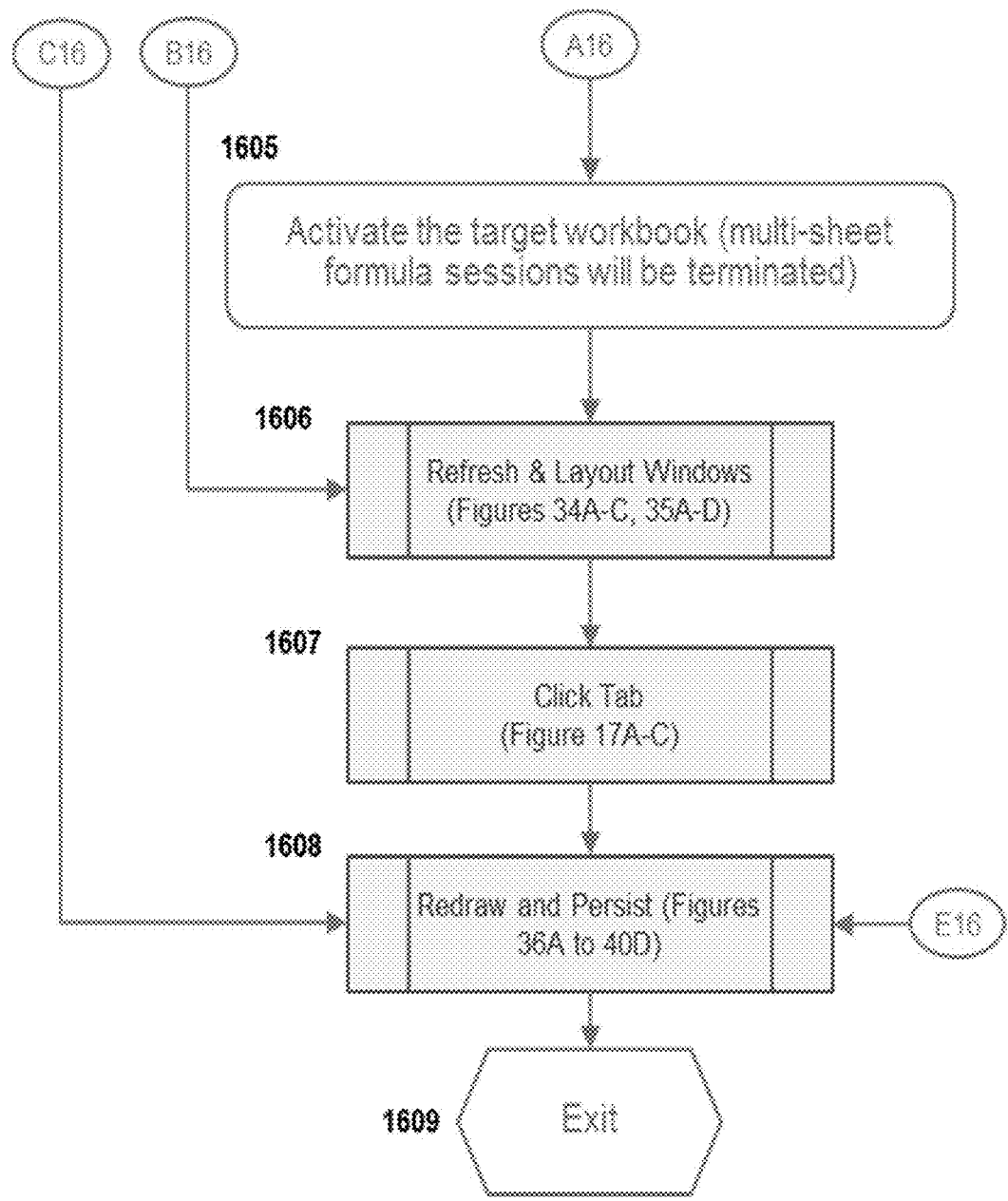

Figure 16C - shows how the HUI selects an EXCEL worksheet
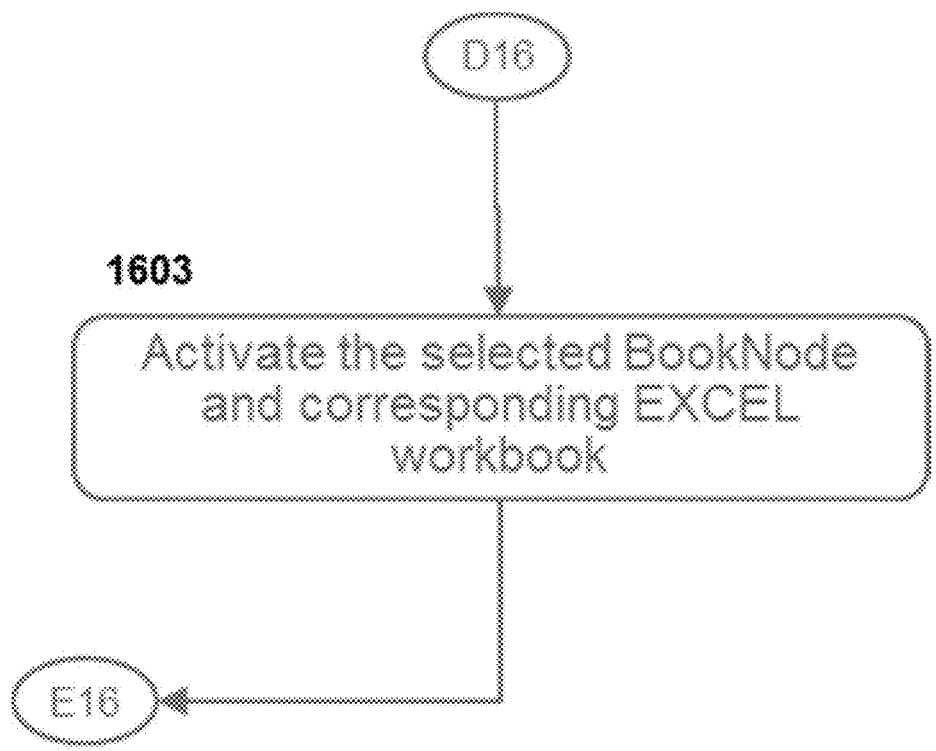

Figure 17A - shows additional steps in selecting an EXCEL worksheet
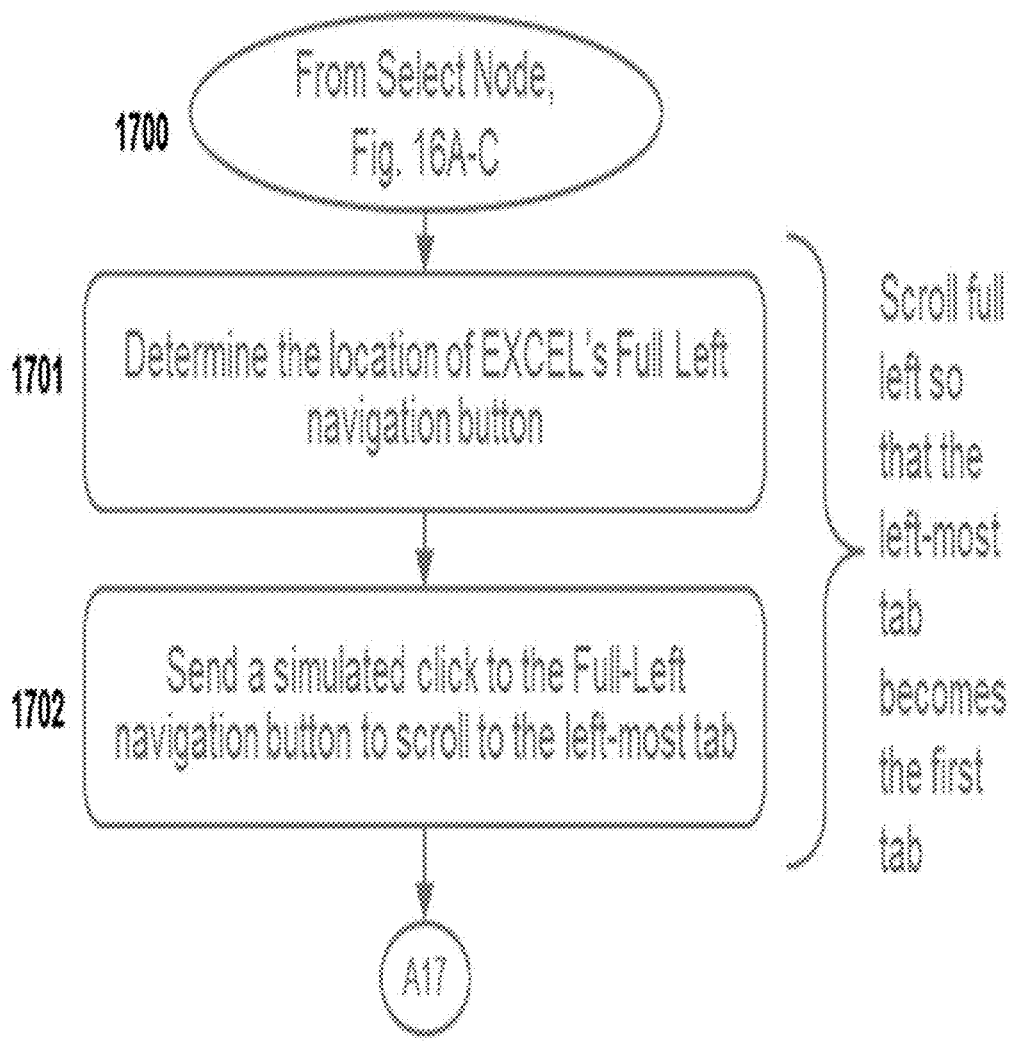

Figure 17B - shows additional steps in selecting an EXCEL worksheet
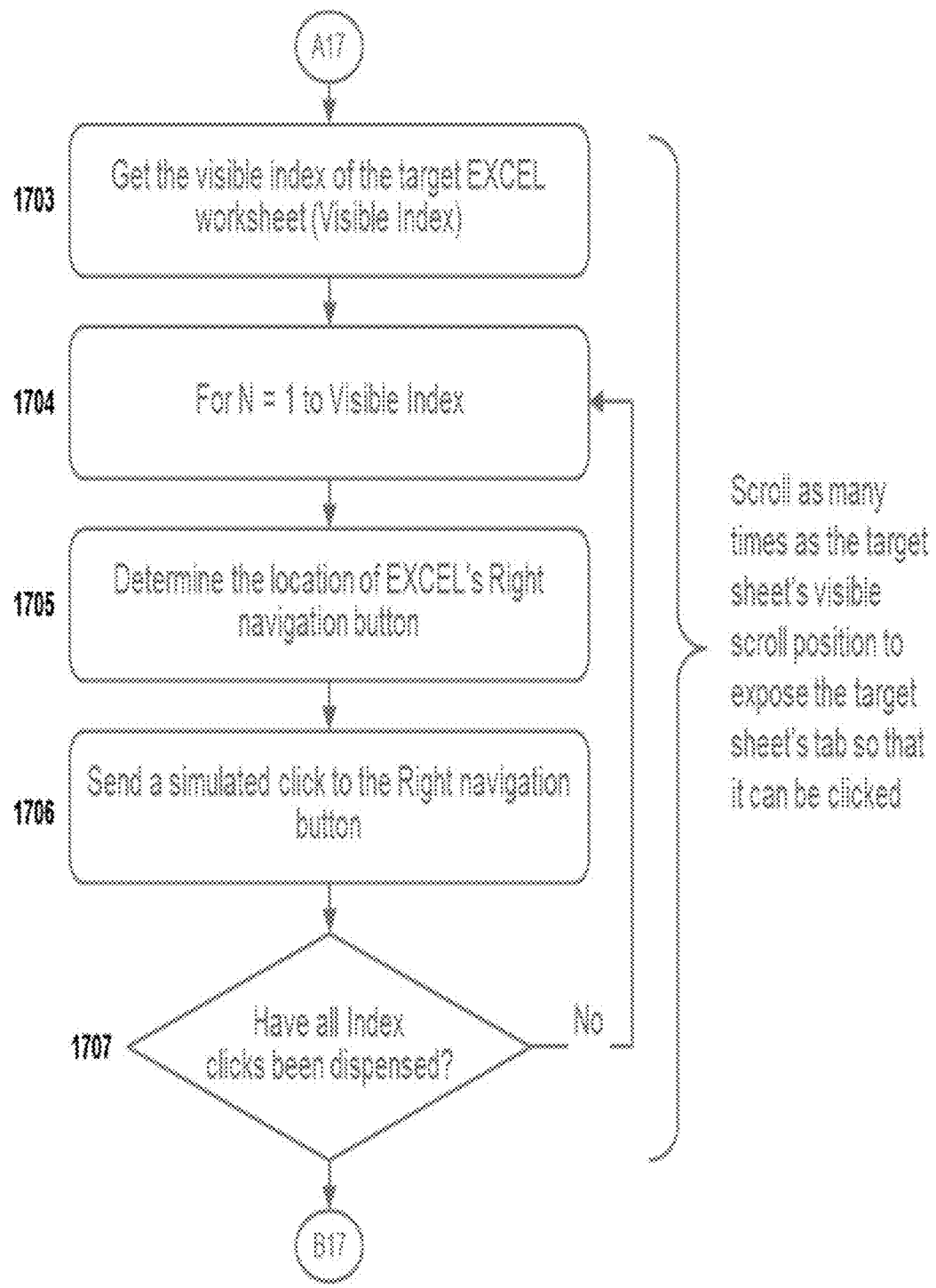

Figure 17C - shows additional steps in selecting an EXCEL worksheet
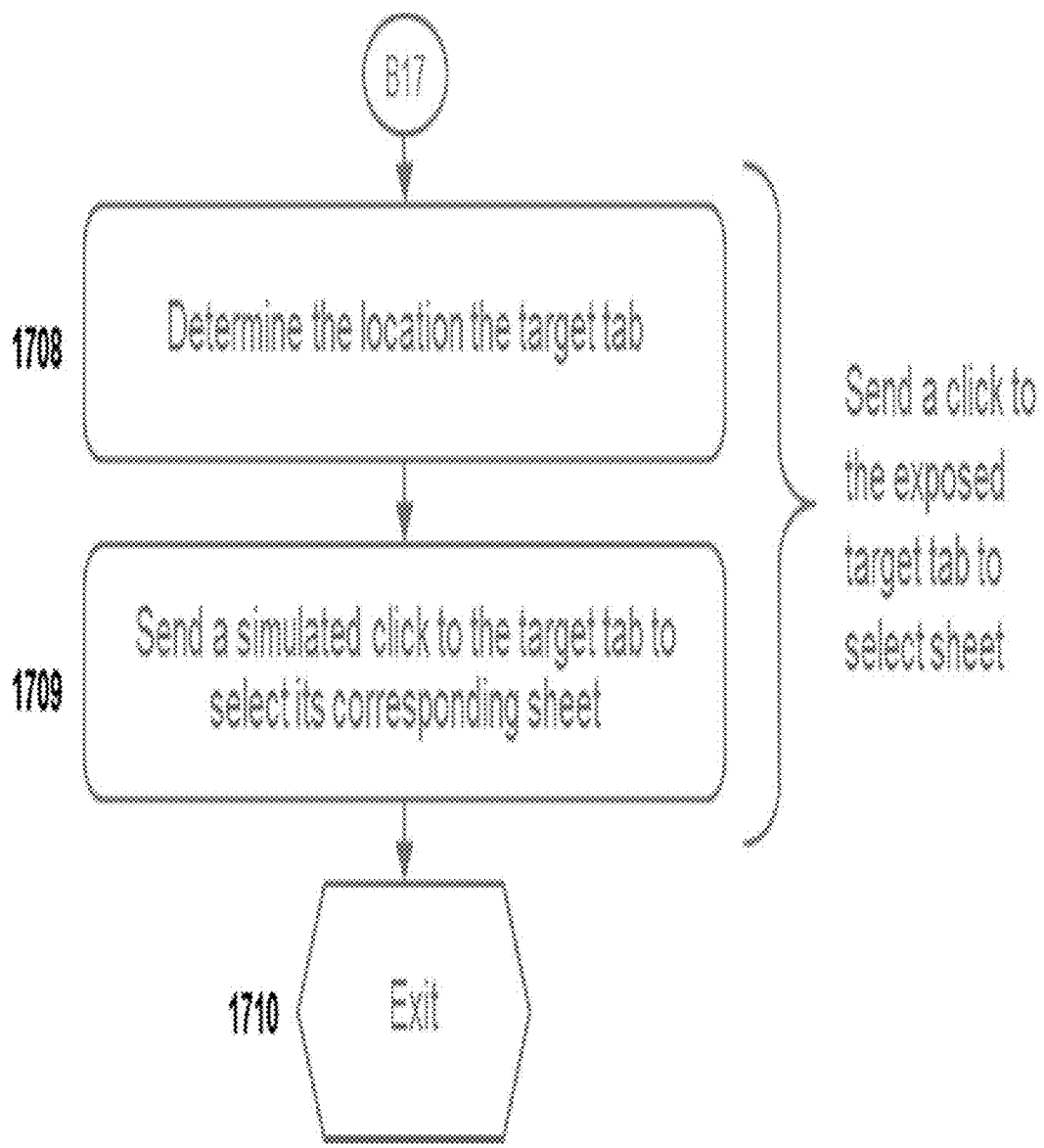

Figure 18A - illustrates the steps of sheet selection
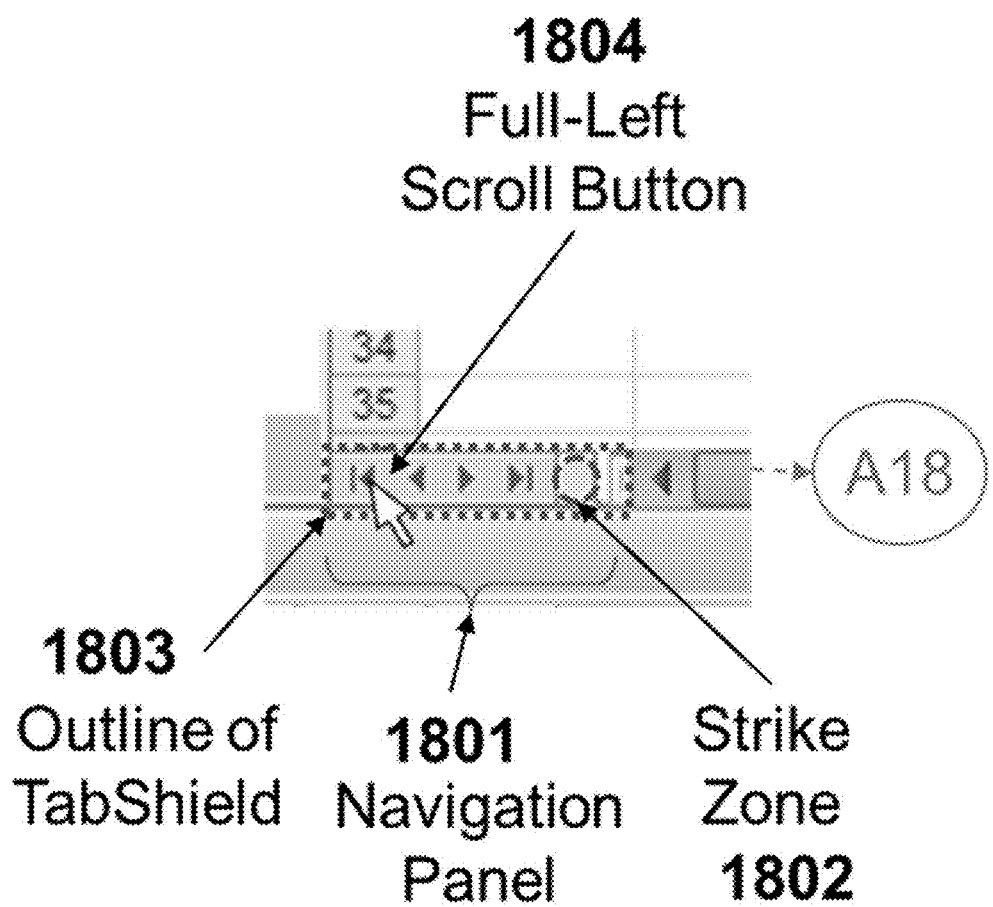

Figure 18B - illustrates the steps of sheet selection
2. Scroll right as many times as the target sheet's index
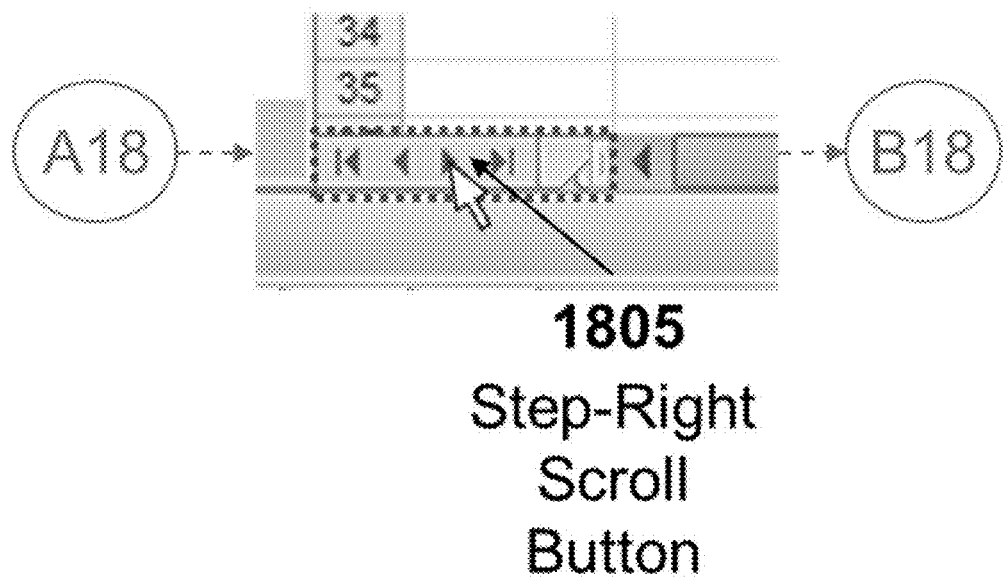
1805
Step-Right
Scroll
Button

Figure 18C - illustrates the steps of sheet selection
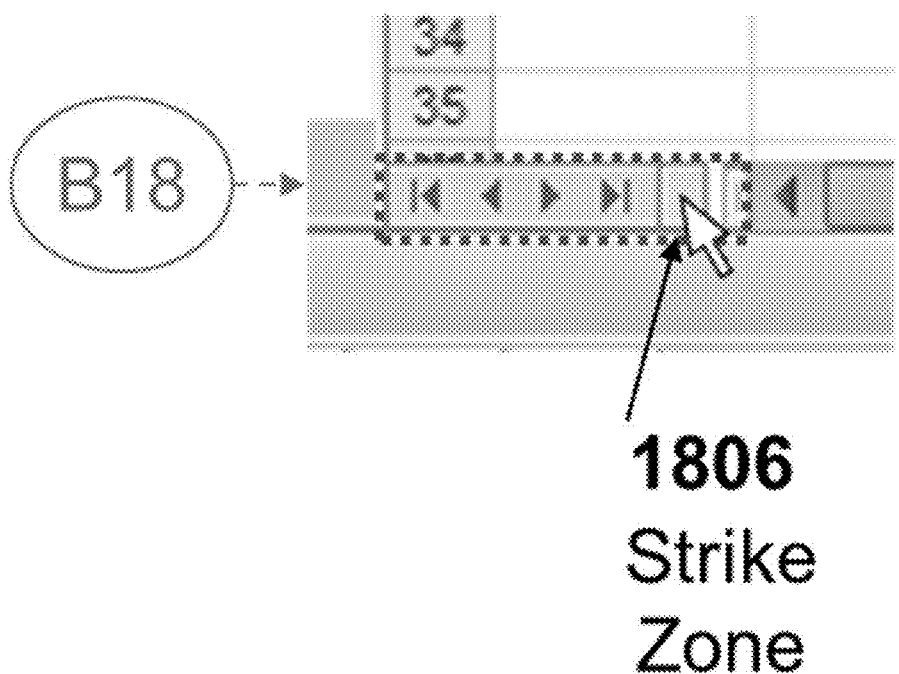

Figure 19A - shows tree view locations for drag-and-drop (DND) operations
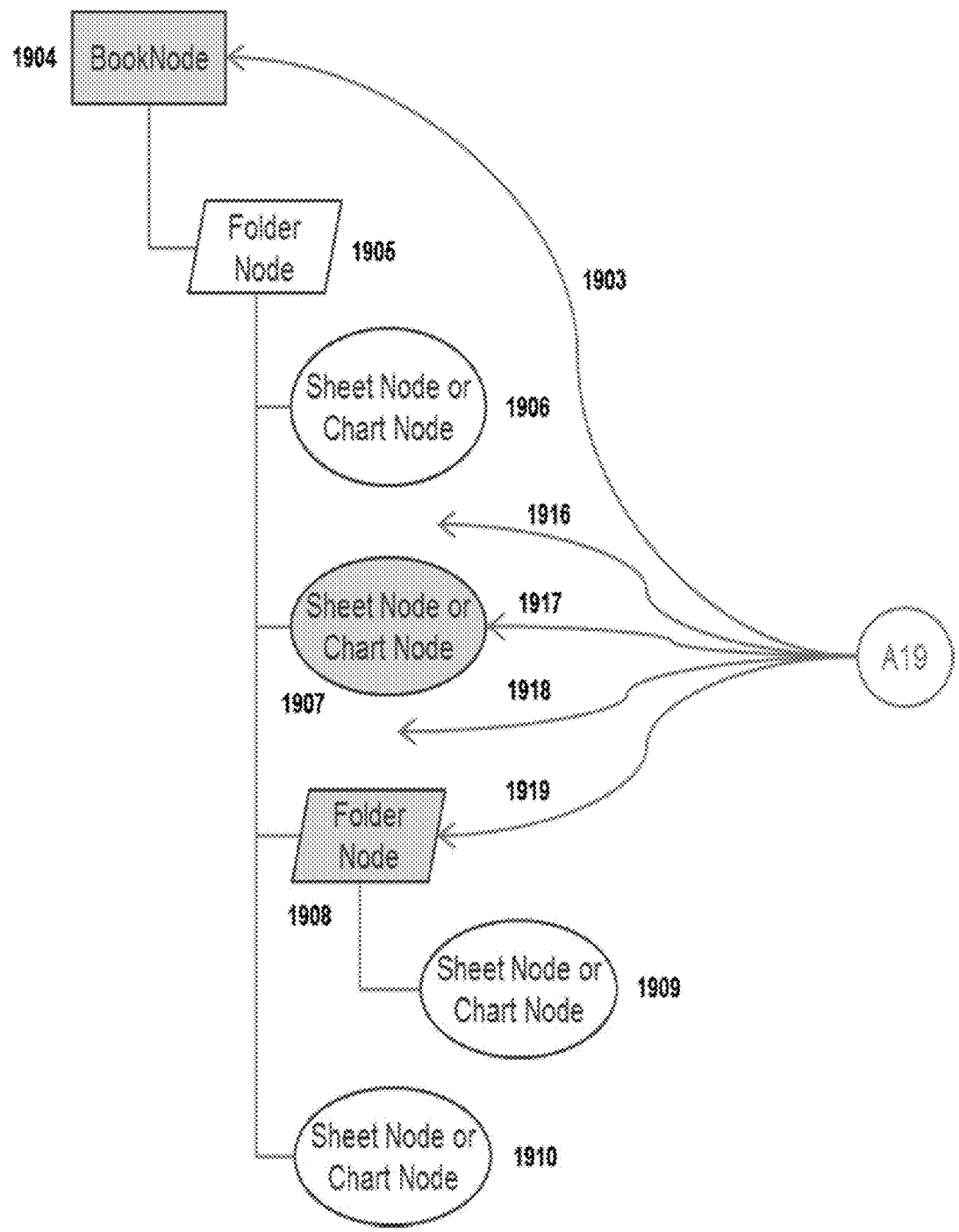

Figure 19B - shows tree view locations for drag-and-drop (DND) operations
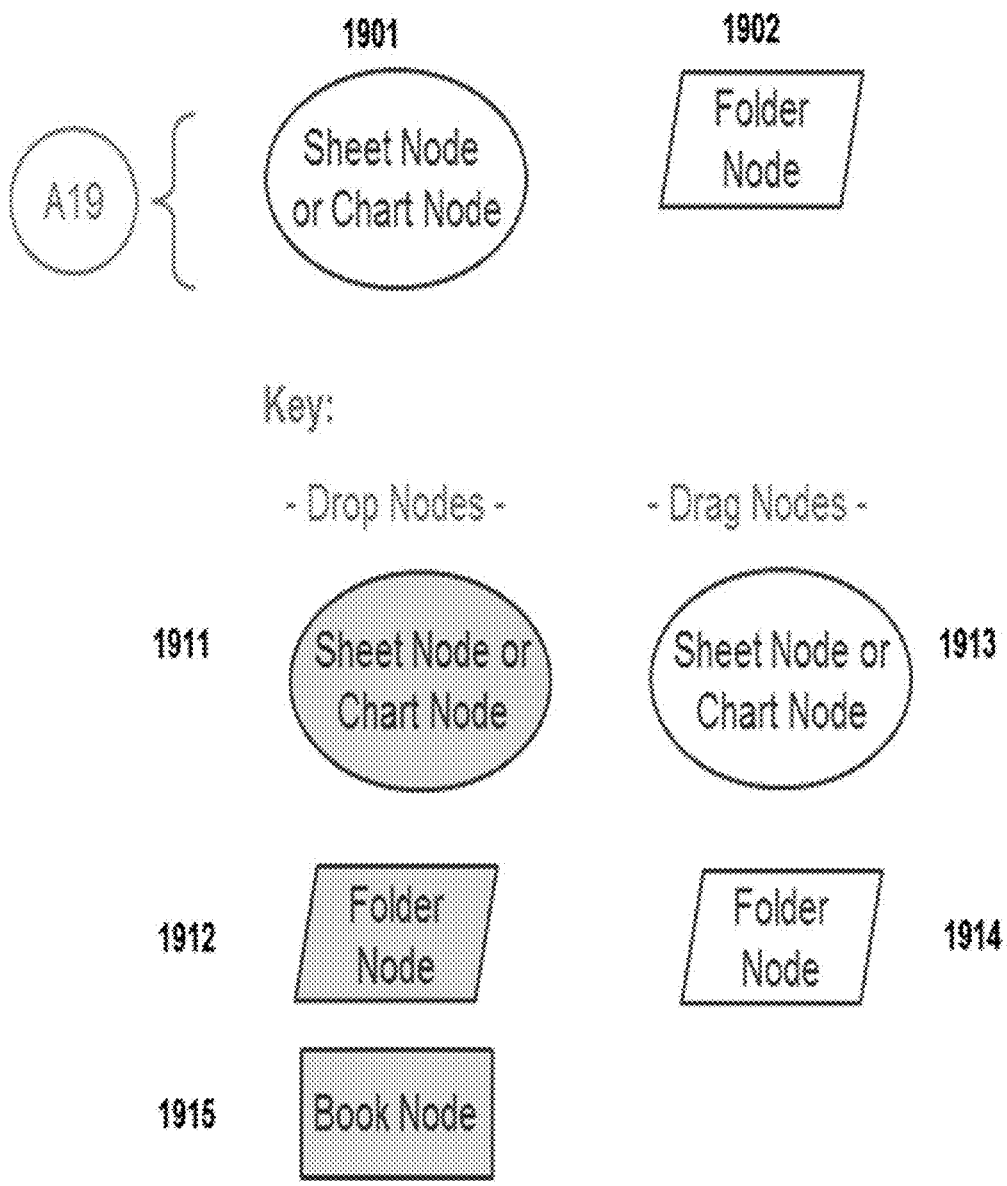

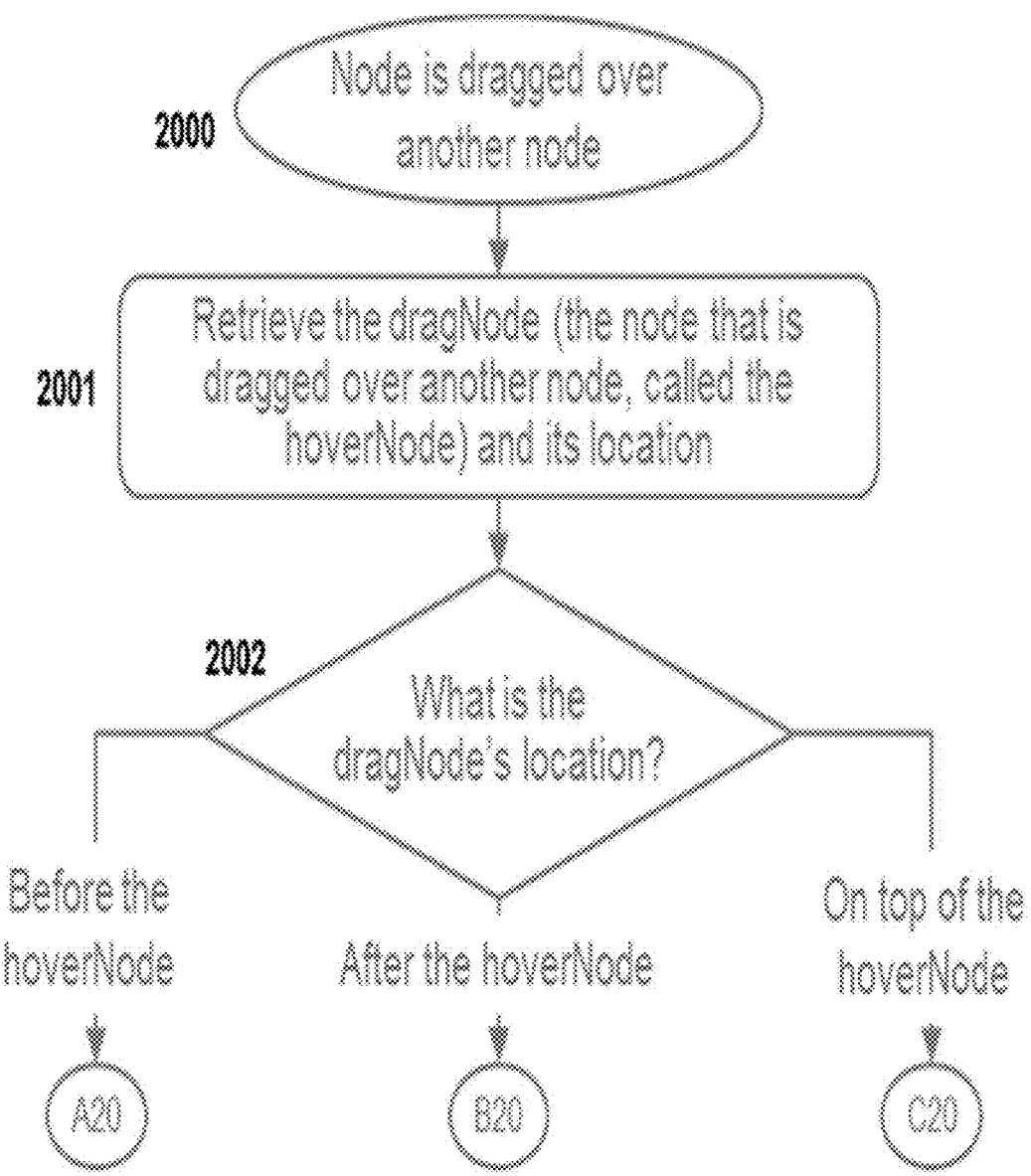
Figure 20A - illustrates steps for DND

Figure 20B - illustrates steps for DND
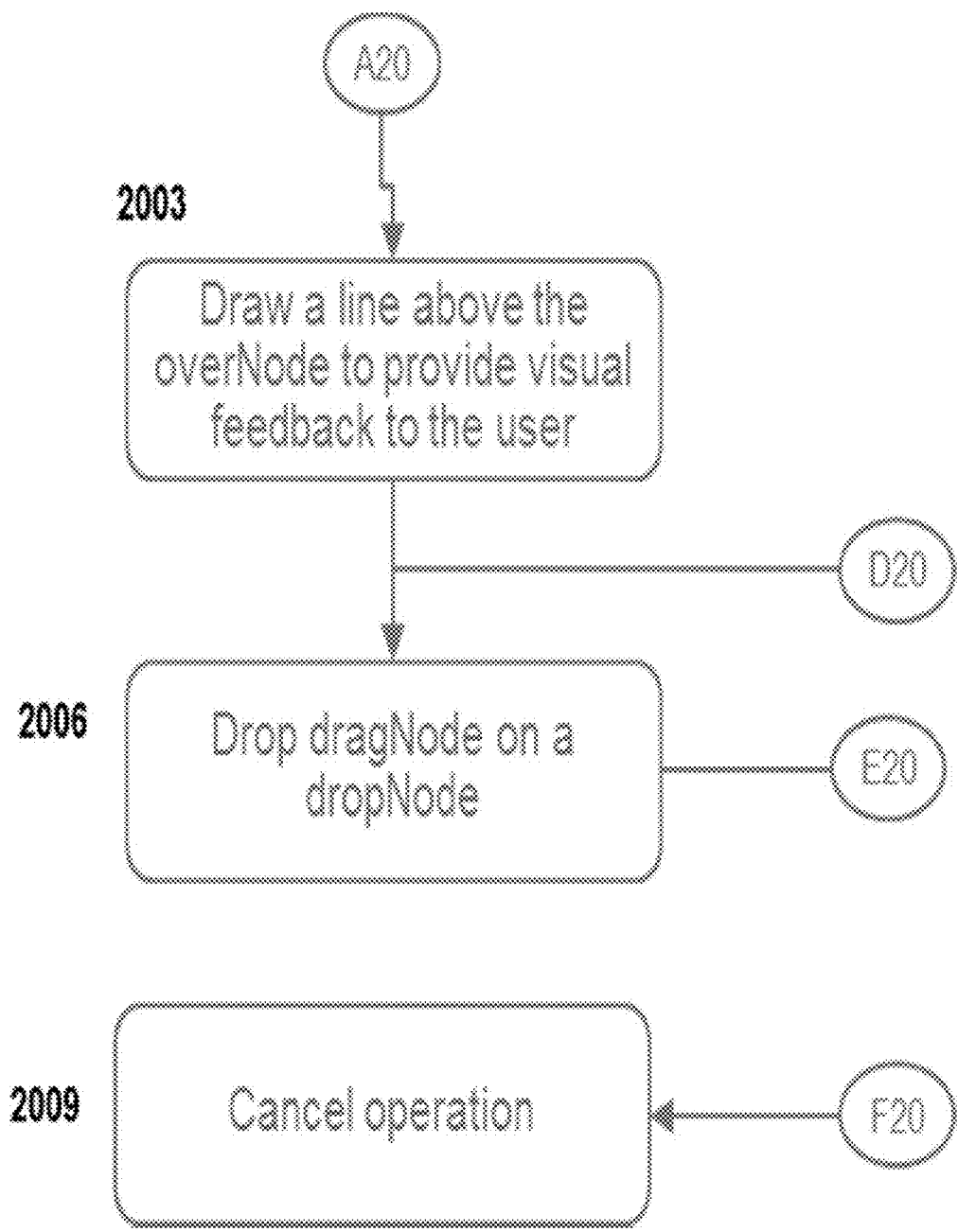

Figure 20C - illustrates steps for DND
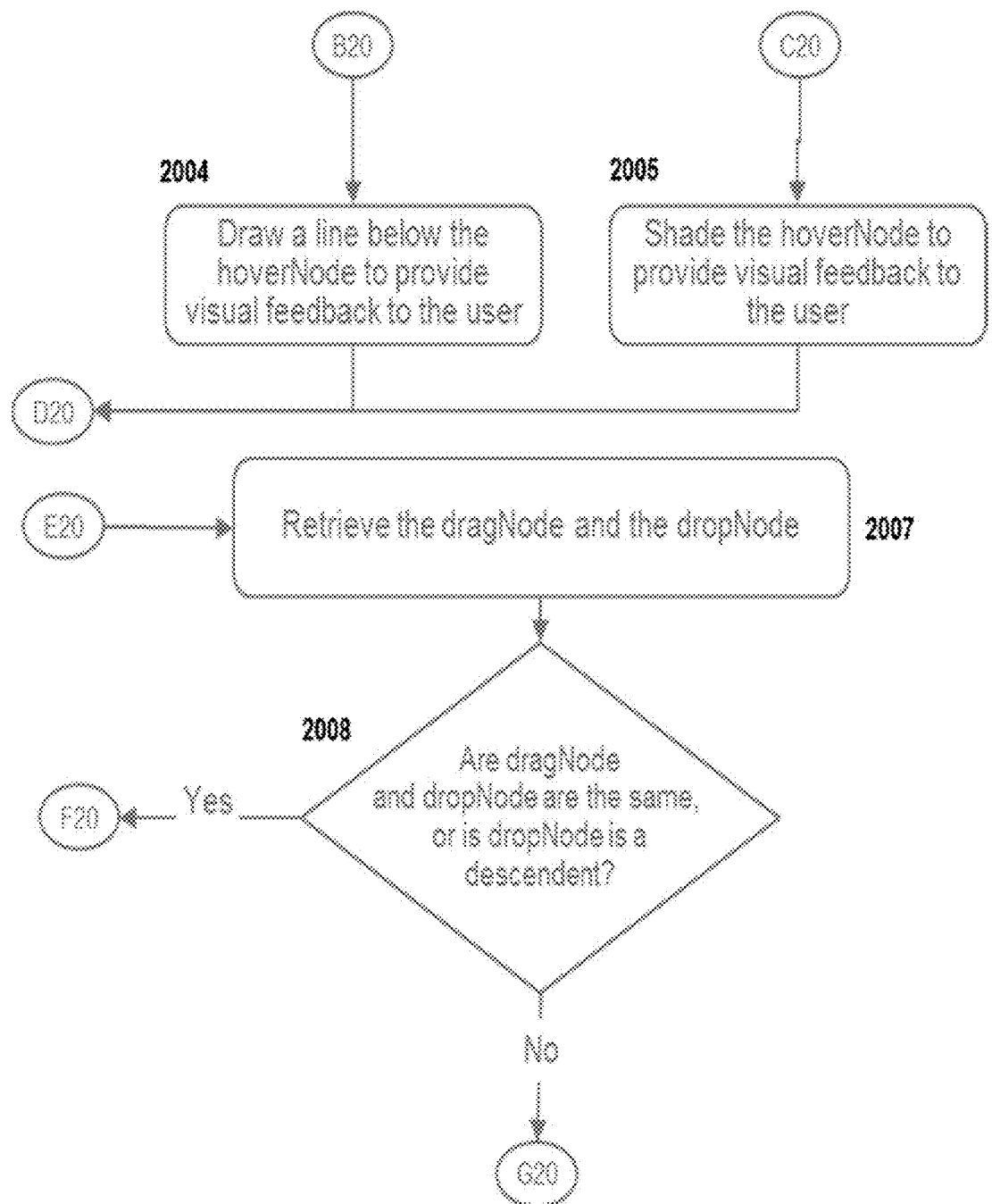

Figure 20D - illustrates steps for DND
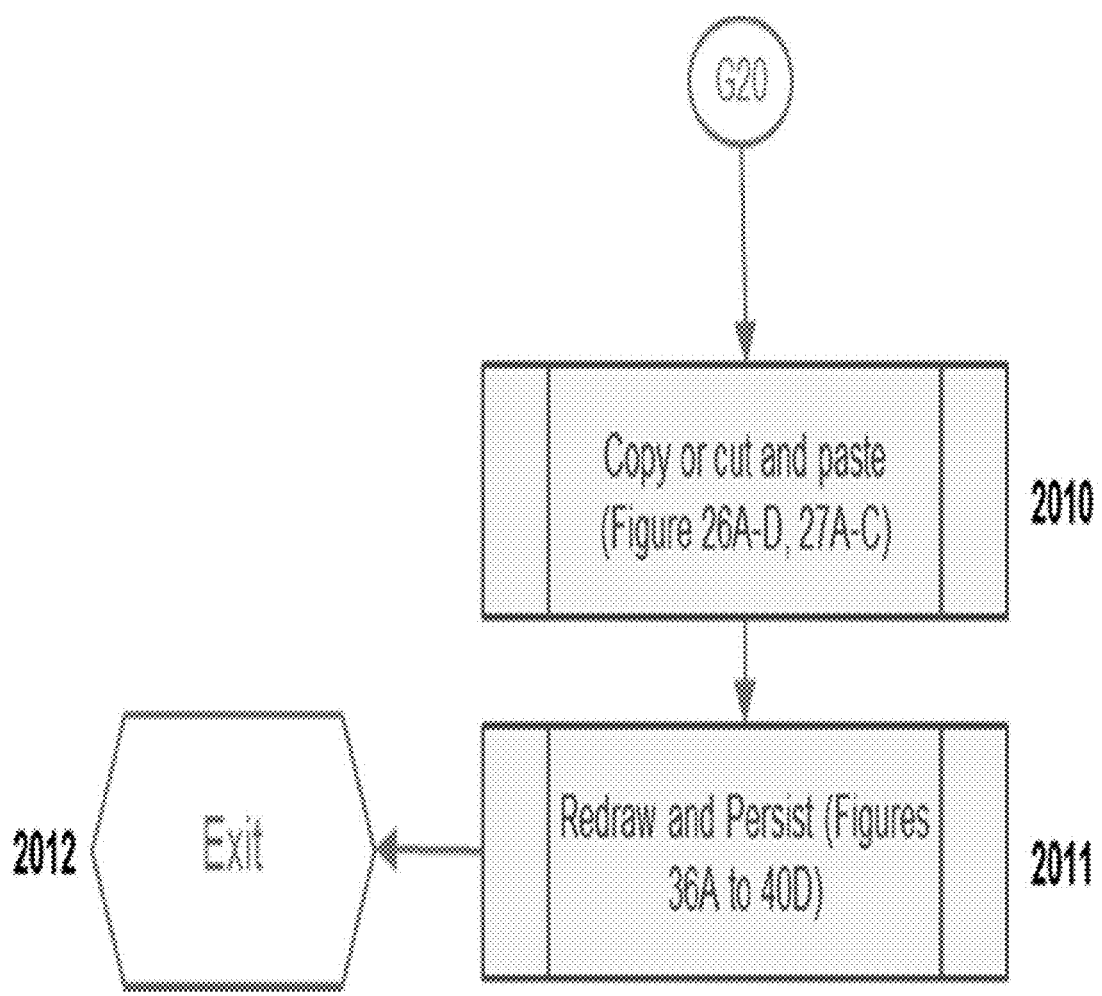

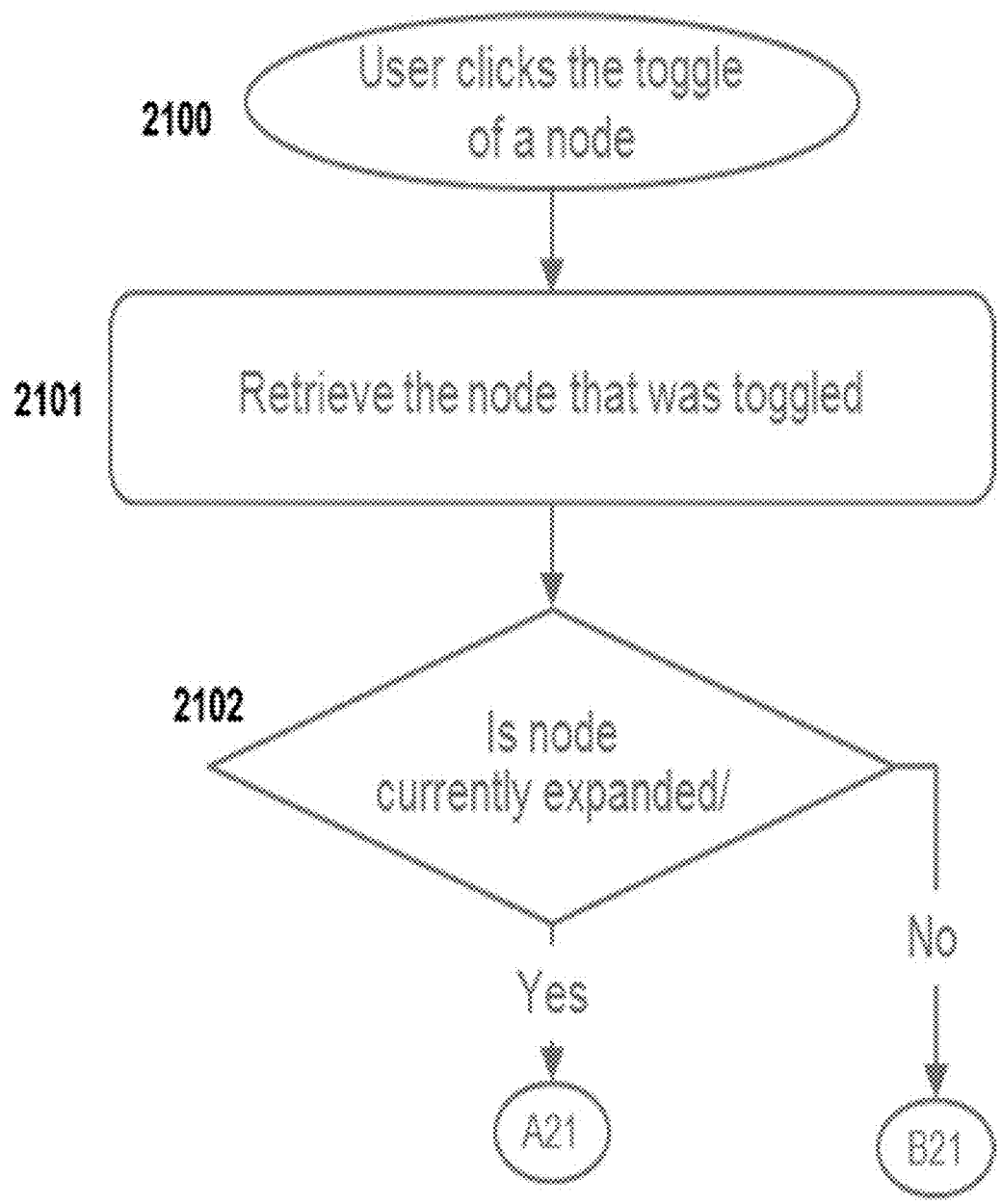
Figure 21A - shows how tree nodes are toggled

Figure 21B - shows how tree nodes are toggled
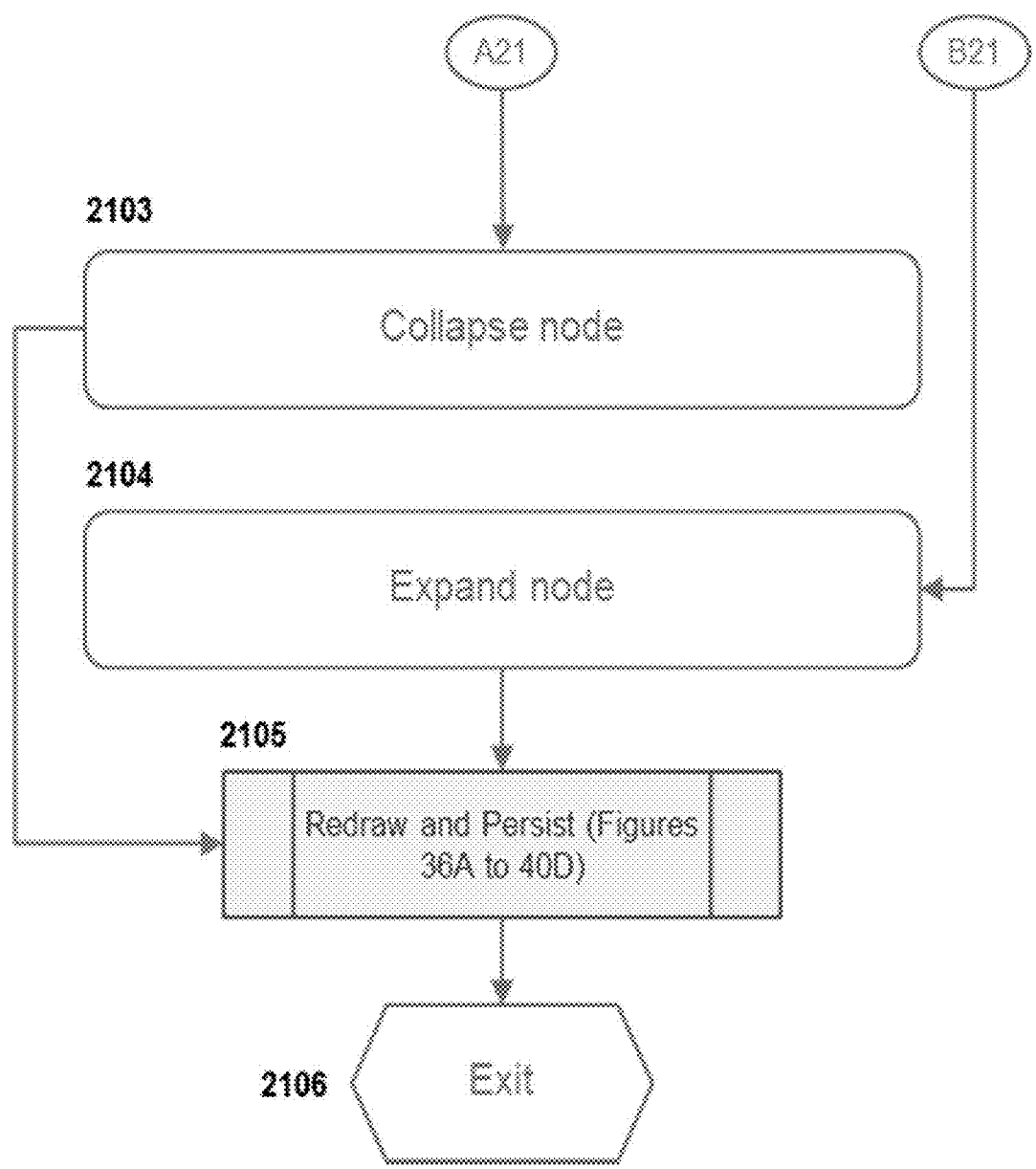

Figure 22A - shows how the HUI's pop-up menu is displayed
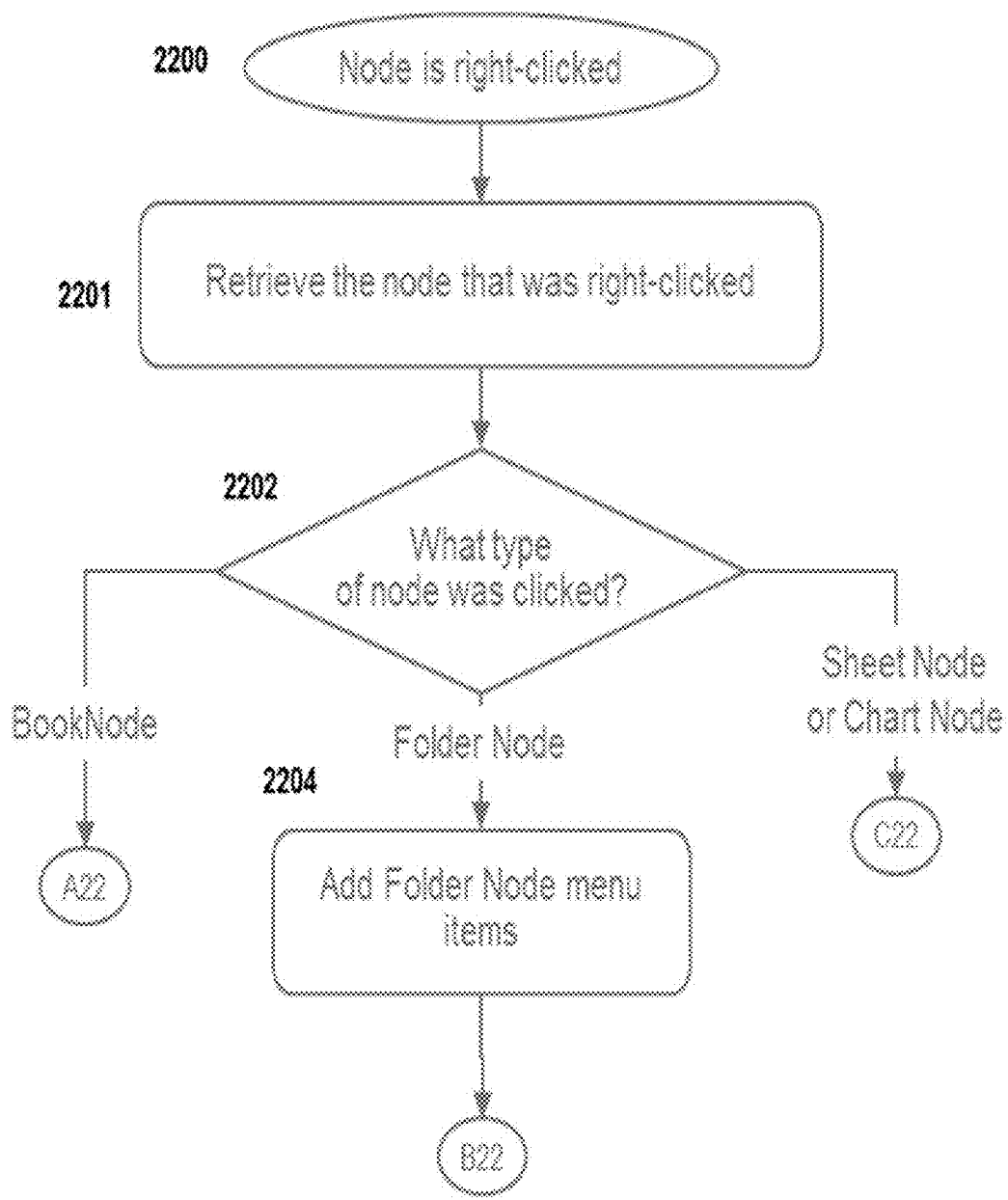

Figure 22B - shows how the HUI's pop-up menu is displayed
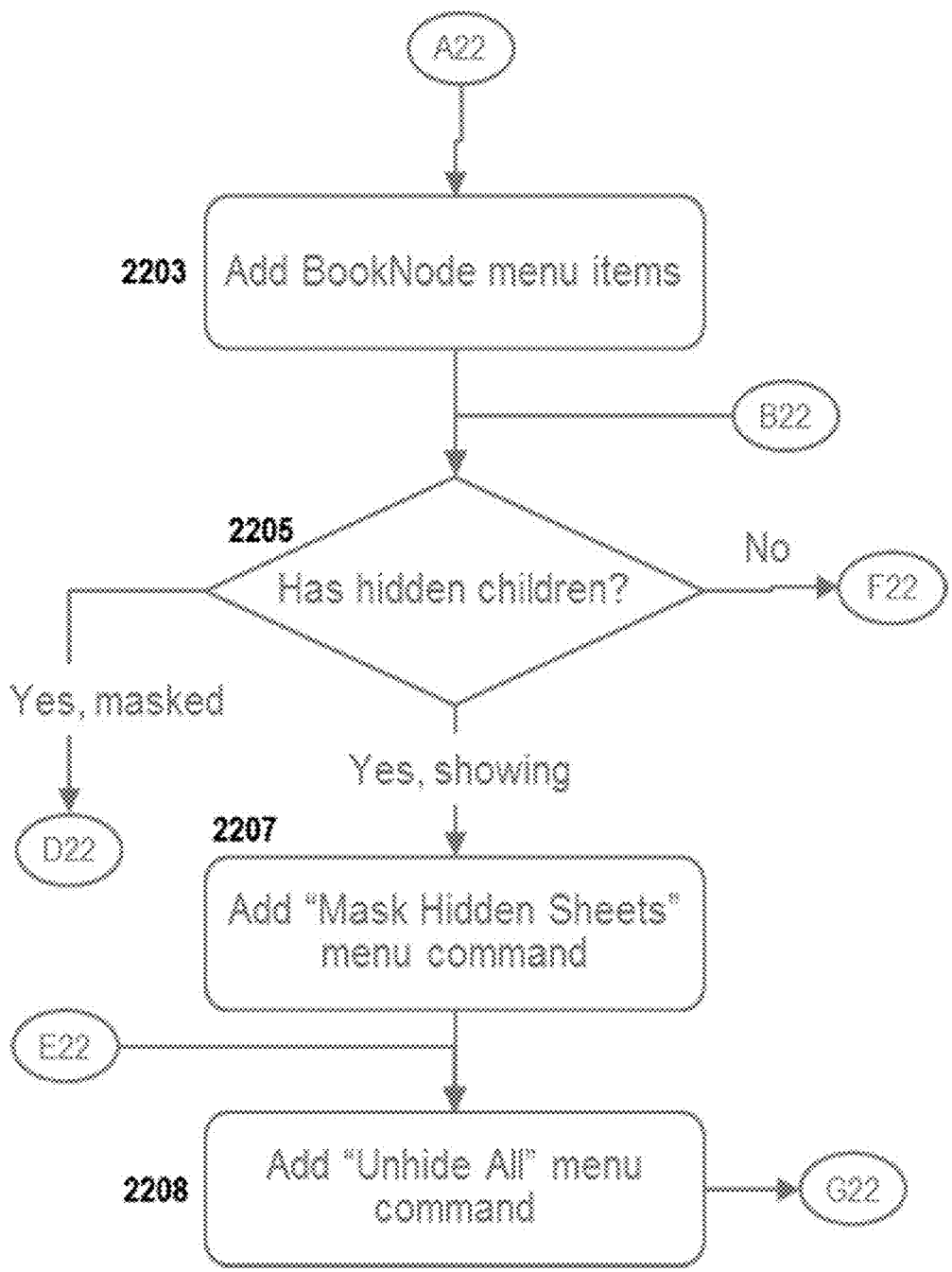

Figure 22C - shows how the HUI's pop-up menu is displayed
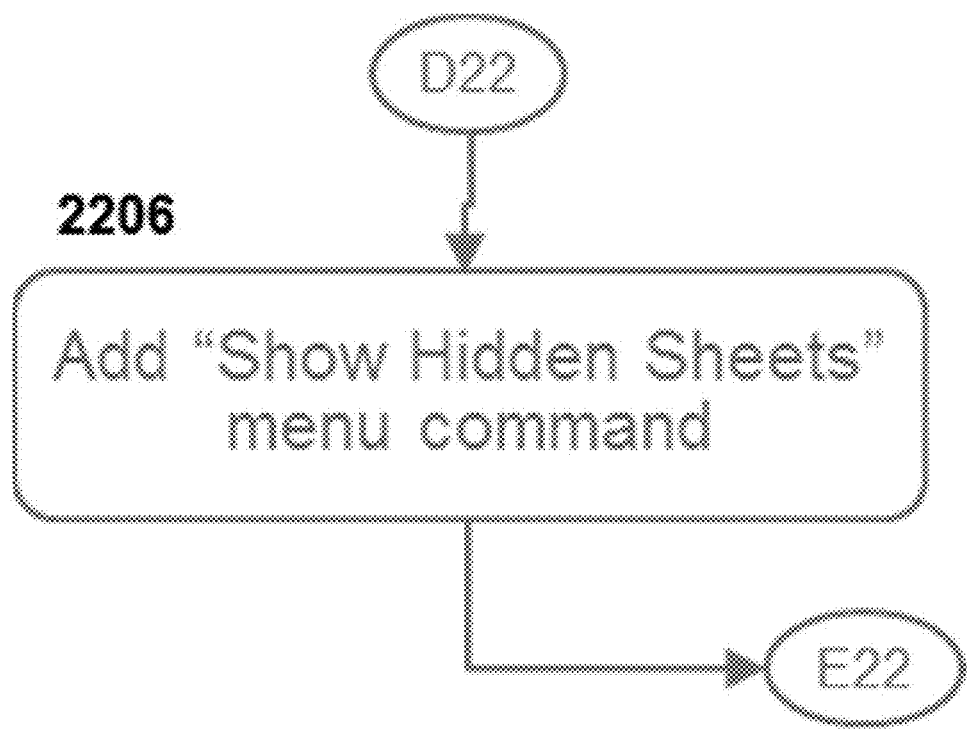

Figure 22D - shows how the HUI's pop-up menu is displayed
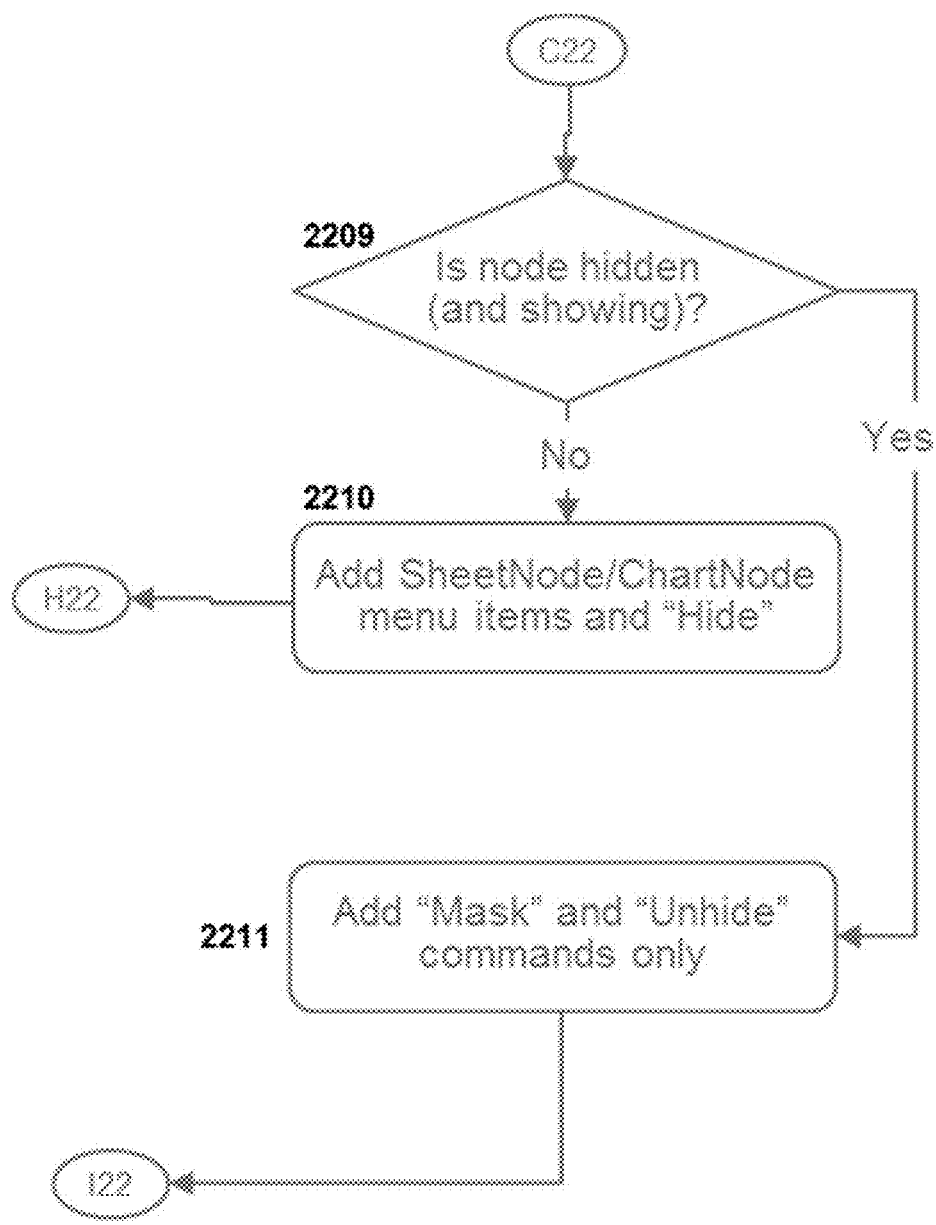

Figure 22E - shows how the HUI's pop-up menu is displayed
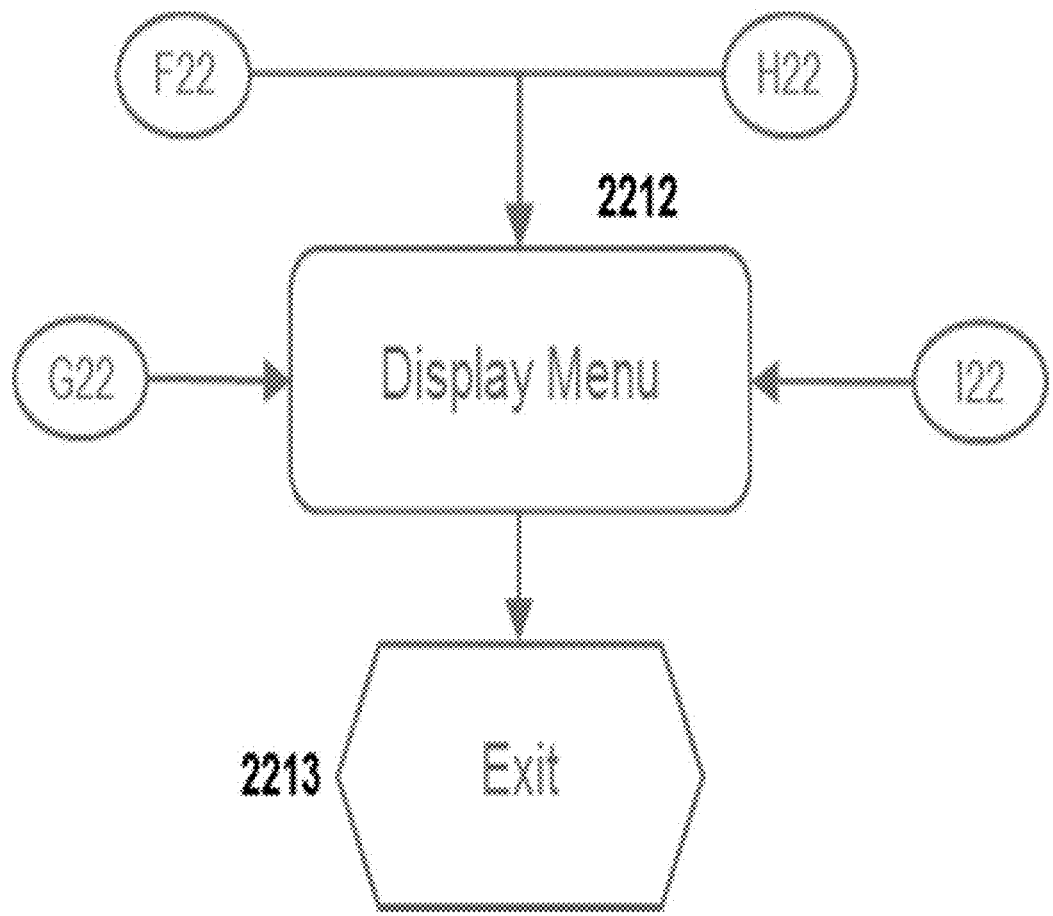

Figure 23A - illustrates the HUI's pop-up menu
2301
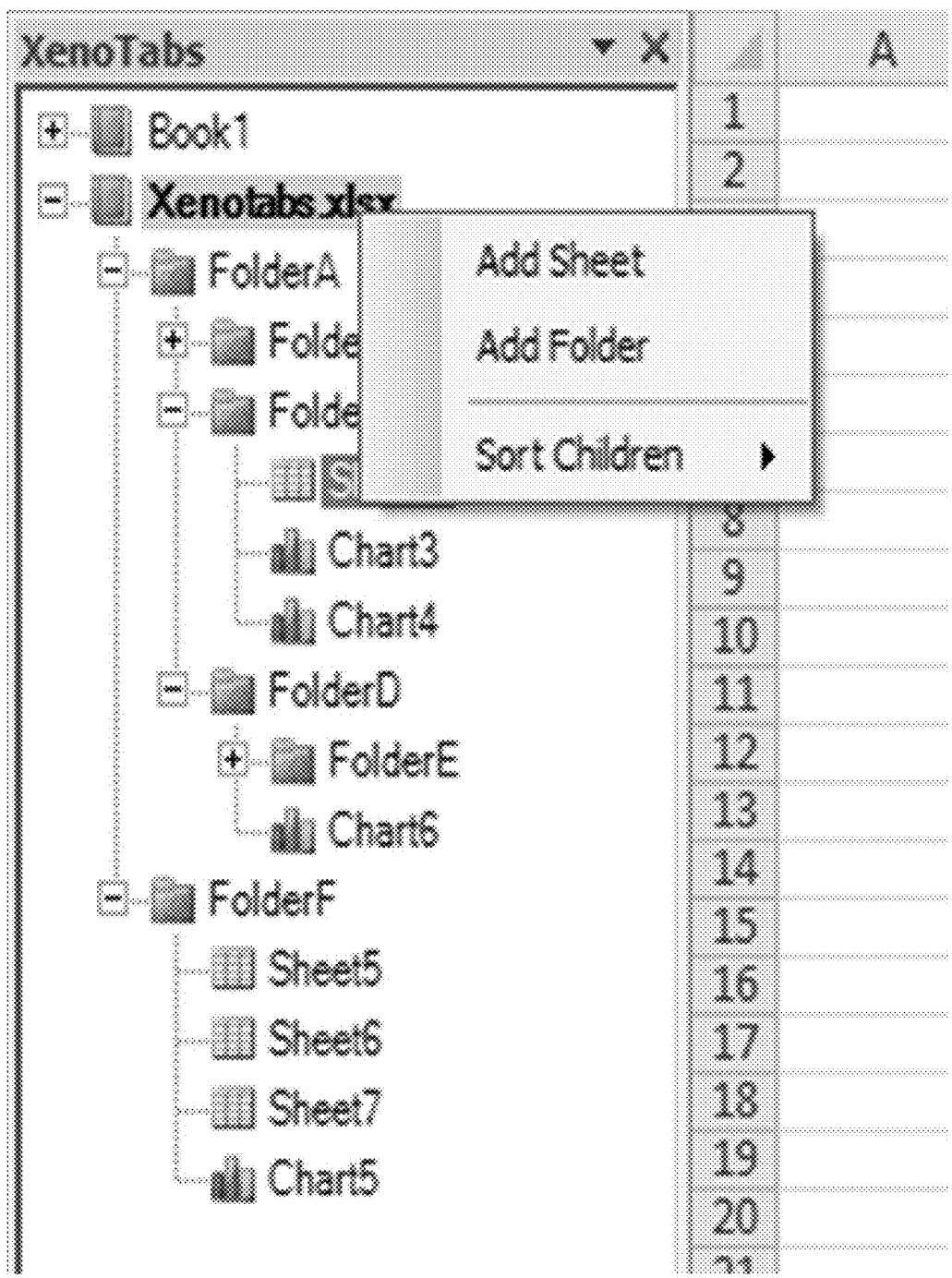

Figure 23B - illustrates the HUI's pop-up menu 2302
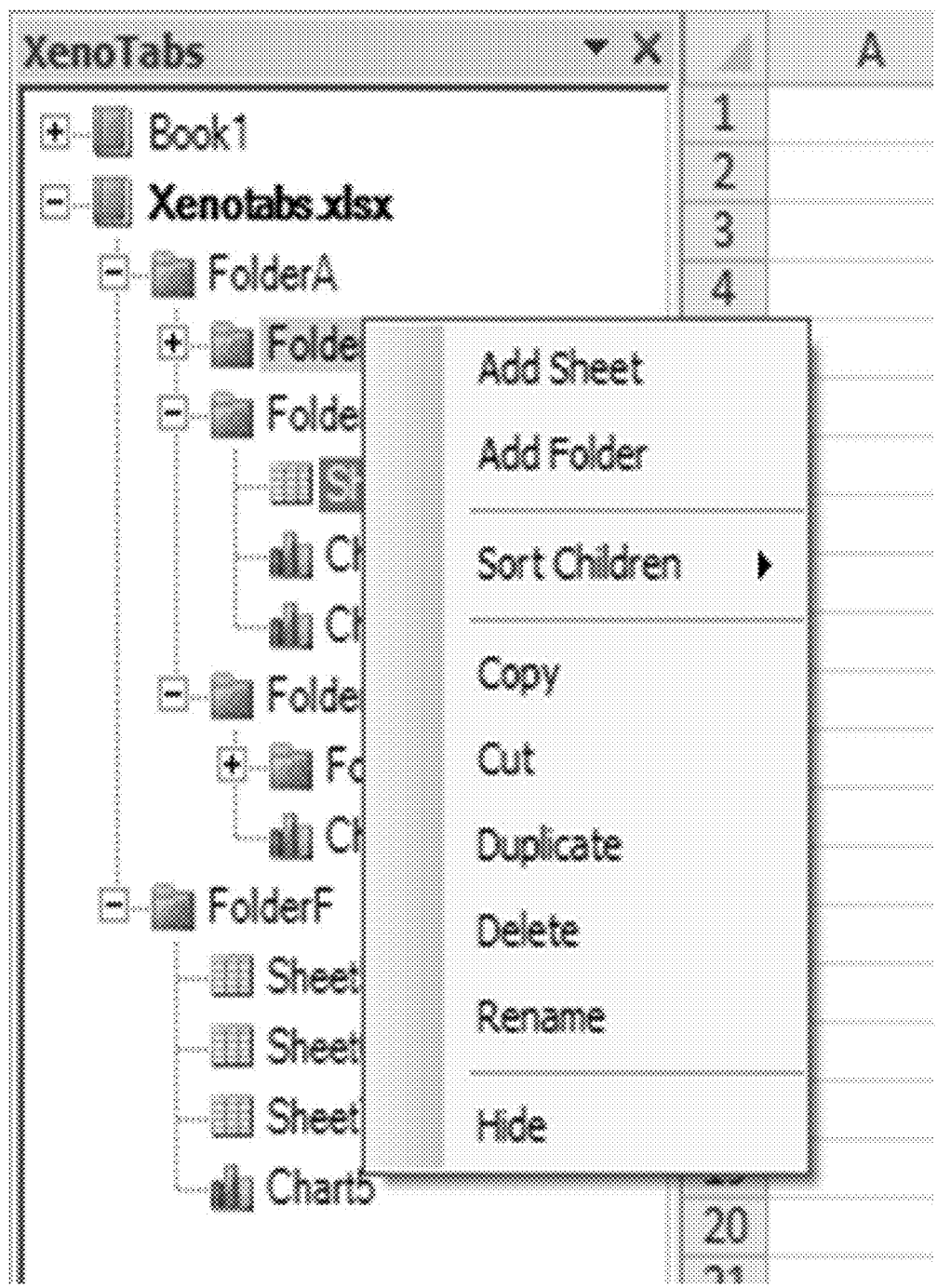

Figure 23C - illustrates the HUI's pop-up menu
2303
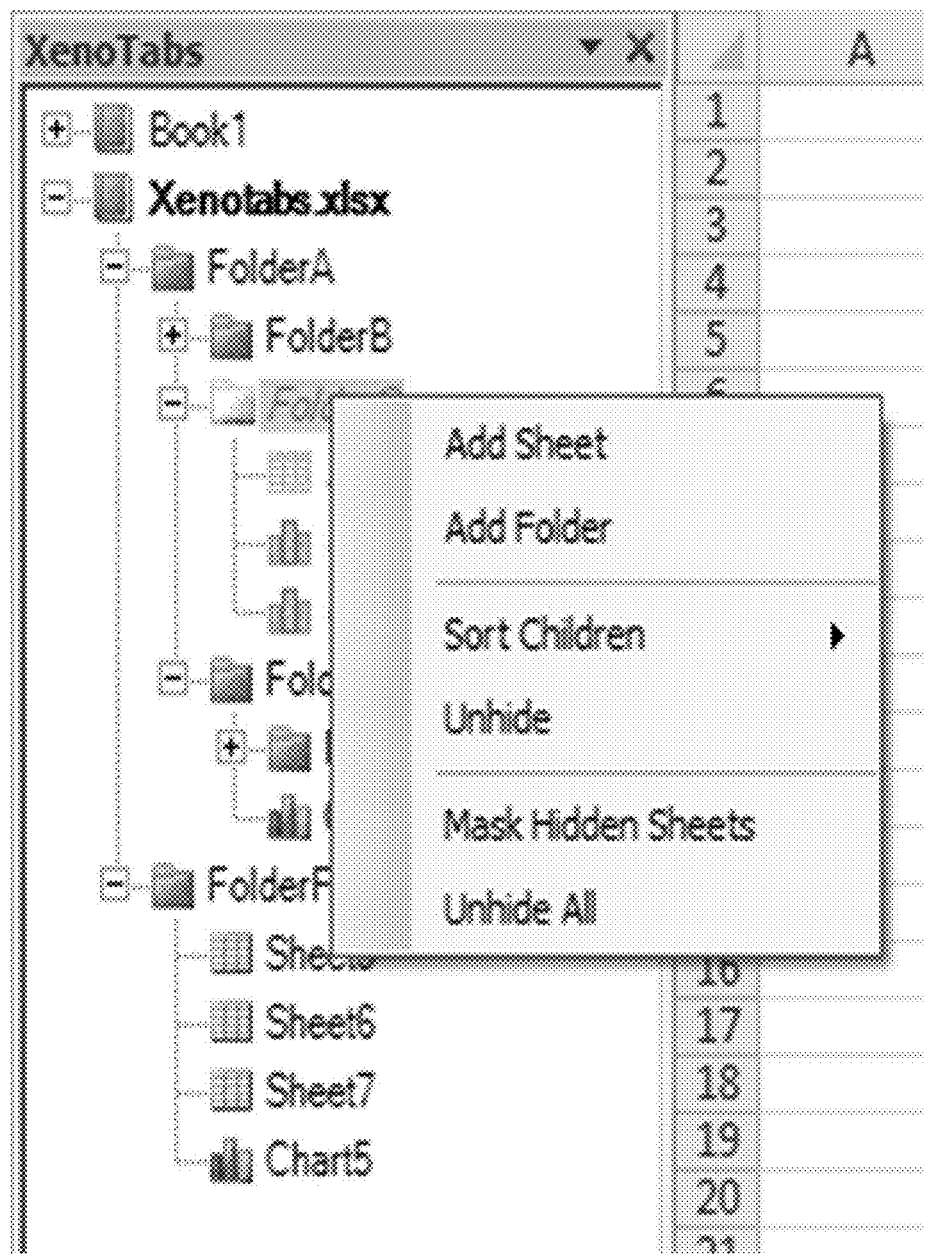

Figure 23D - illustrates the HUI's pop-up menu
2304
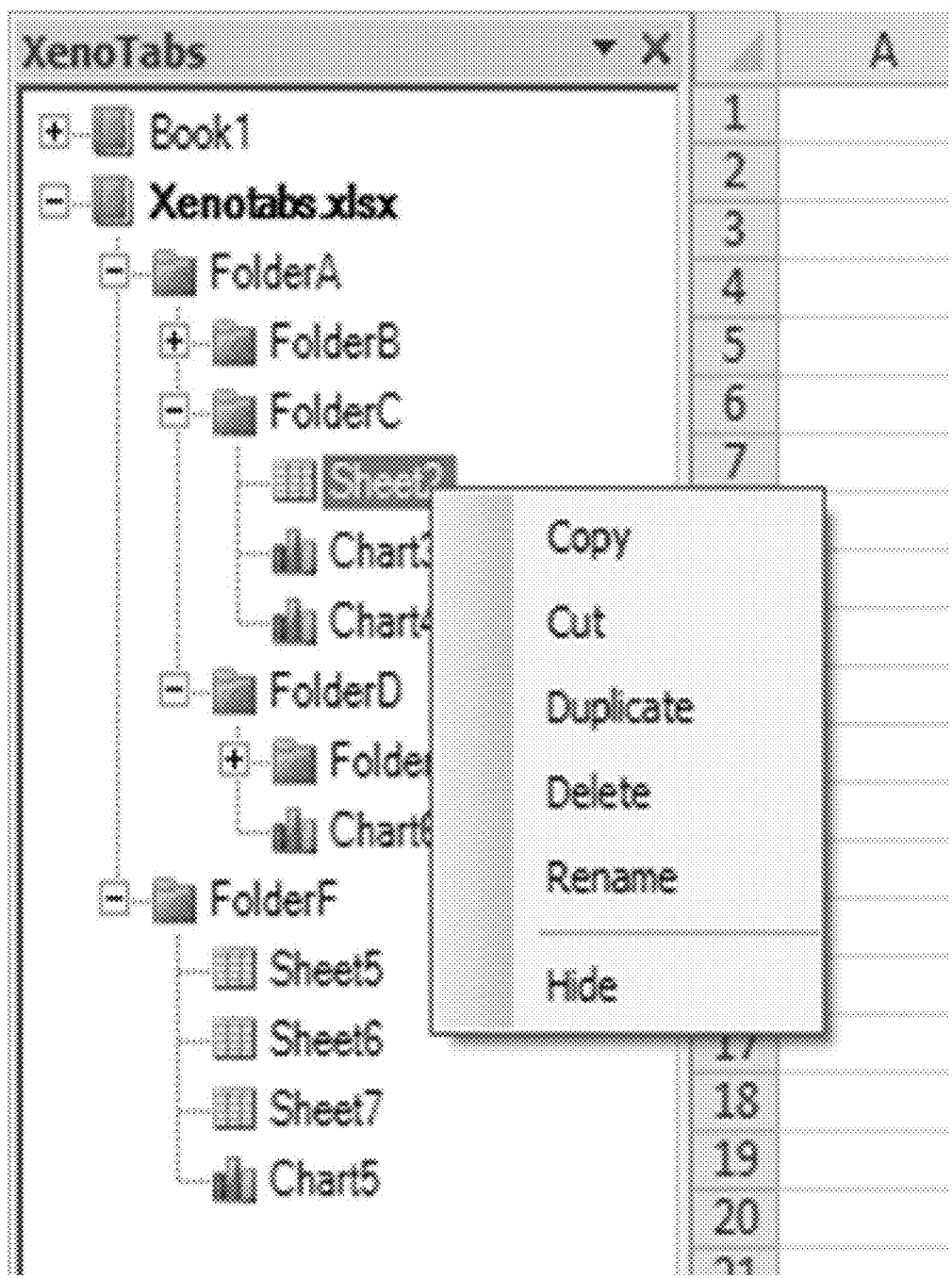

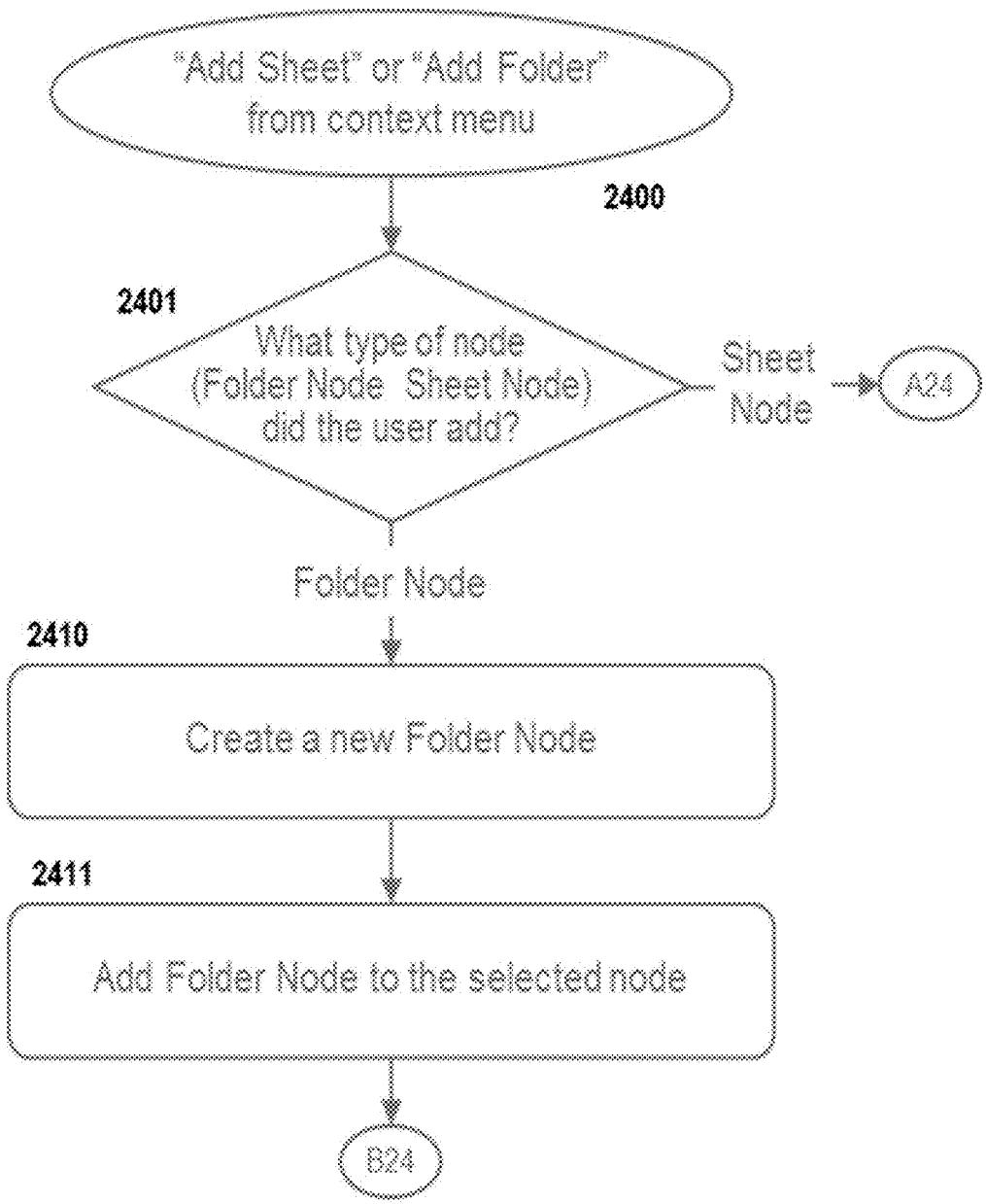
Figure 24A - illustrates how sheets and folders are added to a workbook

Figure 24B - illustrates how sheets and folders are added to a workbook
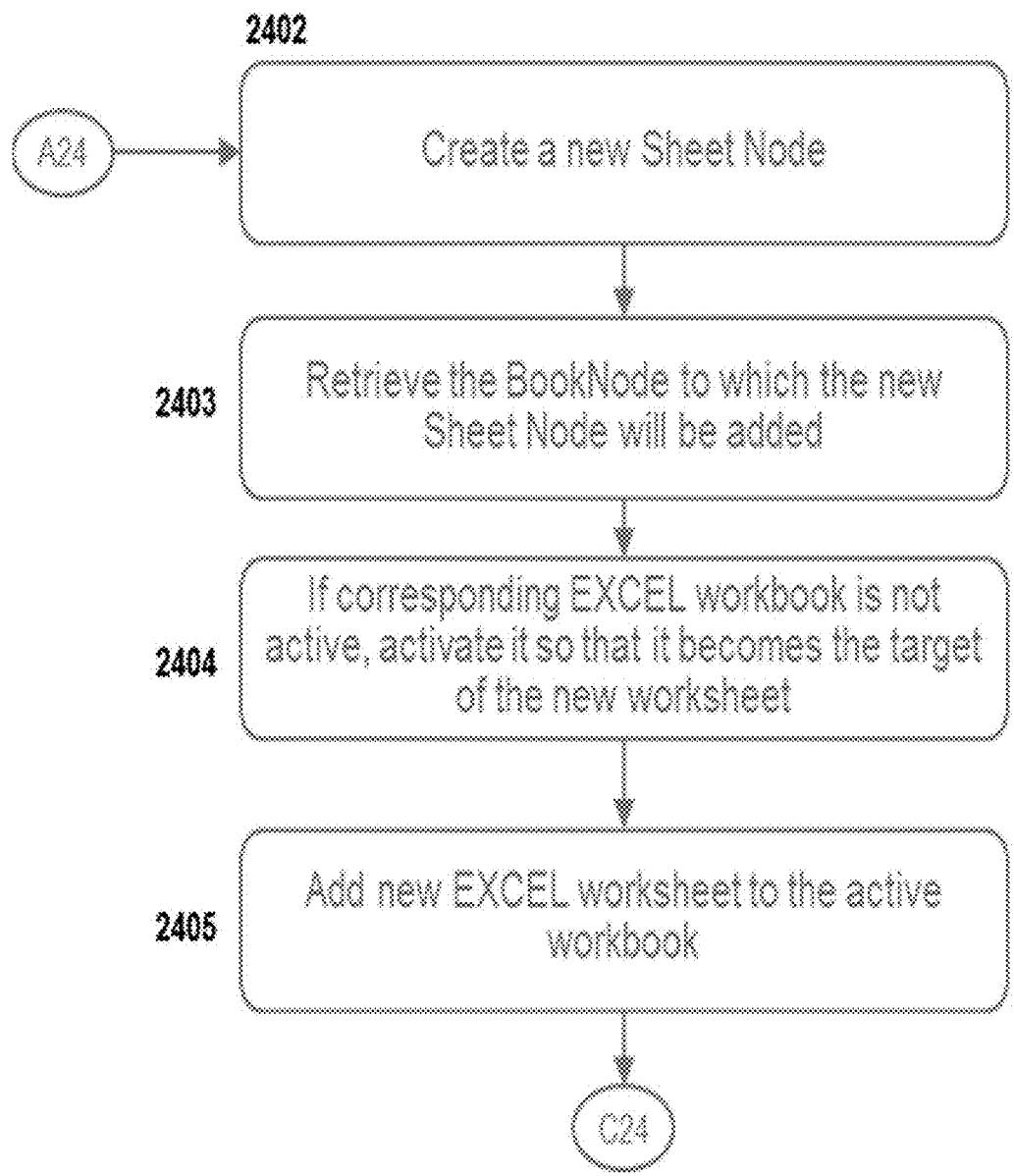

Figure 24C - illustrates how sheets and folders are added to a workbook
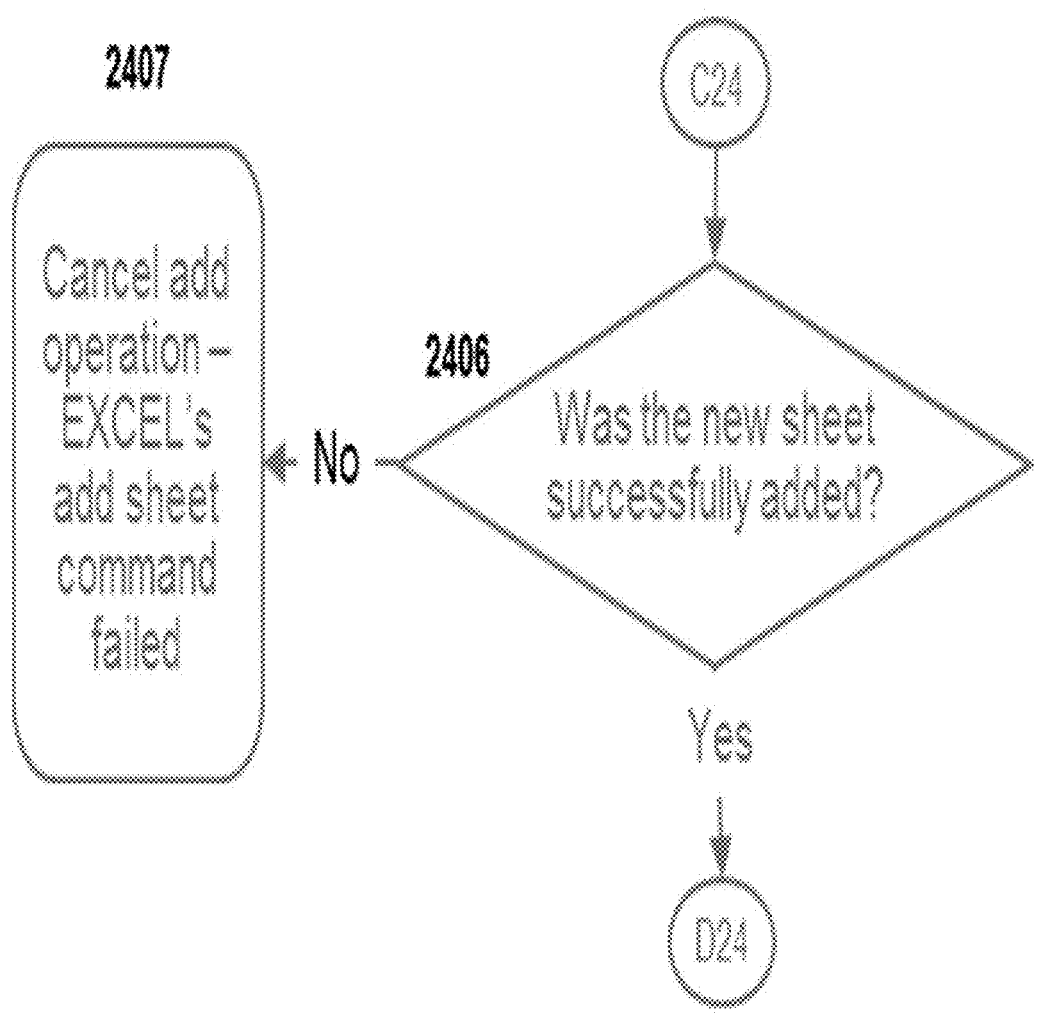

Figure 24D - illustrates how sheets and folders are added to a workbook
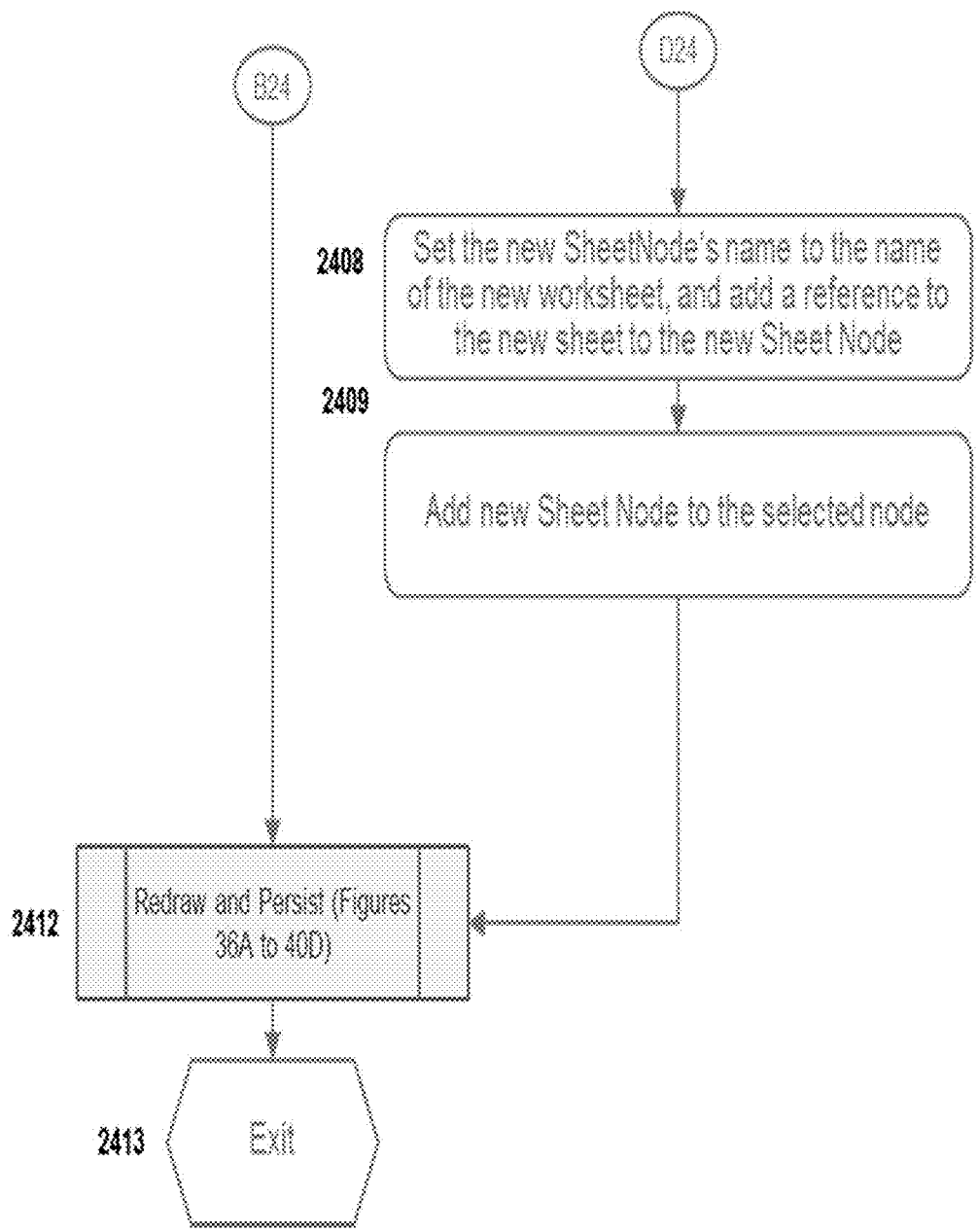

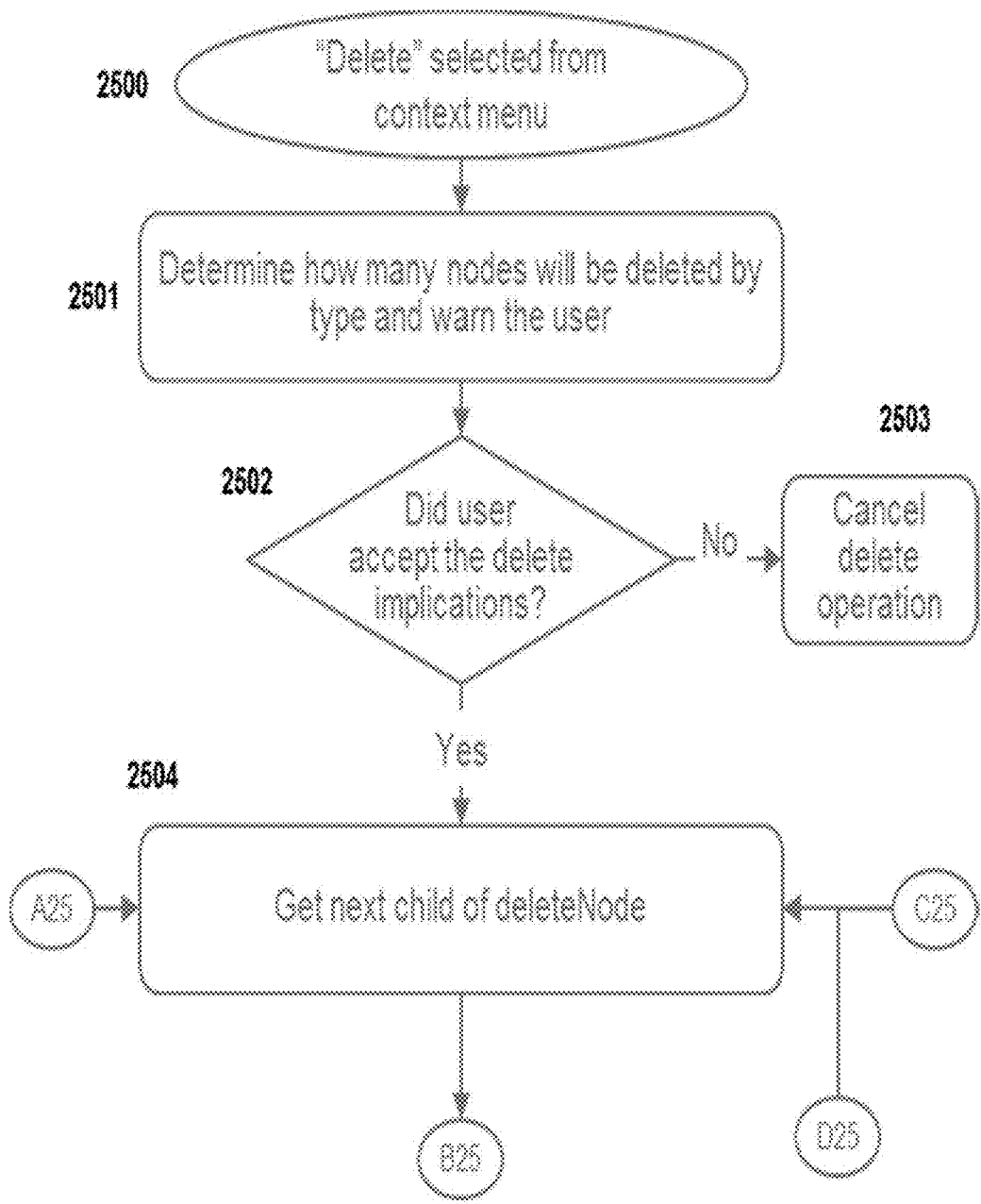
Figure 25A - illustrates how sheets and folders are deleted from a workbook

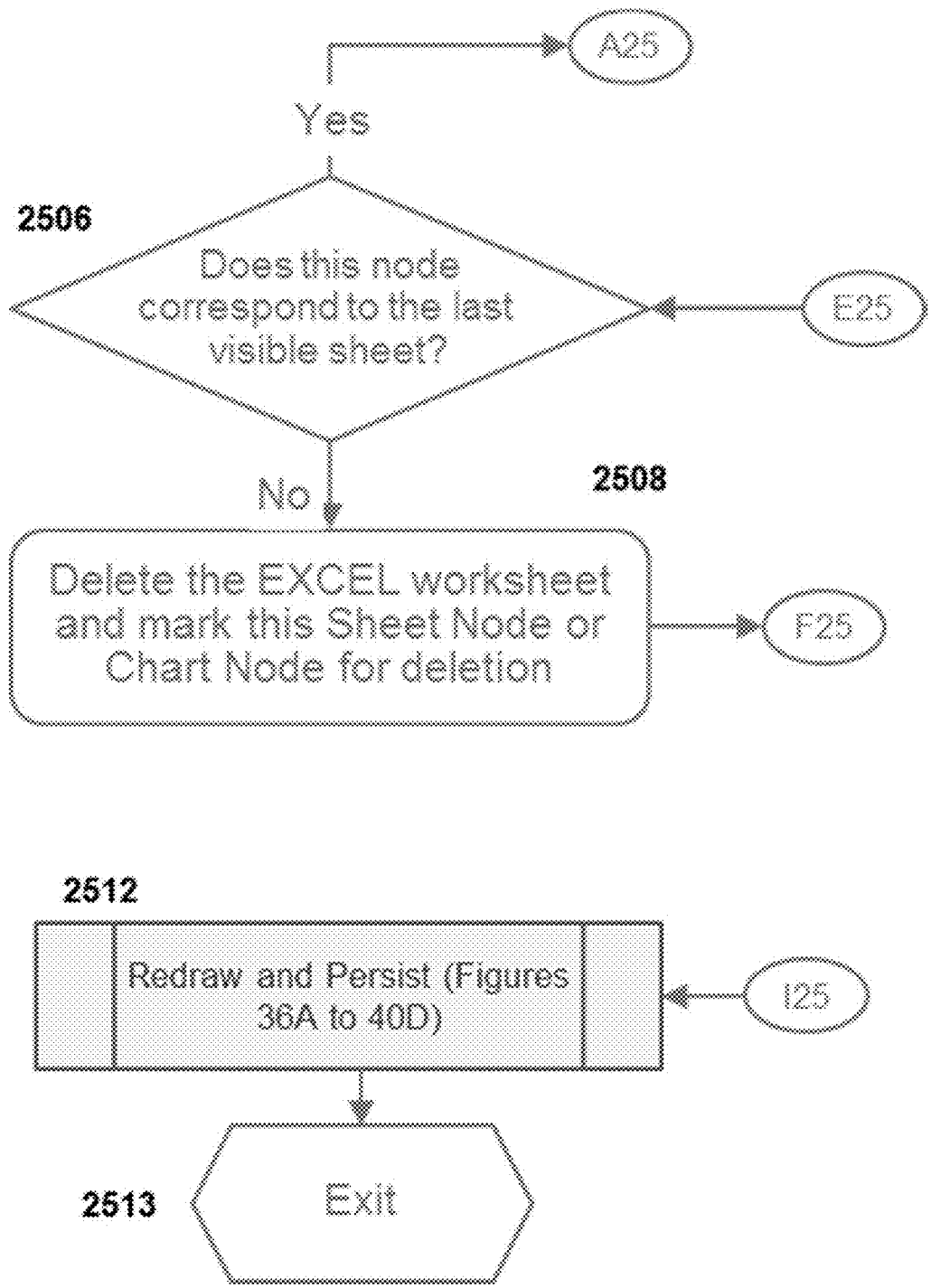
Figure 25B - illustrates how sheets and folders are deleted from a workbook

Figure 25C - illustrates how sheets and folders are deleted from a workbook
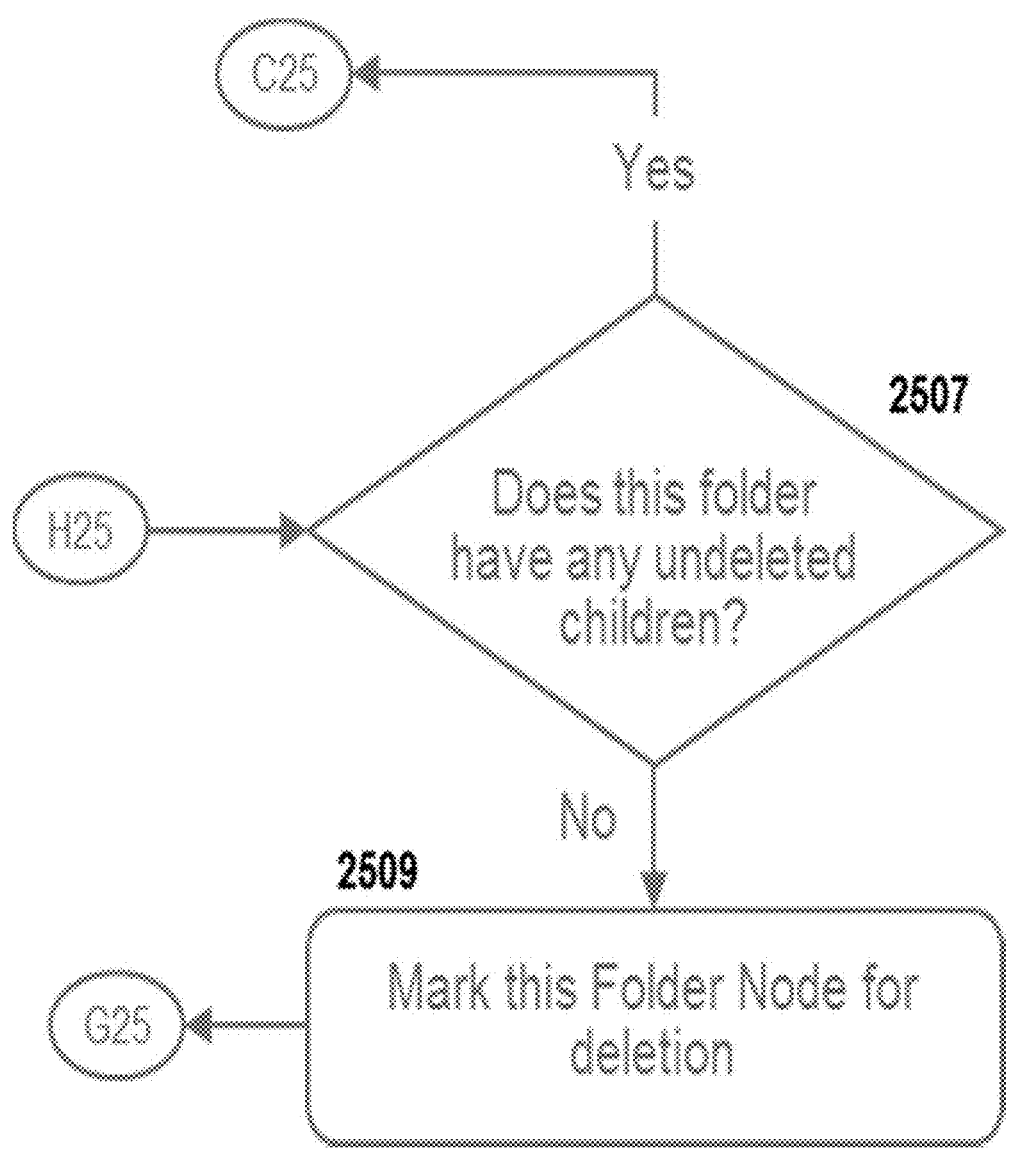

Figure 25D - illustrates how sheets and folders are deleted from a workbook
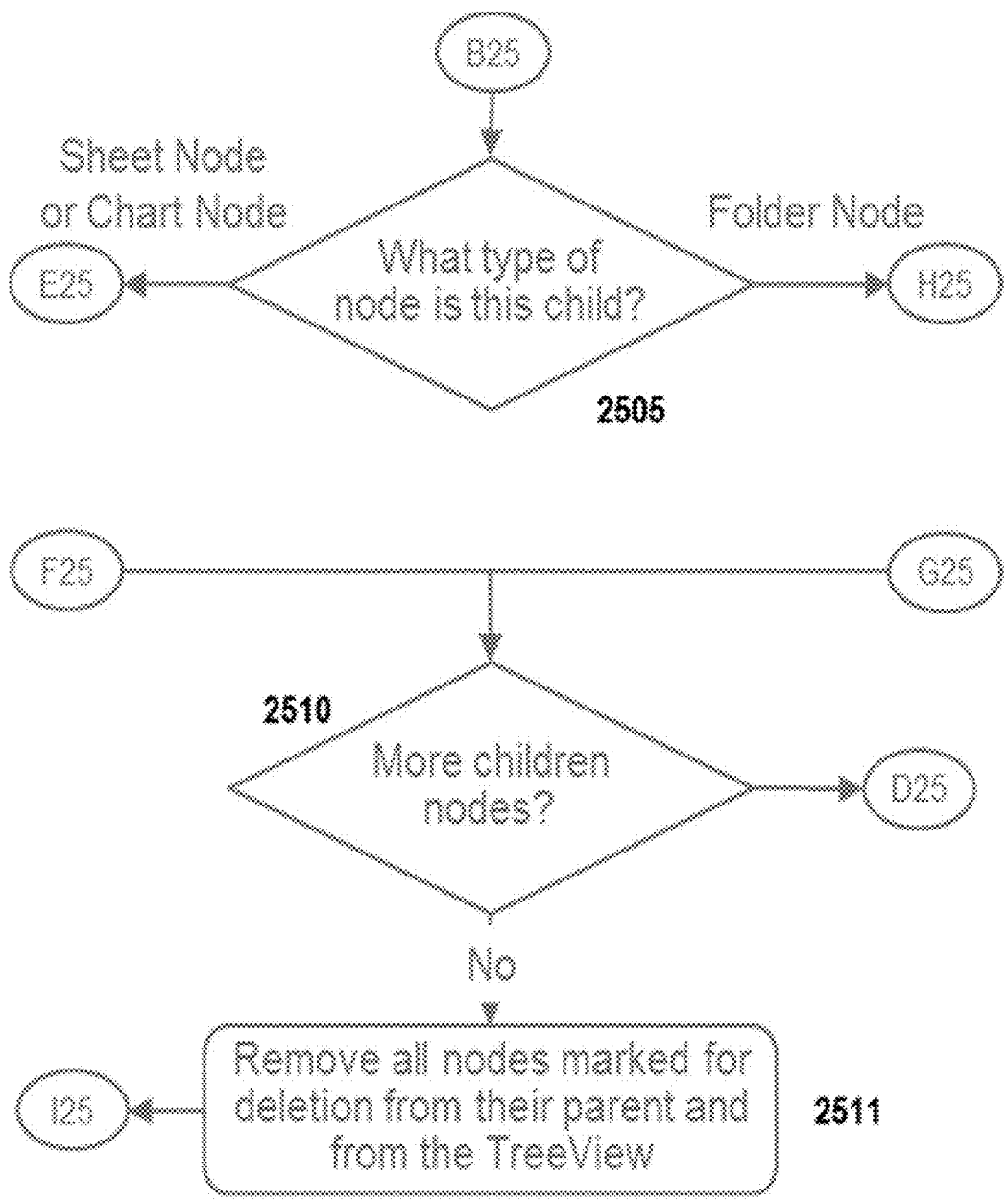

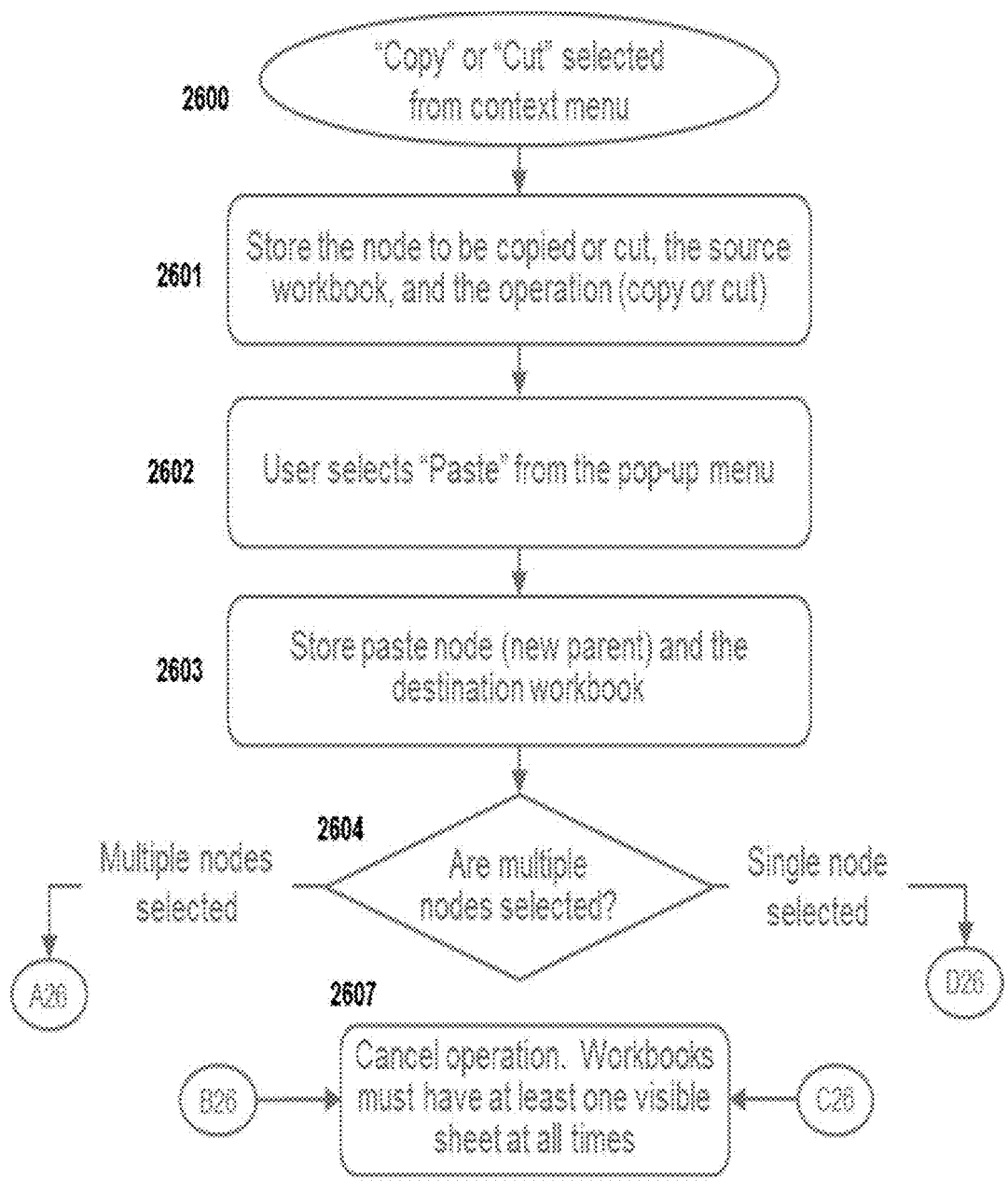
Figure 26A - illustrates the initial steps for copying a node

Figure 26B - illustrates the initial steps for copying a node
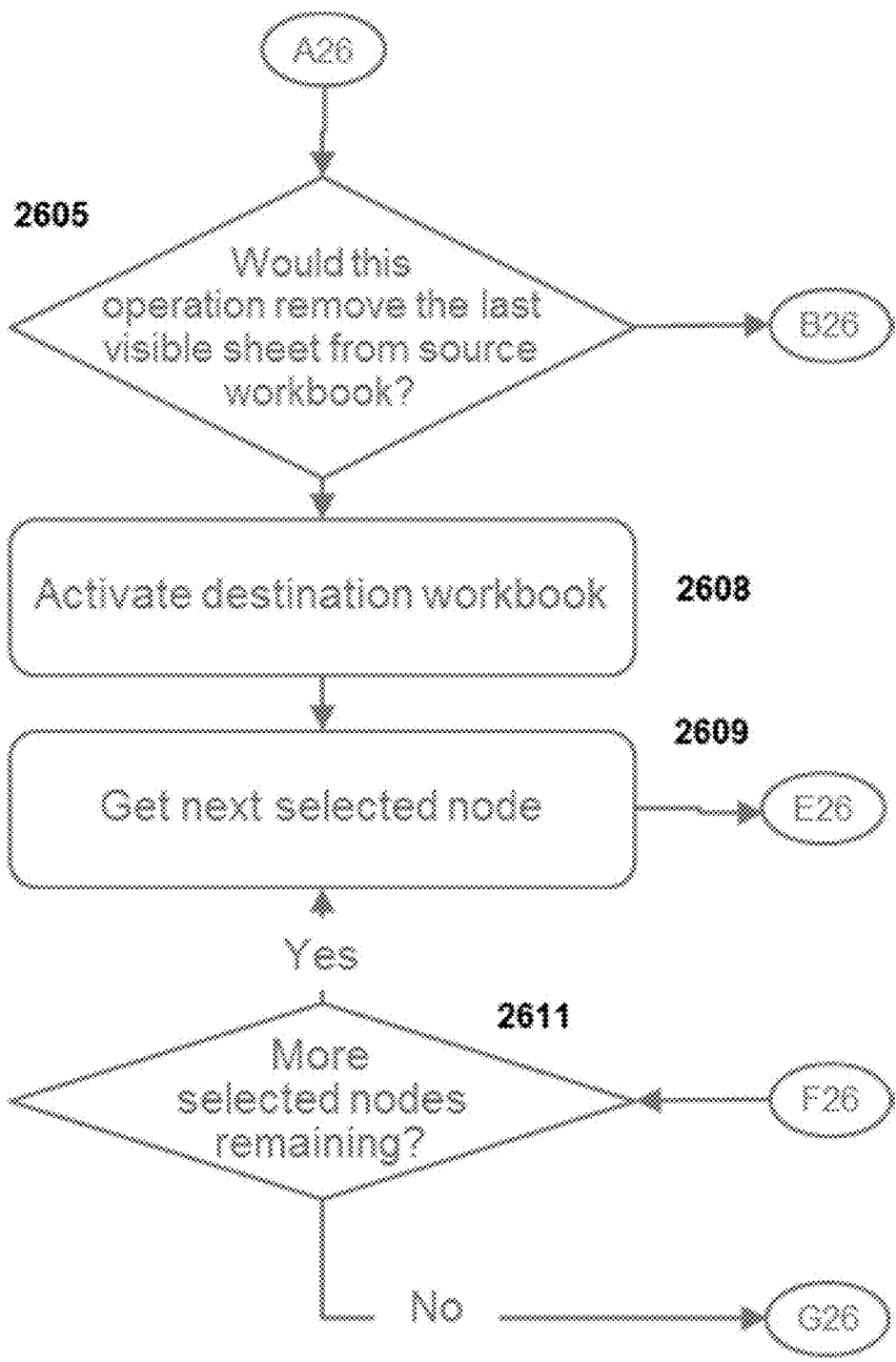

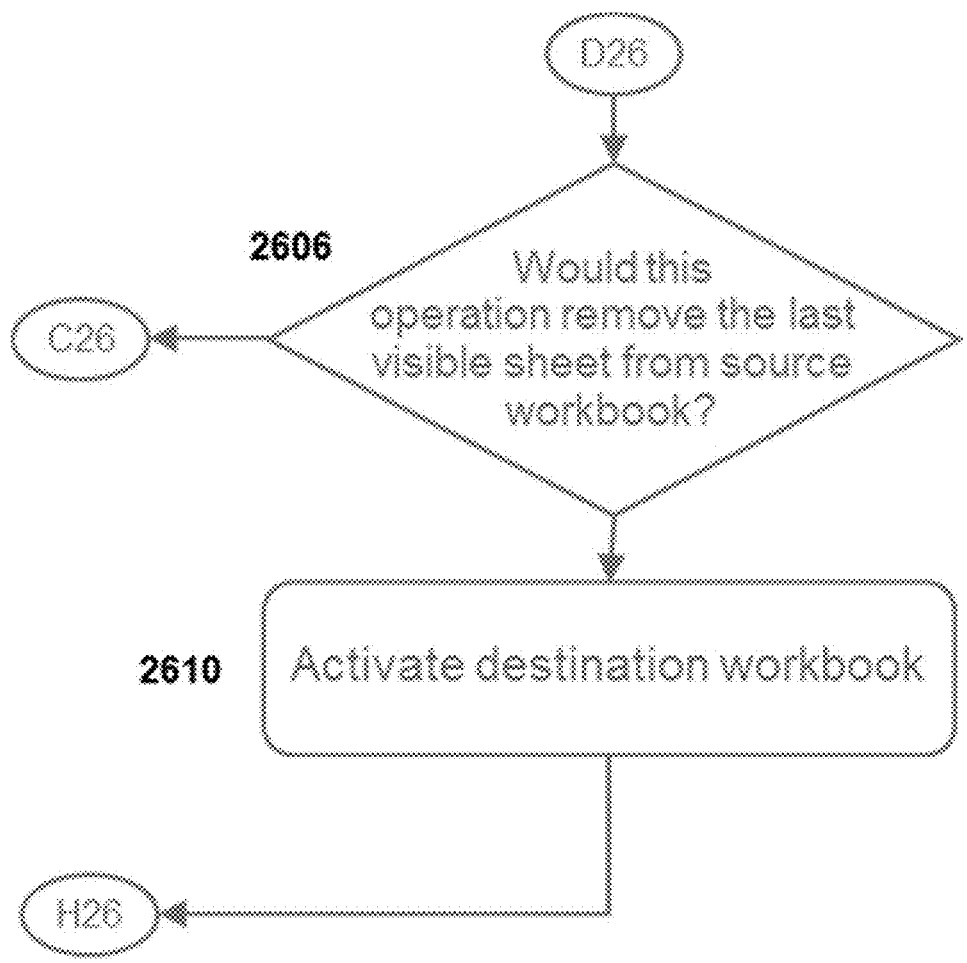
Figure 26C - illustrates the initial steps for copying a node

Figure 26D - illustrates the initial steps for copying a node
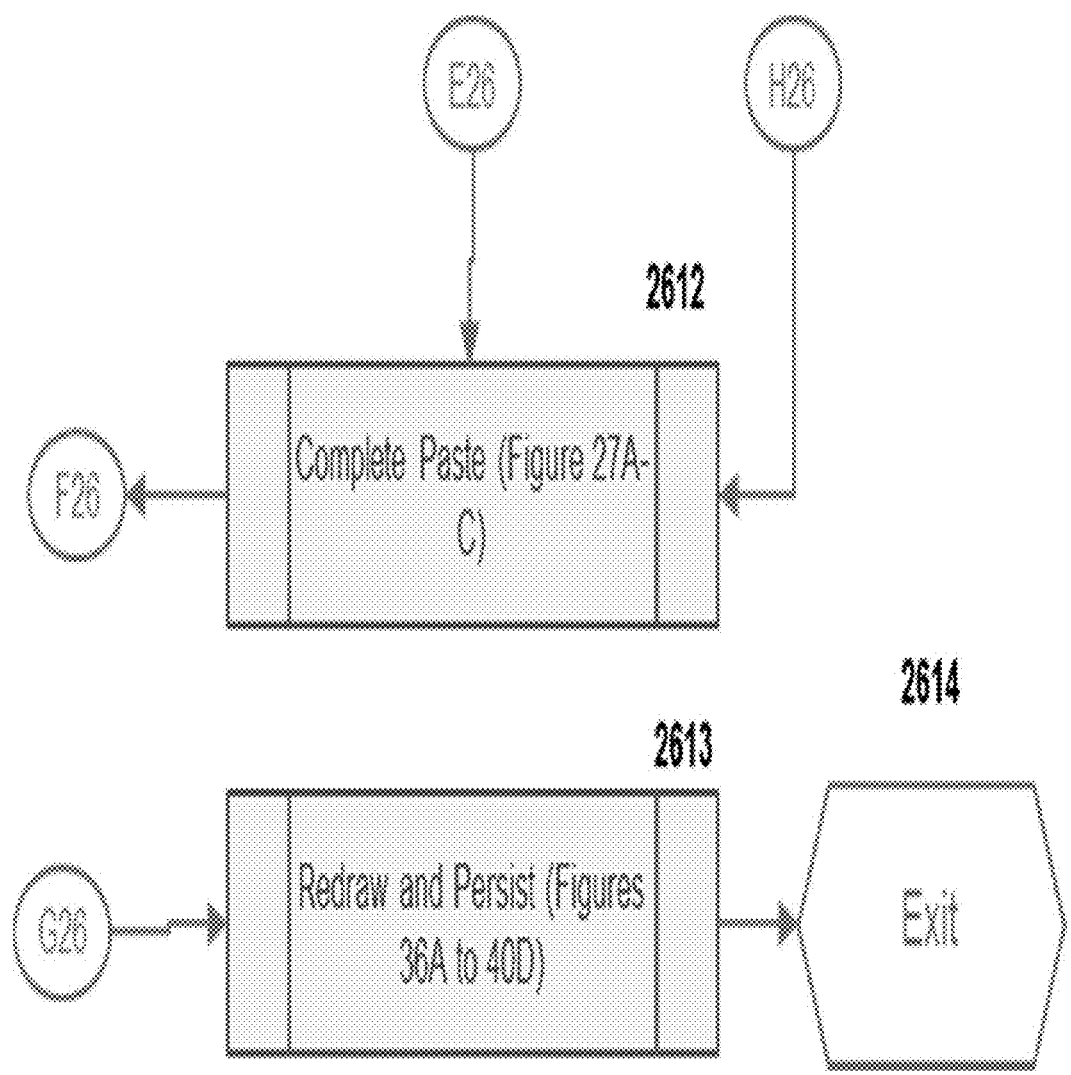

Figure 27A - illustrates steps for copying or moving nodes to their new parent
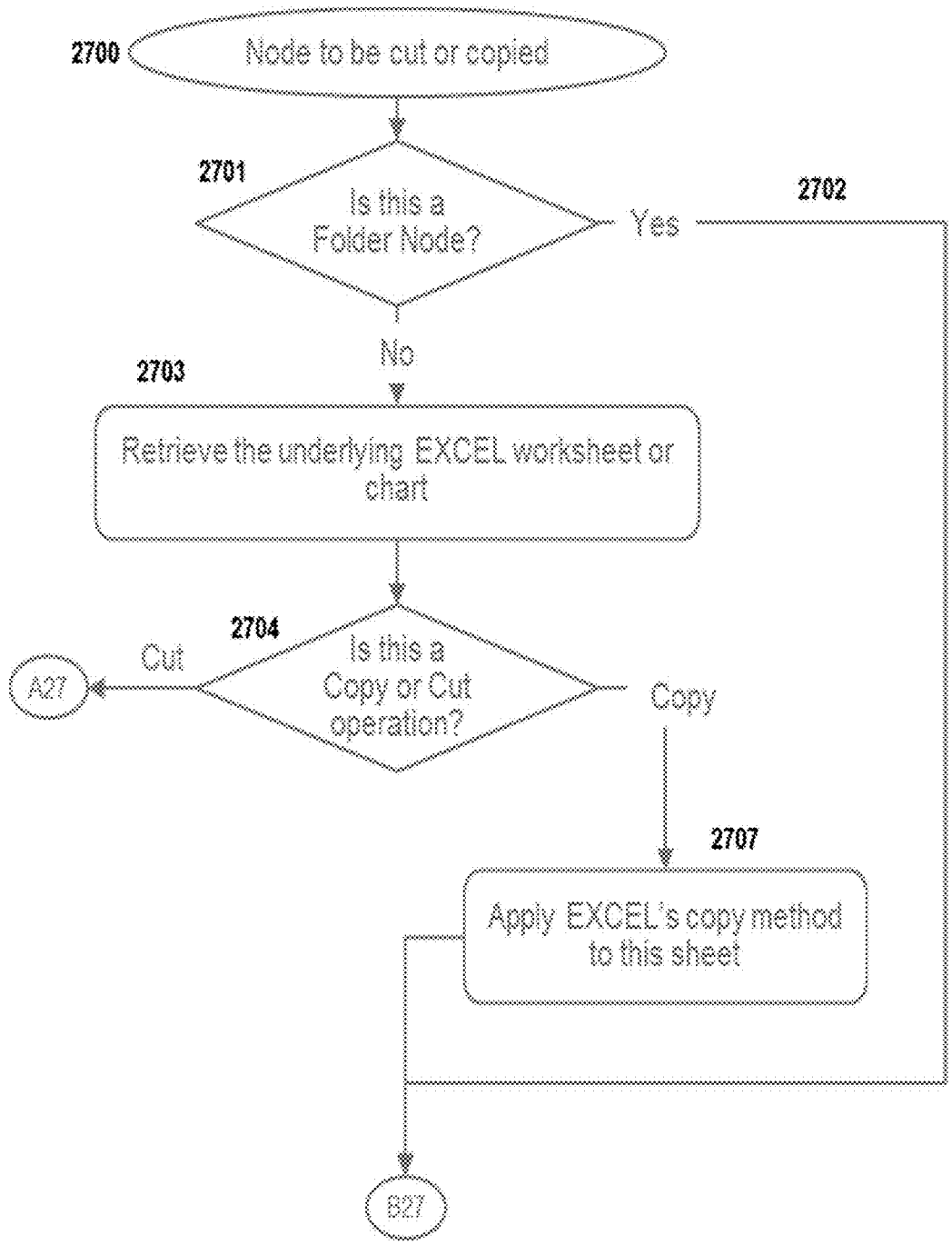

Figure 27B - illustrates steps for copying or moving nodes to their new parent
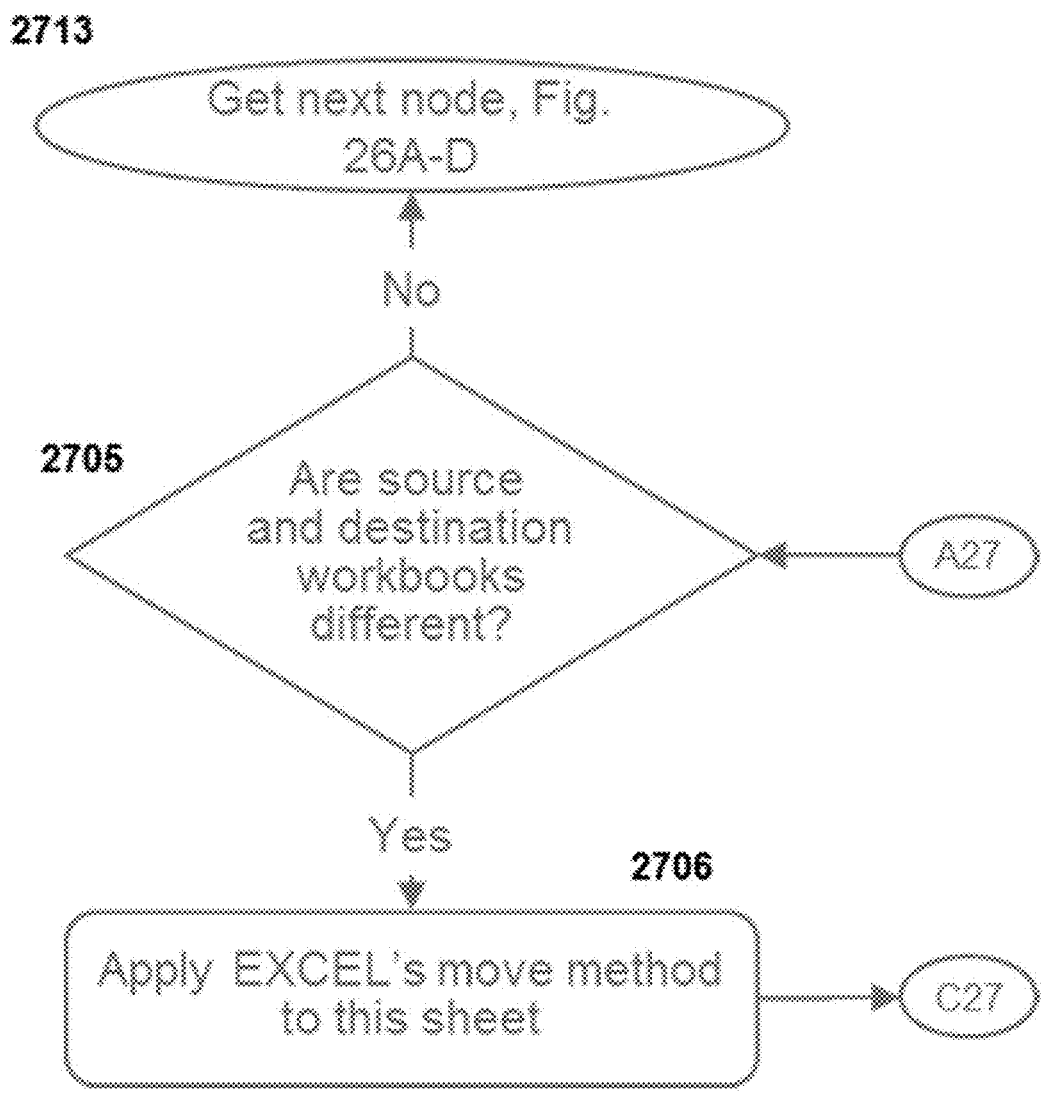

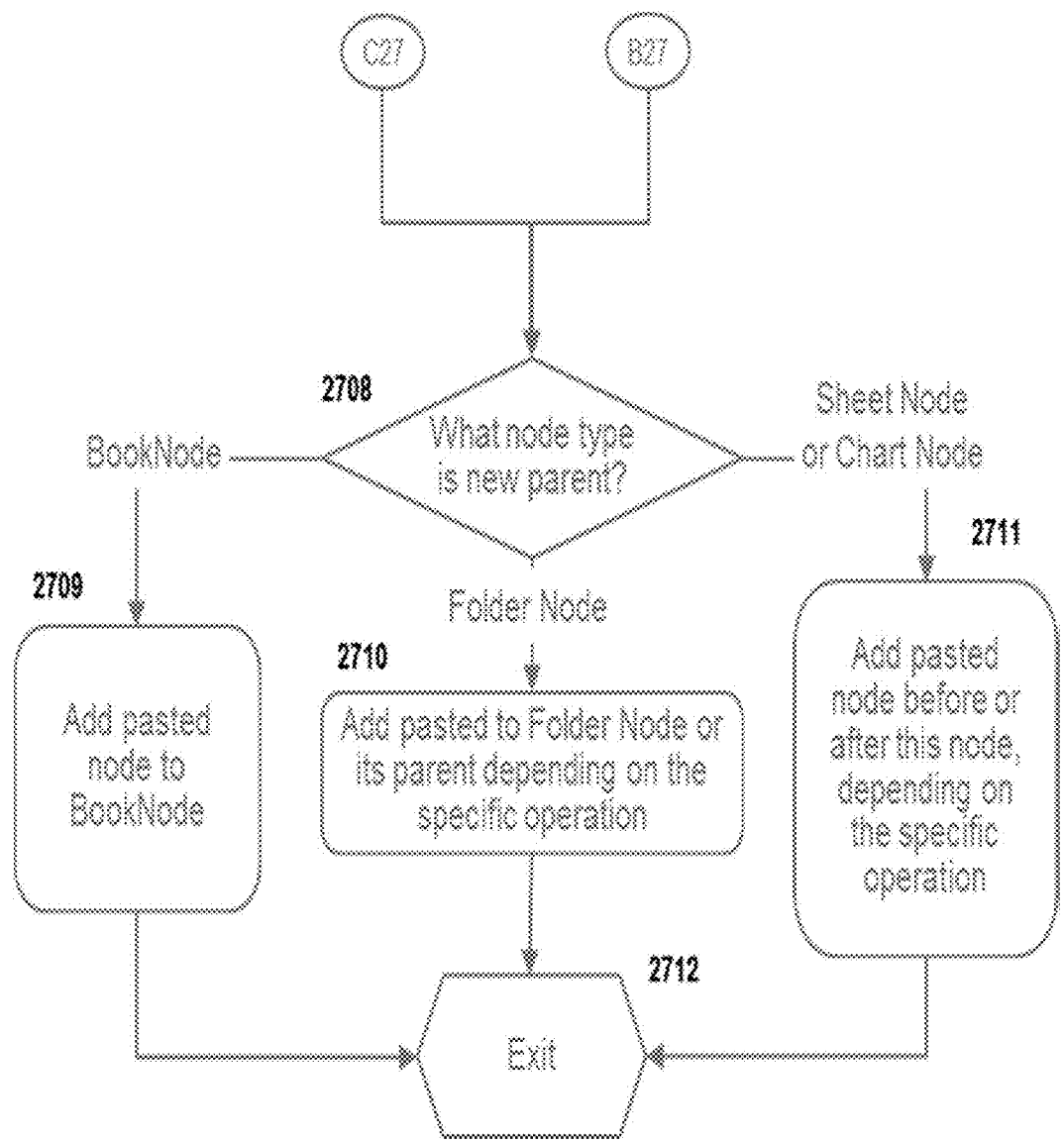
Figure 27C - illustrates steps for copying or moving nodes to their new parent

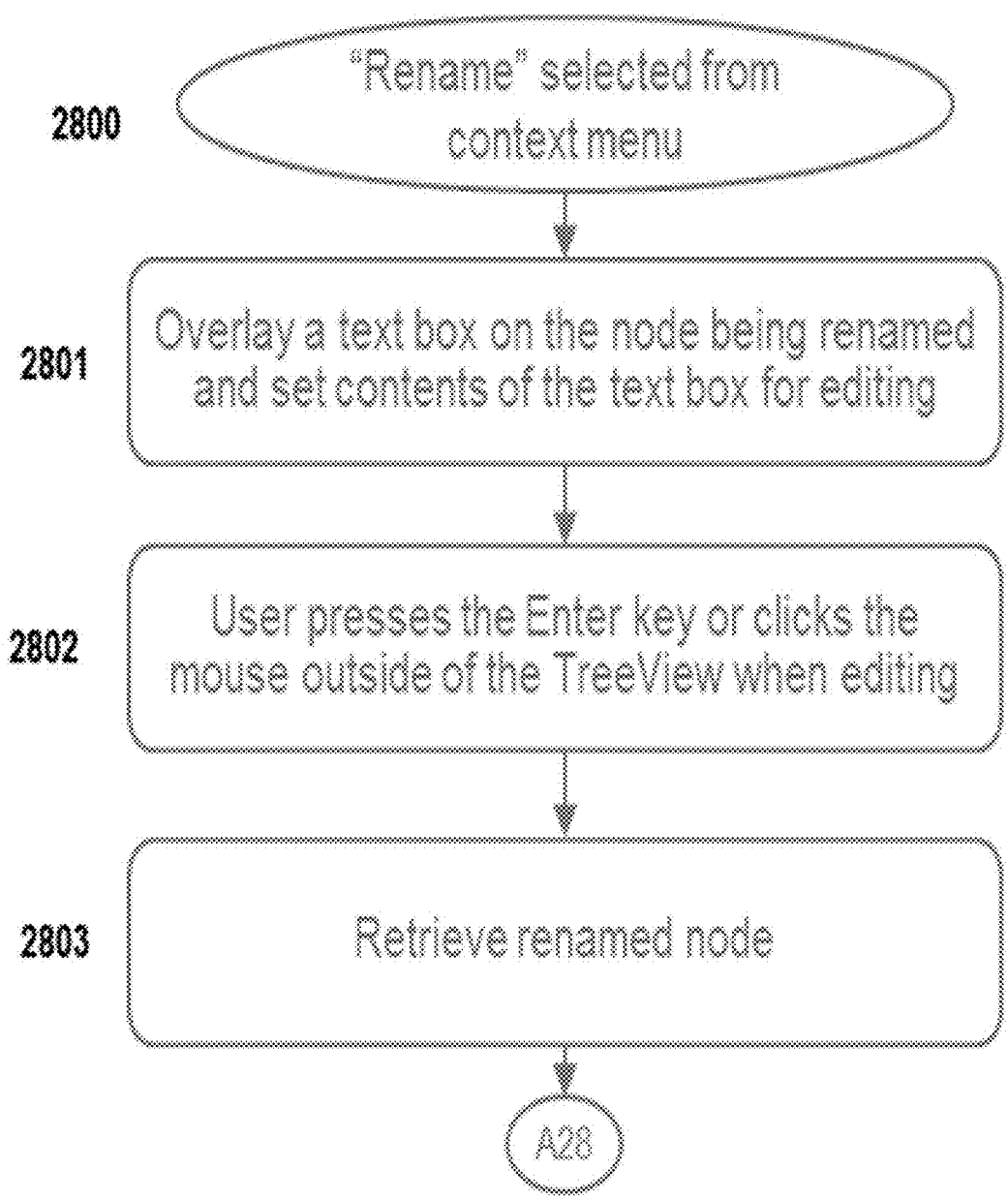

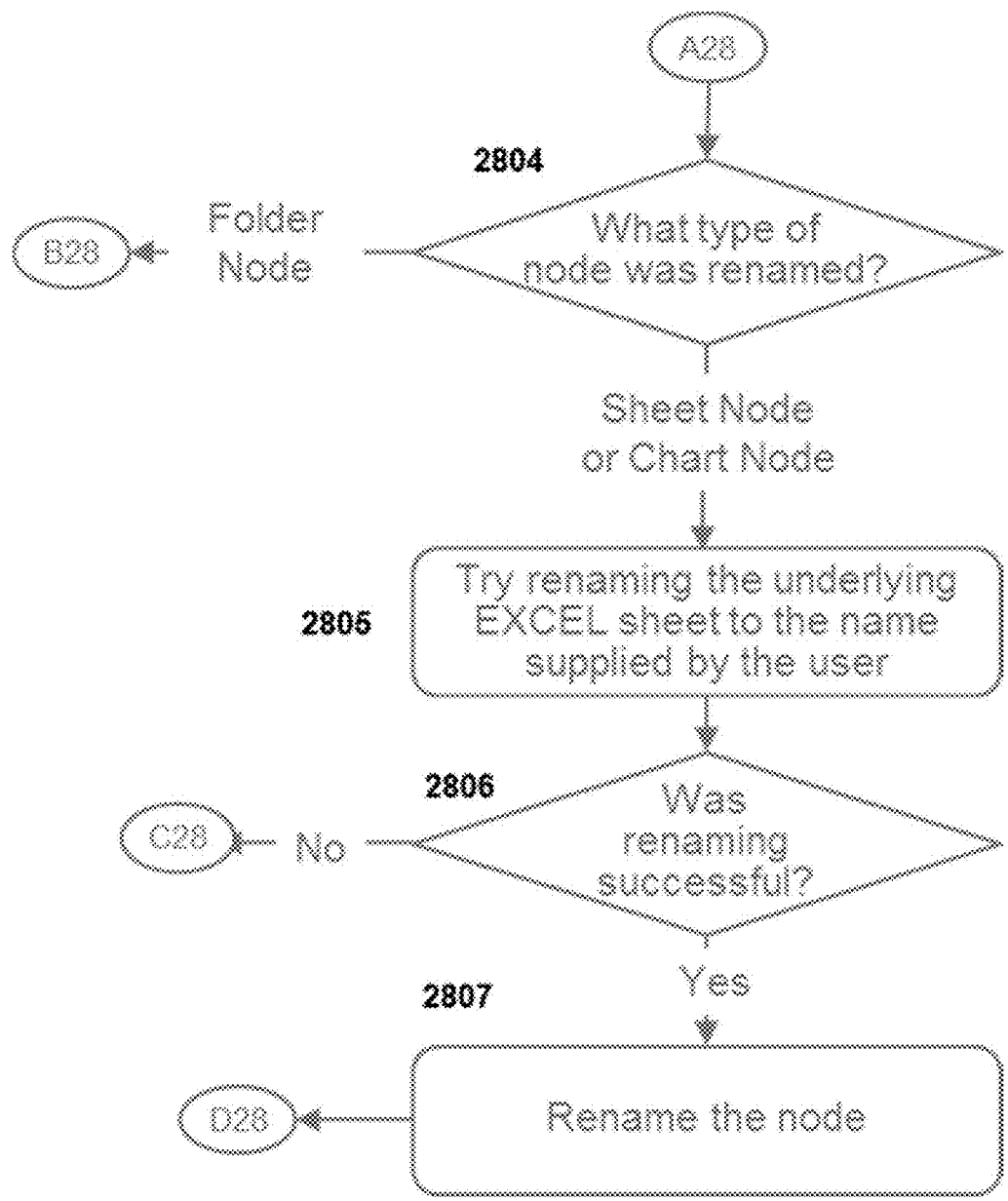
Figure 28B - illustrates the steps associated with renaming a node

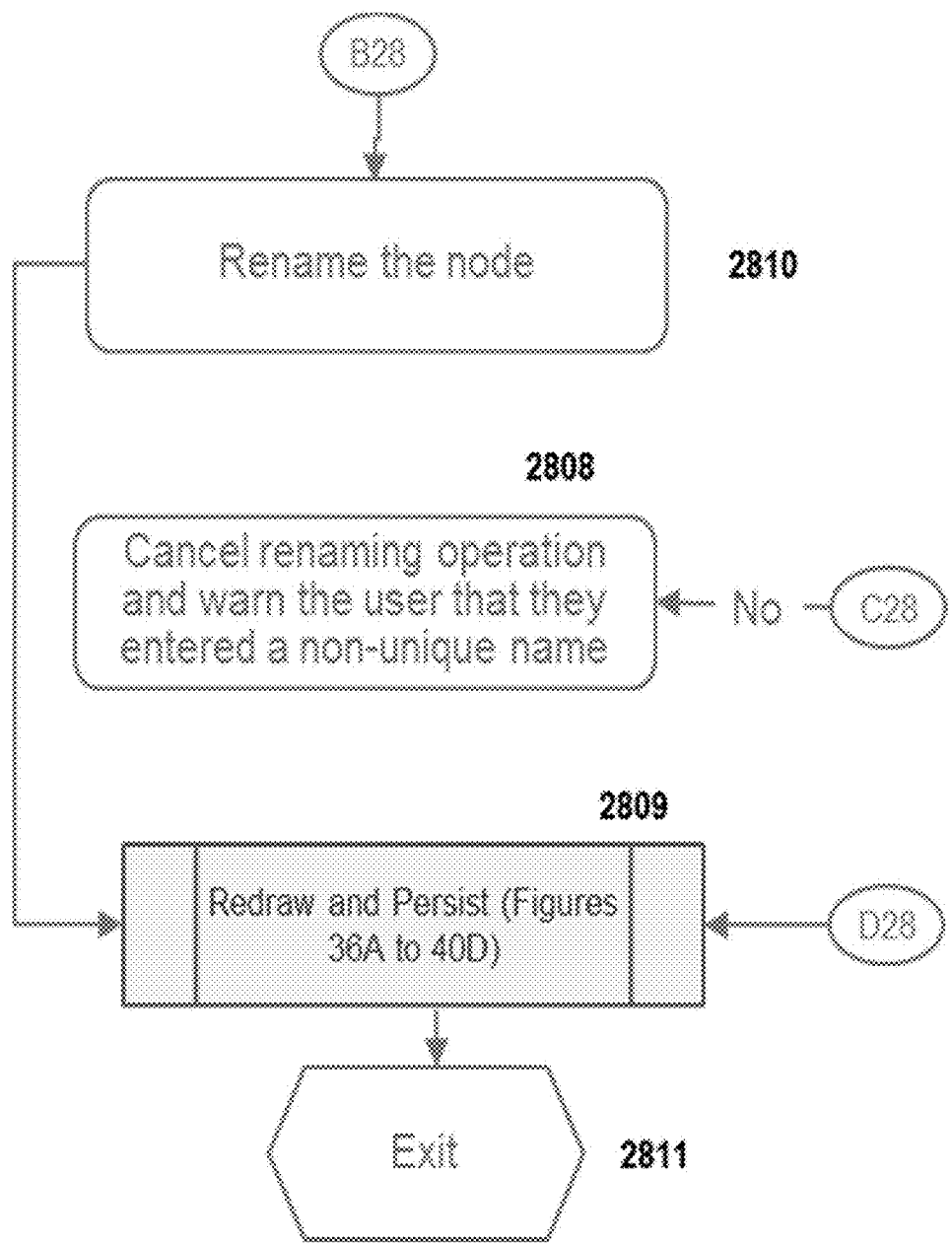
Figure 28C - illustrates the steps associated with renaming a node

Figure 29 - illustrates the allowed states and state transitions for hidden variables
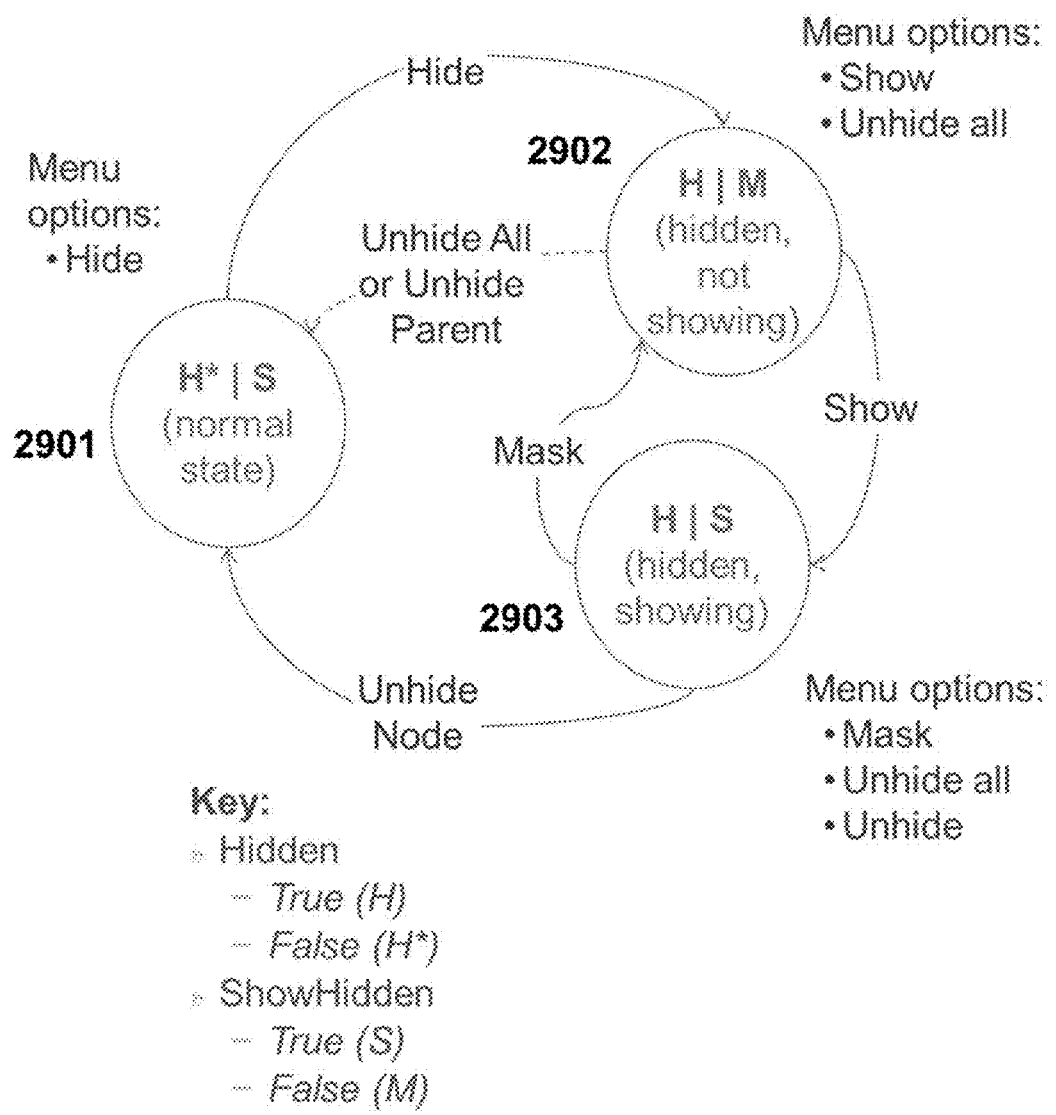

Figure 30A - depicts hide logic
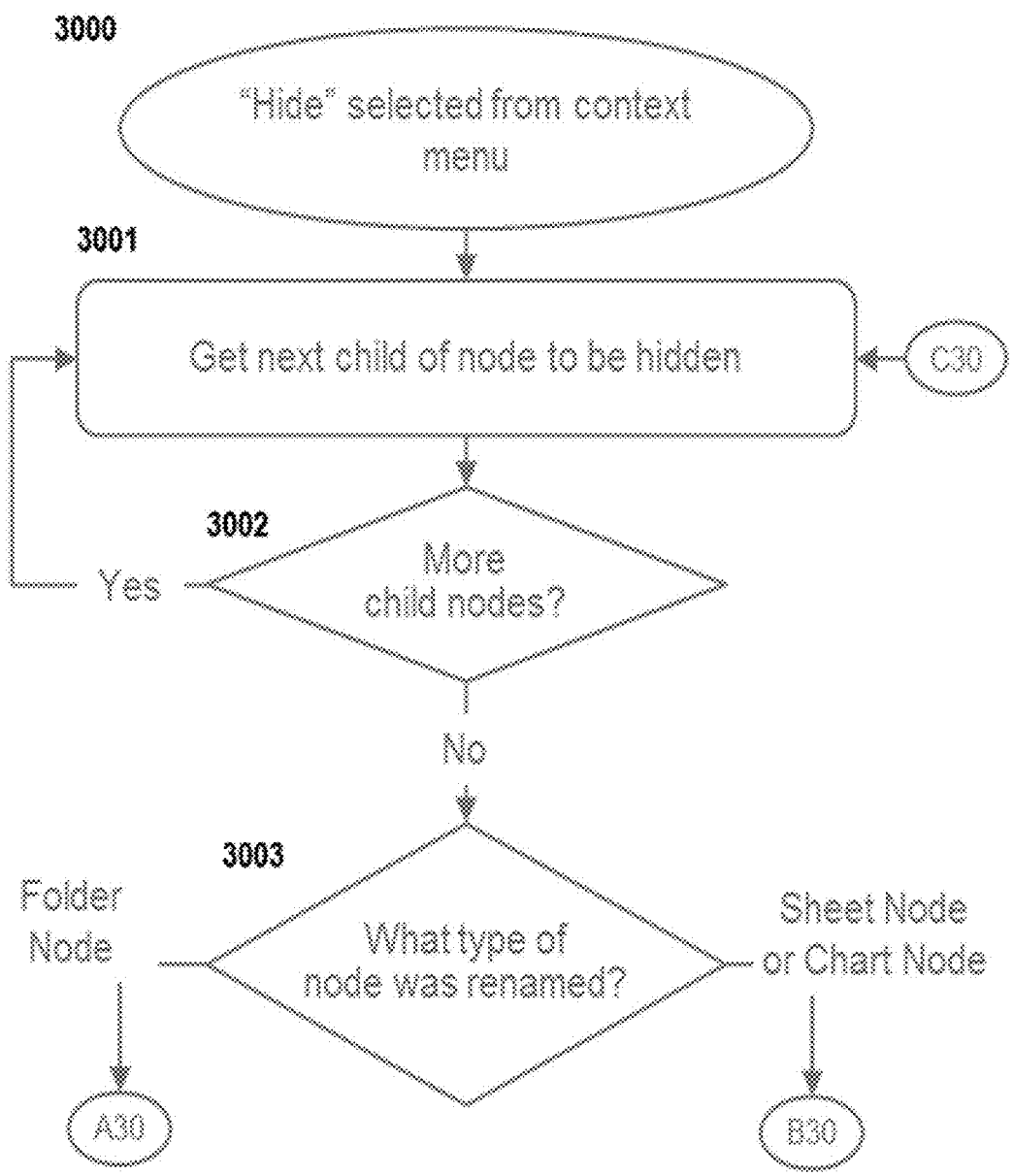

Figure 30B - depicts hide logic
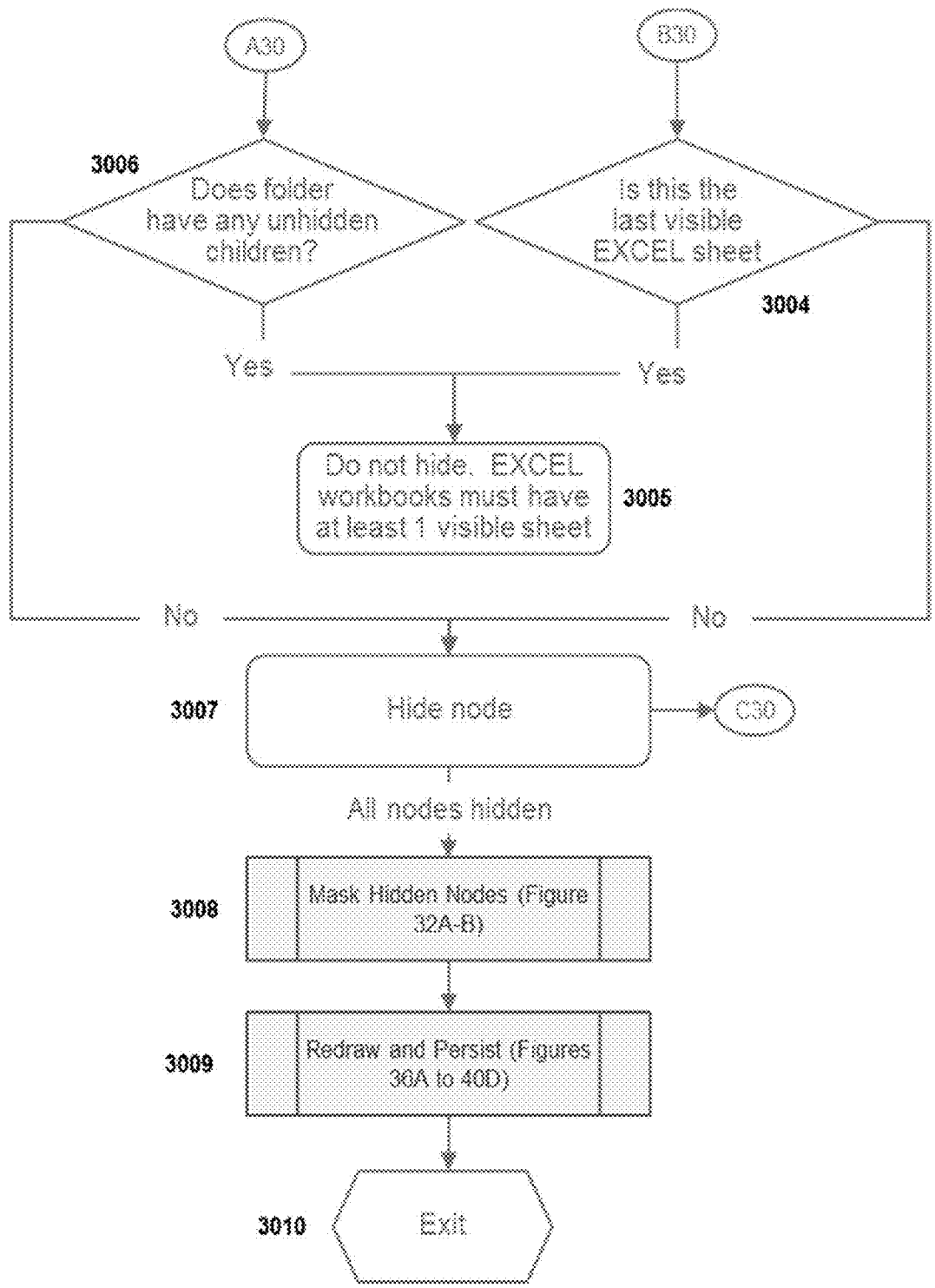

Figure 31A - depicts unhide logic
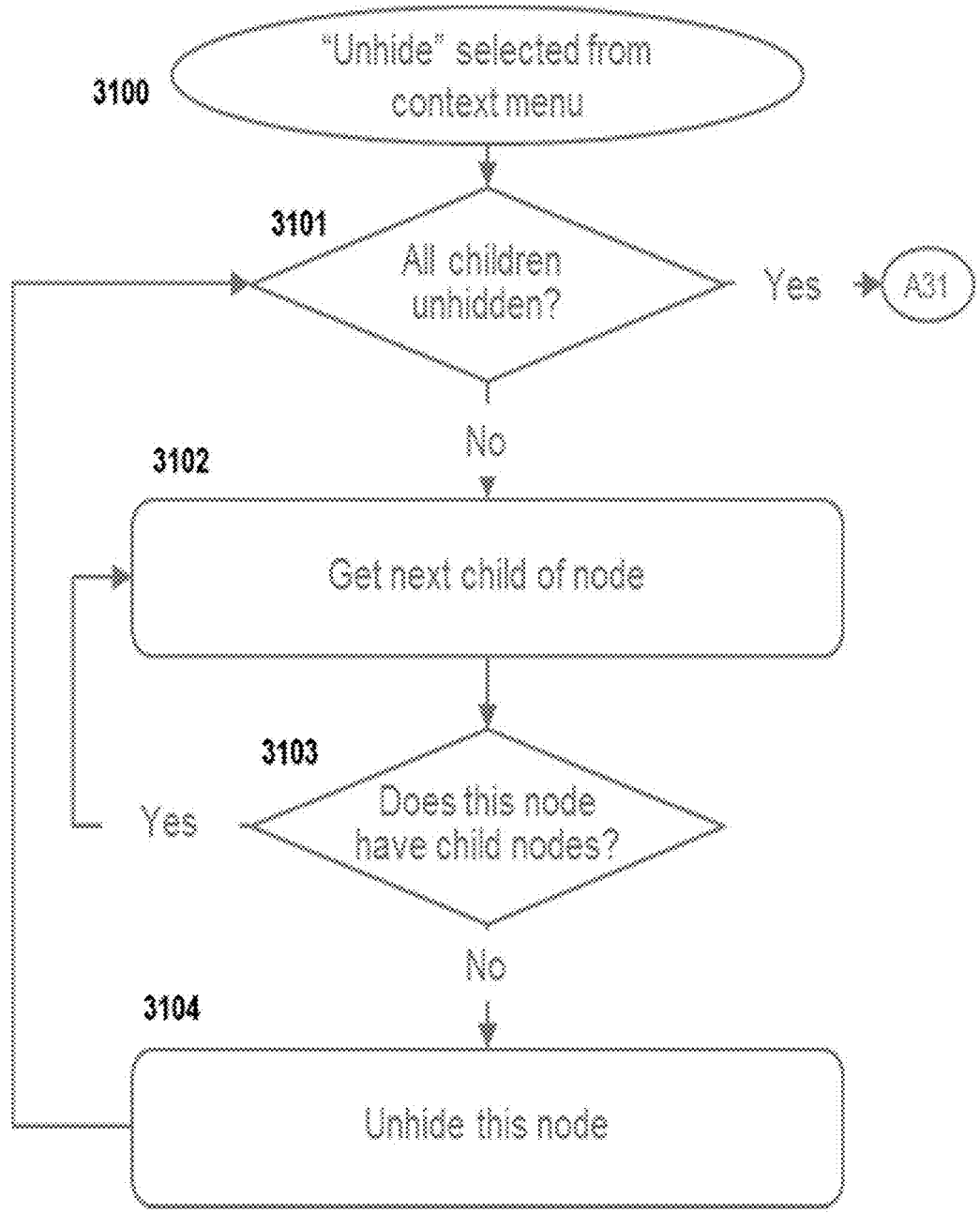

Figure 31B - depicts unhide logic
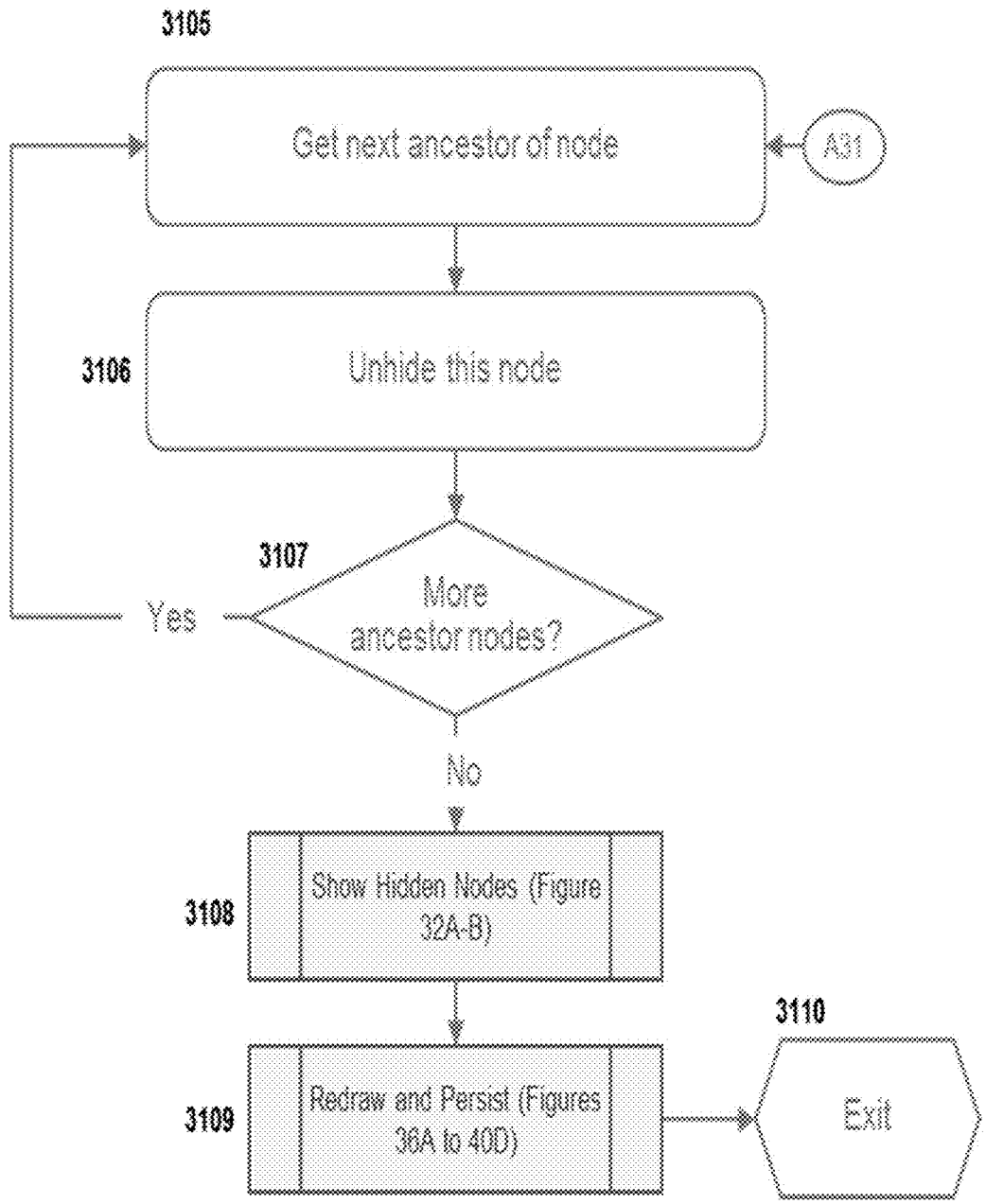

Figure 32A - depicts logic for showing and masking hidden nodes
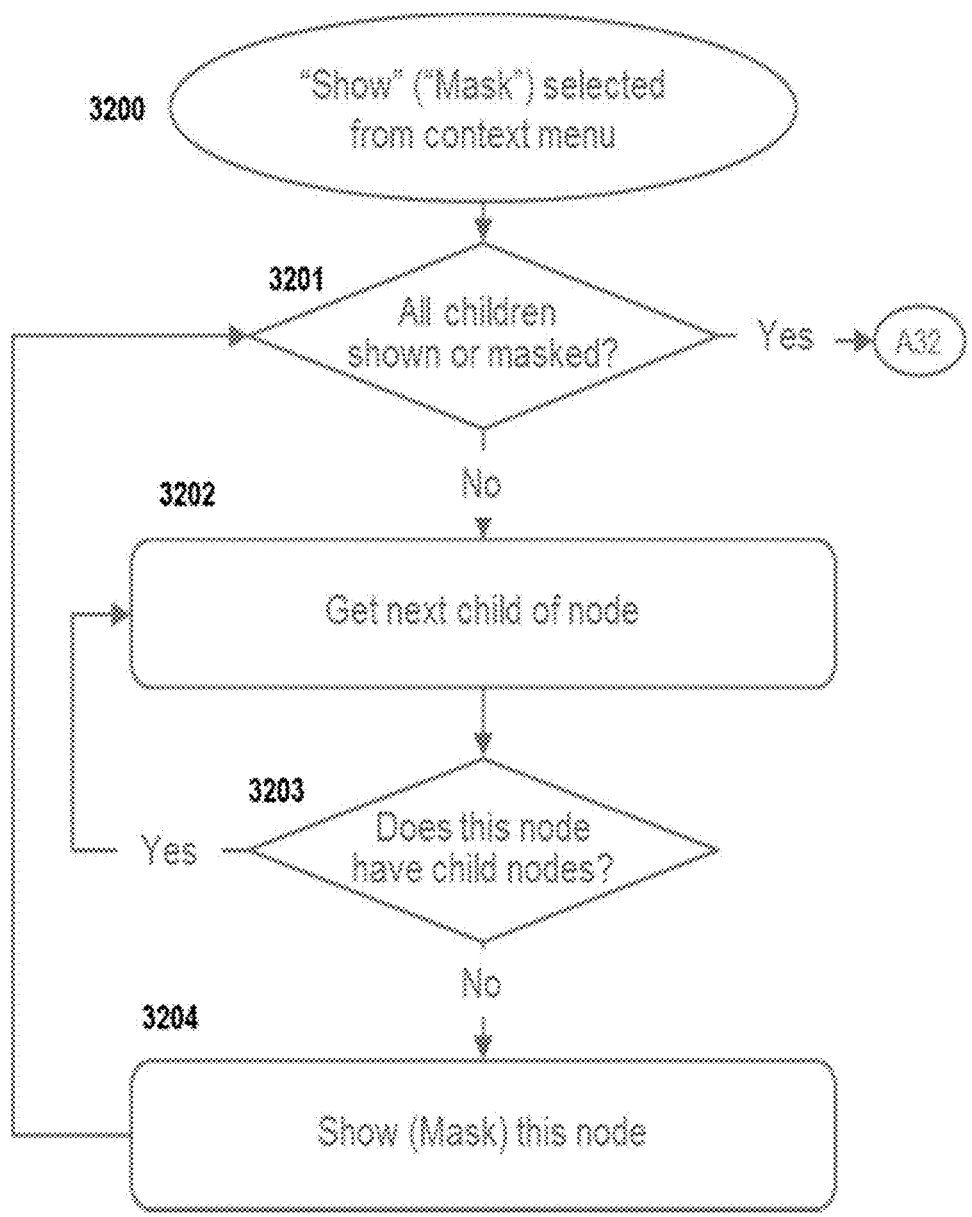

Figure 32B - depicts logic for showing and masking hidden nodes
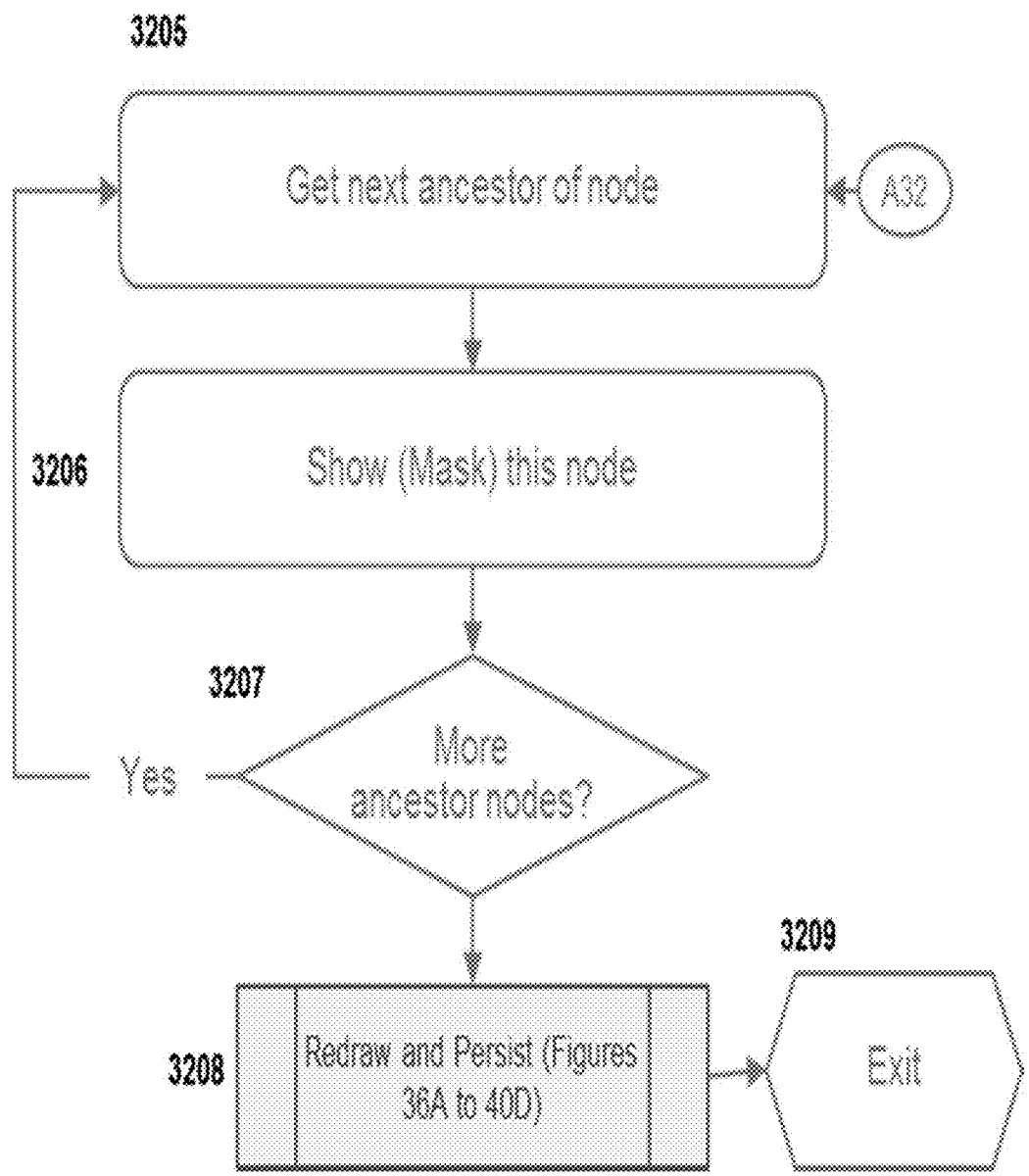

Figure 33 - illustrates EXCEL's child windows
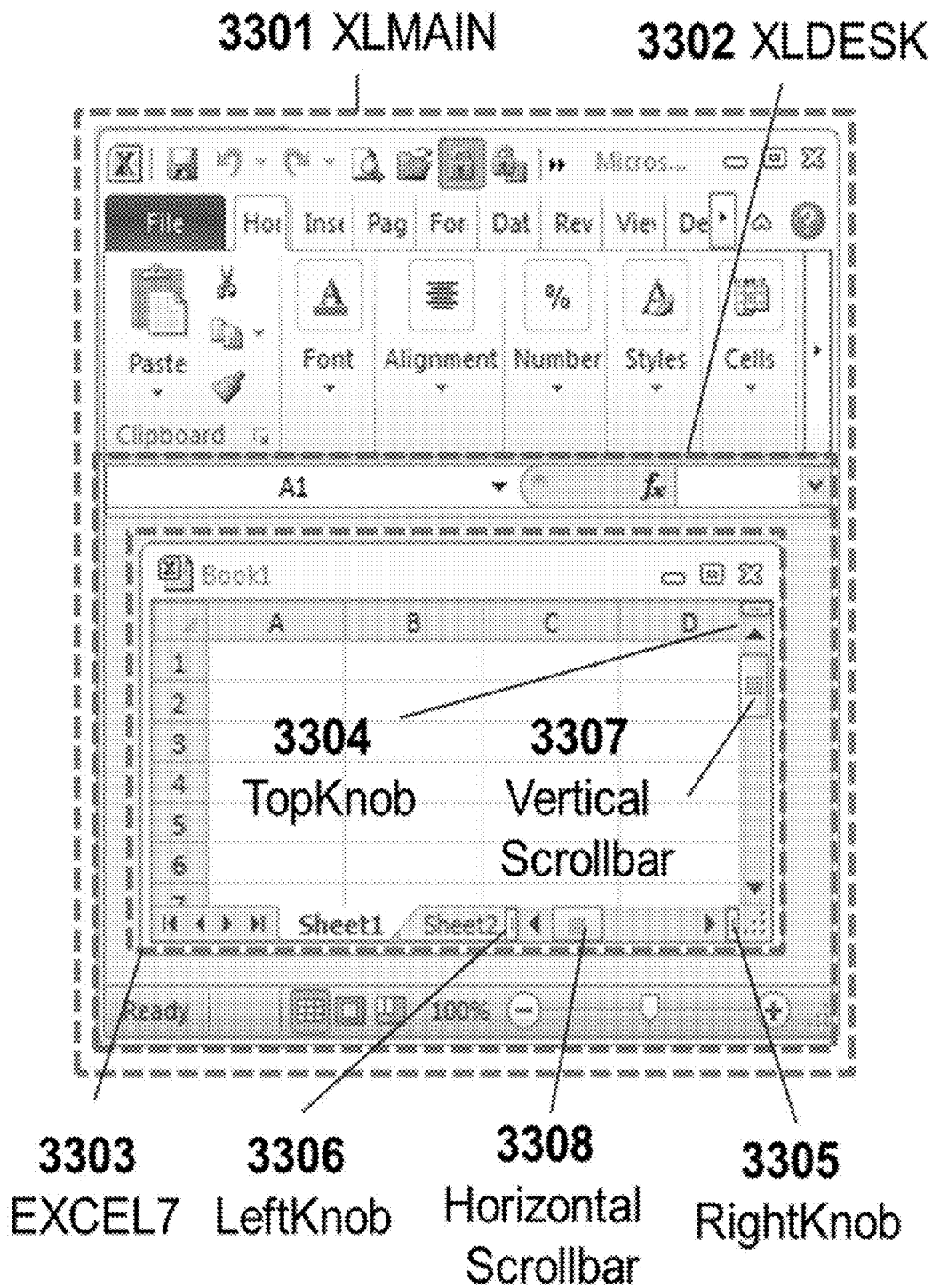

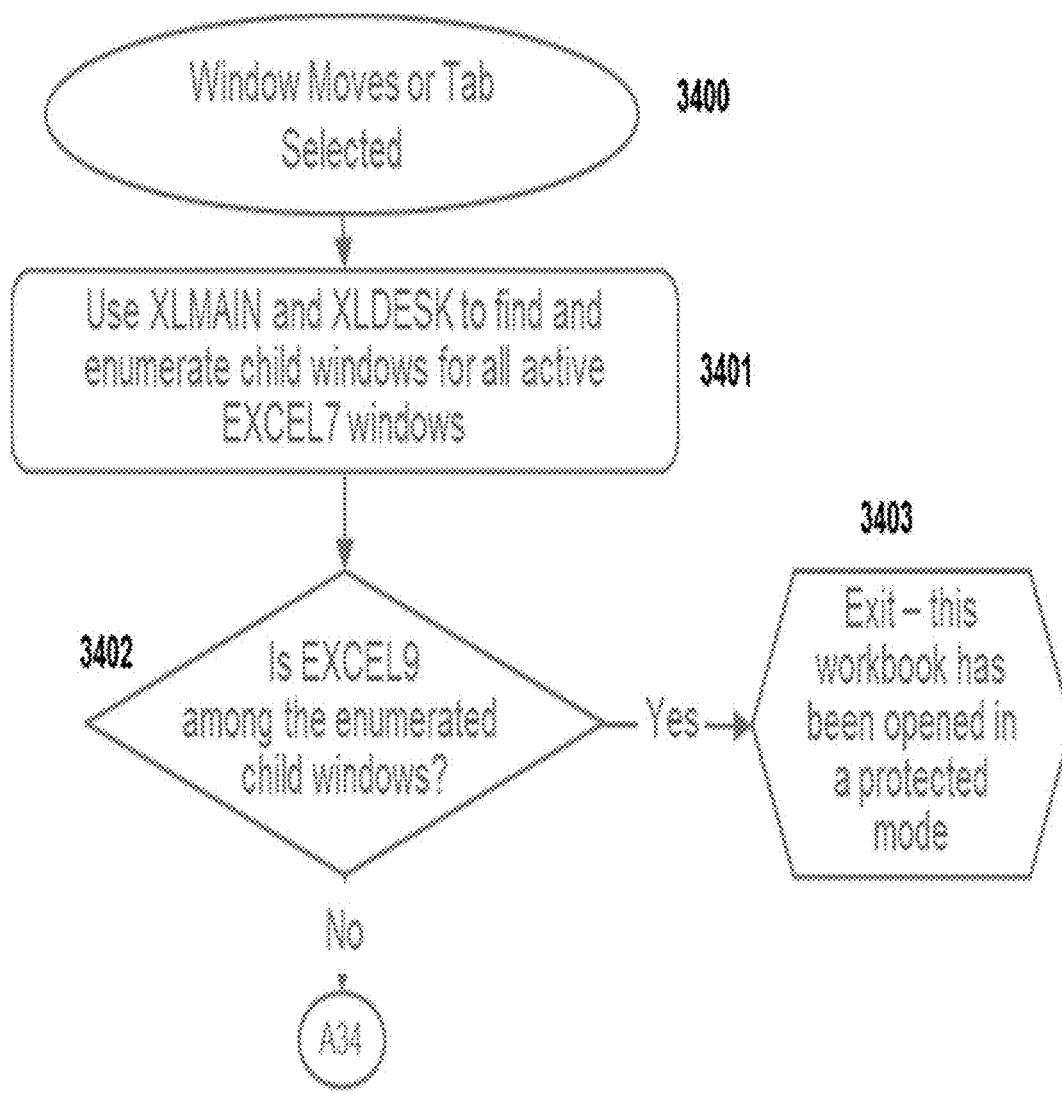
Figure 34A - outlines steps involved in modifying EXCEL's main window

Figure 34B - outlines steps involved in modifying EXCEL's main window
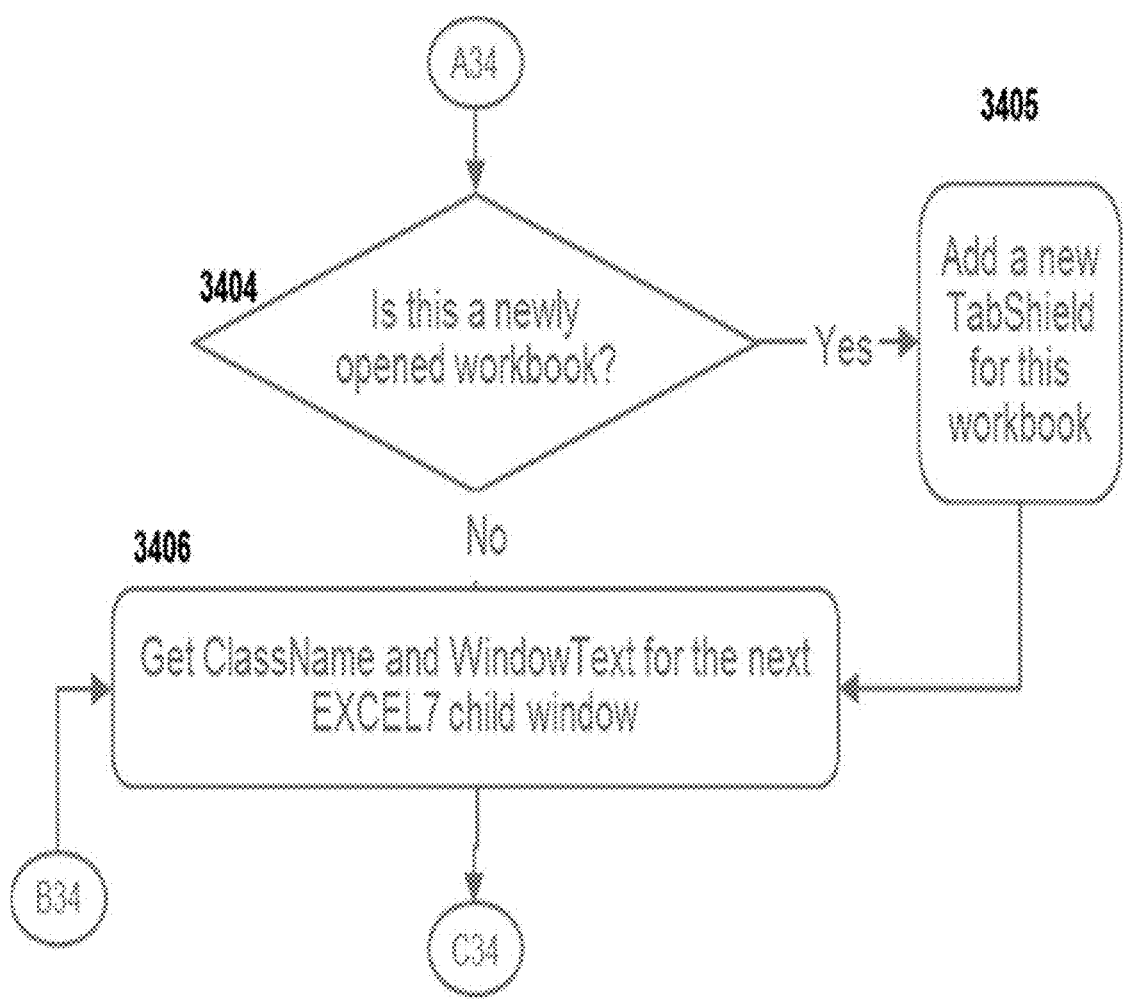

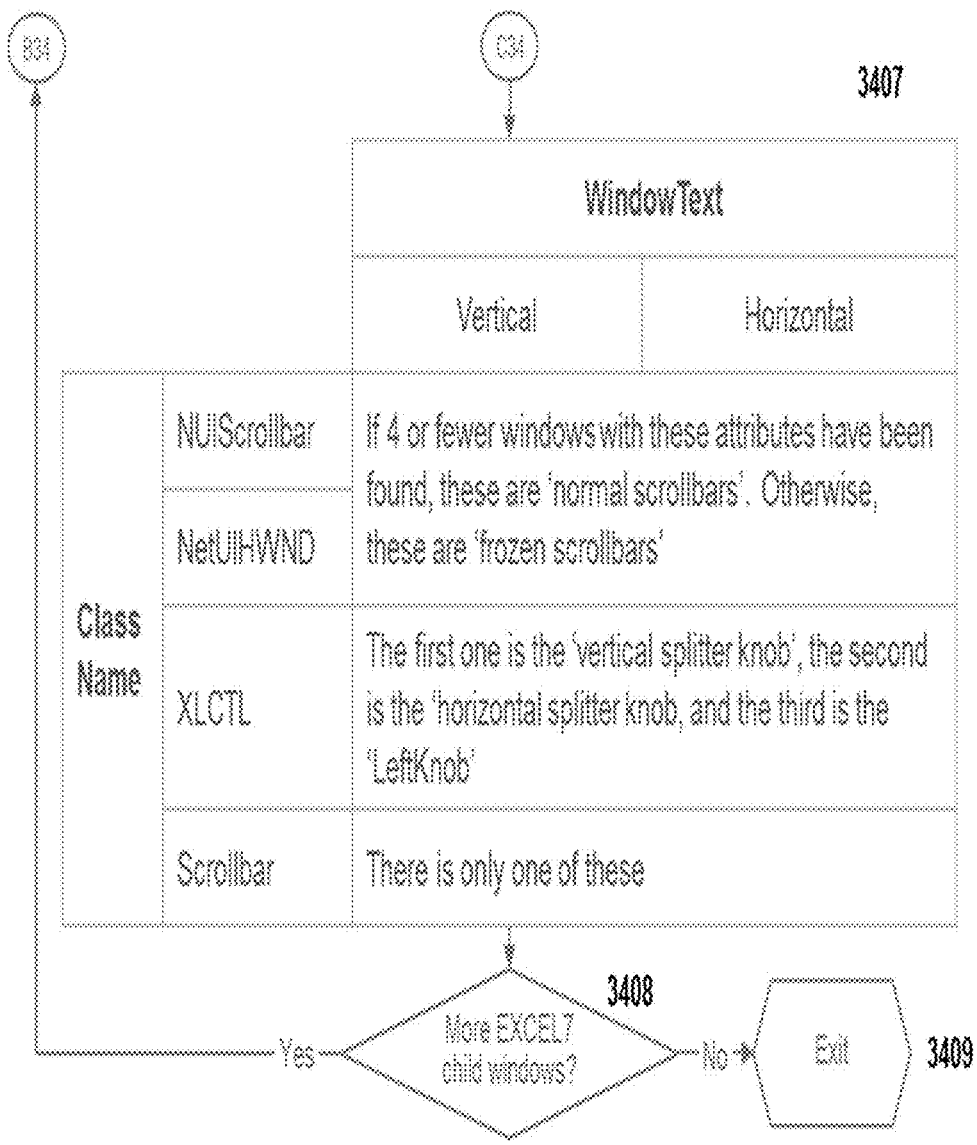
Figure 34C - outlines steps involved in modifying EXCEL's main window

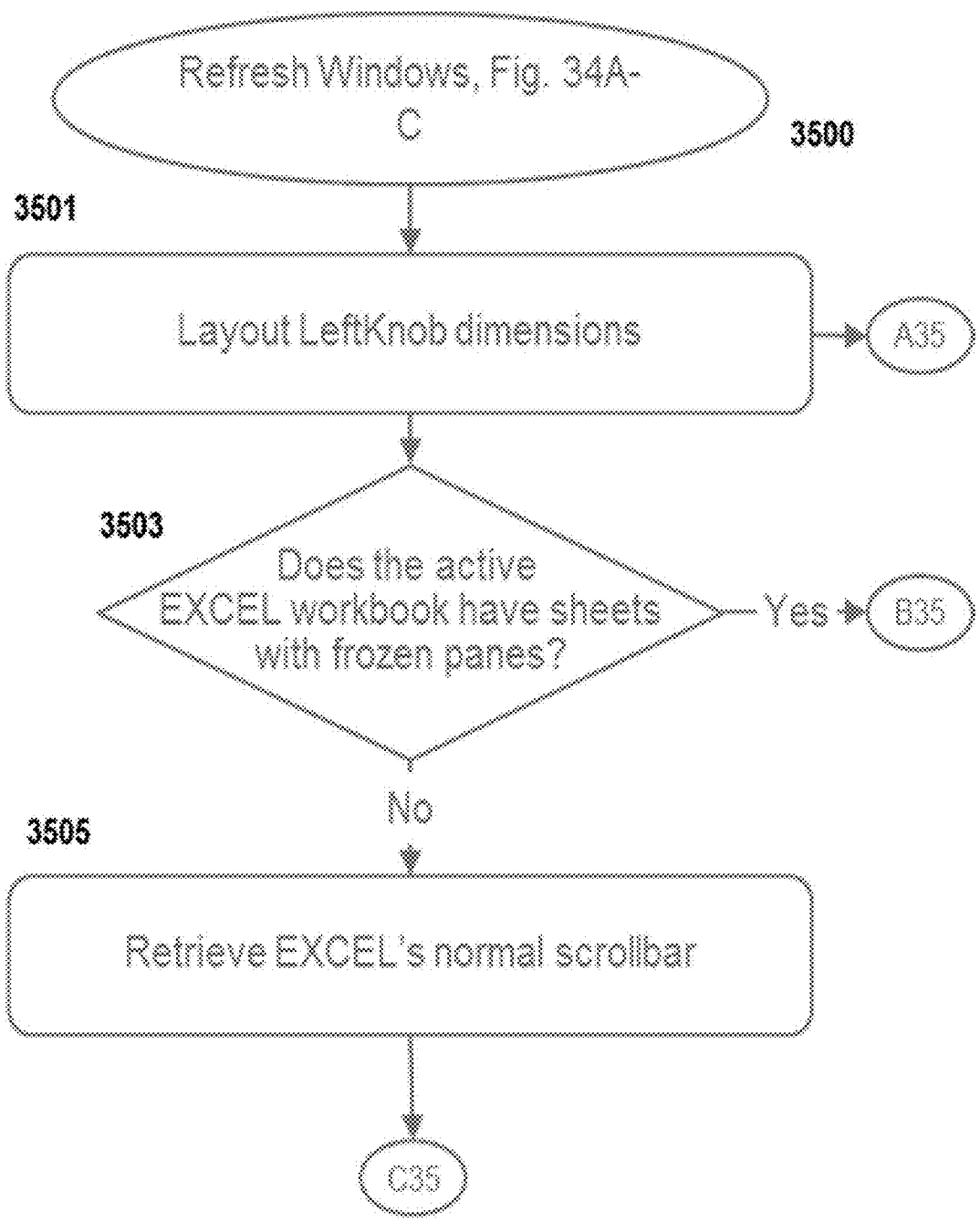
Figure 35A - further outlines steps involved in modifying EXCEL's main window

Figure 35B - further outlines steps involved in modifying EXCEL's main window
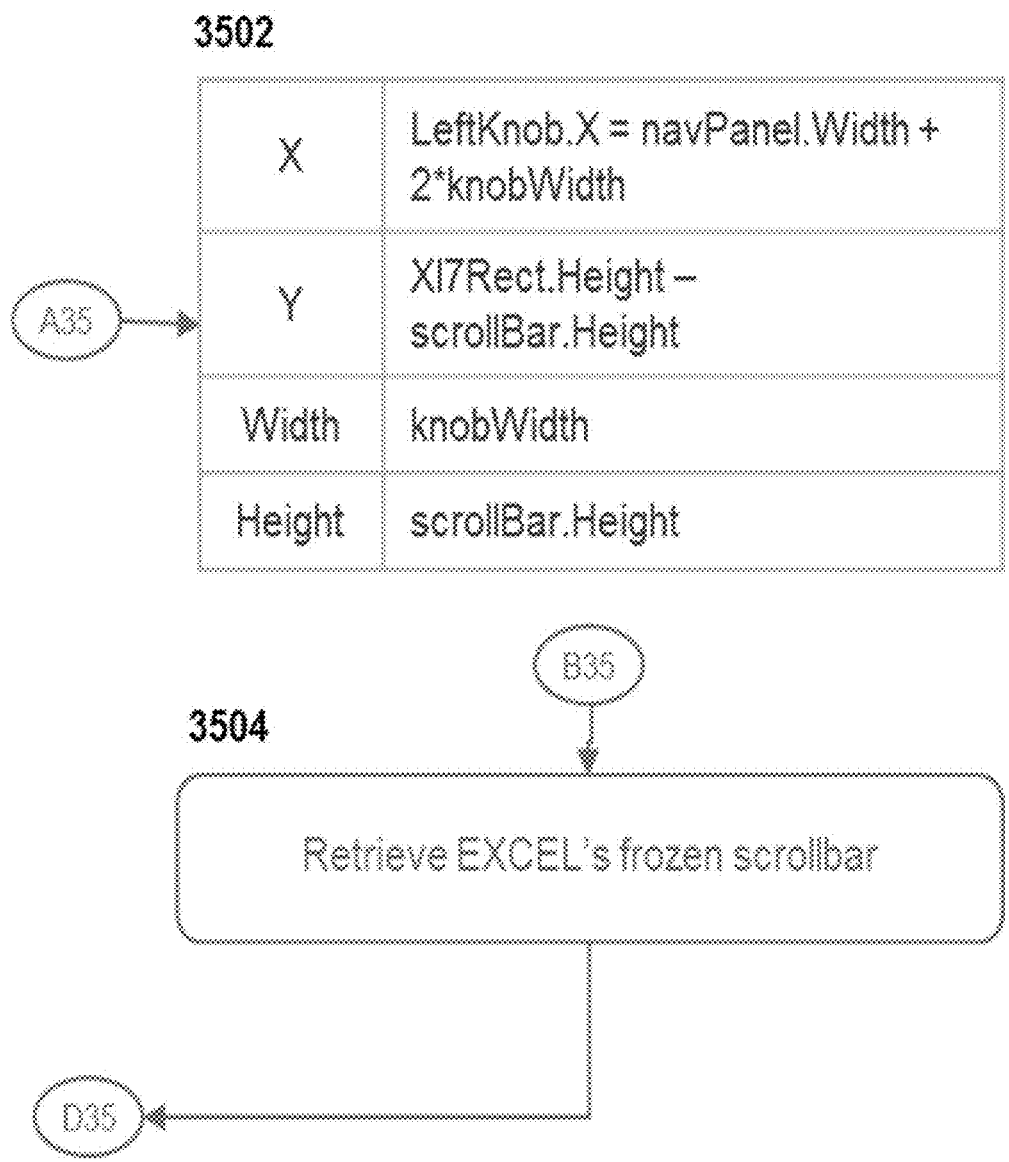

Figure 35C - further outlines steps involved in modifying EXCEL's main window
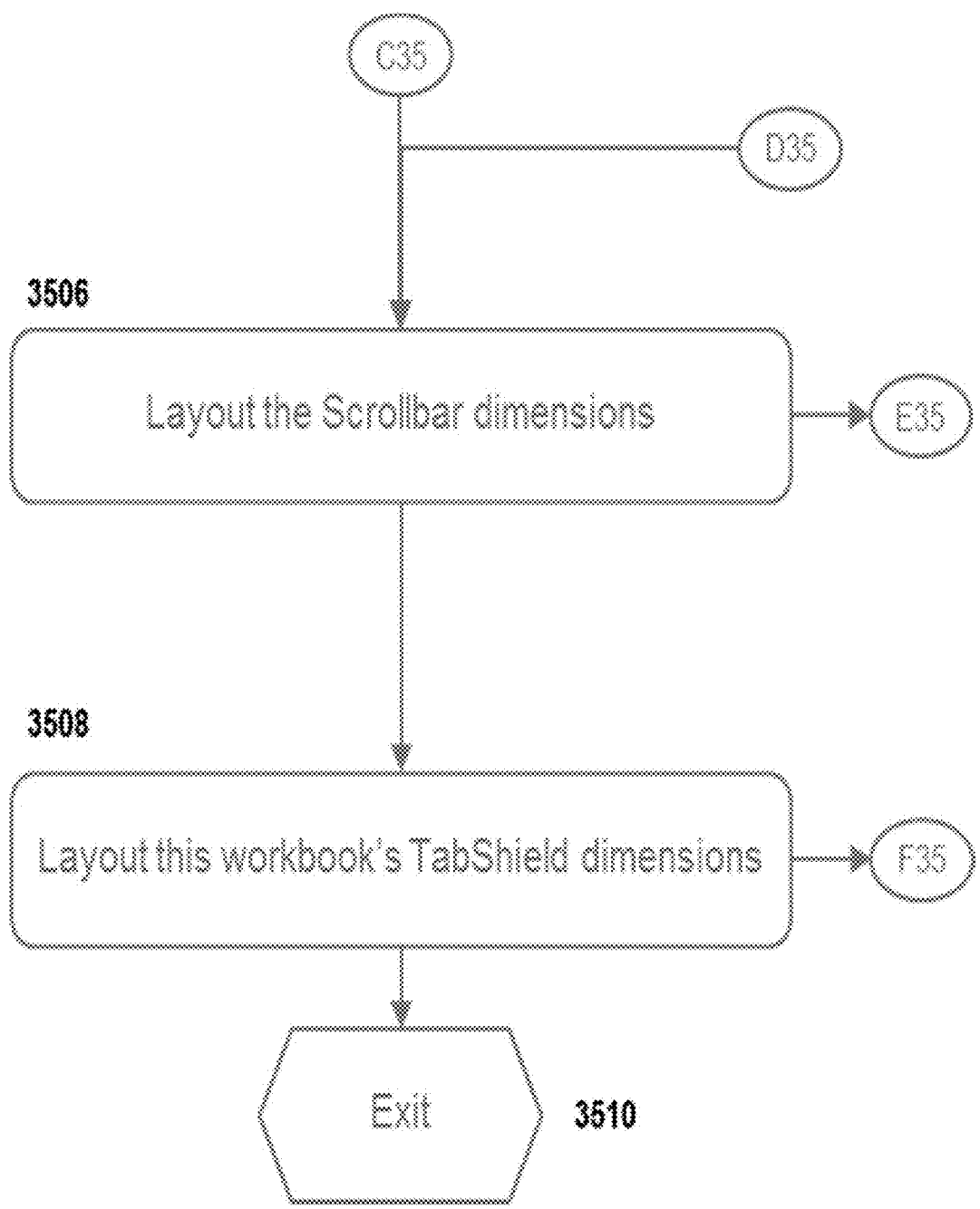

Figure 35D - further outlines steps involved in modifying EXCEL's main window

3507

| | | |
|---|---|---|
| | X | navPanelWidth + knobWidth |
| | Y | Xl7Rect.Height − scrollBar.Height |
| | Width | Xl7Rect.Width − LeftKnobXDim − knobWidth * 2 − scrollBar.Height |
| | Height | scrollBar.Height |

E35

3509

| | | |
|---|---|---|
| | X | 0 |
| | Y | Xl7Rect.Height − scrollBar.Height |
| | Width | LeftKnob.X + knobWidth |
| | Height | scrollBar.Height |

F35

Figure 36A - shows how the HUI's node hierarchy is updated
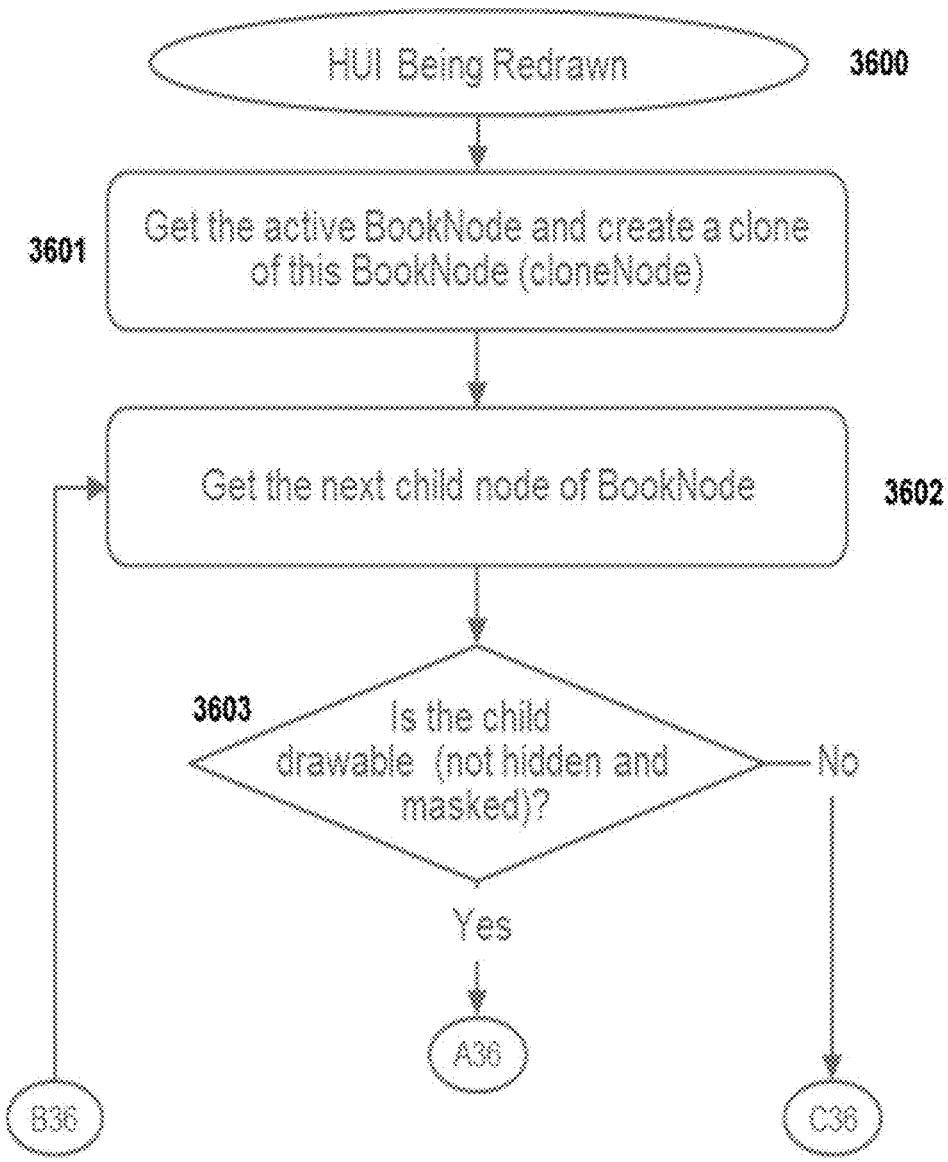

Figure 36B - shows how the HUI's node hierarchy is updated
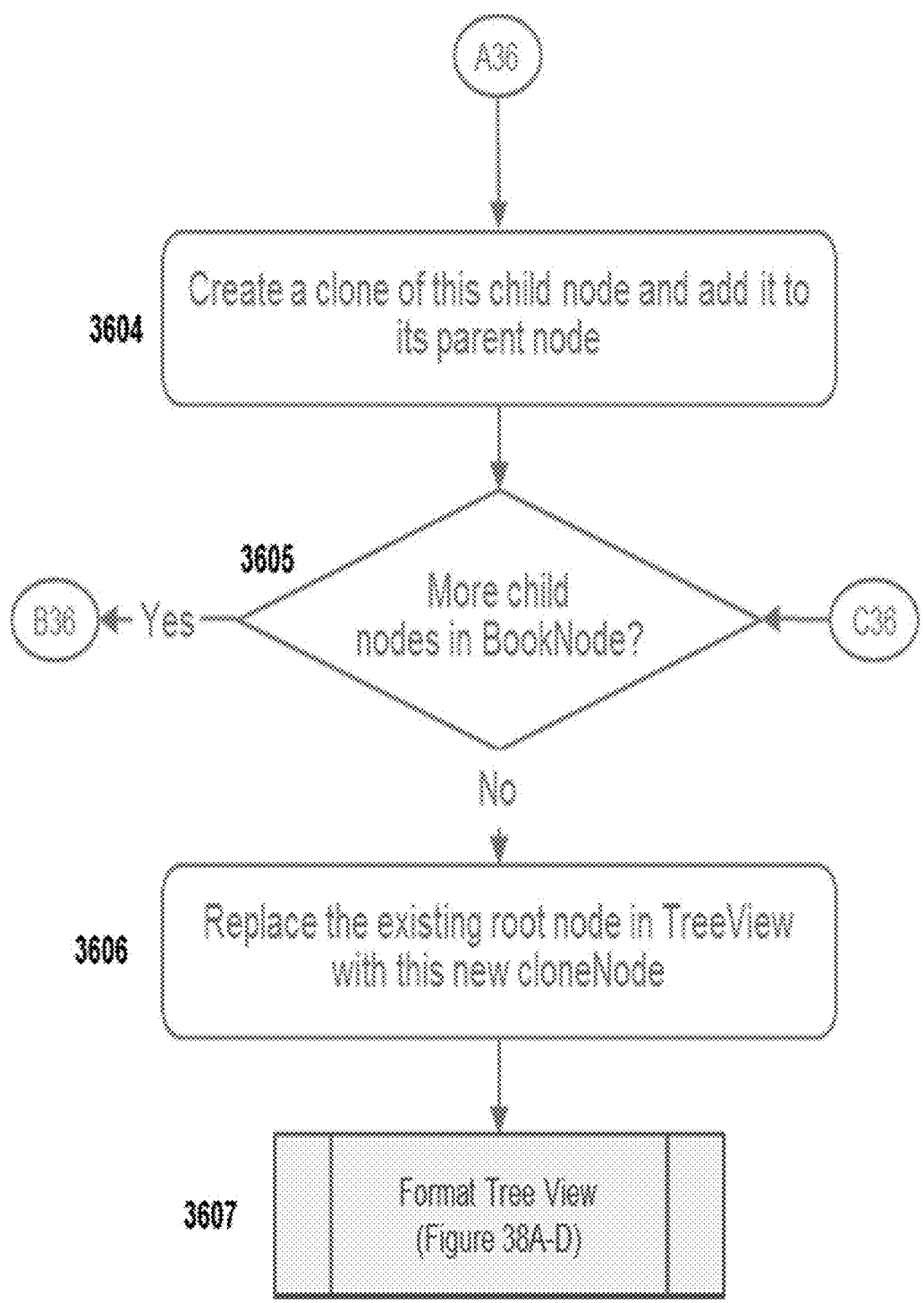

Figure 37 - represents a tabulation of node states

|  | State | Formatting | Meaning |
|---|---|---|---|
| BookNode | Active | Bold text | The corresponding EXCEL workbook is active |
|  | Selected | Shaded, bold text | The corresponding EXCEL workbook is active and the user selects the BookNode itself |
|  | Dormant | Plain text | The corresponding EXCEL workbook is not active |
| Folder Node | Active | Shaded, plain text | The folder is selected |
|  | Dormant | Not shaded, plain text | The folder is not selected |
| Sheet Node or Chart Node | Singular | Shaded, white text | Sole selected and active sheet in its workbook |
|  | Active | Shaded, black text | Inactive sheet in a multi-sheet selection |
|  | Selected | Bold text, no shading | Active sheet in a multi-sheet selection |
|  | Dormant | Plain text, no shading | Inactive and unselected sheet (normal state) |

Figure 38A - represents the process by which nodes are formatted
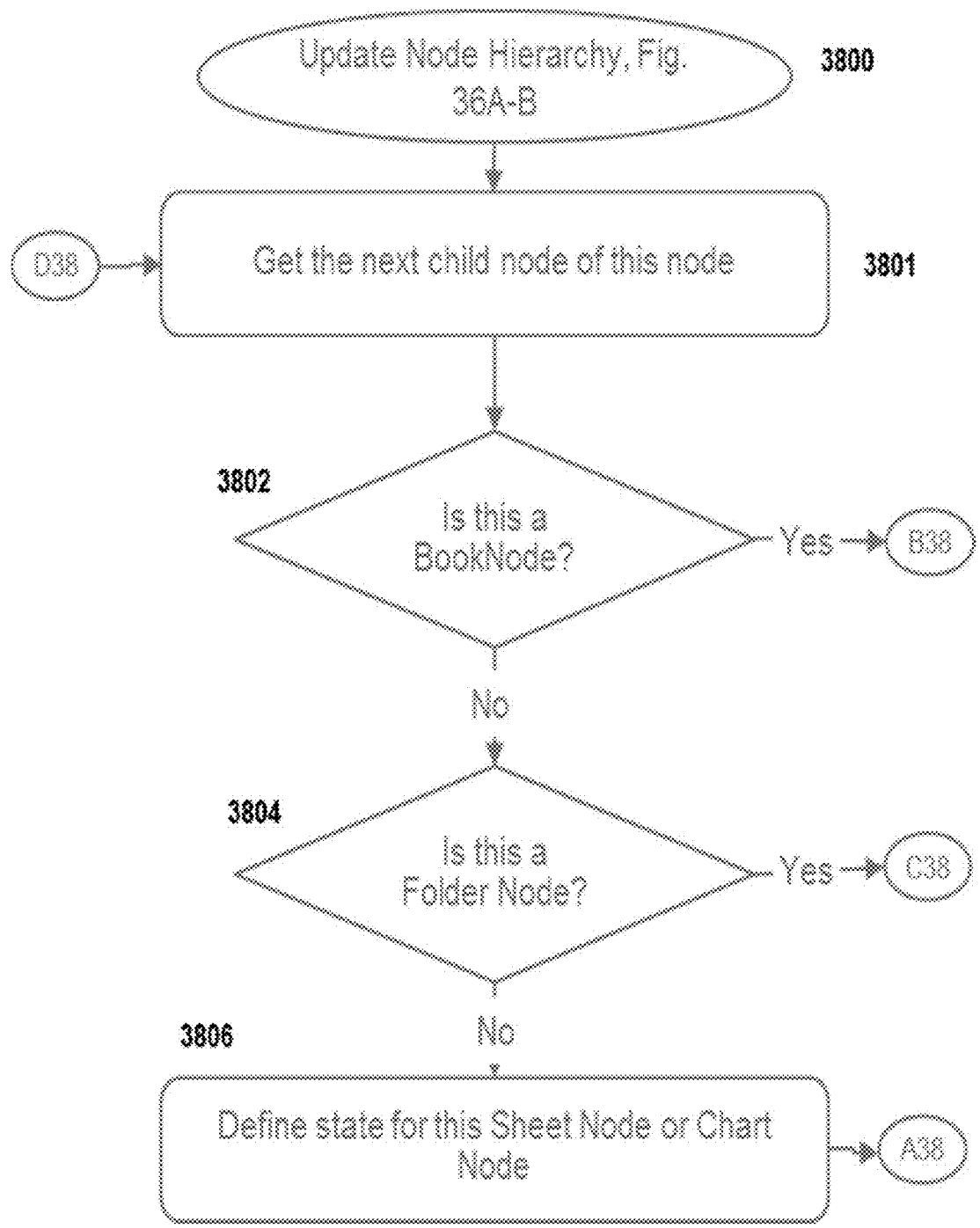

Figure 38B - represents the process by which nodes are formatted
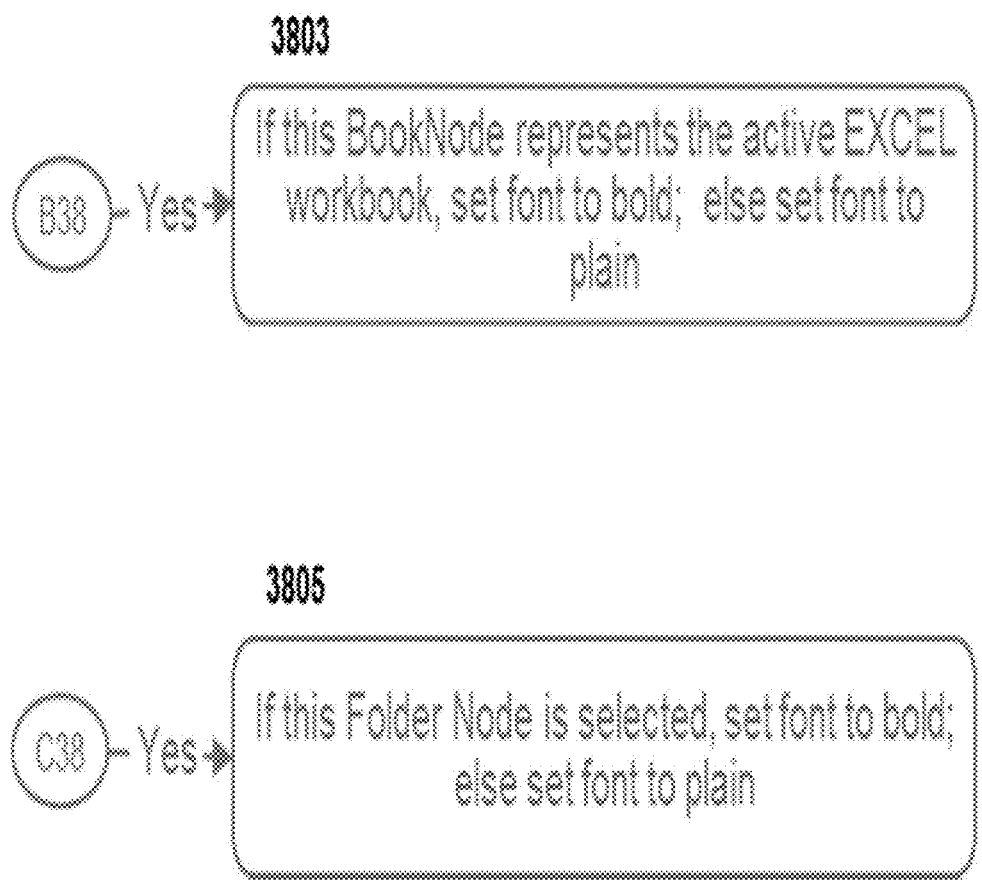

Figure 38C - represents the process by which nodes are formatted
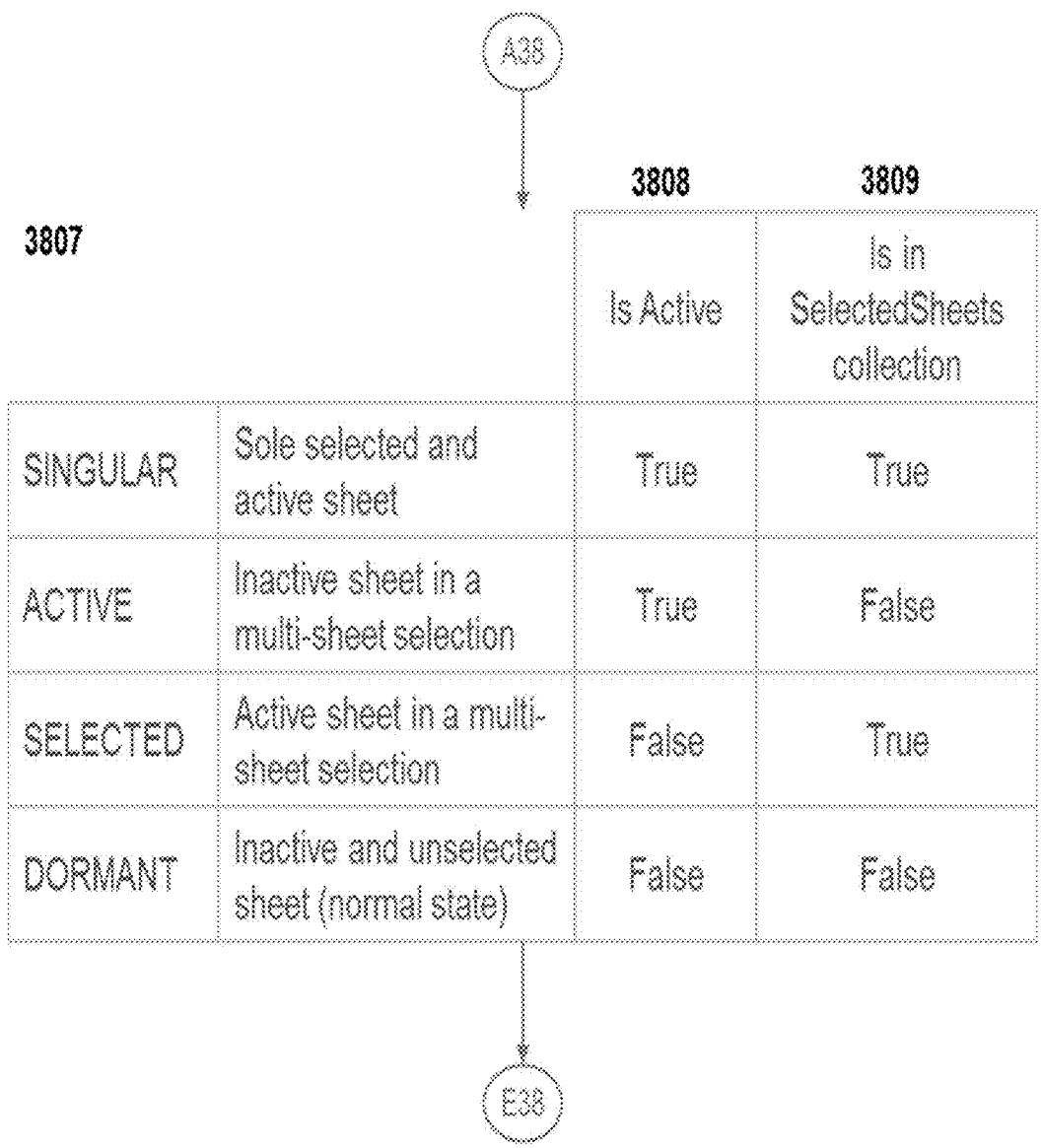

Figure 38D - represents the process by which nodes are formatted
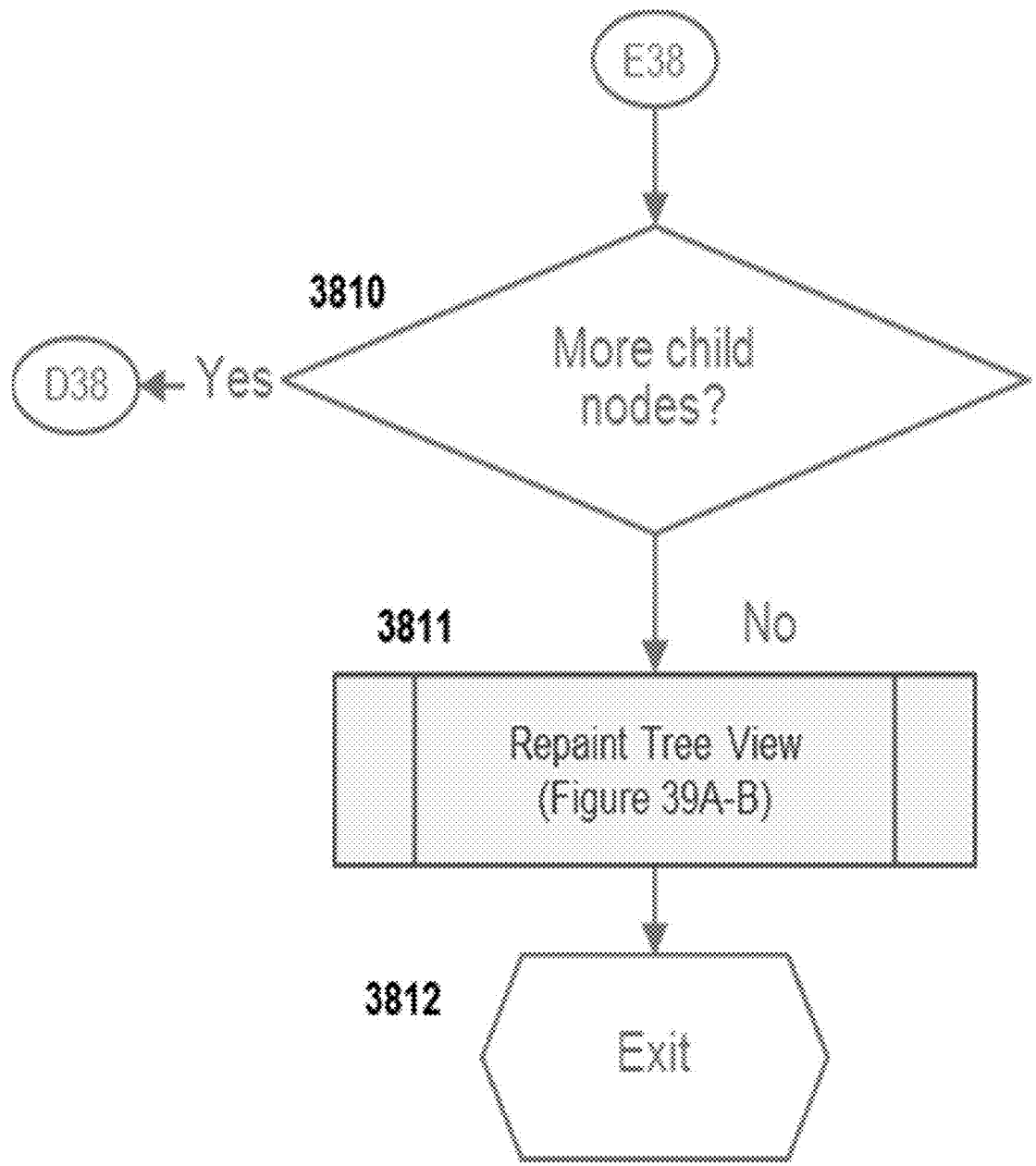

Figure 39A - shows how the tree view is repainted
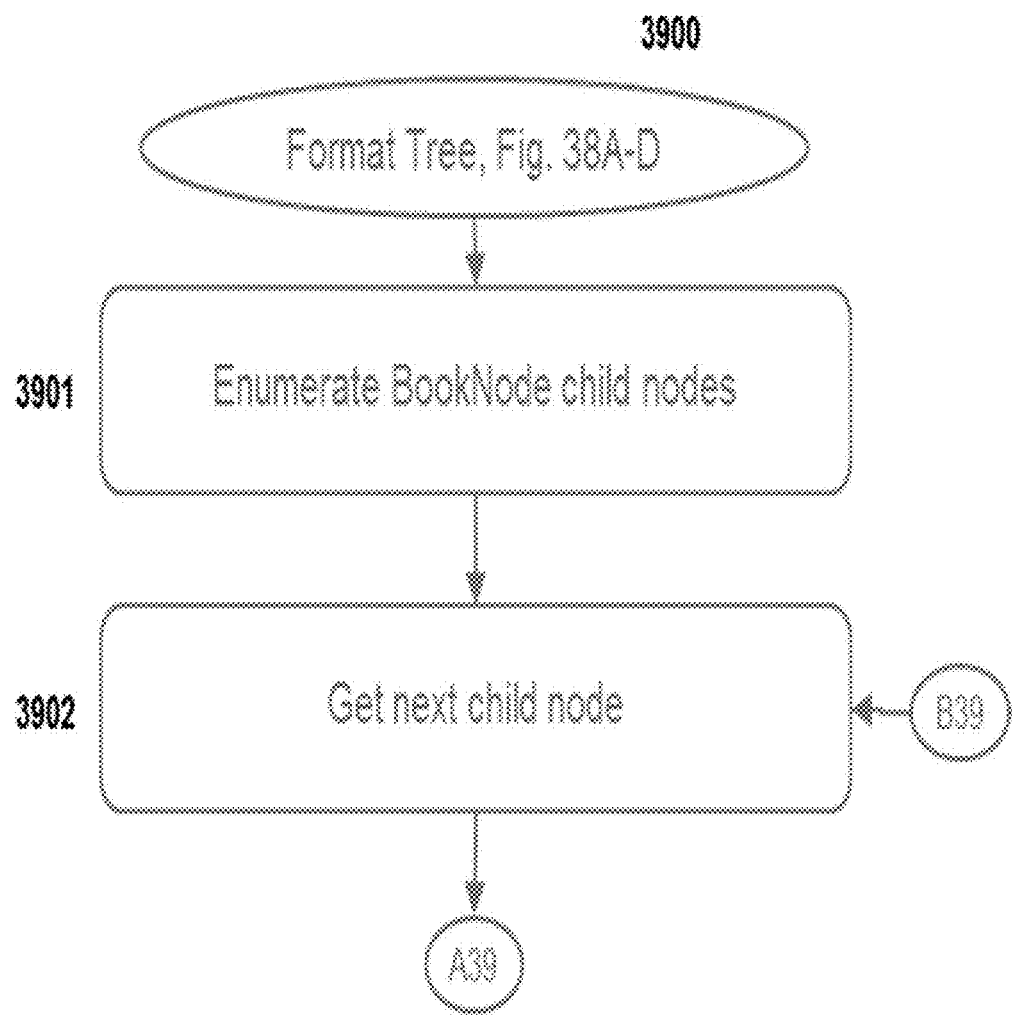

Figure 39B - shows how the tree view is repainted
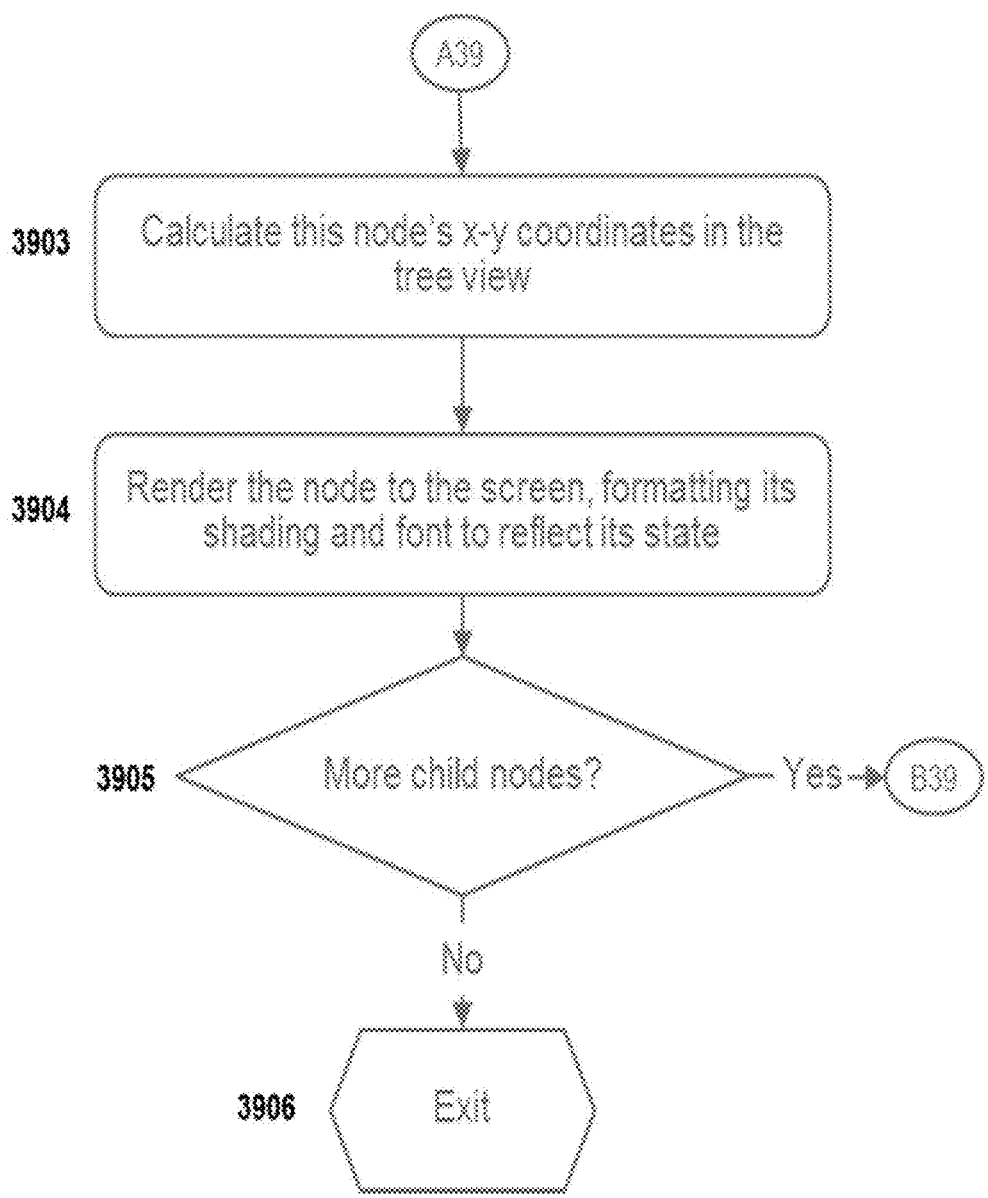

Figure 40A - illustrates the persistence operation
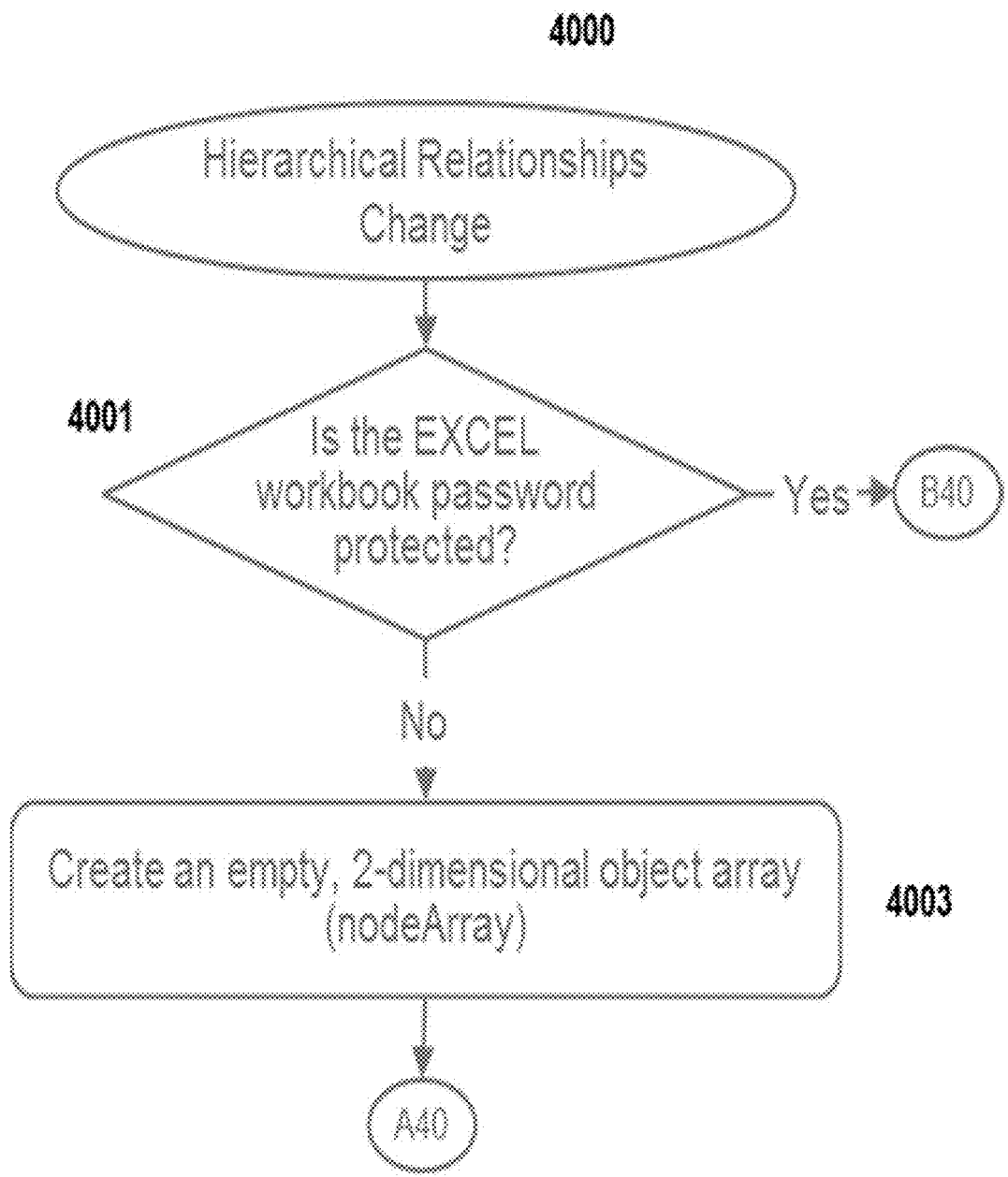

Figure 40B- illustrates the persistence operation
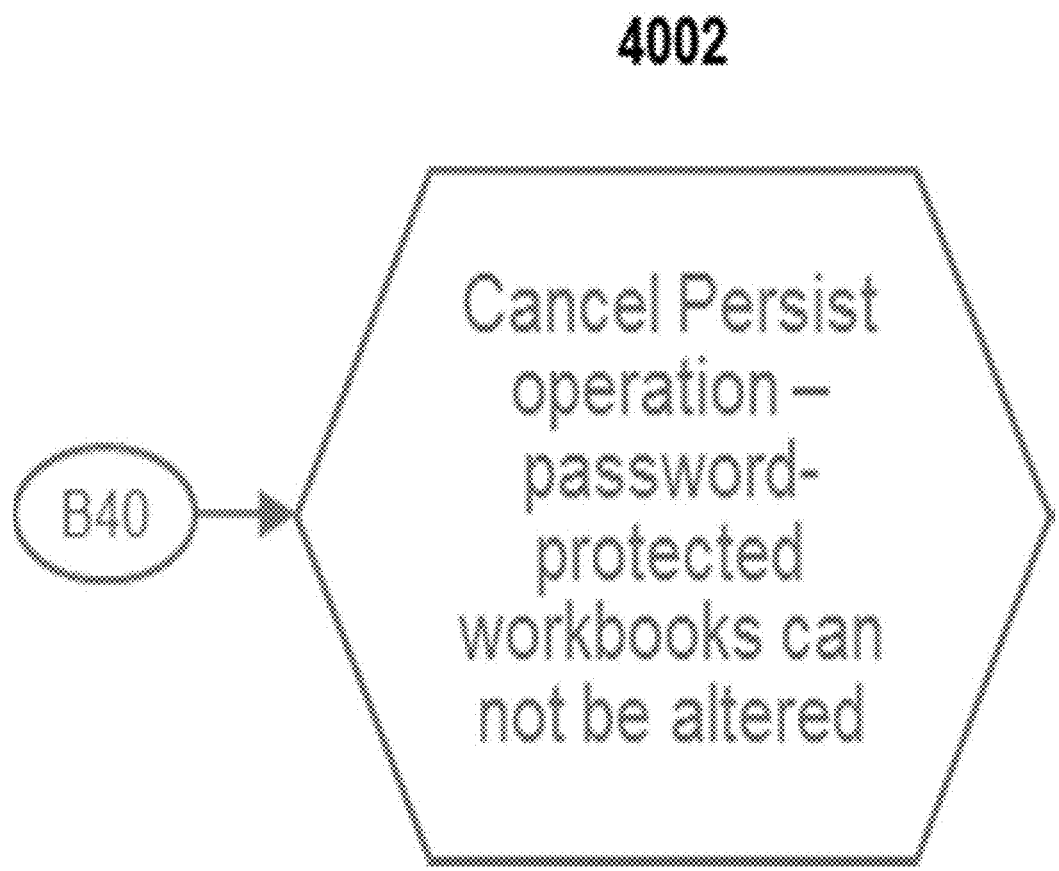

Figure 40C- illustrates the persistence operation
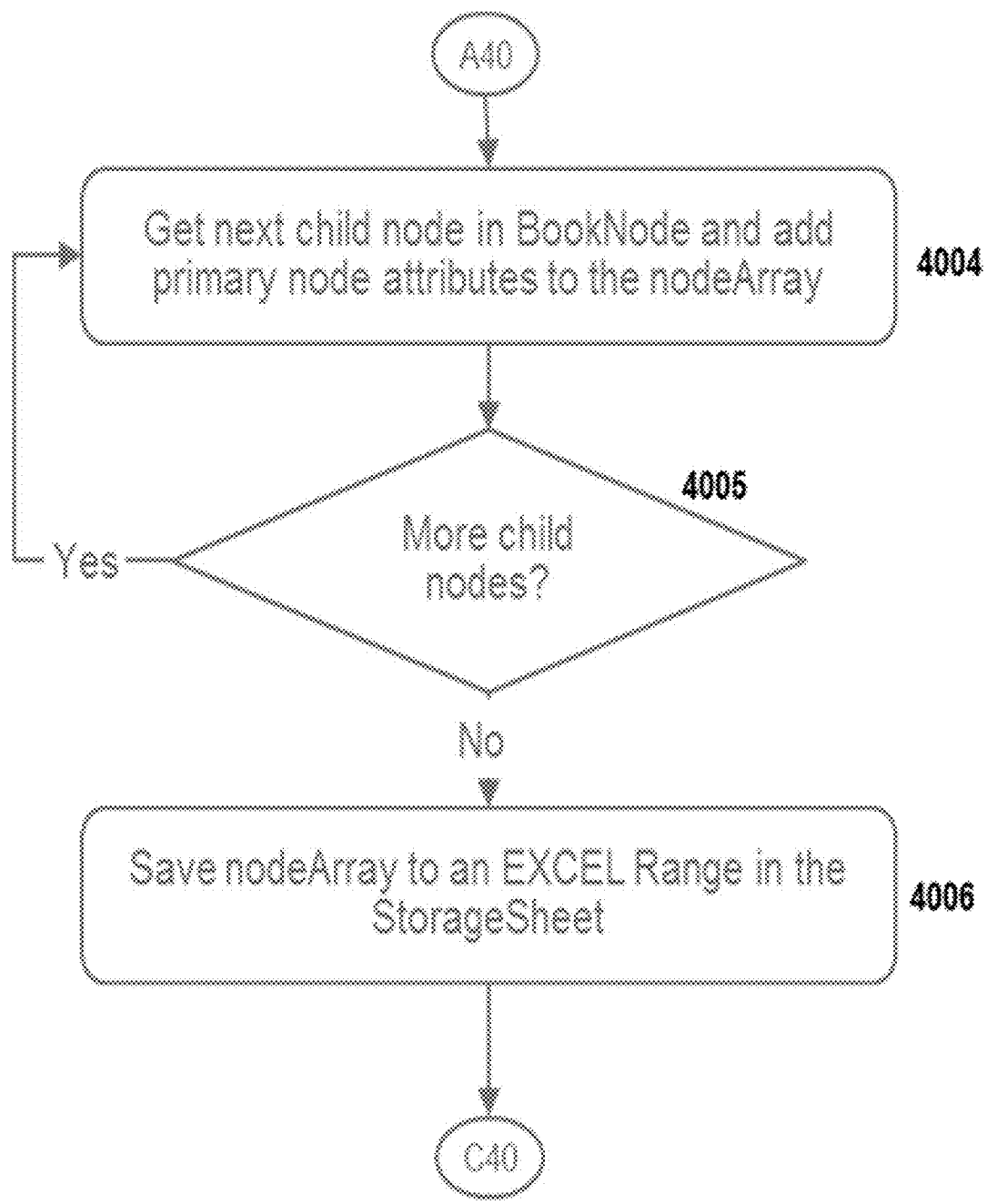

Figure 40D- illustrates the persistence operation
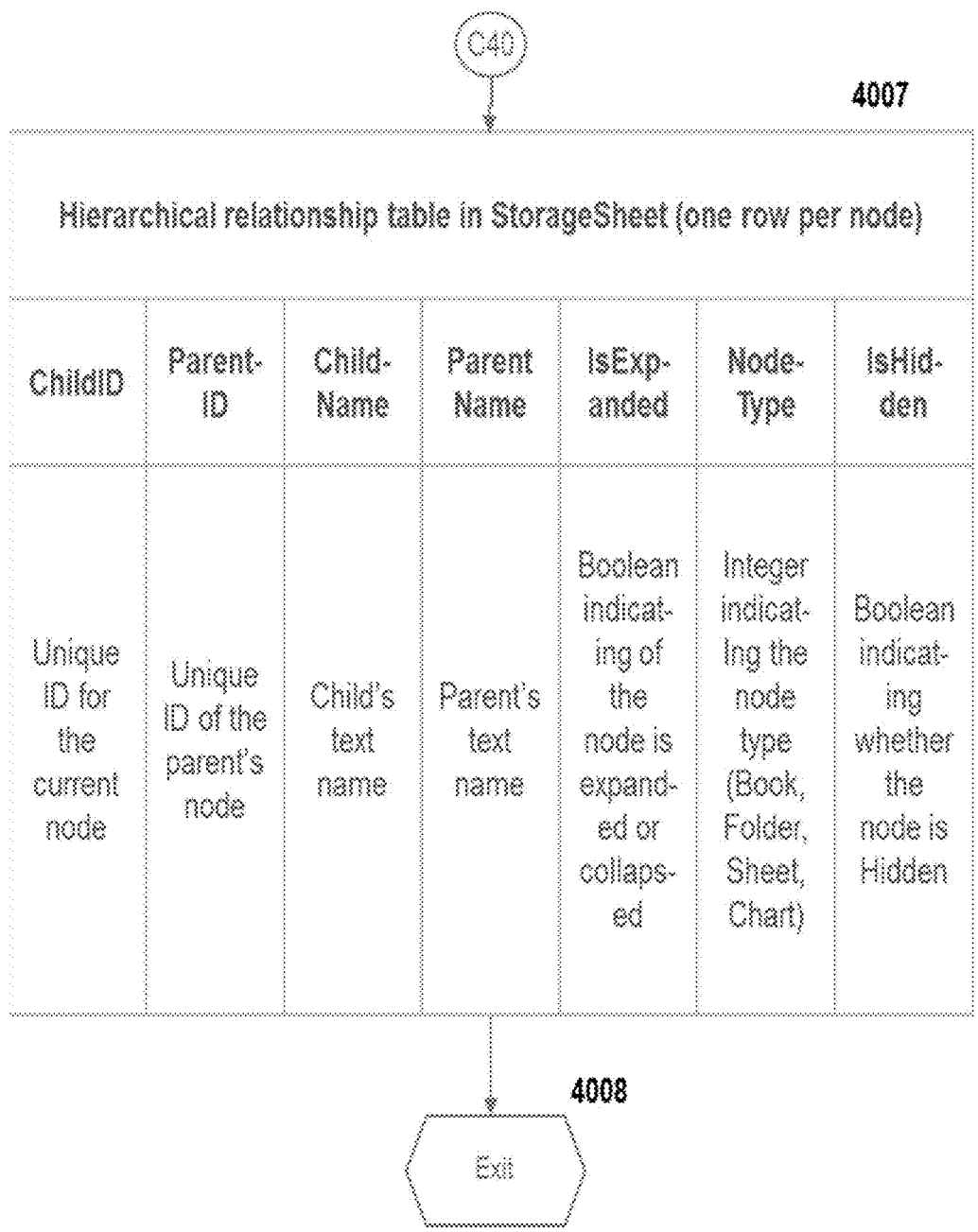

Figure 41 - illustrates the HUI's hardware computing environment
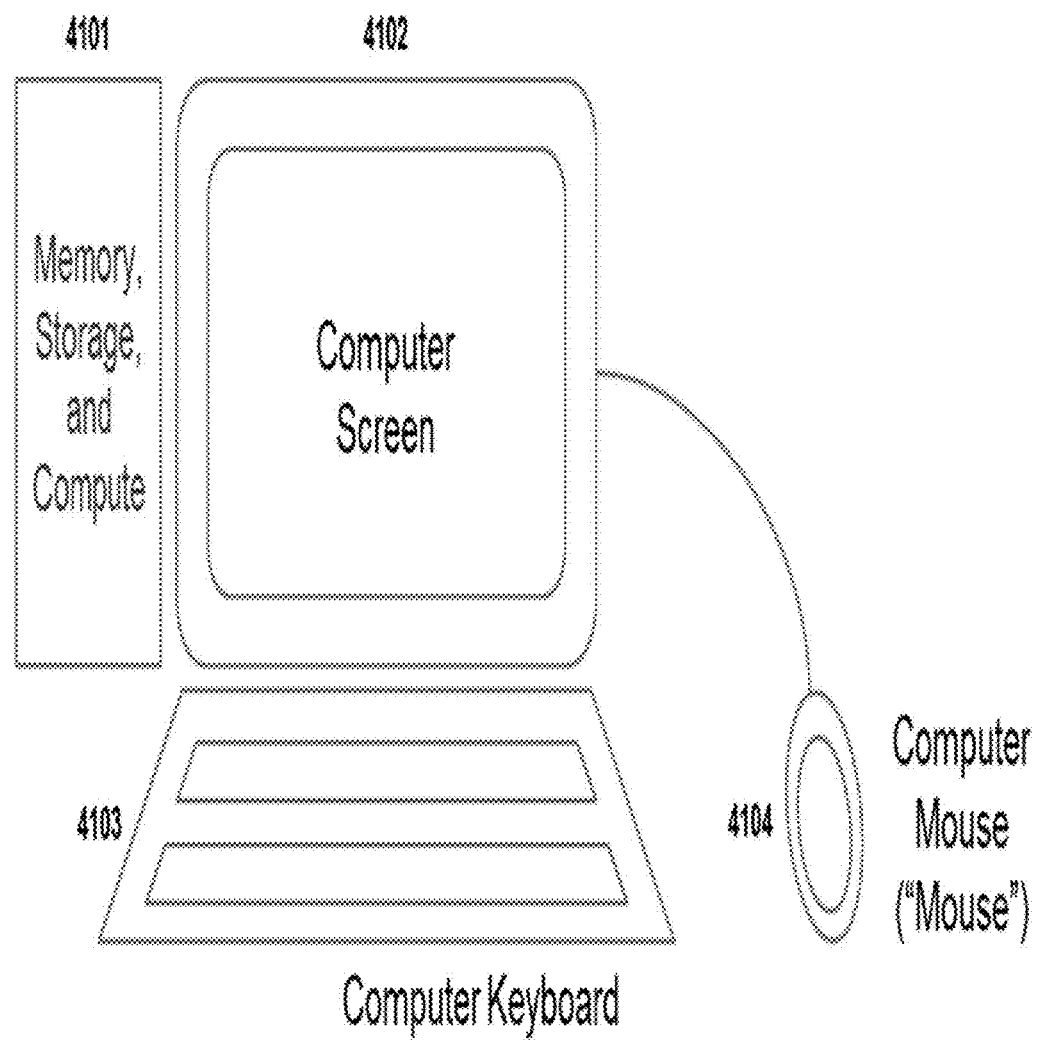

Figure 42 - illustrates the HUI's software computing environment
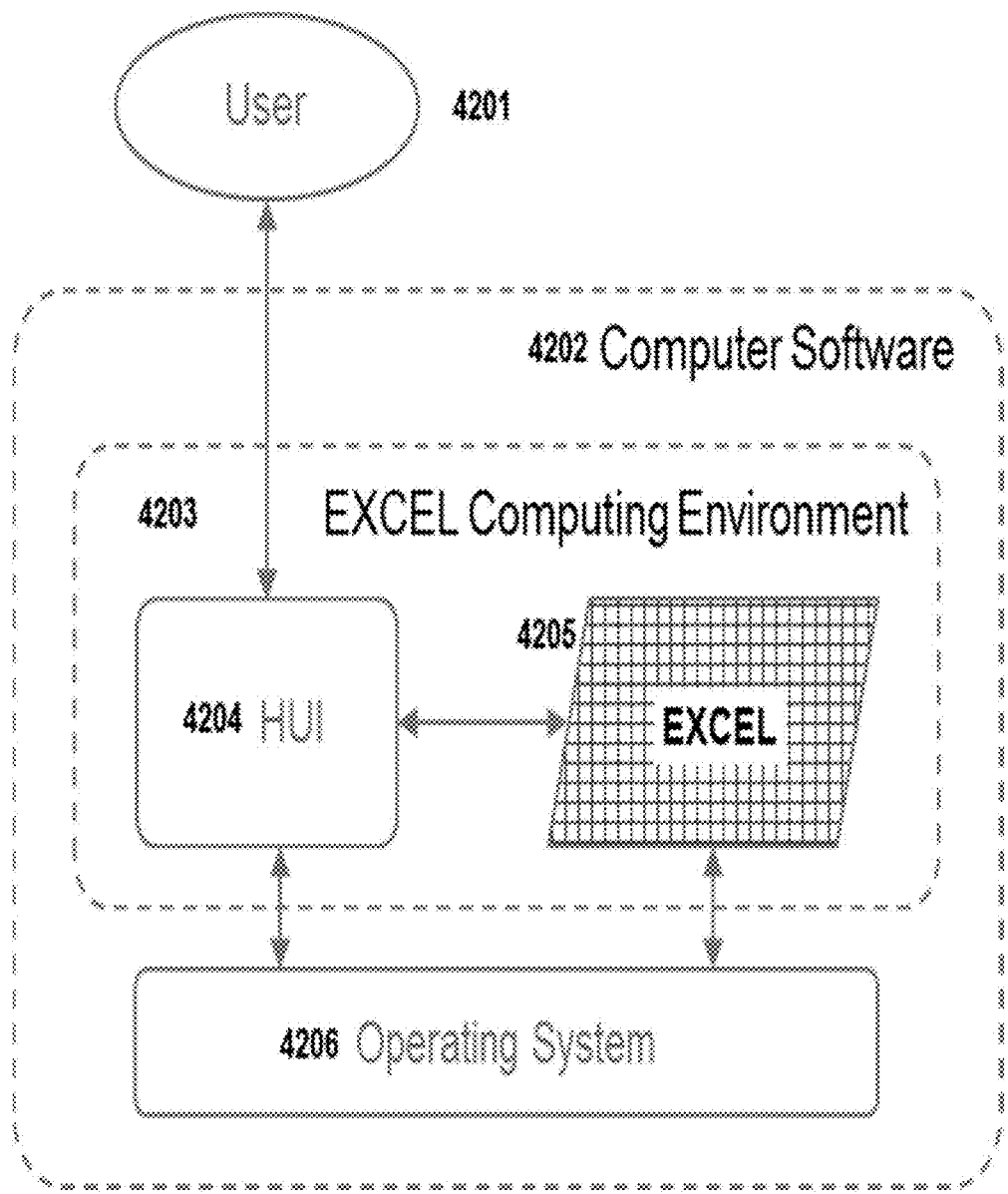

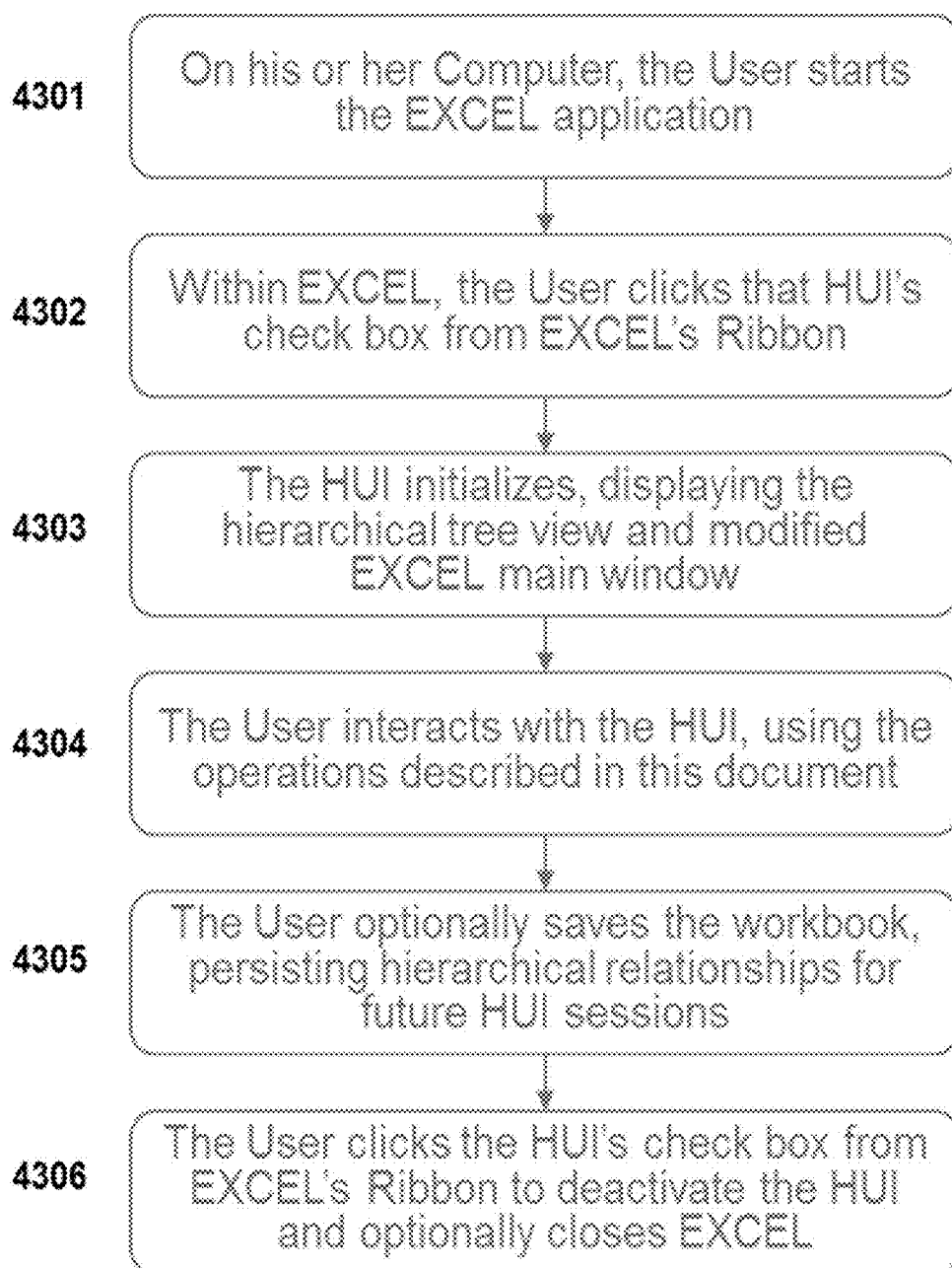
Figure 43 - illustrates the steps of a typical HUI session performed by a user

HIERARCHICAL USER INTERFACE

RELATED APPLICATION

This application claims the benefit of U.S. Provisional Application No. 61/777,577, filed on Mar. 12, 2013. The entire teachings of the above application are incorporated herein by reference.

BACKGROUND

The primary document interface for the MICROSOFT EXCEL (hereinafter "EXCEL") application is a workbook, which includes a collection of worksheets and chart-sheets ("sheets"), as shown in FIGS. 1A-B. EXCEL provides a system of tabs 101 and navigation buttons 102 that allow users to navigate a workbook. Tabs are used to select and activate sheets. They are arranged horizontally in the "tab gutter" 103 at the bottom of EXCEL's window. When the number of tabs grows beyond the tab gutter's capacity, tabs may scroll out of view. Navigation buttons are used to scroll tabs horizontally, so they may be scrolled in and out of view.

EXCEL's native navigation system has several shortcomings. First, because tabs are arranged horizontally and in one dimension, tabs prevent users from organizing workbooks logically in more than one dimension. Second, because tabs may scroll out of view as the number of sheets grows, and because the number of tabs that the user may see is limited by the bounds of the tab gutter, the full structure and content of the workbook may be partially hidden. Third, selecting sheets that are scrolled out of view often requires multiple mouse clicks to find and activate hidden tabs, creating additional effort for users and degrading the user experience.

SUMMARY

To overcome these limitations, a hierarchical user interface (HUI) is disclosed which uses a tree-like structure to organize EXCEL's tabs hierarchically to improve workbook organization and facilitate workbook navigation. This creates a more productive interface for EXCEL that allows users to visualize the full structure and content of workbooks, quickly navigate to and select sheets, and organize workbooks in a more logical manner than one-dimensional tabs allow. Hierarchical relationships are stored within the workbook itself, so they persist over the lifetime of the workbook, and may be shared with and modified by other HUI users. The HUI also allow users to switch effortlessly between EXCEL's horizontal tabs and the HUI's hierarchical tree view at will. Additionally, the HUI seeks to preserve the full-range of functionality users expect from EXCEL's native interface. The HUI preserves functionality by reconfiguring EXCEL's user interface to allow simulated mouse clicks to manipulate EXCEL's navigation controls, emulating the actions that users perform to locate and select sheets. The present approach is an improvement over other techniques for replacing tab-based navigation, such as selecting sheets programmatically using EXCEL's API, which can disrupt certain EXCEL operations and compromise EXCEL's full functionality.

Principles of the invention may be applied to computer applications, including but not limited to MICROSOFT OFFICE applications, including but not limited to EXCEL and Visio. These applications organize documents in one-dimensional schemas with limitations similar to those described above. By transforming these schemas from one dimension to a plurality of dimensions displayed in a tree view, and enabling one-click navigation, the HUI mitigates these issues and yields an improved and more productive user experience. In an embodiment, the HUI operates as a EXCEL AddIn.

In one embodiment, the present approach may include a computer-implemented method. The method may include identifying, within a computer-implemented software application, one or more documents including one or more document members that are organized in a tabbed user interface. The tabbed user interface may perform at least one of selection, navigation, and organization of the one or more document members in a linear fashion. The method may include organizing, in a hierarchical manner, hierarchical elements that are associated with the one or more documents, the one or more document members, and one or more folders. The method may include mapping one or more hierarchical relationships between the hierarchical elements. The method may include displaying at least the hierarchical elements and the one or more hierarchical relationships to a user through a hierarchical user interface. The method may further include replacing the tabbed user interface with the hierarchical user interface. The method may also include enabling the user to perform one or more operations including at least one of selecting, navigating, and organizing at least one of the hierarchical elements, the one or more documents, the one or more document members, and the one or more folders.

In another embodiment of the computer-implemented method, the tabbed user interface may include tabs and navigation controls. The hierarchical user interface may be displayed in a manner that enables the user to have full visualization of full structure and content of the one or more documents and the one or more document members without a requirement for scrolling. The method may enable the user, through the hierarchical user interface, to select and modify each hierarchical element and to modify the one or more hierarchical relationships between the hierarchical elements and their corresponding documents and document members. Other users may share and modify the one or more hierarchical relationships. The method may include storing the one or more hierarchical relationships in a persistent manner.

In another embodiment, upon initially accessing a given document, the method may associate a storage medium with the given document, and the computer-implemented software application may include non-desktop applications.

In another embodiment, the method may automatically identify and restore hierarchical relationships for the hierarchical elements. The method may enable alternation between the tabbed user interface and the hierarchical user interface. The method may prevent users from manipulating navigation controls and tabs of the tabbed user interface by hiding navigation controls and tabs by at least one of: resizing a native application window, relocating a native application window, and adding a non-native application window.

In another embodiment, the method may preserve modifications to the tabbed user interface when geometry of the tabbed user interface or hierarchical user interface changes by repositioning at least one of: a native application window associated with the tabbed user interface and a non-native application window associated with the tabbed user interface. The method may preserve a full-range of functionality of the tabbed user interface in the hierarchical user interface, the hierarchical user interface emulating navigation actions of the tabbed user interface by performing simulated mouse clicks.

In another embodiment, the method may modify at least one of the hierarchical elements. The modification may include adding and deleting the at least one of the hierarchical elements, corresponding documents, and corresponding document members. The modification may also include copying, cutting, and pasting the at least one of the hierarchical elements, corresponding documents, and corresponding document members. The modification may further include moving the at least one of the hierarchical elements, corresponding documents, and corresponding document members, using drag and drop operations. The modification may include hiding and unhiding the at least one of the hierarchical elements, corresponding documents, and corresponding document members.

In another embodiment, the method may include transforming native operations of the tabbed user interface into hierarchical operations that execute in a plurality of dimensions. The method may include displaying with a tree view a cloned hierarchy comprising unhidden hierarchical elements. The method may further include navigating or selecting without the user requiring multiple mouse clicks or scrolling. The method may include drawing a tree view that displays the hierarchical elements and renders one or more tabbed documents in a visual hierarchy. The user may move the tree view freely within the tabbed user interface while retaining full functionality of the hierarchical user interface and the tabbed user interface. The one or more documents may include EXCEL workbooks, the one or more document members may include at least one of one or more EXCEL worksheets and one or more charts, and the tabbed user interface may include a native EXCEL interface. The method may include initializing and updating the hierarchical user interface by at least one of the following: modifying EXCEL's main window to conceal tabs and navigation controls of the tabbed user interface; initializing the one or more hierarchical relationships; and adding a tree view to the tabbed user interface.

In one embodiment, the present approach may include a system. The system may include a data module configured to identify, within a computer-implemented software application, one or more documents including one or more document members that are organized in a tabbed user interface. The tabbed user interface may perform at least one of selection, navigation, and organization of the one or more document members in a linear fashion. The system may include a computing module configured to organize, in a hierarchical manner, hierarchical elements that are associated with the one or more documents, the one or more document members, and one or more folders. The computing module may be configured to map one or more hierarchical relationships between the hierarchical elements. The display module may be configured to display at least the hierarchical elements and the one or more hierarchical relationships to a user through a hierarchical user interface. The computing module further may be configured to replace the tabbed user interface with the hierarchical user interface. The computing module may be further configured to enable the user to perform one or more operations including at least one of selecting, navigating, and organizing at least one of the hierarchical elements, the one or more documents, the one or more document members, and the one or more folders.

In one embodiment, the present approach may include a non-transitory computer readable medium having stored thereon a sequence of instructions which, when loaded and executed by a processor coupled to an apparatus causes the apparatus to perform the following functions. The apparatus may identify, within a computer-implemented software application, one or more documents including one or more document members that are organized in a tabbed user interface, the tabbed user interface performing at least one of selection, navigation, and organization of the one or more document members in a linear fashion. The apparatus may organize, in a hierarchical manner, hierarchical elements that are associated with the one or more documents, the one or more document members, and one or more folders, and map one or more hierarchical relationships between the hierarchical elements. The apparatus may display at least the hierarchical elements and the one or more hierarchical relationships to a user through a hierarchical user interface. The apparatus may replace the tabbed user interface with the hierarchical user interface. The apparatus may enable the user to perform one or more operations including at least one of selecting, navigating, and organizing at least one of the hierarchical elements, the one or more documents, the one or more document members, and the one or more folders.

BRIEF DESCRIPTION OF THE DRAWINGS

The foregoing is apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1A-B illustrate the EXCEL native user interface.

FIGS. 2A-C illustrate the HUI user interface.

FIG. 2D illustrates the HUI user interface floating over an EXCEL sheet.

FIGS. 3A-B show the geometry behind the HUI user interface.

FIG. 4 represents the relevant dimensional relationships for the HUI interface.

FIG. 5 illustrates the HUI's architecture.

FIGS. 6A-C show the storage sheet and its parameter table.

FIGS. 7A-L show the HUI's lifecycle operations.

FIGS. 8A-C show how the HUI is activated.

FIGS. 9A-B show how the HUI is deactivated.

FIGS. 10A-C illustrate the steps associated with opening workbooks.

FIGS. 11A-C illustrate how a BookNode is created for each open EXCEL workbook.

FIGS. 12A-B illustrate the steps associated with closing workbooks.

FIGS. 13A-B illustrate the steps associated with adding sheets asynchronously.

FIG. 14 illustrates the elements of a tree node.

FIGS. 15A-C show how the HUI processes mouse clicks.

FIGS. 16A-C show how the HUI selects an EXCEL worksheet.

FIGS. 17A-C show additional steps in selecting an EXCEL worksheet.

FIGS. 18A-C illustrate the steps of sheet selection.

FIGS. 19A-B show tree view locations for drag-and-drop (DND) operations.

FIGS. 20A-D illustrate steps for DND.

FIGS. 21A-B show how tree nodes are toggled.

FIGS. 22A-E show how the HUI's pop-up menu is displayed.

FIGS. 23A-D illustrate the HUI's pop-up menu.

FIGS. 24A-D illustrate how sheets and folders are added to a workbook.

FIGS. 25A-D illustrate how sheets and folders are deleted from a workbook.

FIGS. 26A-D illustrate the initial steps for copying a node.

FIGS. 27A-C illustrate steps for copying or moving nodes to their new parent.

FIGS. 28A-C illustrate the steps associated with renaming a node.

FIG. 29 illustrates the allowed states and state transitions for hidden variables.

FIGS. 30A-B depict hide logic.

FIGS. 31A-B depict unhide logic.

FIGS. 32A-B depict logic for showing and masking hidden nodes.

FIG. 33 illustrates EXCEL's child windows.

FIGS. 34A-C outline steps involved in modifying EXCEL's main window.

FIGS. 35A-D further outline steps involved in modifying EXCEL's main window.

FIGS. 36A-B show how the HUI's node hierarchy is updated.

FIG. 37 represents a tabulation of node states.

FIGS. 38A-D represent the process by which nodes are formatted.

FIGS. 39A-B show how the tree view is repainted.

FIGS. 40A-D illustrate the persistence operation.

FIG. 41 illustrates the HUI's hardware computing environment.

FIG. 42 illustrates the HUI's software computing environment.

FIG. 43 illustrates the steps of a typical HUI session performed by a user.

DETAILED DESCRIPTION

A description of example embodiments of the invention follows.

Glossary of Terms and Conventions

Sheet: EXCEL workbooks include two types of sheet-like documents: a worksheet and a chart-sheet. A worksheet is a standard spreadsheet document including rows and columns that allow users to range information in a tabular format and perform calculations. A chart-sheet is an EXCEL document that includes a single graphical EXCEL chart, does not include rows and columns, and does not enable calculations. In the following descriptions, the term "sheet" refers to either a worksheet or a chart-sheet. When "worksheet" or "chart-sheet" are used, they refer to those types of EXCEL documents specifically.

Tree view: This refers to the HUI's graphical tree view, which visually renders the HUI's hierarchical relationships in a tree-like structure on the computer screen, and with which the user interacts.

User: The individual that is operating EXCEL or the HUI.

Event: Many operations in the HUI are "event-driven." An event may include a software alert that is raised asynchronously by EXCEL, MICROSOFT WINDOWS, and certain HUI software components, in response to user actions, such as clicking the mouse. The HUI responds to events and also raises its own events during the course of operation.

HUI Session: The period of time during which the HUI is active and the user is interacting with it.

EXCEL User Interface

FIGS. 1A-B describe the EXCEL's native user interface. For navigation purposes, EXCEL provides two primary controls: Tabs and Navigation Buttons. EXCEL's tabs are illustrated in 101. When the user clicks a tab, its corresponding sheet is selected and activated. EXCEL's tabs reside within the tab gutter, 103, at the bottom of EXCEL's main window. EXCEL's Navigation Buttons are illustrated in 102: Full-Left Scroll, Step Left, Step Right, and Full-Right Scroll. These buttons reside within the Navigation Panel, 106, and allow the user to scroll EXCEL's tabs left and right, and to expose tabs that are scrolled out of view. EXCEL also provides scrolling capabilities. EXCEL's horizontal scrollbar, 104, allows the user to scroll the columns of EXCEL's sheets left and right. The LeftKnob, 105, controls the length of EXCEL's horizontal scrollbar. By dragging the LeftKnob left and right, the user may expand and contract the horizontal scrollbar. EXCEL's Ribbon, 107, which includes EXCEL's native commands and also the HUI's checkbox. The HUI's checkbox, 108, which activates and deactivates the HUI. A typical EXCEL worksheet is shown in 109, and 110 makes reference to a single EXCEL workbook ("Book1"). EXCEL allows many workbooks to be open simultaneously, but preferably only one workbook may be viewed at one time in EXCEL's native interface.

HUI User Interface

FIGS. 2A-C describe the HUI's user interface. The HUI's interface includes two primary elements: 201A, the tree view, and 202A, the modified EXCEL window. In 201A, the tree view renders the hierarchical relationships embodied by the HUI within a tree-like structure included within panel typically positioned on the left side of EXCEL's main window, but which also floats and may be positioned on the right side, top, bottom, and arbitrarily within EXCEL's window. The tree view is the primary interface through which users interact with the HUI, and is comprised of BookNodes 203A, FolderNodes 204A, SheetNodes 205A, and ChartNodes 206A. Within the tree view, the BookNode appears as a book icon, and represents an EXCEL workbook. Each active EXCEL workbook is represented by a single BookNode in the tree view. Unlike EXCEL's native interface, the HUI allows the user to view multiple workbooks simultaneously. SheetNodes and ChartNodes correspond to EXCEL worksheets and chart-sheets, respectively. The SheetNode's icon mimics a spreadsheet, and the ChartNode's icon mimics a graphical chart. The FolderNode preferably has no counterpart in EXCEL; it is preferably an organizational construct for grouping SheetNodes, ChartNodes, and other FolderNodes, and appears in the tree view as a folder icon.

EXCEL's main window, 202A, is modified by the HUI to conceal EXCEL's native tabs and navigation buttons. Two of EXCEL's child windows (Horizontal Scrollbar 208A and LeftKnob 105) are extended over the tab gutter 103 to hide exposed tabs. Hiding tabs and navigation buttons prevents the user from interacting with EXCEL's tabs and disrupting operation of the HUI. An additional component, the TabShield 207A, is overlaid on top of EXCEL's navigation panel 106. The TabShield 207A is impervious to user-generated mouse clicks, but allows simulated mouse clicks from the HUI to pass through and strike the underlying tabs and navigation buttons. As a result, users are unable to interact with EXCEL's navigation buttons when the HUI is active, but the HUI may manipulate these buttons and EXCEL's tabs in response to user interactions with the tree view.

In FIG. 2D, item 201B shows that the HUI's tree view may be positioned anywhere within or outside of EXCEL's main window and still retain its full functionality.

The geometry behind the modifications to EXCEL's main window is depicted in FIGS. 3A-B, and the relevant dimensional relationships are tabulated in FIG. 4 for EXCEL 2007 and EXCEL 2010. These dimensions may change to accommodate future releases of EXCEL, other OFFICE products, or other software products. These dimensions are maintained by the HUI when it is active. The Strike Zone, 301, is a critical aspect of the HUI's operation. It is a gap, hidden by the TabShield, that exposes a small portion of the tab gutter through which the HUI sends simulated mouse clicks to select and activate sheets. The width of the Strike Zone, 302, preferably is held to precise width when the HUI is active to enable sheet selection. As indicated in 401, the Strike Zone's width is preferably held at twice the knobWidth 303 to ensure proper functionality of the HUI. To accomplish this, the Left-Knob 304 is positioned two knobWidths to the right of EXCEL's navigation panel 305, using the dimensions described in 402, and the Horizontal Scrollbar 306 is extended left so that its left edge abuts the right edge of the LeftKnob, using the dimensions described in 403. The Tab-Shield, whose outline is illustrated by 307, is then sized and positioned to overlay both the navigation panel and the Left-Knob, using the dimensions in 404, to conceal EXCEL's navigation buttons and prevent the user from using EXCEL's navigation buttons or moving the LeftKnob. By modifying EXCEL's main window in this way, the HUI is the sole interface through which the user navigates and organizes EXCEL workbooks.

HUI Software Architecture

FIG. 5 describes the HUI's software architecture, in which solid boxes 520 represent HUI software components, and trapezoidal boxes 521 represent EXCEL software entities, such as, but not limited to, EXCEL components. The HUI's architecture comprises a collection of software components whose purpose is to transform EXCEL's flat architecture into the HUI's hierarchical structure, and to create and maintain the user interface through which the user navigates and organizes EXCEL.

The XenotabsController, 501, provides overall supervisory control of the HUI. It responds to events generated by EXCEL and by the HUI when the user interacts with the tree view. For example, when the user clicks on a tree node to select an EXCEL sheet, a software event is raised that the Xenotabs-Controller responds to by locating and selecting the corresponding tab. XLApp, 502, wraps and provides a programmatic interface to the active EXCEL instance and its underlying workbooks and sheets. Due to the complexity of EXCEL, XLApp encapsulates the EXCEL instance with a well-conditioned interface that allows for error-resistant access to EXCEL's native commands. XLApp serves three primary purposes. First, it senses and propagates events raised by EXCEL, such as when a new workbook is opened. Second, it provides a safe and well-defined interface to EXCEL's native commands. Third, it maintains the structure and position of certain EXCEL child windows (horizontal scroll bar 208A and left knob 304) and the TabShield 207A. It performs this latter task using a native Windows Hook to sense movements of EXCEL's window, such as when it is resized or repositioned by the user, and repositioning the TabShield, LeftKnob, and horizontal scroll bar in response to these movement to keep them in place. The TreeApp, 503, encapsulates and controls the HUI's tree view. For example, the TreeApp repaints the tree view on the computer screen when the users makes changes to or resizes it. Like XLApp, TreeApp uses a native Windows Hook to monitor user interactions with the tree view. This is critical to preserving EXCEL's the full native functionality. That is, by sensing tree view interactions with a Windows Hook, instead of responding to higher-level events raised by the tree view, the HUI allows critical EXCEL tasks, such as entering multi-sheet formulas, to be executed using the tree view. The TabTree-Controller, 504, senses and responds to events propagated by TreeApp, XLApp, and by the HUI's pop-up menu. The Tab-TreeMenu, 505, is a pop-up menu that is displayed when the user right-clicks the tree view with the mouse. It allows the user to perform tree operations, such as adding, renaming, and deleting tree nodes. The CopyPasteManager, 506, encapsulates the logic needed to copy and paste tree nodes. The complexity of copy, cut, and paste tasks warrants a dedicated software component that ensures these operations are executed correctly within EXCEL and the HUI.

The BookNode, 507, includes and manages the HUI's hierarchical relationships. When the HUI is active, there is one BookNode for every open EXCEL workbook. The Tab-TreeController maintains a collection of open BookNodes that is updated as workbooks are opened and closed during a HUI session. Each BookNode maintains a reference to a WorkBook, 508. Each WorkBook corresponds to a single EXCEL workbook, as indicated by 514. The WorkBook includes a single StorageSheet, 509, which manages a hidden EXCEL sheet ("storage sheet") 513, which is added when an EXCEL workbook is first opened by the HUI. The storage sheet stores hierarchical relationships during and between HUI sessions, and because it remains with the workbook, hierarchical relationships travel with the workbook and may be shared with other HUI users. The BookNode may have an unlimited number of FolderNodes 510, SheetNodes and ChartNodes 511 as children. SheetNodes and ChartNodes represent EXCEL's worksheets and chart-sheets, respectively, as indicated by 512. SheetNodes and ChartNodes preferably do not have children and preferably appear as children of FolderNodes or BookNodes. FolderNodes preferably have no counterpart in EXCEL, as indicated by the lack of a corresponding EXCEL entity in FIG. 5. Their primary role is to provide hierarchical grouping and organization of Sheet-Nodes, ChartNodes, and other FolderNodes. Notwithstanding EXCEL's capacity constraints, there is no limit to the number of child nodes and hierarchical levels a FolderNode may include.

FIGS. 6A-C describe the storage sheet in more depth. The StorageSheet uses an EXCEL Range object to store and retrieve parent-child relationships and node attributes to the storage sheet. An extract from an actual storage sheet is depicted in 601, where each row represents a single parent-child relationship, for example, between a FolderNode and a SheetNode. The storage sheet maintains seven parameters for each parent-child relationship: 602 the node's unique ID, 603 the parent node's unique ID, 604 the node's name, 605 parent's name, 606 its node type (SheetNode, ChartNode, FolderNode, or BookNode), 607 whether it is expanded or collapsed (IsExpanded), and 608 whether it is hidden or visible (IsHidden).

HUI Lifecycle Operations Overview

The HUI's lifecycle operations are outlined in FIGS. 7A-L. When the user checks the HUI's check box in EXCEL's Ribbon in 701, the HUI is activated in 702. Once the HUI is activated, five primary actions may follow. First, the user may deactivate the HUI in 704 by unchecking the HUI checkbox in EXCEL's Ribbon in 703. Second, the user may open workbooks in 706 using EXCEL file commands in 705. Third, the user may close workbooks in 708 using EXCEL file commands in 707. Fourth, sheets may be opened in 710 when during asynchronous EXCEL events, 709. This may occur, for example, when a user creates a chart and moves it to its own chart-sheet, which is created asynchronously by EXCEL.

The fifth action, 711, involves user interaction with the HUI's tree view using the computer mouse. There are many tasks the user may perform by manipulating the tree view with the mouse. In 712, the mouse click first preferably is processed by the HUI to determine what action to take next. In 713, when the user clicks the left mouse button ("left click") on the tree view, one of three actions may follow. First, in 714, if the label of BookNode, SheetNode, or ChartNode was clicked, this causes the corresponding EXCEL workbook and sheet to be selected and activated, as in 715. Second, if the image of a SheetNode, ChartNode, or FolderNode is clicked, this initiates a Drag and Drop operation, as in 716. Third, if the user left clicks the toggle of a FolderNode or BookNode, this causes that node to be expanded or collapsed, exposing or obscuring child nodes, as in 717. In 734, the HUI awaits further user input.

If in 713, the user clicks the right mouse button ("right clicks"), and if in 718, this click lands on a node label, the HUI's pop-up menu preferably is displayed, as indicated by 719. The pop-up menu presents the user with a range of possible commands, which fall into three categories. The first category is 'creation' commands, as indicated by 720. In 721, the user may add a new FolderNode or SheetNode. If a SheetNode is added, a new corresponding EXCEL worksheet also is added. Note that EXCEL, and thus the HUI, does not allow users directly to add chart-sheets. In 722, the user may delete a FolderNode, SheetNode, or ChartNode; corresponding EXCEL sheets also preferably is deleted. The second category of commands, in 723, relate to organizational tasks. In 724, the user may cut, copy, and paste FolderNodes, SheetNodes, and ChartNodes. In 725, the user may rename FolderNodes, SheetNodes, and ChartNodes. The third category of commands in 726 control the visibility FolderNodes, SheetNodes, or ChartNodes. In 727, users may hide nodes. In 728, users may unhide nodes. In 729, hidden nodes may be shown, or temporarily exposed, by the user, and in 730, these exposed nodes may be masked. Visibility functions replicate EXCEL's native hiding capabilities, but extend them to entire hierarchies of nodes. For example, if a FolderNode includes children and is hidden, then it and of its decedents preferably is hidden. This same logic applies to unhiding, showing, and masking nodes. In 734, the HUI awaits further user input.

Three additional infrastructure operations—731 Refresh & Layout Windows, 732 Update Tree View, and 733, Persist Hierarchical Relationships—are invoked frequently throughout operation of the HUI, but not directly by the user. Refresh & Layout Windows, 731, is invoked whenever the geometry of EXCEL's main window changes. In response to these changes, it updates the locations of the TabShield 207A, LeftKnob 304, and horizontal scrollbar, 306. Update Tree View, 732, is invoked to redraw the tree view whenever changes are made to the HUI, for example by adding a new SheetNode. Persist Hierarchical Relationships, 733, is invoked to save the HUI's hierarchical relationships to the storage sheet.

HUI Lifecycle Operations Detail

FIGS. 8A-C describe how the HUI is activated. In 800, the user checks the HUI's checkbox in EXCEL's Ribbon, and in 801 the basic HUI software components are loaded, including XenotabsController, XLApp, TreeApp, TabTreeController, and the tree view. Next, in 802, EXCEL's main window is modified, as described in FIGS. 34A-C and 35A-D. If in 803, there are open EXCEL workbooks when the HUI is activated, then in 804 the next workbook is retrieved, and in 805 the workbook is initialized as described in FIGS. 11A-C. Next, in 806 a new BookNode is added to the tree view. In 807, this process repeats until a new BookNode is created for each open EXCEL workbook and added to the tree view. In 808, the tree view is added to EXCEL's main window and in 809, the HUI is redrawn and saved. After the HUI is activated, it preferably is receptive to user input and asynchronous EXCEL events.

FIGS. 9A-B describe how the HUI is deactivated. In 900, the user unchecks the HUI's checkbox in EXCEL's Ribbon. If in 901 there are open EXCEL workbooks, then in 902, the next open workbook is retrieved, in 903, this workbook's remove corresponding BookNode is removed from the tree view, and 904, if more workbooks are open, steps 902, 903, and 904 are repeated until all BookNodes are removed from the tree view and from the HUI. When BookNodes are removed, the tree view itself is removed from EXCEL's main window in 905, and the XenotabsController, XLApp, TreeApp, and TabTreeController are unloaded in 906, which in turn removes the TabShield from EXCEL's main window, exposing EXCEL's navigation buttons, and releases the horizontal scroll bar and LeftKnob, exposing EXCEL's tabs for normal use. The operation in FIGS. 9A-B then exits in 907.

FIGS. 10A-C describe how workbooks are opened. Workbooks may be opened in several different ways. For example, they may be opened using EXCEL's file commands, from the Windows explorer by double-clicking on an EXCEL file, and from an email attachment. In 1000, when a new EXCEL workbook is opened, EXCEL raises a WorkbookActivate event to which the HUI responds in 1001. In 1002, if this workbook is not in a format compatible with the HUI, for example, if it was created in a very old version of EXCEL, then preferably it is not opened by the HUI and this operation preferably exits 1009. Otherwise, in 1003, if the workbook is in EXCEL's protected mode, it preferably is opened in EXCEL's native window, 1004, and preferably not in the HUI's tree view. EXCEL workbooks in protected mode preferably is opened by the HUI when the user enables editing. In 1005, if the workbook is password protected, it is preferable not to alter its structure, and it is preferable for the storage sheet to be disabled to prevent write operations, as in 1006, until the workbook is unprotected. If the workbook is not protected, then in 1007, a new BookNode is added to encapsulate this new EXCEL Workbook, as described in FIGS. 11A-C. The operation in FIGS. 10A-C then exits in 1008.

FIGS. 11A-C describe how EXCEL workbooks are initialized after they opened in the HUI or added when the HUI is activated. In 1100, when the user opens a new or existing workbook, a new BookNode and corresponding WorkBook are created and added to the HUI's collection of BookNodes in 1101. In 1102, if the EXCEL workbook does not include a storage sheet, indicating that it preferably has not been opened and saved previously by the HUI, then in 1103, a new storage sheet is added to the EXCEL workbook and a corresponding StorageSheet component is added to the BookNode. A SheetNode or ChartNode then is created for each sheet in the EXCEL workbook. New storage sheets preferably include an initially-flat hierarchy, preferably including only SheetNodes and/or ChartNodes, but preferably no FolderNodes, mirroring EXCEL's native flat architecture. In 1104, these new nodes are added to the BookNode, and in 1105 the workbook is formatted and saved. In 1102, when a workbook is opened that already includes a storage sheet, hierarchical relationships are restored in three steps. First, in 1106, a new StorageSheet component is created to encapsulate the existing storage sheet, and it is added to the BookNode. Next, in 1107, the relationships are retrieved from the storage sheet, and in 1108, they are compared to the sheets within the EXCEL workbook. Relationships that match existing sheets in the workbook are restored by creating corresponding SheetNodes or ChartNodes and adding them to their designated parent nodes. If sheets are deleted since the last HUI session, the corresponding hierarchical relationships are not restored. FolderNodes are added automatically to the hierarchy since they have no counterpart in EXCEL. These actions are repeated until valid relationships in the storage sheet are restored. Second, in 1109, if any sheets are added or renamed outside of the HUI since the last HUI sessions, then in 1110, new SheetNodes or ChartNodes are added for any sheets that are added or renamed. In this way, the HUI is 'self-healing'; it survives intervening changes to the workbook that may are made since the last HUI session. Finally, restored nodes are added to the BookNode in 1104 and the workbook is formatted and saved, as described in 1105. The operation in FIGS. 11A-C then exits in 1111.

FIGS. 12A-B describe how EXCEL workbooks are closed. In 1200, workbooks are closed when the user applies EXCEL's file close command, causing a WorkbookBeforeClose event to be raised. In 1201, the HUI responds to this event, and in 1202, the BookNode corresponding to the just-closed EXCEL workbook is retrieved. In 1203, that BookNode is removed from the tree view. Next, in 1204, the BookNode is removed from the HUI's collection of BookNodes, and in 1205, the tree view is redrawn and saved. The operation in FIGS. 12A-B then exits in 1206.

FIGS. 13A-B show that sheets may be added asynchronously by EXCEL without direct user intervention. For example, when a user moves an EXCEL chart to its own sheet, EXCEL creates a new chart-sheet to host the chart, which causes a WorkbookNewSheet event to be raised. In response to this event, the HUI adds a new SheetNode or ChartNode to the active BookNode for display in the tree view. This process is described in FIGS. 13A-B. In 1300, a sheet is added asynchronously by EXCEL. In 1301, the HUI responds to the WorkbookNewSheet event. In 1302, the BookNode corresponding to the active EXCEL workbook is retrieved. In 1303, a new SheetNode or ChartNode is created to encapsulate the new sheet. In 1304, the new SheetNode or ChartNode is added to the active BookNode, and in 1305, the tree view is reformatted and saved to persist the new hierarchical structure. The operation in FIGS. 13A-B then exits in 1306.

FIG. 14 describes the structure of a tree node, which is integral to user interaction with the HUI. Most user interaction with the HUI occurs through mouse clicks to BookNodes, FolderNodes, SheetNodes, and ChartNodes in the HUI's tree view. As indicated in FIG. 14, there are three parts of a tree node that are receptive to mouse clicks. The toggle, 1401, is used to expand and collapse tree nodes. Preferably only parent nodes (BookNodes and FolderNodes) with children may have toggles. The image, 1402, graphically indicates the node type. The image is used to initiate drag and drop operations. The label, 1403, is the text-based name of the node. The label is used for selecting nodes and their corresponding EXCEL sheets, renaming nodes, and displaying the HUI's pop-up menu.

FIGS. 15A-C describe how mouse clicks are processed by the HUI. In 1500, the user clicks the mouse, which causes a mouse click event to be raised by EXCEL. In 1501, a Windows MouseHook is used to sense and respond to mouse click events. A MouseHook is used for this purpose, rather than higher-level tree view events, because responding to the latter interferes with the normal operation of EXCEL, such as creating multi-sheet formulas. In 1502, if the mouse click lands outside of the tree view, for example in EXCEL's main window, it preferably is ignored in 1503; the HUI preferably only processes mouse clicks that land within the tree view. If the mouse click lands within the tree view, then in 1504, the HUI determines which mouse button was used to initiate the click, left or right. If left, then the location of the mouse click is determined in 1505 and mapped to a specific tree node and node element. If a node label was clicked, then in 1506, the node is selected as described in FIGS. 16A-C. If a node image was clicked, then in 1507, a drag and drop operation is initiated as described in FIGS. 19A-B and 20A-D. If a node toggle was clicked, then in 1508, the node is toggled as described in FIGS. 21A-B. In 1504, if the node was right clicked, then in 1509, if the node's label was clicked, then the HUI's pop-up menu is displayed in 1510. If a different part of the node was right-clicked, then the operation in FIGS. 15A-C exits in 1511. Other node elements preferably are not responsive to right-clicks.

FIGS. 16A-C, 17A-C, and 18A-C describe how sheets are selected when the user left-clicks the label of a tree node. In 1600, the user left-clicks a node in the tree view. In 1601, the HUI first retrieves the node that was clicked and the BookNode to which it belongs. In 1602, if a BookNode was clicked, then in 1603 it is activated if not already, and the HUI is redrawn and persisted in 1608. In 1602, if a FolderNode was clicked, then the tree view is redrawn and saved, which preferably causes the selected folder to be reformatted as active. In 1602, if a SheetNode or ChartNode was left-clicked, and in 1604, if the BookNode to which it belongs is not active, this BookNode preferably is activated in 1605. In 1606, windows are refreshed to obtain the latest coordinates and dimensions of EXCEL's child windows, as described in FIGS. 34A-C. Then, in 1605, the desired EXCEL sheet is activated by sending simulated clicks to its tab in 1607. Finally, after the desired EXCEL sheet has been activated, in 1608 the HUI is redrawn to reflect the tree view's and EXCEL's new state and the HUI is saved. The operation in FIGS. 16A-C then exits in 1609.

FIGS. 17A-C and 18A-C describe how an EXCEL tab is clicked by the HUI to select and activate the desired sheet. The HUI activates sheets by mimicking the actions users perform to scroll to and select sheets in EXCEL. With a single click, users may accomplish with the HUI what might require multiple clicks using EXCEL's native navigation system to scroll to and select the desired sheet ("one-click navigation"). One-click navigation is particularly useful in larger workbooks in which sheets often scroll beyond the visible bounds of EXCEL's tab gutter and preferably are scrolled back into view manually before they may be selected by the user. By mimicking user actions rather than performing these actions programmatically using EXCEL's API, the HUI avoids interfering with native EXCEL functionality. For example, multi-sheet formulas are disrupted if navigation is performed programmatically, but not when mimicking user behavior. A preferable design objective for the HUI is to not compromise native EXCEL functionality, so this approach is adopted despite the additional design complexity and computational overhead. In 1700, the operation continues from FIGS. 4935.16A-C. In 1701, the updated EXCEL child window dimensions and coordinates is known from the process described in FIGS. 34A-C and 35A-D, and the HUI uses this information to calculate the location of the navigation panel, 1801, and strike zone, 1802, both of which are hidden beneath the TabShield, 1803. Then, the HUI preferably sends a single simulated mouse click in 1702 to EXCEL's Full-Left scroll button, 1804. This resets the tabs by moving the left-most tab to the first scroll position abutting the right edge of the navigation panel. Next, in 1703, the HUI retrieves the corresponding EXCEL sheet and determines its index, or position in EXCEL's tab sequence. Preferably only visible sheets are counted in this index. Then, in 1704 a logical loop is initiated in which there are as many iterations as the sheet's Visible Index (for example, if the Visible Index is 3 for a given sheet, 3 loops are executed). In 1705, the location of EXCEL's right navigation button is calculated. In 1706, a single simulated mouse click is sent to the right navigation button, causing EXCEL's native tabs to scroll once to the left (the right navigation button scrolls tabs left). If in 1707 the number of loops is less than the sheet's visible index, then steps 1704, 1705, and 1706 are repeated until a number of simulated mouse clicks equal to the target sheet's index are sent sequentially to the Step Right Scroll Button, causing the target sheet's tab to scroll into strike position. For example, if the user clicks a SheetNode corresponding to the third sheet in EXCEL's tab order, three simulated mouse clicks preferably is sent to the Step-Right scroll button to position the target sheet's tab in the Strike Zone. Finally in 1708, the target tab's location is calculated and 1709, a single simulated mouse click is sent to the strike zone, as indicated in 1806, to select and activate the target sheet. The operation in FIGS. 17A-C then exits in 1710.

FIGS. 19A-B and 20A-D describe how the drag and drop (DND) operation is performed. FIGS. 19A-B describe the locations to which nodes may be dragged and dropped. In this figure, nodes that are not shaded are dragged ("DragNode"), and nodes that are shaded are dropped upon by DragNodes ("DropNode"). DragNodes may include SheetNodes or ChartNodes 1913, or FolderNodes 1914, as shown in the key in FIG. 19B. As shown in the FIG. 19B key, DropNodes may include a BookNode 1915, SheetNode or ChartNode, 1911, or FolderNode 1912. DragNodes including, but not limited to, SheetNode or ChartNode 1901, and FolderNode 1902) may be dropped on a BookNode, 1904, a SheetNode or ChartNode, 1907, or a FolderNode, 1908. When a DragNode is dropped on a DropNode that is a BookNode, as in 1903, or FolderNode, as in 1919, the DragNode is a child of the DropNode. When the DropNode is a SheetNode or ChartNode, 1907, there are three possible outcomes. First, if the DragNode is dropped above the DropNode, as in 1916, the DragNode is a prior sibling of the DropNode. Second, if the DragNode is dropped on the DropNode, as in 1917, the DragNode is a latter sibling of the DropNode, because SheetNodes and ChartNodes may not have child nodes. Third, if the DragNode is dropped below the DropNode, as in 1918, the DragNode is a latter sibling of the DropNode. Additional examples of drag nodes are illustrated in FIG. 19A such as a FolderNode 1905, and SheetNode or ChartNode indicated by figures, 1906, 1909 and 1910.

FIGS. 20A-D describe the steps involved in a DND operation. Note that DND is closely related to copy/cut and paste, and reuses much of the functionality described in FIGS. 26A-D and 27A-C. DND is initiated when the user left-clicks the image of a node and begins to drag the node while holding the left mouse button down. Visual feedback is provided to the user as they drag the selected node over, before, or after other nodes. Preferably SheetNodes, ChartNodes, and FolderNodes may be dragged, and they may be dropped before or after other node, or on top of a FolderNode or BookNode. DND preferably results in a move (cut and paste) rather than a copy. A Control-Click combination may be used to initiate a multi-sheet DND operation, and if a FolderNode with children is the DragNode, it and of its children be moved. In 2000, the user drags a DragNode over other nodes in the tree view. In 2001, the DragNode's location is tracked continuously during a drag operation. In 2002, DropNode formatting is changed to reflect the position of the DragNode in relation to the DropNode. In 2003, if the DragNode is positioned before DropNode, a line is drawn above the DropNode to visually indicate where a drop occurs if executed. In 2004, if the DragNode is positioned after the DropNode, a line is drawn below the DropNode. In 2005, if the DragNode is positioned directly above the DropNode, that node is shaded to indicate that it is the new parent of the DragNode if the drop is executed.

In 2006, after the DragNode is dropped on a DropNode, in 2007, both the DragNode and the DropNode are retrieved. In 2008, if these two nodes are the same, that is, if the DragNode is dropped onto itself, the DND operation is cancelled in 2009. Otherwise, in 2010, a cut operation proceeds, as described in FIGS. 26A-D and 27A-C, starting at 2602. In 2011, the tree view is reformatted and saved to persist changes resulting from the drag and drop operation. The DND operation then exits in 2012. In an embodiment, Drag and Drop may be applied to documents, such as EXCEL workbooks, in addition to document members, such as EXCEL sheets.

FIGS. 21A-B describe how nodes are toggled—that is, how they are expanded or collapsed to reveal or conceal their child nodes. Toggling nodes applies to BookNodes and FolderNodes with children. In 2100, the user clicks the toggle image of a tree node. In 2101, the node whose toggle was clicked is retrieved and in 2102 its current toggle state is determined (expanded or collapsed). If the node currently is expanded, then in 2103 it preferably is collapsed. Otherwise, in 2104 it preferably is expanded. After the node is toggled, the tree view preferably is reformatted and saved to reflect and persist the new tree state, as indicated in 2105. The operation in FIGS. 21A-B then exits in 2106.

The preceding operations describe the HUI's behavior when the user left-clicks a tree node. To recap, these operations include (a) selecting a node, (b) drag and drop, and (c) toggling a node. The following operations describe the HUI's behavior when the user right-clicks a tree node, which begin by displaying a pop-up menu to the user. In an embodiment, these operations may be applied to documents, such as EXCEL workbooks, as well as document members, such as EXCEL sheets.

FIGS. 22A-E and 23A-D describe the HUI's pop-up menu and how it is displayed. When the user right-clicks the label of a node, this causes the HUI's pop-up menu to appear, presenting the user with a broad range of operations. The pop-up menu presents contextual commands to the user. That is, it preferably displays only commands that are allowed based on the type of node that was right-clicked, and the state of that node. In 2200, the user right-clicks a tree node. In 2201, the node that was clicked is retrieved. In 2202, its type is determined so that the appropriate commands may be added to the menu. If the node is a BookNode, then in 2203, BookNode-specific commands are added. A typical BookNode pop-up menu is illustrated in 2301. If the node is a FolderNode, then in 2204, FolderNode-specific commands are added. A typical FolderNode pop-up menu is illustrated in 2302. In 2205, if the BookNode or FolderNode has hidden children, then in 2206 if these children are masked, then the "Show Hidden Sheets" command is added to the menu to allow the user to expose those sheets. If in 2207, hidden children are showing, then the "Mask Hidden Sheets" command is added to the menu to allow the user to mask those sheets. In either case, the "Unhide All" command is added to the menu in 2208 to allow the user to unhide hidden nodes. A pop-up menu for a hidden but exposed FolderNode is shown in 2303. If in 2202, the node clicked is a SheetNode or a ChartNode, then in 2209 if this node is hidden but showing, then in 2211 the "Mask" and "Unhide" commands preferably are added to the menu to allow the user to mask or unhide this node. Otherwise, in 2210, the "Hide" command is added to the menu along with SheetNode and ChartNode related menu commands. In 2304, a typical pop-up menu for a SheetNode or ChartNode is depicted. Once the menu has been configured, it is displayed to the user in 2212. After the pop-up menu is displayed, the user may select from the available menu commands to perform the actions described below. The operation in FIGS. 22A-E then exits in 2213.

FIGS. 24A-D describe how a new worksheet or folder is added to the HUI. Note that chart-sheets are not added to EXCEL proactively by the user; EXCEL adds chart-sheets programmatically. In 2400, the user chooses to add either a new worksheet or folder from the pop-up menu. In 2401, if the user adds a worksheet, a new SheetNode is created in 2402. In 2403, the BookNode to which the new SheetNode is added is retrieved. In 2404, if this is not the active BookNode, then its corresponding EXCEL workbook preferably is activated so that the new EXCEL worksheet preferably is added to the correct EXCEL workbook, as indicated in 2405. In 2406, a check is made to ensure the new worksheet was added successfully to EXCEL. If it was not, then in 2407, this operation is cancelled to avoid causing an EXCEL error. If the EXCEL-side renaming operation succeeded, then in 2408 the unique name EXCEL assigns to the new worksheet preferably is retrieved and assigned to the new SheetNode. In this way, EXCEL's naming conventions are followed. In 2409, the new SheetNode is added to its parent node, which may be either a BookNode or a FolderNode. If in 2401 the user adds a new folder, a corresponding FolderNode is created in 2410 and in 2411 this folder node is added to its new parent, which may be either a BookNode or another FolderNode. Because FolderNodes have no counterpart in EXCEL, no changes are required within the EXCEL and EXCEL naming conventions need not be followed. Finally, in 2412, the tree is reformatted and saved to persist these changes. The operation in FIGS. 24A-D then exits in 2413.

FIGS. 25A-D describes how sheets are deleted. It is preferable for deletions to conform to EXCEL's requirement that workbooks have at least one visible sheet at times. It is preferable for this condition to be closely monitored during delete operations, and it is preferable to forestall deletions that remove the last visible sheet from a workbook. To adhere to this rule, a backward recursion is used for deletion in which the bottom-most leaf nodes are deleted first, followed by parent and ancestor nodes. When a SheetNode or ChartNode is encountered in the recursion, deletion preferably proceeds if its corresponding EXCEL sheet is not the last visible sheet in its workbook. When a FolderNode is encountered, deletion preferably proceeds if it has no un-deleted children. In 2500, the user selects the delete command from the pop-up menu. In 2501, when the user wants to delete a node, which may include child nodes, a warning is displayed informing the user of how many sheets is deleted. This warning is necessary because, unlike in EXCEL, a single delete operation in the HUI may delete many sheets simultaneously. In 2502, if the user chooses to cancel the deletion, then the delete operation is terminated in 2503. Otherwise, in 2504, the next child in the collection of nodes to be deleted is retrieved. In 2505, if it is a SheetNode or ChartNode, then in 2506, if this is the last visible sheet in the workbook, then the sheet preferably is not deleted and the next node in the collection is retrieved in 2504. If it is not the last visible sheet in the workbook, then in 2508, the EXCEL sheet is deleted and its corresponding SheetNode or ChartNode is marked for deletion. If in 2505, the node is a FolderNode, then in 2507 if the node lacks undeleted children, it preferably is not the bottom-most node in its hierarchy, so the recursion continues in 2504. Otherwise, it is marked for deletion in 2509. In 2510, once selected EXCEL sheets are deleted and corresponding nodes are marked for deletion, nodes marked for deletion are removed from their parent in 2511 and the tree view is reformatted and persisted in 2512. The operation in FIGS. 25A-D then exits in 2513.

FIGS. 26A-D and 27A-C describe how nodes are copied, cut, and pasted.

Nodes are copied/cut and pasted in four steps: The user selects the node to copy or cut (copy/cut node), the user selects the parent node (paste node) to which copied or cut nodes may be pasted, the HUI performs the EXCEL-related copy or cut operations, and the HUI performs the tree view-related copy or cut operations.

The first part of FIG. 26A describes the initial step of a copy or cut operation, in which a node to be copied or cut is selected by the user. The copy or cut operation may involve one or more nodes. For a single node operation, the node is selected by right-clicking it and selecting Copy or Cut from the pop-up menu. For a multi-node operation, a Control-click combination is used to select multiple nodes, then one of these nodes is right-clicked to select Copy or Cut from the menu. In 2600, the user selected Copy or Cut from the pop-up menu. In 2601, the selected node, its parent BookNode, and the chosen operation (copy or cut) is noted for reference when completing the copy or cut operation.

The second part of FIGS. 26A-D describe the first step of a paste operation. To paste the copied or cut node(s), a new parent node is selected by right clicking the parent node and selecting the Paste menu command. Clicking the parent node triggers the following actions. In 2602, after the user selects Paste from the pop-up menu, in 2603, the new parent node and the parent node's including workbook is noted for reference. In 2604, if multiple nodes are selected to be copied or cut, then in 2605, if the cut operation removes the last visible sheet from the source workbook, it is preferable to curtail the cut operation in 2607. Otherwise, if the destination workbook differs from the source workbook, then the destination workbook is activated in 2608. Then, each node in the collection of nodes to be pasted is retrieved in 2609, and the paste operation proceeds as in 2612. If more nodes remain to be cut or copied in 2611, then the above steps are repeated until nodes are copied or cut. For example, if five nodes are selected to be cut or copied using the Control-click combination, the steps above are repeated for five selected nodes. If in 2604, a single node is selected to be copied or cut, then in 2606, if removing this node in a cut operation results in the last visible sheet being deleted from EXCEL, the cut operation preferably is terminated in 2607. Otherwise, the destination workbook is activated in 2610 if the destination workbook differs from the source workbook, and the paste operation proceeds in 2612. Finally, in 2613, the tree is reformatted and persisted to save the results of the copy or cut operation. The operation in FIGS. 26A-D then exits in 2614.

FIGS. 27A-C describe the final step in a paste operation, in which nodes are copied or moved to a new parent. The paste operation proceeds in two steps. First, for SheetNodes and ChartNodes, the underlying EXCEL sheets are copied or moved using native EXCEL commands. Second, the corresponding SheetNodes, ChartNodes, and FolderNodes are copied or moved to their new parent. In 2700, the node to be cut or copied is passed in from FIGS. 26A-D. In 2701, if a FolderNode is being pasted, in 2702, it preferably is excluded because FolderNodes do not have corresponding EXCEL sheets and thus do not require EXCEL-side copy and move operations; preferably SheetNodes and ChartNodes require such operations. If in 2701, the node being pasted is a SheetNode or ChartNode, then its underlying sheet is retrieved in 2703. If in 2704, this is a cut operation, then in 2705, if the source and destination workbooks are the same, then the cut operation is ignored in 2713 because cutting and pasting a sheet within the same workbook does not change state so it is an unnecessary operation. Otherwise, in 2706, EXCEL's native Move operation is applied to move the sheet from the source workbook to the destination workbook. If in 2704, this is a copy operation, then EXCEL's native Copy command is applied to make a copy of the sheet, either within the same workbook, or from the source workbook to the destination workbook in 2707. Once the EXCEL-side copy or move operations are complete, then in 2708, depending on the node type of the new parent, the node is added to the BookNode in 2709, added to the FolderNode in 2710, or added before or after the SheetNode or ChartNode, 2711, that was selected prior to the paste operation. These operations are repeated until copied or cut nodes and underlying EXCEL sheets are pasted to their new parent. The operation in FIGS. 27A-C then exits in 2712.

FIGS. 28A-C describe how nodes are renamed. Nodes are renamed by right-clicking them and selecting the Rename command from the pop-up menu. In 2800, the user selected the Rename operation from the pop-up menu. In 2801, when the user chooses to rename a node, a text box is overlaid on the node, and the contents of that textbox are populated with the node's current label. The user now is able to edit the node's label. The user signals the end of editing either by pressing the return key or by clicking outside of the text box. In 2802, the user signals the completion of editing by pressing the return key or clicking outside of the node's bounds. In 2803, after editing is complete, the new node name is retrieved from the text box. In 2804, the next step depends on the type of node edited. If a SheetNode or ChartNode is edited, it is preferable to enforce EXCEL's naming conventions. EXCEL prefers sheet names to be unique and also that illegal characters, such as :, \, /, and ? be avoided. It is preferable for SheetNodes and ChartNodes to conform to these naming conventions because they have corresponding EXCEL sheets. EXCEL's naming conventions are enforced by first renaming the underlying EXCEL sheet using the name supplied by the user in 2805. In 2806, if EXCEL accepts the new name, then preferably the node is renamed in 2807. If EXCEL rejects the name because it violates EXCEL's naming conventions, the node is preferably not renamed, as in 2808. In 2804, if a FolderNode is edited, the node is renamed automatically in 2810. FolderNodes are preferably not subject to EXCEL's naming conventions because they do not have a counterpart in EXCEL. Thus, the names of FolderNodes may include characters and preferably need not be unique. In 2809, the tree view is redrawn and saved, and the operation in FIGS. 28A-C then exits in 2811.

FIGS. 29, 30A-B, 31A-B, and 32A-B describe how nodes are hidden, unhidden, masked, and exposed. To replicate EXCEL's native behavior, the HUI allows nodes to be hidden. It also allows hidden nodes to be exposed ("shown") so that they may be unhidden. This capability is enabled by two node attributes: Hidden and ShowHidden. FIG. 29 illustrates the allowed states and state transitions for these variables. Normally, Hidden is false and ShowHidden is true for nodes 2901. When a node is hidden 2902, preferably Hidden is set to true and ShowHidden is set to false. From this state, hidden nodes may be exposed by setting ShowHidden to true 2903. Hidden nodes that are exposed may be masked, by setting ShowHidden to false, or unhidden, by setting Hidden to false. The logic used to implement these transitions is described below.

FIGS. 30A-B describe how nodes are hidden. In 3000, the user selected Hide from the pop-up menu. It is preferable to avoid hiding the last visible sheet from the corresponding workbook to prevent errors within EXCEL. To avoid this condition, a backward recursion is used in which leaf nodes are hidden first, followed by parent and ancestor nodes. The backward recursion is represented by 3001, in which each child of the node to be hidden is retrieved, and in 3002, the hidden node's full collection of child nodes is traversed until the bottom-most node is located. In 3003, if the bottom-most node is a SheetNode or ChartNode, and in 3004, if this bottom-most node is the last visible sheet in the workbook, this bottom-most node is not hidden, as in 3005. Otherwise, in 3007, this bottom-most node is hidden. In 3003, if this bottom-most node is a FolderNode, and in 3006, if this bottom-most node includes unhidden children or grandchildren, this bottom-most node is not hidden, as in 3005. Otherwise, in 3007, this node is hidden. In 3008, it is preferable to mask the selected node, the selected node's children, and the selected node's ancestors so that "Show Hidden" is among the menu commands when a visible ancestor is right-clicked to display the menu. In 3009, the tree is reformatted and persisted to save the results of the hide operation. The operation in FIGS. 30A-B then exits in 3010.

FIGS. 31A-B describe how nodes are unhidden by the HUI. Unhiding nodes is less complicated than hiding nodes because there is no risk of hiding the last visible sheet. In 3100, the user selected Unhide from the pop-up menu. In 3101, if there are unhidden nodes remaining in the collection of nodes to unhide, in 3102, the next node in this collection is retrieved. In 3103, if this node lacks children, then it preferably is unhidden in 3104. Otherwise, the next node preferably is retrieved and these steps repeated until leaf nodes are unhidden. In 3101, once nodes are unhidden, an upward recursion proceeds, climbing up the tree of direct ancestors of the selected node. It is preferable for direct ancestors to be unhidden to enforce the principle that hidden parents may not have unhidden children. In 3105, the next ancestor node is retrieved and unhidden in 3106. If in 3107 there are more ancestor nodes, these steps are repeated until direct ancestors are unhidden. In 3108, ShowHidden is set to true so that when the user right clicks on this node or its ancestors or children, "Mask Hidden" preferably is among the menu commands. In 3109, the tree is reformatted and persisted to save the results of the unhide operation. The operation in FIGS. 31A-B then exits in 3110.

FIGS. 32A-B describe the logic for showing and masking nodes. To show or mask hidden nodes, the user right clicks an unhidden parent and selects Show from the menu, which causes hidden children to be added back to the tree view and rendered in a translucent, gauzy format that distinguishes them from normal nodes. In 3200, the user selected Show from the pop-up menu. In 3201, if there are non-exposed or non-masked descendants of the node selected by the user, then in 3202 the next node is retrieved. In 3203, if this node lacks children, then it preferably is shown or masked, as in 3204. Otherwise, the next node preferably is retrieved and these steps repeated until leaf nodes are shown or masked. In 3201, once nodes are shown or masked, then an upward recursion is used to climb up the tree of direct ancestors of the selected node. It is preferable for direct ancestors to be shown or masked to enforce the principle that shown or masked parents may not have children that are not shown or masked. In 3205, the next ancestor node is retrieved and shown or masked in 3206. If in 3207 there are more ancestor nodes, these steps are repeated until direct ancestors are shown or masked. In 3208, the tree is reformatted and persisted to save the results of the show or mask operation. The operation in FIGS. 32A-B then exits in 3209.

The HUI has three "infrastructure" operations that are invoked frequently when the HUI is active. These are captured in (a) FIGS. 33, 34A-C, and 35A-D, which describe how EXCEL's main window is modified and maintained during a HUI session, (b) FIGS. 36A-B, 37, 38A-D, and 39A-B, which describe how the tree view is updated and redrawn whenever the node hierarchy changes, and (c) FIGS. 40A-D, which describes how the HUI saves hierarchical relationships to the storage sheet.

FIG. 33 describes the EXCEL child windows referenced by the HUI. XLMAIN, 3301, is a window that encompasses the entire EXCEL application. There is one XLMAIN window for each active EXCEL application. XLDESK, 3302, encompasses EXCEL's working area. There is one XLDESK for each active EXCEL instance. EXCEL7, 3303, encompasses the working area of a single EXCEL workbook. For each open EXCEL workbook, there is one EXCEL7. EXCEL7 has three child windows that are referred to as "knobs" (Top Knob, 3304; Right Knob, 3305; and LeftKnob 3306). EXCEL7 also has two primary scroll bars (Vertical Scrollbar, 3307; and Horizontal Scrollbar, 3308).

FIGS. 34A-C and 35A-D describe the steps involved in updating and maintaining the position of EXCEL's child windows and the TabShield, 207A. FIGS. 34A-C describe the first step in laying out EXCEL's main window: enumerating active EXCEL7 windows and their child windows. In 3400, EXCEL's window moved or the user selected a tree node, which in turn causes underlying movements to EXCEL's child windows. In 3401, XLMAIN and XLDESK are identified, and within them, EXCEL7 windows and corresponding child windows are enumerated. If in 3402, if EXCEL9 is among EXCEL's child windows, then the workbook being examined is in EXCEL's protected mode and preferably is not opened by the HUI, as indicated in 3403. In 3404, if this is a newly-opened workbook, then a new TabShield is added in 3405 to hide EXCEL's navigation buttons. The TabShield is added as a child window of each EXCEL7 window. Next, in 3406, each EXCEL7 child window is examined and classified based on its ClassName and WindowText attributes, using the logic described in table 3407. In 3408, this examination continues for all EXCEL7 child windows. The ClassName and WindowText attributes are used to identify child windows because there is no direct means for distinguishing of EXCEL7's child windows-consistently, so their identities preferably is inferred from ClassName and WindowText, and in some cases from the order in which child windows appear in EXCEL7's child window collection. The operation in FIGS. 34A-C then exits in 3409.

Once EXCEL's child windows are enumerated and classified, their dimensions and coordinates, which are attributes of each window, are used to reposition them as shown in FIGS. 35A-D. In 3500, the repositioning operation continues from FIGS. 34A-C. First, in 3501, the LeftKnob is repositioned by assigning new coordinates according to table 3502. Next, in 3503, if the workbook has sheets with frozen panes, then it is preferable to use a special horizontal scrollbar, as indicated in 3504, that EXCEL uses for sheets that are frozen, to conceal EXCEL's tabs. Otherwise, in 3505, EXCEL's normal horizontal scroll bar is used. Once the appropriate scroll bar has been identified, in 3506 its coordinates and dimensions are updated according to table 3507. Finally, in 3508, the TabShield's coordinates and dimensions are updated according to table 3509. The operation in FIGS. 35A-D then exits in 3510.

FIGS. 36A-B, 37, 38A-D, and 39A-B, describe how the tree view is updated and redrawn. It is preferable to draw the tree view after hierarchical relationships are initialized or restored, and redraw the tree view whenever its state is invalid.

FIGS. 36A-B describe how the node hierarchy is updated before the tree view is redrawn. In order to render the tree view accurately, the node hierarchy preferably reflects changes made to the tree view since it last was redrawn. For example, if a new node has been added, the node hierarchy preferably is updated to reflect this change. This is accomplished by cloning the BookNode's hierarchy and excluding from this cloned hierarchy nodes that should not appear in the tree view. Preferably only nodes that are "drawable"—that is, neither hidden nor masked—should appear in the tree view; non-drawable nodes preferably are excluded from this cloned hierarchy. In 3600, the HUI is undergoing a redraw operation in response to user interaction and/or movements of EXCEL's windows. In 3601, the active BookNode is retrieved and cloned. In 3602 each child node of this active BookNode is retrieved and if, in 3603, this child node is determined to be drawable, then in 3604, this child node preferably is cloned and added to the cloned BookNode; if this child node is determined not to be drawable in 3603, then this child node preferably is excluded by bypassing 3604. If in 3605 more child nodes remain to be examined in the active BookNode, steps 3602, 3603, 3604, and 3605 are repeated until all drawable child nodes of the active BookNode are added to the cloned hierarchy. In 3606, when drawable nodes are added to the cloned BookNode, the current BookNode is removed from the tree view and replaced with this new clone. The tree view now includes a BookNode with visible nodes and reflects the current state of the HUI's node hierarchy. In 3607, the tree view is then formatted to reflect EXCEL's current state.

Once the cloned hierarchy is created, it is preferable for nodes to be formatted to reflect EXCEL's current state. FIG. 37 describes the possible states and corresponding formatting of each type of node. In 3701, BookNodes have three possible states: Active, Selected, and Dormant. If active, the corresponding EXCEL workbook preferably has bold text. If selected, it also preferably has bold text and be shaded. If the BookNode is dormant, the workbook is inactive and preferably is formatted with plain text and no shading. In 3702, FolderNodes have two possible states: Active and Dormant. If the folder is selected by the user, it is active and preferably is shaded; if not, it is dormant and preferably has plain text and no shading. In 3703, SheetNodes and ChartNodes have four possible states: Singular, Active, Selected, and Dormant. If Singular, the corresponding EXCEL sheet is the sole active sheet in its workbook and preferably is shaded with white text. If Active, the sheet is participating in a multi-sheet selection, but is not the active sheet, so preferably is shaded with black text. If Selected, the sheet is both the active sheet, and participating in a multi-sheet selection. It preferably has bold text and no shading. If Dormant, the sheet is neither active nor selected; this is the normal state for EXCEL sheets and preferably has plain text and no shading.

FIGS. 38A-D describe the process by which nodes are formatted using the formatting rules described in FIG. 37. Note that the HUI uses a reactive formatting strategy. That is, formatting occurs after an operation, such as adding a new sheet, is complete and EXCEL's state stabilizes. This reactive approach is necessary because it is not always possible to anticipate EXCEL's state before an operation is complete. For example, there is no way safely to determine if a sheet is being selected during multi-sheet formula session; efforts to examine state proactively disrupts the formula session. Instead, the HUI waits until the select operation is complete, then checks EXCEL's state and formats nodes accordingly. In this way, nodes are assured of correctly representing EXCEL's state following user interactions, and interference with EXCEL's native functionality is avoided. In 3800, the select operation continues from FIGS. 36A-B. In 3801, after a tree operation completes, each node in the tree view is examined to determine that tree node's node type. In 3802, if the node is a BookNode, then in 3803, if the node is the active BookNode, then the node's font preferably is formatted bold. In 3804, if the node is a FolderNode, then in 3805, if the node is active, then its font preferably is formatted bold. If the node is a SheetNode or ChartNode, then in 3806, the node's state preferably is defined as one of the four states listed in 3807 for SheetNodes and ChartNodes, based on the logical combination of 3808 (Is Active) and 3809 (Is in EXCEL's SelectedSheets collection). These two attributes, 3808 and 3809, are updated by EXCEL when operations are complete and may be used to uniquely identify the state of a node. Finally, in 3810, if more nodes remain to be formatted, then the above steps are repeated until nodes are formatted. The tree view is then repainted in 3811. The operation in FIGS. 38A-D then exits in 3812.

FIGS. 39A-B describe how the tree view is drawn on the computer screen after formatting is complete. Drawing proceeds one BookNode at a time. In 3900, the drawing operation continues from FIGS. 38A-D. For each BookNode, its child nodes are enumerated in 3901. Then each node in this collection is retrieved in 3902, and in 3903 its coordinates are calculated based on its vertical and horizontal position within the tree view. In 3904, using these coordinates, the node is rendered to the computer screen using MICROSOFT WINDOWS drawing commands. Because each node has been pre-formatted based on its state, as described in FIGS. 37 and 38A-D, the node is formatted as it is rendered. In this way, after the node is rendered, it preferably appears in the correct location on the screen, formatted to reflect EXCEL's current state. In 3905, if more nodes remain, they preferably are drawn as just described until all nodes are rendered. The operation in FIGS. 39A-B then exits in 3906.

FIGS. 40A-D describe how the HUI persists hierarchical relationships to the storage sheet. This operation is called immediately after initialization of the HUI, and also whenever hierarchical relationships change. Hierarchical relationships are retained within the BookNode. In 4000, the HUI's hierarchical relationships have changed and preferably are saved. If in 4001, the corresponding workbook is password protected when a save operation is attempted, hierarchical relationships preferably are not saved and the save operation preferably terminates in 4002. Password protected workbooks are preferably not saved by the HUI because the save operation preferably alters the storage sheet, which is forbidden by protected workbooks. If the workbook is not protected, then in 4003, a new 2-dimensional array is created ('nodeArray'). The BookNode's hierarchical relationships are converted to a 2-dimensional array in which each row corresponds to a single node. In 4004, each child node of the BookNode is retrieved and added, along with its primary attributes, to the nodeArray. In 4005, step 4004 is repeated until all nodes and node attributes are added to the nodeArray. In 4006, this array is then persisted to an EXCEL range object within the hidden storage sheet using the column structure defined by 4007. The operation in FIGS. 40A-D then exits in 4008.

HUI Operating Environment

FIG. 41 illustrates a hardware operating environment for the HUI. In 4101, computer memory is utilized to store the HUI software, EXCEL software, and user data files, including EXCEL workbooks that are modified by the HUI. The computer screen, 4102, displays EXCEL's and the HUI's user interfaces. The keyboard, 4103, is used by the user to manipulate certain aspects of the HUI, such as renaming FolderNodes, SheetNodes, and ChartNodes. The computer mouse, 4104, is used to interact with the HUI's tree view.

FIG. 42 illustrates a software operating environment for the HUI. The HUI operates within EXCEL's computing environment. That is, the HUI is not a stand-alone application capable of running independently on the computer's operating system, but instead it runs as an AddIn within EXCEL's software environment. The user, 4201, interacts with the HUI. The universe of software applications installed on the user's computer is represented by 4202, among which is EXCEL. Within EXCEL's operating environment, 4203, the HUI, 4204, operates within the active EXCEL instance, 4205. The computer operating system, 4206, controls the underlying computer operations.

FIG. 43 illustrates a typical user session with the HUI. In 4301, the user starts the EXCEL application on their computer. Once EXCEL is running, the user activates the HUI by clicking the check box as in 4302. In 4303, this causes the HUI to activate and render the tree view and modified EXCEL window. In 4304, while the HUI is active, the user may perform HUI-related operations, such as organizing tabs in a vertical hierarchy and navigating workbooks, as well as other EXCEL-related tasks. In 4305, when the user completes their HUI session, they may save the workbook, which in turn persists the hierarchical relationships created during this session for future use by this user or other HUI users with whom the workbook is shared. In 4306, the user optionally may click the HUI checkbox in EXCEL's ribbon to deactivate the HUI.

Embodiments may be implemented in hardware, firmware, software, or any combination thereof. Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transitory machine-readable medium may include read only memory (ROM); random access memory (RAM); magnetic disk storage media; optical storage media; flash memory devices; and others.

It should be understood that the block and flow diagrams may include more or fewer elements, be arranged differently, or be represented differently. It should be understood that implementation may dictate the block and flow diagrams and the number of block and flow diagrams illustrating the execution of embodiments of the invention.

While this invention has been particularly shown and described with references to example embodiments thereof, it is understood by those skilled in the art that various changes in form and details may be made therein without departing from the scope of the invention encompassed by the appended claims.

What is claimed is:

1. A computer-implemented method comprising:

identifying, within a computer-implemented spreadsheet application, one or more workbooks including one or more worksheets that are organized in a tabbed user interface, the tabbed user interface performing at least one of selection, navigation, and organization of the one or more worksheets in a linear fashion;

organizing, in a hierarchical manner, hierarchical elements that are representative of one or more folders, the one or more workbooks, and the one or more worksheets identified in the tabbed user interface, and mapping one or more hierarchical relationships between the hierarchical elements, wherein the one or more hierarchical relationships include parent-child relationships not existing in the tabbed user interface;

displaying at least the hierarchical elements and the one or more hierarchical relationships to a user through a hierarchical user interface having the one or more folders, the one or more workbooks, and the one or more worksheets;

replacing the tabbed user interface with the hierarchical user interface; and enabling the user to perform one or more operations including at least one of selecting, navigating, and organizing at least one of the hierarchical elements, the one or more workbooks, the one or more worksheets identified in the tabbed user interface, and the one or more folders;

wherein the one or more folders include at least one folder and at least two sub-folders within the at least one folder, wherein the one or more folders provide hierarchical grouping of the one or more worksheets identified in the tabbed user interface, the one or more folders, and the at least two sub-folders.

2. The computer-implemented method of claim 1, wherein the tabbed user interface includes tabs and navigation controls.

3. The computer-implemented method of claim 1, further displaying the hierarchical user interface in a manner that enables the user to have full visualization of full structure and content of the one or more workbooks and the one or more worksheets without a requirement for scrolling.

4. The computer-implemented method of claim 1, further comprising enabling the user, through the hierarchical user interface, to select and modify each hierarchical element and to modify the one or more hierarchical relationships between the hierarchical elements and their corresponding workbooks and worksheets.

5. The computer-implemented method of claim 1, wherein the one or more hierarchical relationships are shared and modified by other users.

6. The computer-implemented method of claim 1, further comprising storing the one or more hierarchical relationships in a persistent manner.

7. The computer-implemented method of claim 1, further comprising, upon initially accessing a given document, associating a storage medium with the given document, the computer-implemented software application.

8. The computer-implemented method of claim 1, further comprising identifying and restoring hierarchical relationships between the hierarchical elements.

9. The computer-implemented method of claim 1, further comprising enabling alternation between the tabbed user interface and the hierarchical user interface.

10. The computer-implemented method of claim 1, further comprising preventing users from manipulating navigation controls and tabs of the tabbed user interface by hiding navigation controls and tabs by at least one of: resizing a native application window, relocating a native application window, and adding an application window, wherein the one or more workbooks include the one or more workbooks of the computer-implemented spreadsheet application, the one or more worksheets include at least one of one or more worksheets of the computer-implemented spreadsheet application and one or more charts, and the tabbed user interface is a native interface of the computer-implemented spreadsheet application.

11. The computer-implemented method of claim 1, further comprising preserving a full-range of functionality of the tabbed user interface in the hierarchical user interface, the hierarchical user interface emulating navigation actions of the tabbed user interface by performing simulated mouse clicks.

12. The computer-implemented method of claim 1, further comprising modifying at least one of the hierarchical elements by at least one of:
   adding and deleting the at least one of the hierarchical elements and corresponding worksheets;
   copying, cutting, and pasting the at least one of the hierarchical elements and corresponding worksheets;
   moving the at least one of the hierarchical elements and corresponding worksheets, using drag and drop operations; and
   hiding and unhiding the at least one of the hierarchical elements and corresponding worksheets.

13. The computer-implemented method of claim 1, further displaying with a tree view a cloned hierarchy comprising unhidden hierarchical elements.

14. The computer-implemented method of claim 1, wherein the navigating or selecting occurs without the user requiring multiple mouse clicks or scrolling.

15. The computer-implemented method of claim 1, further comprising drawing a tree view that displays the hierarchical elements and renders one or more tabbed workbooks in a visual hierarchy.

16. The computer-implemented method of claim 1, wherein a first sub-folder of the at least two sub-folders is a parent folder to a second sub-folder of the at least two sub-folders.

17. The computer-implemented method of claim 1, wherein the one or more workbooks include the one or more workbooks of the computer-implemented spreadsheet application, the one or more worksheets include at least one of one or more worksheets of the computer-implemented spreadsheet application and one or more charts, and the tabbed user interface is a native interface of the computer-implemented spreadsheet application.

18. The computer-implemented method of claim 17, further comprising initializing and updating the hierarchical user interface by at least one of the following:
   modifying a main window of the computer-implemented spreadsheet application to conceal tabs and navigation controls of the tabbed user interface;
   initializing the one or more hierarchical relationships; and
   adding a tree view to the tabbed user interface.

19. The computer-implemented method of claim 17, wherein
   at least one of the one or more hierarchical relationships is between a plurality of worksheets of the computer-implemented spreadsheet application and a folder of the one or more folders.

20. A computer-implemented system comprising:
   at least one processor configured to identify, within a computer-implemented spreadsheet application, one or more workbooks including one or more worksheets that are organized in a tabbed user interface, the tabbed user interface performing at least one of selection, navigation, and organization of the one or more worksheets in a linear fashion;

the at least one processor configured to organize, in a hierarchical manner, hierarchical elements that are representative of one or more folders, the one or more workbooks, and the one or more worksheets identified in the tabbed user interface, the at least one processor configured to map one or more hierarchical relationships between the hierarchical elements, wherein the one or more hierarchical relationships include parent-child relationships not existing in the tabbed user interface;

a display configured to display at least the hierarchical elements and the one or more hierarchical relationships to a user through a hierarchical user interface having the one or more folders, the one or more workbooks, and the one or more worksheets;

the at least one processor further configured to replace the tabbed user interface with the hierarchical user interface; and the at least one processor further configured to enable the user to perform one or more operations including at least one of selecting, navigating, and organizing at least one of the hierarchical elements, the one or more workbooks, the one or more worksheets identified in the tabbed user interface, and the one or more folders;

wherein the one or more folders include at least one folder and at least two sub-folders within the at least one folder, wherein the one or more folders provide hierarchical grouping of the one or more worksheets identified in the tabbed user interface, the one or more folders, and the at least two sub-folders.

21. A non-transitory computer readable medium having stored thereon a sequence of instructions which, when loaded and executed by a processor coupled to an apparatus causes the apparatus to:

identify, within a computer-implemented spreadsheet application, one or more workbooks including one or more worksheets that are organized in a tabbed user interface, the tabbed user interface performing at least one of selection, navigation, and organization of the one or more worksheets in a linear fashion;

organize, in a hierarchical manner, hierarchical elements that are representative of one or more folders, the one or more workbooks, and the one or more worksheets identified in the tabbed user interface, and map one or more hierarchical relationships between the hierarchical elements, wherein the one or more hierarchical relationships include parent-child relationships not existing in the tabbed user interface;

display at least the hierarchical elements and the one or more hierarchical relationships to a user through a hierarchical user interface having the one or more folders, the one or more workbooks, and the one or more worksheets;

replace the tabbed user interface with the hierarchical user interface; and enable the user to perform one or more operations including at least one of selecting, navigating, and organizing at least one of the hierarchical elements, the one or more workbooks, the one or more worksheets identified in the tabbed user interface, and the one or more folders identified in the tabbed user interface;

wherein the one or more folders include at least one folder and at least two sub-folders within the at least one folder, wherein the one or more folders provide hierarchical grouping of the one or more worksheets identified in the tabbed user interface, the one or more folders, and the at least two sub-folders.

\* \* \* \* \*